United States Patent
Schadt et al.

(10) Patent No.: US 9,684,206 B2
(45) Date of Patent: Jun. 20, 2017

(54) COPOLYMER, AND LIQUID CRYSTAL ALIGNMENT LAYER INCLUDING CURED PRODUCT THEREOF

(75) Inventors: Martin Schadt, Seltisberg (CH); Vladimir Grigorievich Chigrinov, Kowloon (CN); Hoi-Sing Kwok, Kowloon (CN); Sayaka Nose, Kitaadachi-gun (JP); Masayuki Iwakubo, Kitaadachi-gun (JP); Masanao Hayashi, Kitaadachi-gun (JP); Yutaka Nagashima, Kitaadachi-gun (JP); Isa Nishiyama, Kitaadachi-gun (JP); Haruyoshi Takatsu, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/129,236

(22) PCT Filed: Jun. 27, 2012

(86) PCT No.: PCT/JP2012/066390
§ 371 (c)(1),
(2), (4) Date: Mar. 21, 2014

(87) PCT Pub. No.: WO2013/002260
PCT Pub. Date: Jan. 3, 2013

(65) Prior Publication Data
US 2014/0221574 A1    Aug. 7, 2014

(30) Foreign Application Priority Data

Jun. 30, 2011   (JP) ................. 2011-146556
Jun. 30, 2011   (JP) ................. 2011-146637
Jun. 30, 2011   (JP) ................. 2011-146638

(51) Int. Cl.
| | | |
|---|---|---|
| C09K 19/38 | (2006.01) |
| G02F 1/1337 | (2006.01) |
| C08F 220/10 | (2006.01) |
| C08F 220/36 | (2006.01) |
| C08F 220/30 | (2006.01) |
| C08F 220/24 | (2006.01) |
| C08F 222/10 | (2006.01) |

(52) U.S. Cl.
CPC ...... *G02F 1/133711* (2013.01); *C08F 220/10* (2013.01); *C08F 220/30* (2013.01); *C08F 220/36* (2013.01); *C09K 19/3852* (2013.01); *C08F 220/24* (2013.01); *C08F 2220/305* (2013.01); *C08F 2222/102* (2013.01)

(58) Field of Classification Search
CPC .... C08F 220/10; C08F 220/30; C08F 220/36; C08F 220/24; C08F 2220/305; C08F 2222/102; C09K 19/3852; G02F 1/133711
See application file for complete search history.

(56) References Cited

U.S. PATENT DOCUMENTS

| | | | |
|---|---|---|---|
| 5,965,761 A | 10/1999 | Buchecker et al. |
| 6,107,427 A | 8/2000 | Herr et al. |
| 7,514,514 B2 | 4/2009 | Buchecker et al. |
| 2004/0138394 A1 | 7/2004 | Buchecker et al. |
| 2008/0241431 A1 | 10/2008 | Hirai |
| 2009/0086140 A1 | 4/2009 | Yasuda et al. |
| 2010/0151154 A1 | 6/2010 | Hirai |
| 2011/0013850 A1 | 1/2011 | Wang et al. |
| 2013/0116396 A1* | 5/2013 | Nose et al. ............ 526/263 |

FOREIGN PATENT DOCUMENTS

| | | |
|---|---|---|
| CN | 1181383 A | 5/1998 |
| JP | 5-232473 A | 9/1993 |
| JP | 6-287453 A | 10/1994 |
| JP | 6-509889 A | 11/1994 |
| JP | 9-118717 A | 5/1997 |
| JP | 2682771 B2 | 11/1997 |
| JP | 10-310613 A | 11/1998 |
| JP | 2002-37826 A | 2/2002 |
| JP | 2002-517605 A | 6/2002 |
| JP | 2003-149647 A | 5/2003 |
| JP | 2009-98619 A | 5/2009 |
| JP | 4957977 B1 | 6/2012 |
| TW | 589329 | 12/2000 |
| WO | 94/00797 A1 | 1/1994 |
| WO | WO-2011122598 A1 * | 10/2011 |

OTHER PUBLICATIONS

Extended European Search Report dated Feb. 6, 2015, issued in corresponding European Application No. 12804646.3, (9 pages).
International Search Report dated Aug. 7, 2012 issued in corresponding application No. PCT/JP2012/066390.

\* cited by examiner

*Primary Examiner* — Irina S Zemel
*Assistant Examiner* — Jeffrey Lenihan
(74) *Attorney, Agent, or Firm* — Westerman, Hattori, Daniels & Adrian, LLP

(57) ABSTRACT

Provided is a liquid crystal alignment layer of which a constituent member is a polymer represented by the general formula (I).

[Chem. 1]

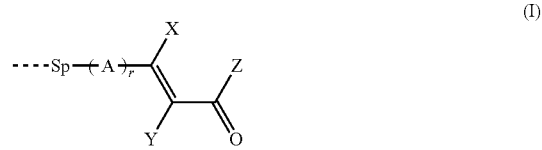

(I)

27 Claims, No Drawings

COPOLYMER, AND LIQUID CRYSTAL ALIGNMENT LAYER INCLUDING CURED PRODUCT THEREOF

TECHNICAL FIELD

The present invention relates to a polymer, a liquid crystal alignment layer, a liquid crystal display element, and an optical anisotropic body. More specifically, the present invention relates to a liquid crystal display element, a liquid crystal alignment layer in the liquid crystal display element, a polymer for producing the liquid crystal alignment layer, and an optical anisotropic body useful for an optical anisotropy film used in optical compensation of a liquid crystal display element, or the like.

The present application claims priority based on Japanese Patent Application Nos. 2011-146556, 2011-146637, and 2011-146638, each filed on Jun. 30, 2011, the contents of which are incorporated herein by reference.

BACKGROUND ART

An alignment layer for aligning liquid crystals is important for keeping the order of alignment of the liquid crystals and realizing optical characteristics based on refractive index anisotropy of liquid crystal molecules, and is an essential compositional member that constitutes a liquid crystal display element. Alignment of the liquid crystals significantly affects display characteristics of liquid crystal display elements, and thus various methods for aligning the liquid crystal have been investigated. The liquid crystal display elements can be broadly classified into two types, that is, a vertical alignment type and a horizontal alignment type.

A liquid crystal display device (sometimes referred to as a VA mode liquid crystal display device) using a liquid crystal layer of a vertical alignment type has been widely used in displays for their excellent display characteristics such as high contrast. However, since it cannot be said that the liquid crystal display device using a liquid crystal layer of a vertical alignment type necessarily has sufficient viewing angle characteristics, various methods have been investigated to improve the viewing angle characteristics. As a method for improving the viewing angle characteristics, a multi-domain vertical alignment mode (MVA mode) (incorporating an alignment division structure therein) has become prevalent, which forms a plurality of liquid crystal domains having different alignment directions in one pixel. In the MVA mode, it is necessary to control the tilt alignment of the liquid crystal molecules in order to form the alignment division structure, and as such a method, a method in which a slit (opening) or a rib (projection structure) is provided in electrodes, is used. However, with the use of the slit or the rib, the slit or the rib is linear unlike a case where a pretilt direction is defined by inserting liquid crystal molecules into two alignment films used in a TN mode used in the related art, and thus, the ability to control the alignment for the liquid crystal molecules becomes uneven within a pixel, whereby a problem of generation of a distribution in the response speeds arises.

In addition, there is another problem that a region provided with a slit or a rib exhibits decreased optical transmittance, resulting in a decrease in display luminance.

As another method for controlling the tilt alignment, there is disclosed a polymer alignment support (PSA; Polymer Sustained Alignment) technology in which photo- or thermo-polymerizable monomers are incorporated into a liquid crystal, the monomers being polymerized while tilting the liquid crystal molecules by voltage application so that the tilt direction of the liquid crystal molecules is memorized (see PTL 1). This method can overcome the problem in the distribution of the response speeds or a decrease in the optical transmittance in the slit-and-rib method. However, this method faces a problem such as changes in characteristics caused by the addition of monomers in the liquid crystal material, difficulty in controlling the process, and adverse effects of the residual monomers.

In order to avoid these problems, it is preferable even for the VA mode liquid crystal display device to form an alignment division structure by controlling the tilt alignment with an alignment film. As a method of providing the vertical alignment film with an ability to control the tilt alignment, there is a rubbing method. In this method, an alignment film made of a polyimide or the like is applied onto a substrate, and then the alignment film is rubbed with rubbing cloth to control the alignment direction and the pretilt angle. However, it is difficult to form a precise alignment division structure by the rubbing method, and thus problems of static electricity caused by friction and generation of impurities arise.

Meanwhile, as one of liquid crystal display devices using a liquid crystal layer of the horizontal alignment type, there is an In Plane Switching (IPS) mode liquid crystal display device. The IPS mode liquid crystal display device has little dependency on viewing angles such as in contrast and color tone, and is widely used in displays due to its excellent display characteristics. In the IPS mode, in order to reduce viewing angle dependency in the black display and the color reproducibility, it is required to have a low pretilt angle of one degree or less on the electrode surface. Even when achieving the horizontal alignment, a rubbing method as a general alignment method is used. However, when a horizontal alignment treatment is carried out by a rubbing treatment with a polyimide alignment film, the pretilt angle provided to the liquid crystal molecules exceeds one degree, and thus, a problem that the display characteristics are deteriorated arises.

From these problems, in any alignment mode of the vertical alignment type and the horizontal alignment type, it is important to control the alignment direction and the pretilt angle using the alignment film so as to improve the display characteristics. As a method for controlling the tilt alignment with an alignment film, a photo-alignment method is known, in addition to the methods using rubbing treatment (see PTL 2). In the photo-alignment method, a precise alignment division structure can be formed easily by changing the illumination pattern of light, and static electricity or generation of impurities is difficult to occur, as compared with the rubbing treatment since a non-contact treatment on the alignment film can be carried out, and thus, it is expected to solve the above-described problems and to improve the display characteristics.

As the materials which can be a photo-alignment layer for the liquid crystal display element, a compound having a photochemically isomerizable site, such as an azobenzene derivative (see PTL 3), a compound having a photochemically crosslinkable site, such as a cinnamic acid derivative, a coumarin derivative, and a chalcone derivative (see PTLs 4, 5, and 6), a compound causing an anisotropic photodegradation, such as a polyimide derivative, and the like are known.

However, the photo-alignment method using these compounds has a problem such as a low voltage holding ratio (VHR), as compared with a case using an ordinary alignment film. It also has problems such as a high residual voltage (RDC) caused by residual charges and frequent occurrence of seizure.

Therefore, various characteristics such as reliability, which allows realization of performance for controlling the tilt alignment of the liquid crystals and use in active matrix driving, are required, and photo-alignment layers for liquid crystals, which satisfy the requirements, have been required.

As described above, there has been a demand for a liquid crystal alignment layer having a superior ability to control the alignment of the liquid crystals and the pretilt angles and further, a high voltage holding ratio (VHR). There has been a further demand for a liquid crystal alignment layer having a superior ability to control the alignment of the liquid crystals and the pretilt angles, a high voltage holding ratio (VHR), low residual voltage, and infrequent occurrence of seizure.

Furthermore, the photo-alignment method is expected to be commercialized since it has excellent mass productivity and an ability of coping with a large substrate.

The material to be used as a material for the photo-alignment layer for a liquid crystal display element or an optical anisotropic body, a compound having a photochemically isomerizable site, such as an azobenzene derivative, has been known (see PTL 3). As an important characteristic in the use of the photo-alignment layer, what is important is a degree of irradiation dose of anisotropic light with which realignment will be performed (hereinafter referred to as sensitivity), and the photo-alignment layer using a compound having an azo group is excellent in the sensitivity and thus, exhibits an ability of aligning liquid crystals at a low irradiation dose of approximately 500 mJ/cm$^2$.

However, since the photo-alignment layer using a compound having an azo group is a low-molecular-weight compound, there may occur problems in a step of producing a liquid crystal cell, for example, it is flown off in a washing step or eroded by an adhesive member such as a sealing agent, in some cases. Further, in the case of producing an optical anisotropic body formed by repeating the lamination of a photo-alignment layer and a polymerizable liquid crystal layer in the production of an optical anisotropic body, the process includes a step of coating a polymerizable liquid crystal composition solution onto a photo-alignment layer, or a step of coating a composition solution for a photo-alignment film onto a polymerizable liquid crystal layer, but there have been cases where the liquid crystal alignment layer or the polymerizable liquid crystal layer after the production has been affected, and thus the film has been peeled, or uniform optical characteristics could not be obtained, by a solvent used in the coating solution, or the like.

Moreover, as a material which can be used for a photo-alignment layer, a compound having a photochemically crosslinkable site, such as a cinnamic acid derivative, a coumarin derivative, and a chalcone derivative; a compound causing an anisotropic photo-degradation, such as a polyimide derivative; and the like have been known (see PTLs 4, 6, and 7). However, the photo-alignment layer formed with a compound having a photochemically crosslinkable site, such as a cinnamic acid derivative, is poor at sensitivity, as compared with a compound having an azo group, is required to be irradiated with light having a potent anisotropic property during the photo-alignment, and thus, is not easily commercialized due to large-scale devices needed.

On the other hand, there has already been disclosed a polymer compound which has a skeleton having an azo group as a skeleton having a photochemically isomerizable site and having a cinnamic acid skeleton as a skeleton having a photochemically crosslinkable site (see PTL 8). However, in the cited document, the polymer compound is used as an optical non-linear polymer, there is no suggestion of use as an optical anisotropic body, and it was not clear how to use specifically and what kind of characteristics the compound has.

As described above, there has been a demand for development of a material for a photo-alignment layer, which is highly sensitive and is not eroded by a solvent or the like.

CITATION LIST

Patent Literature

[PTL 1] Japanese Unexamined Patent Application, First Publication No. 2003-149647
[PTL 2] Japanese Patent No. 2682771
[PTL 3] Japanese Unexamined Patent Application, First Publication No. H05-232473
[PTL 4] Japanese Unexamined Patent Application, First Publication No. H06-287453
[PTL 5] Japanese Unexamined Patent Application, First Publication No. H09-118717
[PTL 6] Japanese Unexamined Patent Application Publication (Translation of PCT Application) No. 2002-517605
[PTL 7] Japanese Unexamined Patent Application, First Publication No. H10-310613
[PTL 8] Japanese Unexamined Patent Application Publication (Translation of PCT Application) No. H06-509889

SUMMARY OF INVENTION

Technical Problem

The present invention has an object to provide a liquid crystal alignment layer which has a superior ability to control the alignment of liquid crystals and the pretilt angles, and a high voltage holding ratio (VHR), has a liquid crystal alignment property to provide an ability to control the alignment at a low irradiation dose of ultraviolet rays, and is not eroded by a solvent or the like; and a polymer used for the liquid crystal alignment layer. The present invention has another object to provide a liquid crystal alignment layer having superior coatability; and a polymer used for the liquid crystal alignment layer. The present invention has a further object to provide a liquid crystal display element using the liquid crystal alignment layer, and an optical anisotropic body formed using the polymer.

Solution to Problem

The present inventors have made extensive studies on various materials in order to solve the problems, and as a result, they have found that a liquid crystal alignment layer which has a superior ability to control the alignment of the liquid crystals and the pretilt angles, a high voltage holding ratio (VHR), excellent coatability, and a liquid crystal alignment property to provide an ability to control the alignment at a low irradiation dose of ultraviolet rays, and is not eroded by a solvent or the like can be obtained by coating a polymer having a structure of a specific cinnamic acid derivative onto a substrate, and curing it, thereby leading to the completion of the present invention.

The present invention provides the following polymers. Specifically, the present invention provides:

a polymer having (a) a photochemically isomerizable and photochemically non-crosslinkable site, and (b) a photochemically crosslinkable site, in which the polymer includes a structure represented by the general formula (I):

[Chem. 1]

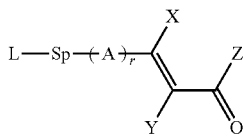

(I)

(in which L represents a polymerizable group and Sp represents a spacer unit,

A represents a group selected from the group consisting of:

(a) a trans-1,4-cyclohexylene group (one methylene group or two or more non-adjacent methylene groups present in this group may be substituted with —O—, —NH—, or —S—), (b) a 1,4-phenylene group (one —CH= or two or more —CH='s present in this group may be substituted with —N=), and (c) a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, r represents 0, 1, or 2, but in the case where r represents 2, a plurality of A's, which is present, may be the same as or different from each other, X and Y each independently represent a hydrogen atom, a fluorine atom, a chlorine atom, a cyano group, or an alkyl group having 1 to 20 carbon atoms, but a hydrogen atom in the alkyl group may be substituted with a fluorine atom, and one $CH_2$ group or two or more non-adjacent $CH_2$ groups may be substituted with —O—, —CO—O—, —O—CO— and/or —CH=CH—, and Z is represented by the general formula (IIa) or (IIb):

[Chem. 2]

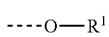

(IIa)

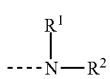

(IIb)

(in which the broken line represents a bond to a carbon atom, to which Z is bonded, and $R^1$ and $R^2$ each independently represent a hydrogen atom or a linear or branched alkyl group having 1 to 30 carbon atoms, one —$CH_2$— group or two or more non-adjacent —$CH_2$— groups in $R^1$ and $R^2$ may be substituted with —O—, —CO—, —CO—O—, —O—CO—, —CO—NH—, —NH—CO—, —$NCH_3$—, —CH=CH—, —CF=CF—, and/or —C≡C—, one —$CH_2$— group or two or more —$CH_2$— groups in $R^1$ and $R^2$ may be each independently substituted with a cycloalkyl group of from 3- to 8-membered ring, and a hydrogen atom in $R^1$ and $R^2$ may be substituted with an alkyl group having 1 to 20 carbon atoms, a cyano group, or a halogen atom)).

As used in the present specification, the "(a) photochemically isomerizable and photochemically non-crosslinkable site" means a site which can cause an isomerization reaction such as a cis-trans isomerization reaction, but does not substantially cause a reaction for forming a new bond, such as a 2+2-cyclization reaction, simultaneously in the site, at an irradiation of the site with light.

As used in the present specification, the "(b) photochemically crosslinkable site" means a site which can cause a reaction for forming a new bond, such as a 2+2-cyclization reaction, in the site, at an irradiation of the site with light.

A second embodiment of the present invention is a liquid crystal alignment layer for a vertical alignment mode liquid crystal display element, using the polymer of the present invention.

A third embodiment of the present invention is a vertical alignment mode liquid crystal display element, using liquid crystal alignment layer using the polymer of the present invention.

A fourth embodiment of the present invention is a liquid crystal alignment layer for a horizontal alignment mode liquid crystal display element, using the polymer of the present invention.

A fifth embodiment of the present invention is a horizontal alignment mode liquid crystal display element, using a liquid crystal alignment layer using the polymer of the present invention.

A sixth embodiment of the present invention is an optical anisotropic body constituted with polymer of a polymerizable liquid crystal composition using the polymer of the present invention, in which the polymerizable liquid crystal molecules in the polymerizable liquid crystal composition are aligned using the polymer of the present invention.

Advantageous Effects of Invention

By using the polymer of the present invention, a liquid crystal alignment layer which has a superior ability to control the alignment of the liquid crystals and the pretilt angles, and a high voltage holding ratio (VHR) can be produced, which is efficiently provided with an alignment property at a low dose of irradiation of polarized light. Further, a liquid crystal alignment layer having excellent coatability, in addition to the characteristics above, and/or a liquid crystal alignment layer having low residual voltage can be produced.

Since the liquid crystal alignment layer of the present invention has a high voltage holding ratio (VHR) and a superior ability to control the alignment of the liquid crystals and the pretilt angles, and is not easily eroded by a solvent or the like, it can be used to efficiently produce a liquid crystal display element and a liquid crystal display device, each exhibiting excellent display properties and reliability. Further, the optical anisotropic body of the present invention is useful for the production of an optical anisotropy film that can be used in optical compensation or the like.

DESCRIPTION OF EMBODIMENTS

Hereinafter, preferable examples of the present invention will be described in detail.

(Aspects of Polymer)

The polymer of the present invention may include a polymer having (a) a photochemically isomerizable and photochemically non-crosslinkable site, and (b) a photochemically crosslinkable site, in which the polymer includes a structure represented by the general formula (I).

[Chem. 3]

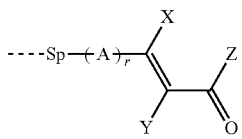
(I)

In the general formula (I), Sp is bonded to A and L (not shown in the formula above), L represents a polymerizable group, and Sp represents a spacer unit, A represents a group selected from the group consisting of:

(a) a trans-1,4-cyclohexylene group (one methylene group or two or more non-adjacent methylene groups present in this group may be substituted with —O—, —NH—, or —S—), (b) a 1,4-phenylene group (one —CH= or two or more —CH='s present in this group may be substituted with —N=), and (c) a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, r represents 0, 1, or 2, but in the case where r represents 2, a plurality of A's, which is present, may be the same as or different from each other, X and Y each independently represent a hydrogen atom, a fluorine atom, a chlorine atom, a cyano group, or an alkyl group having 1 to 20 carbon atoms, but a hydrogen atom in the alkyl group may be substituted with a fluorine atom, and one $CH_2$ group or two or more non-adjacent $CH_2$ groups may be substituted with —O—, —CO—O—, —O—CO— and/or —CH=CH—, and Z is represented by the general formula (IIa) or (IIb).

[Chem. 4]

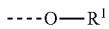
(IIa)

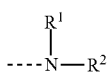
(IIb)

In the general formula (IIa) or (IIb), the broken line represents a bond to a carbon atom, to which Z is bonded, and $R^1$ and $R^2$ each independently represent a hydrogen atom or a linear or branched alkyl group having 1 to 30 carbon atoms, one —$CH_2$— group or two or more non-adjacent —$CH_2$— groups in $R^1$ and $R^2$ may be substituted with —O—, —CO—, —CO—O—, —O—CO—, —CO—NH—, —NH—CO—, —$NCH_3$—, —CH=CH—, —CF=CF—, and/or —C≡C—, one —$CH_2$— group or two or more —$CH_2$— groups in $R^1$ and $R^2$ may be each independently substituted with a cycloalkyl group of from 3- to 8-membered ring, and a hydrogen atom in $R^1$ and $R^2$ may be substituted with an alkyl group having 1 to 20 carbon atoms, a cyano group, or a halogen atom)).

<With Respect to Z>

In the general formula (IIa) or (IIb), preferably, $R^1$ represents a linear or branched alkyl group having 1 to 30 carbon atoms (one —$CH_2$— group or two or more non-adjacent —$CH_2$— groups in the alkyl group are substituted with —O—, —CO—, —CO—O—, —O—CO—, —CO—NH—, —NH—CO—, or —$NCH_3$—, one —$CH_2$— group or two or more —$CH_2$— groups in the alkyl group may be each independently substituted with a cycloalkyl group of from 3- to 8-membered ring, and a hydrogen atom in the alkyl group may be substituted with an alkyl group having 1 to 20 carbon atoms, a cyano group, or a halogen atom), and $R^2$ represents a linear or branched alkyl group having 1 to 30 carbon atoms (one —$CH_2$— group or two or more —$CH_2$— groups in the alkyl group may be each independently substituted with a cycloalkyl group of from 3- to 8-membered ring, and a hydrogen atom in the alkyl group may be unsubstituted or may be substituted with an alkyl group having 1 to 20 carbon atoms, a cyano group, or a halogen atom).

In the general formula (IIa) or (IIb), preferably, $R^1$ is represented by the general formula (IIc):

[Chem. 5]

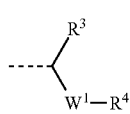
(IIc)

(in which the broken line represents a bond to an oxygen atom or a nitrogen atom, $W^1$ represents a methylene group (a hydrogen atom in the methylene group may be unsubstituted or substituted with an alkyl group having 1 to 5 carbon atoms), —CO—O—, or —CO—NH—, $R^3$ represents a hydrogen atom or an alkyl group having 1 to 5 carbon atoms, and $R^4$ represents a linear or branched alkyl group having 1 to 20 carbon atoms (one —$CH_2$— group or two or more non-adjacent —$CH_2$— groups in the alkyl group are substituted with —O—, —CO—, —CO—O—, —O—CO—, —CO—NH—, —NH—CO—, or —$NCH_3$—, one —$CH_2$— group or two or more —$CH_2$— groups in the alkyl group may be each independently substituted with a cycloalkyl group of from 3- to 8-membered ring, and a hydrogen atom in the alkyl group may be unsubstituted or substituted with a fluorine atom or a chlorine atom).

In the general formula (IIa) or (IIb), preferably, $R^1$ represents a linear or branched alkyl group having 1 to 30 carbon atoms (one —$CH_2$— group or two or more non-adjacent —$CH_2$— groups in the alkyl group are substituted with —CH=CH—, —CF=CF—, and/or —C≡C—, and one —$CH_2$— group or two or more —$CH_2$— groups in the alkyl group may be each independently substituted with a cycloalkyl group of from 3- to 8-membered ring, and a hydrogen atom in the alkyl group may be substituted with an alkyl group having 1 to 20 carbon atoms, a cyano group, or a halogen atom), and $R^2$ represents a linear or branched alkyl group having 1 to 30 carbon atoms (one —$CH_2$— group or two or more —$CH_2$— groups in the alkyl group may be each independently substituted with a cycloalkyl group of from 3- to 8-membered ring, and a hydrogen atom in the alkyl group may be unsubstituted or may be substituted with an alkyl group having 1 to 20 carbon atoms, a cyano group, or a halogen atom).

In the general formula (IIa) or (IIb), preferably, $R^1$ is represented by the general formulae (IId) to (IIg):

[Chem. 6]

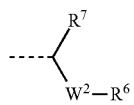
(IId)

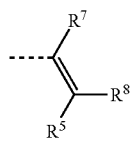
(IIf)

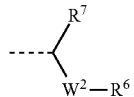
(IIe)

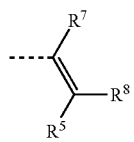
(IIg)

(in which the broken line represents a bond to an oxygen atom or a nitrogen atom, $W^2$ represents a single bond, —$CH_2$—, —CO—O—, or —CO—NH—, $R^7$ represents a hydrogen atom or an alkyl group having 1 to 5 carbon atoms, $R^8$ represents a hydrogen atom, or a linear or branched alkyl group having 1 to 20 carbon atoms (one —$CH_2$— group or two or more —$CH_2$— groups in the alkyl group may be each independently substituted with a cycloalkyl group of from 3- to 8-membered ring, and a hydrogen atom in the alkyl group may be unsubstituted or substituted with a fluorine atom or a chlorine atom), $R^5$ represents an alkyl group having 1 to 20 carbon atoms, in which a hydrogen atom in the alkyl group may be substituted with a fluorine atom, and $R^6$ represents an alkyl group having 1 to 20 carbon atoms (one —$CH_2$— group or two or more non-adjacent —$CH_2$— groups in the alkyl group are substituted with —CH=CH—, —CF=CF—, and/or —C≡C—, and one —$CH_2$— group or two or more —$CH_2$— groups in the alkyl group may be each independently substituted with a cycloalkyl group of from 3- to 8-membered ring, and a hydrogen atom in the alkyl group may be substituted with a fluorine atom or a chlorine atom)).

In the general formula (IIa) or (IIb), preferably, $R^1$ represents a hydrogen atom or a linear or branched alkyl group having 1 to 30 carbon atoms (one —$CH_2$— group or two or more —$CH_2$— groups in the alkyl group may be each independently substituted with a cycloalkyl group of from 3- to 8-membered ring, and a hydrogen atom in the alkyl group may be substituted with an alkyl group having 1 to 20 carbon atoms, a cyano group, or a halogen atom), and $R^2$ represents a linear or branched alkyl group having 1 to 30 carbon atoms (one —$CH_2$— group or two or more —$CH_2$— groups in the alkyl group may be each independently substituted with a cycloalkyl group of from 3- to 8-membered ring, and a hydrogen atom in the alkyl group may be unsubstituted or may be substituted with an alkyl group having 1 to 20 carbon atoms, a cyano group, or a halogen atom).

Further, in the general formula (I), Sp is preferably represented by the general formula (IVc) as described later.

In the general formula (IIa) or (IIb), preferably, $R^1$ represents a linear or branched alkyl group having 1 to 30 carbon atoms (one —$CH_2$— group or two or more —$CH_2$— groups in the alkyl group are each independently substituted with a cycloalkyl group of from 3- to 8-membered ring, and a hydrogen atom in the alkyl group may be substituted with an alkyl group having 1 to 20 carbon atoms, a cyano group, or a halogen atom), and $R^2$ represents a linear or branched alkyl group having 1 to 30 carbon atoms (one —$CH_2$— group or two or more —$CH_2$— groups in the alkyl group may be each independently substituted with a cycloalkyl group of from 3- to 8-membered ring, and a hydrogen atom in the alkyl group may be unsubstituted or may be substituted with an alkyl group having 1 to 20 carbon atoms, a cyano group, or a halogen atom).

Further, in the general formula (I), Sp is preferably represented by the general formula (IVb) as described later.

The alkyl group having 1 to 20 carbon atoms, represented by $R^2$, is preferably a linear or branched alkyl group or a cycloalkyl group of from 3- to 8-membered ring.

In the present specification and claims, "two or more non-adjacent $CH_2$ groups" mean "two or more $CH_2$ groups that are not adjacent to each other".

<With respect to A>

In the general formula (I), (IIa), or (IIb), in order to improve the liquid crystal alignment property of the liquid crystal alignment layer of the present invention, A is preferably a pyridine-2,5-diyl group, a pyrimidine-2,5-diyl group, or a 1,4-phenylene group.

Furthermore, in order to improve the solubility of the polymer of the present invention, A is preferably a 1,4-naphthylene group, a 2,6-naphthylene group, a 2,5-thiophenylene group, or a 2,5-furanylene group.

Moreover, in order to reduce the light irradiation dose required for aligning the liquid crystal in the liquid crystal alignment layer of the present invention, A is preferably a pyridine-2,5-diyl group, a pyrimidine-2,5-diyl group, a 2,5-thiophenylene group, or a 1,4-phenylene group.

In addition, in the liquid crystal alignment layer of the present invention, in order to realize photo-alignment at a longer wavelength, A is preferably a pyrimidine-2,5-diyl group, a 2,5-thiophenylene group, a 2,6-naphthylene group, or a 2,5-furanylene group, and X and Y are preferably a fluorine atom, a chlorine atom, or a cyano group.

Furthermore, in order to improve the voltage holding ratio in the liquid crystal alignment layer of the present invention, X and Y are each preferably a hydrogen atom, W is preferably a single bond or —CH$_2$—, R$^2$ is preferably an alkyl group having 1 to 12 carbon atoms, in which one CH$_2$ group is preferably substituted with —CH═CH— or —C≡C—.

In addition, in order to reduce the residual charges in the liquid crystal alignment layer of the present invention, W is preferably —CO—O— or —CO—NH—, R$^2$ is preferably an alkyl group having 1 to 6 carbon atoms, in which one CH$_2$ group is preferably substituted with —CH═CH— or —C≡C—.

In the polymer represented by the general formula (I) of the present invention, A is preferably a 1,4-phenylene group which may have one or more hydrogen atoms substituted with a fluorine atom, a chlorine atom, a methyl group, or a methoxy group.

By using the compound, a liquid crystal alignment layer which has good coatability, a superior ability to control the alignment of the liquid crystals and the pretilt angles, and a high voltage holding ratio (VHR) and a display element using the composition can be obtained.

<With Respect to X and Y>

In the polymer represented by the general formula (I) of the present invention, X and Y are preferably each a hydrogen atom. Thus, in the liquid crystal alignment layer of the present invention, using the polymer, the voltage holding ratio is improved.

<With Respect to Sp>

In the general formula (I), Sp is preferably a structure represented by the following general formula (IVa).

[Chem. 7]

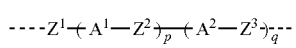
(IVa)

In the general formula (IVa), the left broken line represents a bond to L, and the right broken line represents a bond to A or a bond to a carbon atom, to which X is bonded, Z$^1$, Z$^2$ and Z$^3$ each independently represent a single bond, —(CH$_2$)$_u$— (in which u represents 1 to 20), —OCH$_2$—, —CH$_2$O—, —COO—, —OCO—, —CH═CH—, —CF═CF—, —CF$_2$O—, —OCF$_2$—, —CF$_2$CF$_2$—, or —C≡C—, in which one or more of the non-adjacent CH$_2$ groups in these substituents may be independently substituted with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C—, or —O—CO— (in which R's independently represent hydrogen or an alkyl group having 1 to 5 carbon atoms), A$^1$ and A$^2$ each independently represent a group selected from the group consisting of:

(a) a trans-1,4-cyclohexylene group (one methylene group or two or more non-adjacent methylene groups present in this group may be substituted with —O—, —NH—, or —S—), (b) a 1,4-phenylene group (one —CH═ or two or more —CH═'s present in this group may be substituted with —N═), and (c) a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, and p and q each independently represent 0 or 1).

In the general formula (IVa), the left broken line represents a bond to the main chain of the polymer and the right broken line represents a bond to A or a bond to a carbon atom to which X is bonded, Z$^1$, Z$^2$ and Z$^3$ each independently represent a single bond, —(CH$_2$)$_u$— (in which u represents 1 to 20), —OCH$_2$—, —CH$_2$O—, —COO—, —OCO—, —CH═CH—, —CF═CF—, —CF$_2$O—, —OCF$_2$—, —CF$_2$CF$_2$—, or —C≡C—, and one or more of the non-adjacent CH$_2$ groups in these substituents may be independently substituted with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C—, or —O—CO—O— (in which R's independently represent a hydrogen atom or an alkyl group having 1 to 5 carbon atoms), A$^1$ and A$^2$ each independently represent any group of a trans-1,4-cyclohexylene group, a trans-1,3-dioxane-2,5-diyl group, a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group, one or more hydrogen atoms in any group of these groups may be substituted with a fluorine atom, a chlorine atom, a methyl group, or a methoxy group, and p and q each independently represent 0 or 1, preferably.

The general formula (IVa) representing Sp is preferably the following general formula (IVb).

[Chem. 8]

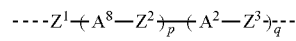
(IVb)

(in which Z$^1$, Z$^2$, Z$^3$, A$^2$, p, and q have the same definitions as in the general formula (IVa)), A$^8$ represents:

a trans-1,4-cyclohexylene group (one methylene group or two or more non-adjacent methylene groups present in this group may be substituted with —O—, —NH—, or —S—), and a 1,4-phenylene group (one or two —CH═'s present in this group may be substituted with —N═), and these may be each unsubstituted or one or more hydrogen atoms may be substituted with a fluorine atom, a chlorine atom, a cyano group, a methyl group, or a methoxy group).

Sp is also preferably represented by the general formula (IVc).

[Chem. 9]

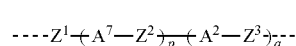
(IVc)

(in which Z$^1$, Z$^2$, Z$^3$, and A$^2$ have the same definitions as in the general formula (IVa)), A$^7$ represents a group selected from the group consisting of:

a 1,4-phenylene group (three or more —CH═'s present in this group are substituted with —N═), a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, and these may be each unsubstituted or have one or more hydrogen atoms substituted with a fluorine atom, a chlorine atom, a cyano group, a methyl group, or a methoxy group, and p represents 1 and q represents 1 or 2, but, in the case where q represents 2, pluralities of $A^2$ and $Z^3$, which are present, may be the same as or different from each other).

In the general formula (IVc), $A^7$ represents a 2,6-naphthylene group, and one or more hydrogen atoms in the 2,6-naphthylene group are preferably substituted with a fluorine atom, a chlorine atom, a methyl group, or a methoxy group.

In the general formula (IVa), $Z^1$, $Z^2$ and $Z^3$ are each independently preferably a single bond, —(CH$_2$)$_u$— (in which u represents 1 to 20, one or more of the non-adjacent CH$_2$ groups independently represent —O—, —CO—, —CO—O—, —O—CO—, —NR—, —NR—CO—, —CO—NR—, —NR—CO—NR—, —CH═CH—, —C≡C—, or —O—CO—O—, and R represents hydrogen, a methyl group, or an ethyl group), —OCH$_2$—, —CH$_2$O—, —COO—, —OCO—, —CH═CH—, —CF$_2$O—, —OCF$_2$—, or —C≡C—.

In the general formula (IVa), $Z^1$, $Z^2$ and $Z^3$ are each independently more preferably a single bond, —(CH$_2$)$_u$— (in which u represents 1 to 20, and one or more of the non-adjacent CH$_2$ groups may be independently substituted with —O—, —CO—O—, —O—CO—, —CH═CH—, or —C≡C—), —OCH$_2$—, —CH$_2$O—, —COO—, —OCO—, —CH═CH—, or —C≡C—.

In the general formula (IVa), $Z^1$, $Z^2$ and $Z^3$ are each independently particularly preferably a single bond, —(CH$_2$)$_u$—(in which u represents 1 to 20, and one or more of the non-adjacent CH$_2$ groups independently represent —O—, —CO—O—, —O—CO—, —CH═CH—, or —C≡C—), —OCH$_2$—, —CH$_2$O—, —COO—, —OCO—, —CH═CH—, or —C≡C—.

Here, "one or more of the non-adjacent CH$_2$ groups" mean "one or more CH$_2$ groups that are not adjacent to each other".

In the general formula (IVa), q is preferably 1.

In the general formula (IVa), p is preferably 0.

In the general formula (IVa), $A^1$ and $A^2$ are each independently preferably any group of a trans-1,4-cyclohexylene group, a trans-1,3-dioxane-2,5-diyl group, a 1,4-naphthylene group, a 2,6-naphthylene group, a pyridine-2,5-diyl group, a pyrimidine-2,5-diyl group, or a 1,4-phenylene group. A hydrogen atom of these groups may be unsubstituted or one or more hydrogen atoms of these groups may be substituted with a fluorine atom, a chlorine atom, a methyl group, or a methoxy group. In the general formula (IVa), $A^1$ and $A^2$ are each independently more preferably any group of a trans-1,4-cyclohexylene group, a 2,6-naphthylene group, a pyridine-2,5-diyl group, a pyrimidine-2,5-diyl group, or a 1,4-phenylene group. A hydrogen atom of these groups may be unsubstituted or one or more hydrogen atoms of these groups may be substituted with a fluorine atom, a chlorine atom, a methyl group, or a methoxy group.

In the general formula (IVa), $A^1$ and $A^2$ are each independently particularly preferably any group of a trans-1,4-cyclohexylene group, a 2,6-naphthylene group, or a 1,4-phenylene group. A hydrogen atom of these groups may be unsubstituted or one or more hydrogen atoms of these groups may be substituted with a fluorine atom, a methyl group, or a methoxy group.

In the general formulae (IVa), (IVb), and (IVc), $A^2$ represents a 1,4-phenylene group, and it is most preferable that a hydrogen atom of this group be unsubstituted or one or more hydrogen atoms of this group be substituted with a fluorine atom, a methyl group, or a methoxy group. A hydrogen atom of the 1,4-phenylene group may be unsubstituted or one or more hydrogen atoms of this group may be substituted with a fluorine atom, a methyl group, or a methoxy group.

In order to improve the liquid crystal alignment property in the liquid crystal alignment layer of the present invention, in the general formula (IVa), $Z^1$, $Z^2$, and $Z^3$ are each independently preferably a single bond, —(CH$_2$)$_u$— (in which u represents 1 to 8 and one or two of the non-adjacent CH$_2$ groups independently represent —O—, —CO—O—, —O—CO—, —Si(CH$_3$)$_2$—O—Si(CH$_3$)$_2$—, —CH═CH—, or —C≡C—), —COO—, —OCO—, —CH═CH—, —CF═CF—, or —C≡C—, and $A^1$ and $A^2$ are each independently preferably a trans-1,4-cyclohexylene group, a trans-1,3-dioxane-2,5-diyl group, a pyridine-2,5-diyl group, a pyrimidine-2,5-diyl group, a 2,5-thiophenylene group, or a 1,4-phenylene group.

Furthermore, in order to improve the thermal stability of the alignment in the liquid crystal alignment layer of the present invention, in the general formula (IVa), $Z^1$, $Z^2$, and $Z^3$ are each independently preferably —NR—CO—, —CO—NR—, —NR—CO—O—, —O—CO—NR—, —NR—CO—NR—, or —O—CO—O—, and $A^1$ and $A^2$ are each independently preferably a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group.

Moreover, in order to improve the solubility of the polymer of the present invention, $Z^1$, $Z^2$ and $Z^3$ are each independently preferably —OCH$_2$—, —CH$_2$O—, —CF$_2$O—, —OCF$_2$—, —CF$_2$CF$_2$—, —NR—, or —CO—, and $A^1$ and $A^2$ are each independently preferably a trans-1,4-cyclohexylene group, a 1,4-naphthylene group, a 2,6-naphthylene group, or a 2,5-furanylene group.

In the general formulae (IVa), (IVb), and (IVc), preferably, $A^2$ represents any group of a trans-1,4-cyclohexylene group, a 2,6-naphthylene group, a pyridine-2,5-diyl group, a pyrimidine-2,5-diyl group, or a 1,4-phenylene group, one or more hydrogen atoms in any group of these groups may be substituted with a fluorine atom, a chlorine atom, a methyl group, or a methoxy group, $Z^3$ represents a single bond or any group of —(CH$_2$)$_u$— (in which u represents 1 to 20), —OCH$_2$—, —CH$_2$O—, —COO—, —OCO—, —CH═CH—, or —C≡C—, one or more of the non-adjacent CH$_2$ groups in any group of these groups may be independently substituted with —O—, —CO—, —CO—O—, —O—CO—, —CH═CH—, or —C≡C—, and q represents 1.

As the Sp represented by the general formula (IVa), for example, those represented by the following chemical formulae (Sp-a-1) to (Sp-ah1-8) are preferable. In these chemical formulae, the left broken line represents a bond to the main chain of the polymer and the right broken line represents a bond to A or a bond to a carbon atom to which X is bonded.

Although these can be selected according to the necessity, among these, those represented by the chemical formulae (Sp-a-6) to (Sp-a-16), the chemical formulae (Sp-b-3) to (Sp-b-10), the chemical formulae (Sp-c-3) to (Sp-c-10), the chemical formulae (Sp-d-3) to (Sp-d-12), the chemical formulae (Sp-k-4) to (Sp-k-7), the chemical formulae (Sp-1-13) to (Sp-1-17), the chemical formulae (Sp-o-3) to (Sp-o-14), the chemical formulae (Sp-p-2) to (Sp-p-13), the chemical formulae (Sp-s-1) to (Sp-s-8), the chemical formulae (Sp-t-1) to (Sp-t-8), the chemical formulae (Sp-y-1) to (Sp-y-9), and the chemical formulae (Sp-aa-1) to (Sp-aa-9) are more preferable.

[Chem. 10]
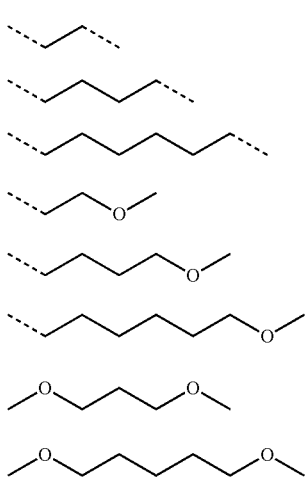
[Chem. 11]
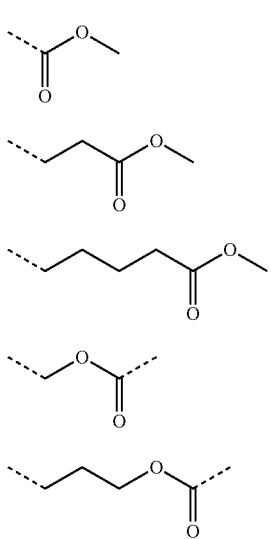
[Chem. 12]
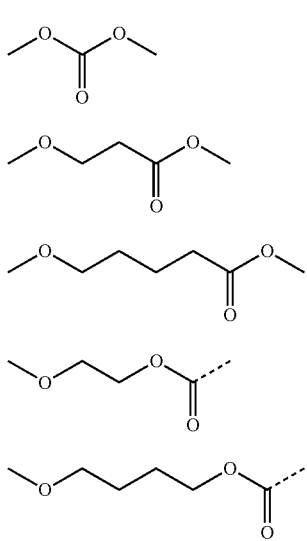

[Chem. 13]
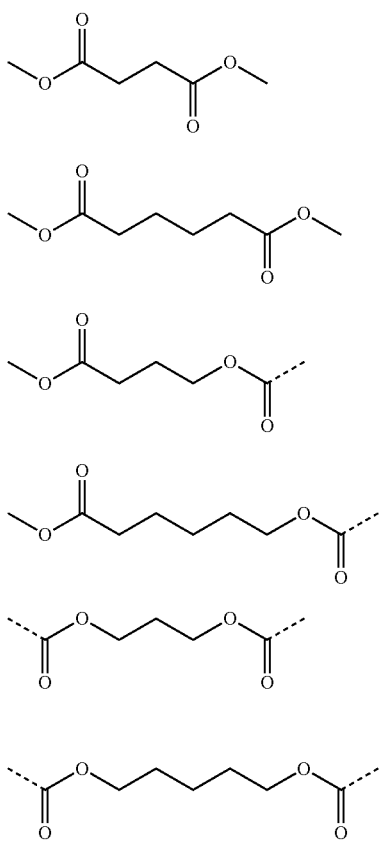
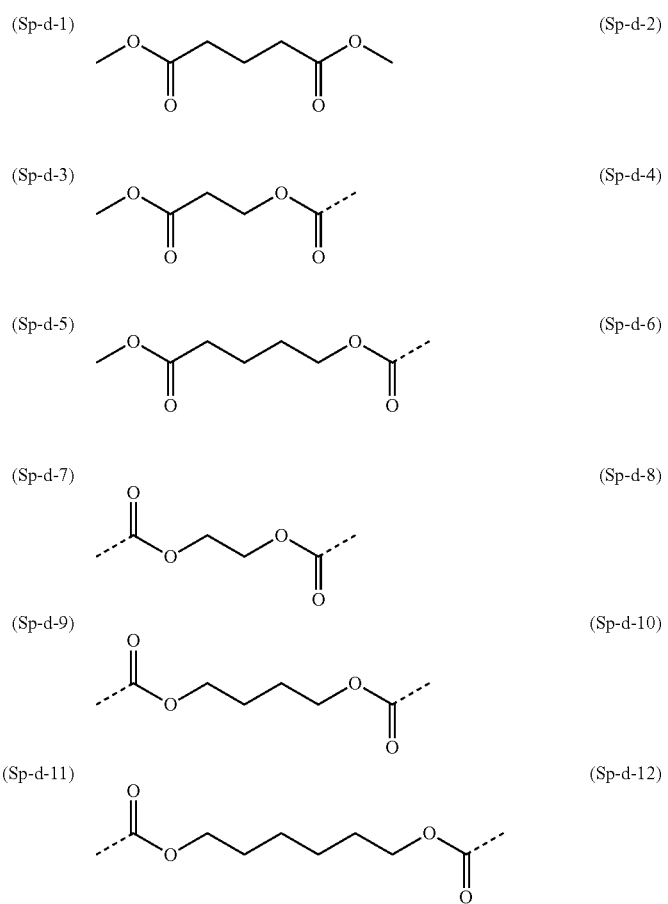
-continued
[Chem. 14]
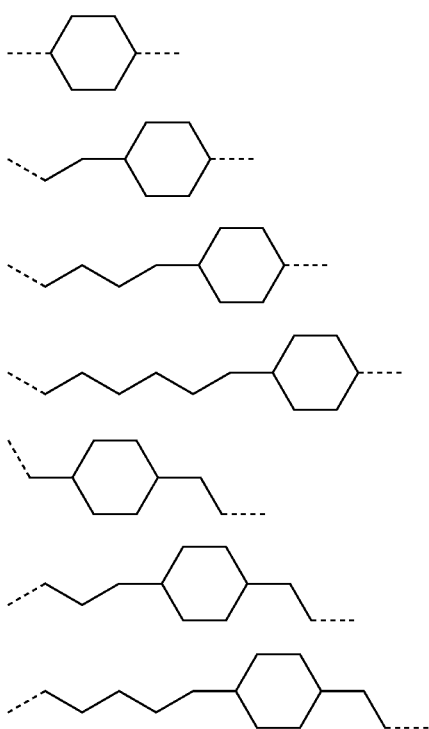
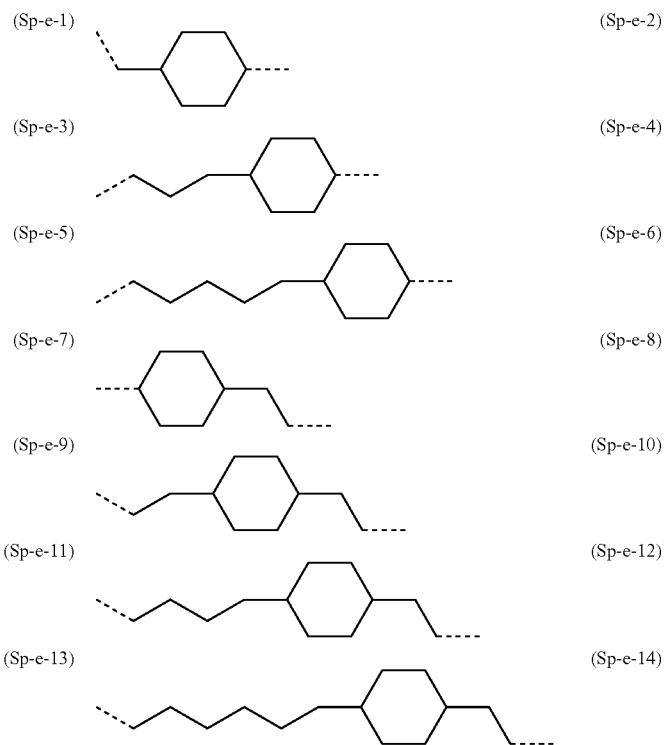

[Chem. 15]
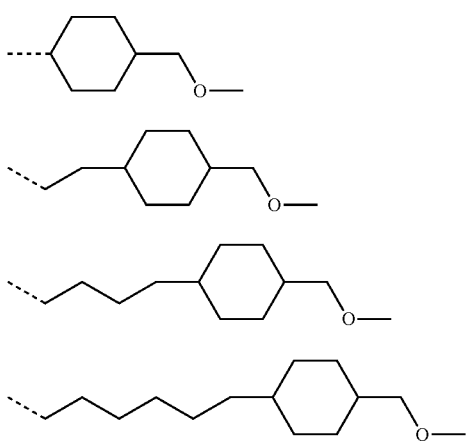
(Sp-f-1)
(Sp-f-3)
(Sp-f-5)
(Sp-f-7)
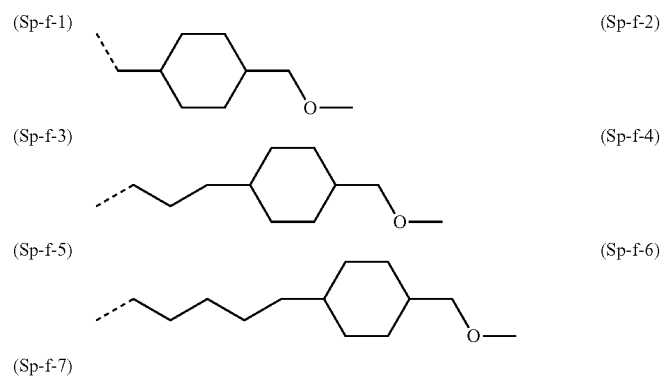
(Sp-f-2)
(Sp-f-4)
(Sp-f-6)
[Chem. 16]
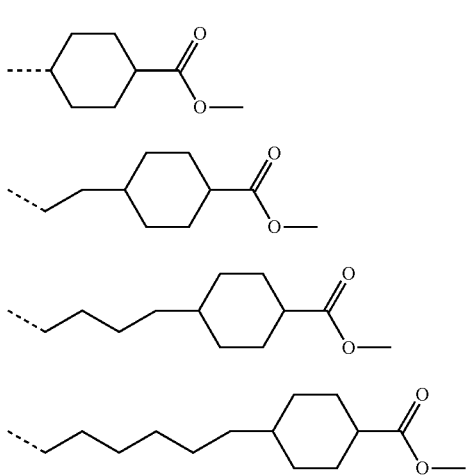
(Sp-g-1)
(Sp-g-3)
(Sp-g-5)
(Sp-g-7)
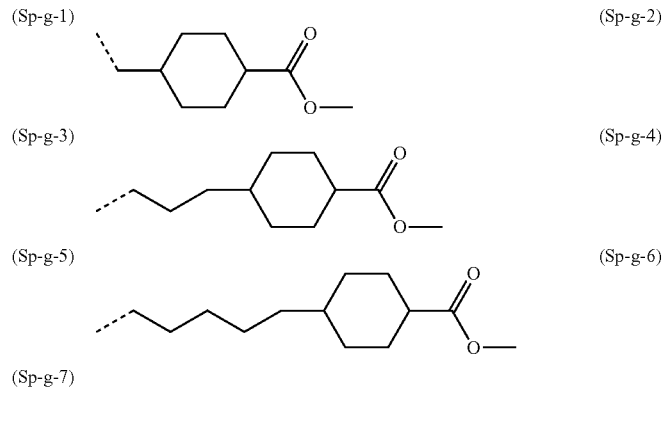
(Sp-g-2)
(Sp-g-4)
(Sp-g-6)
[Chem. 17]
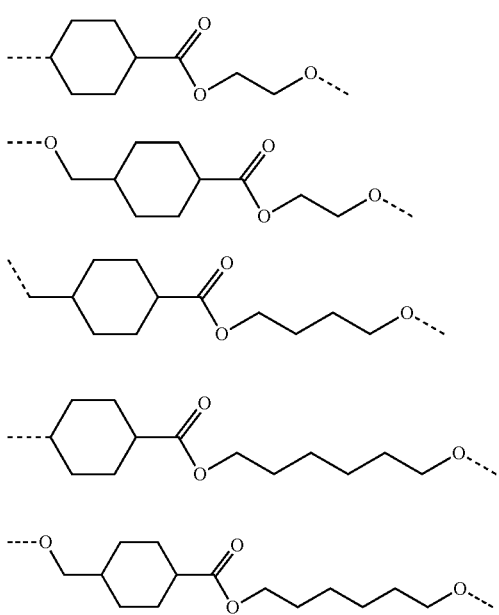
(Sp-h-1)
(Sp-h-3)
(Sp-h-5)
(Sp-h-7)
(Sp-h-9)
(Sp-h-2)
(Sp-h-4)
(Sp-h-6)
(Sp-h-8)

[Chem. 18]
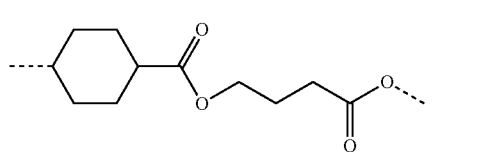 (Sp-i-1)
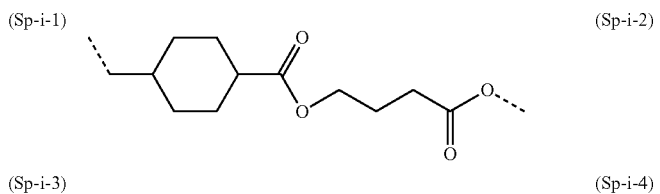 (Sp-i-2)
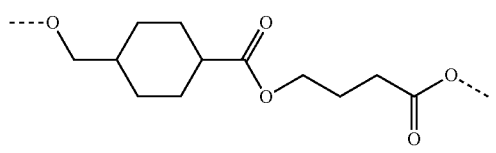 (Sp-i-3)
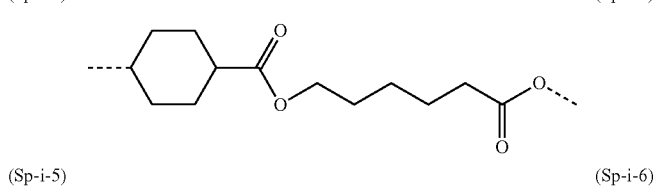 (Sp-i-4)
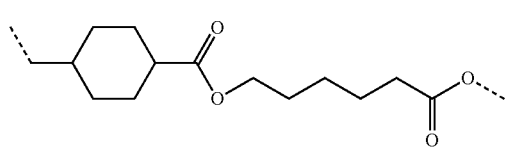 (Sp-i-5)
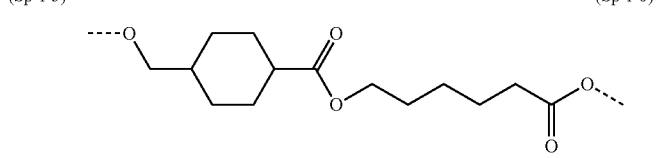 (Sp-i-6)
[Chem. 19]
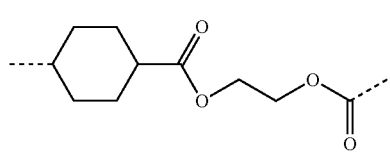 (Sp-j-1)
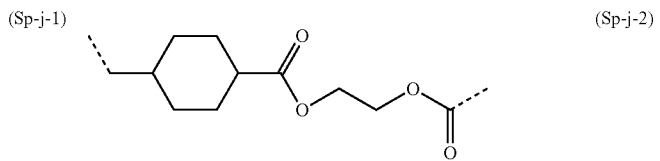 (Sp-j-2)
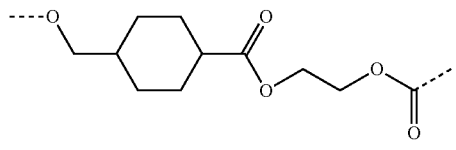 (Sp-j-3)
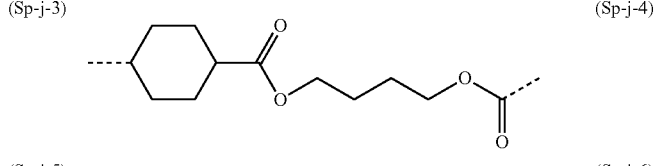 (Sp-j-4)
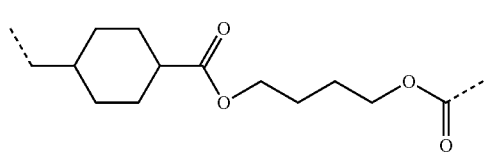 (Sp-j-5)
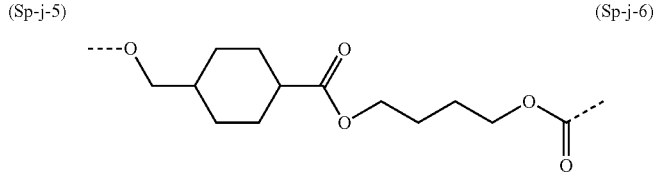 (Sp-j-6)
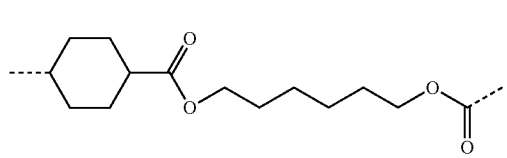 (Sp-j-7)
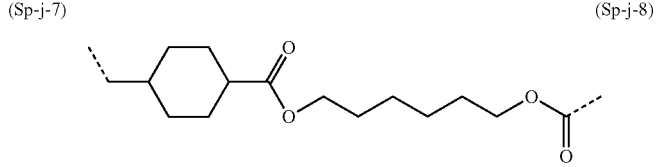 (Sp-j-8)
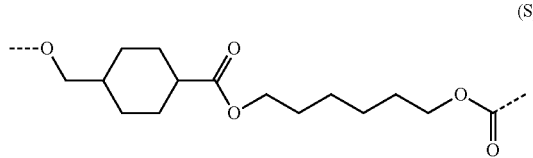 (Sp-j-9)
[Chem. 20]
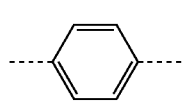 (Sp-k-1)
 (Sp-k-2)
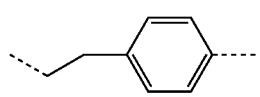 (Sp-k-3)
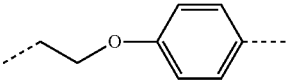 (Sp-k-4)

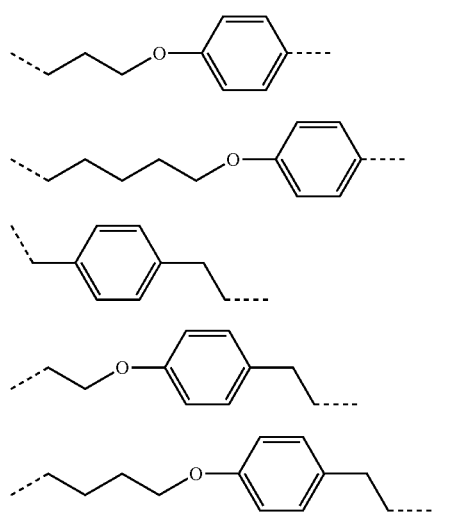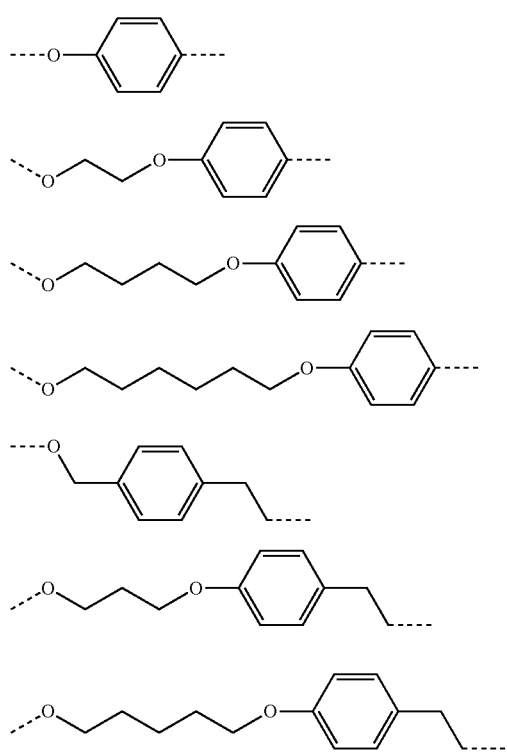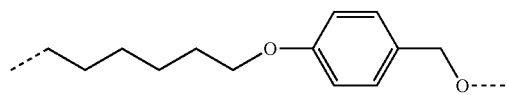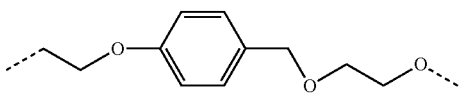

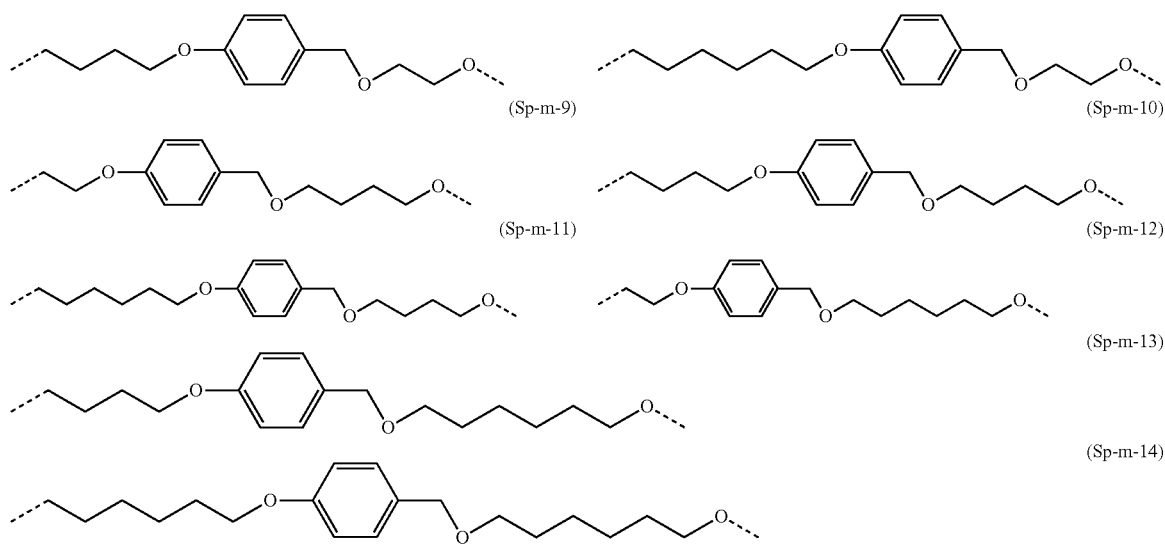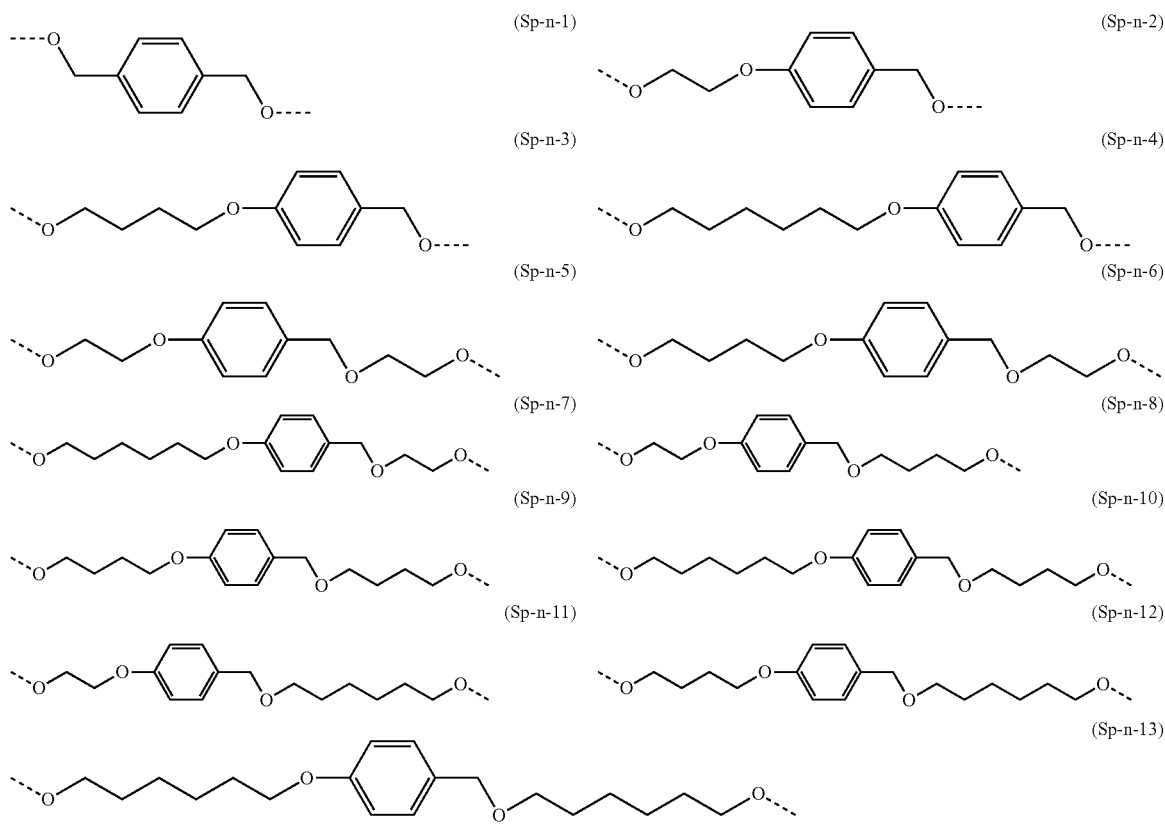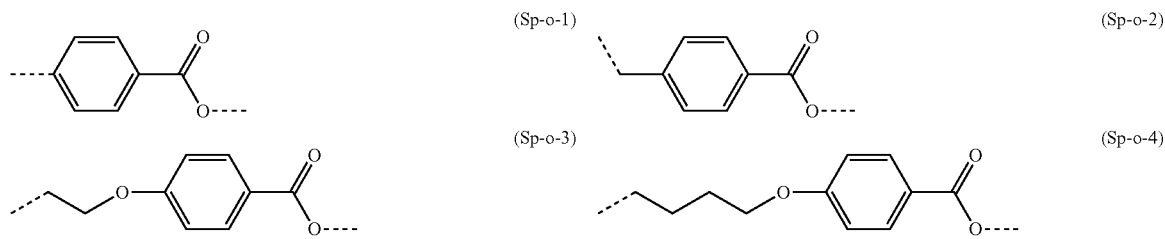

-continued
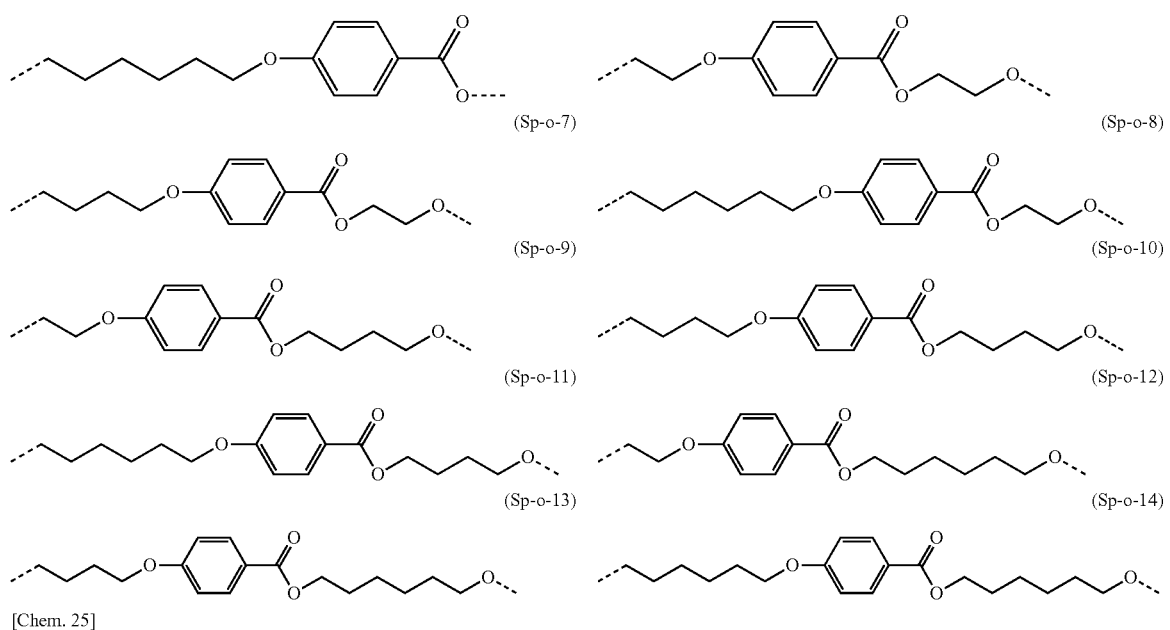
[Chem. 25]
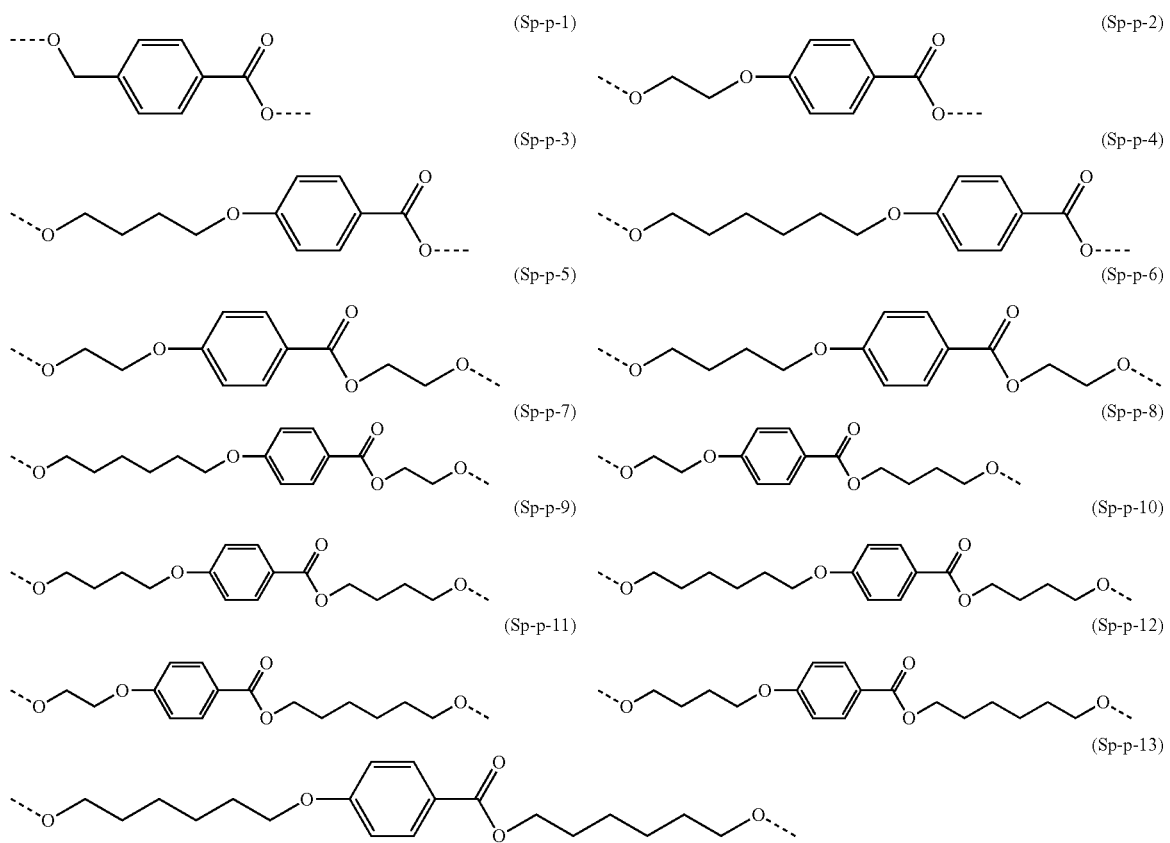
[Chem. 26]

-continued
(Sp-q-3)
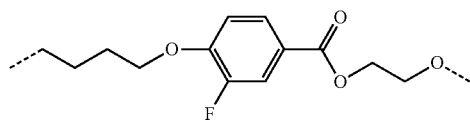
(Sp-q-4)
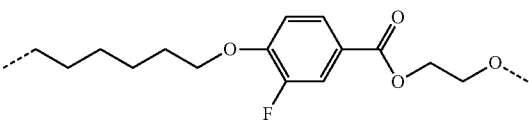
(Sp-q-5)
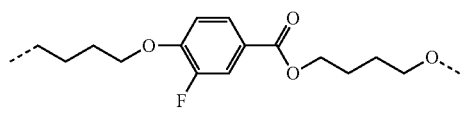
(Sp-q-6)
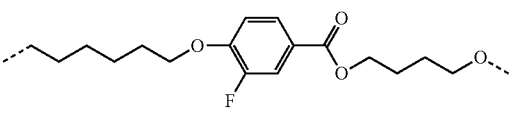
(Sp-q-7)
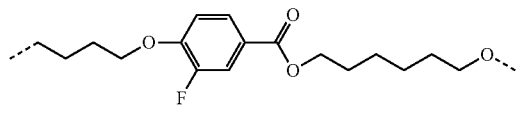
(Sp-q-8)
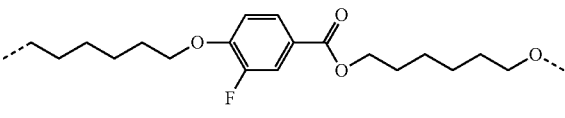
[Chem. 27]
(Sp-r-1)
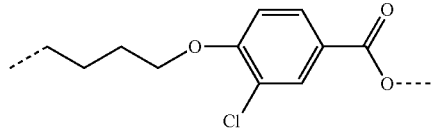
(Sp-r-2)
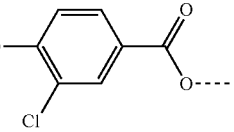
(Sp-r-3)
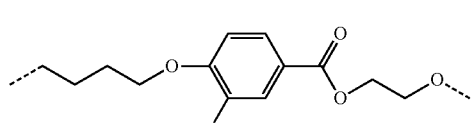
(Sp-r-4)
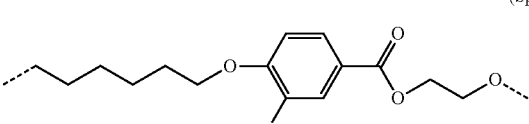
(Sp-r-5)
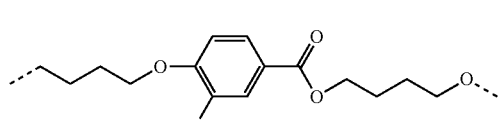
(Sp-r-6)
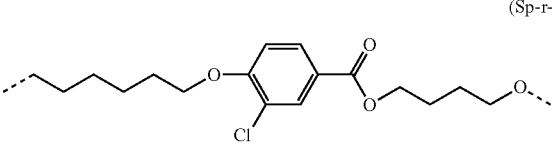
(Sp-r-7)
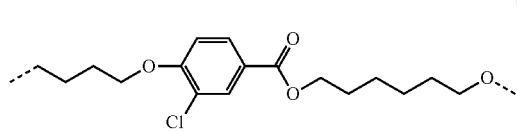
(Sp-r-8)
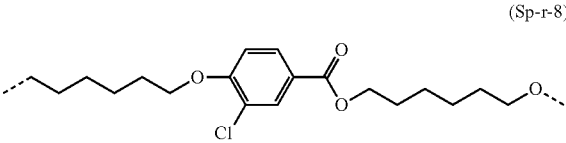
[Chem. 28]
(Sp-s-1)
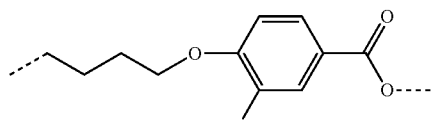
(Sp-s-2)
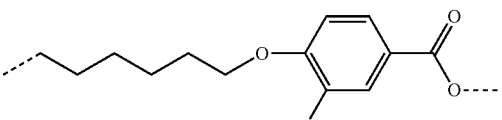
(Sp-s-3)
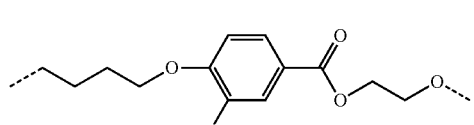
(Sp-s-4)
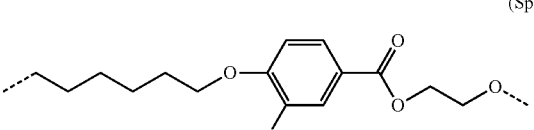
(Sp-s-5)
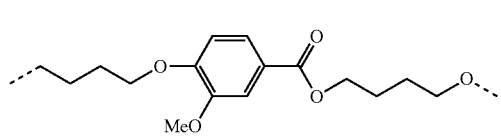
(Sp-s-6)
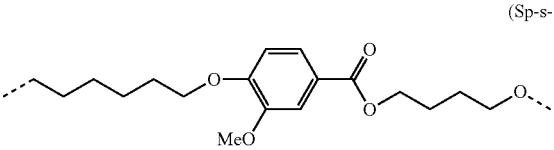

-continued
(Sp-s-7) 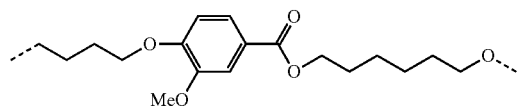 (Sp-s-8) 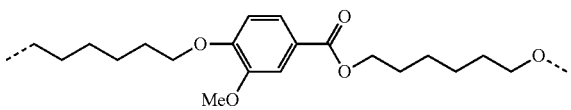
[Chem. 29]
(Sp-t-1) 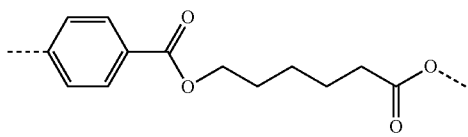 (Sp-t-2)
(Sp-t-3) 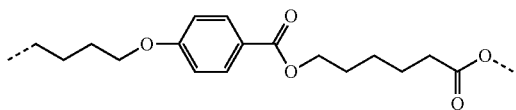 (Sp-t-4)
(Sp-t-5) 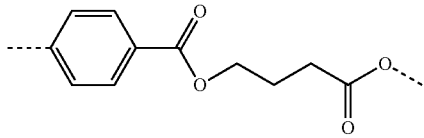 (Sp-t-6)
(Sp-t-7) 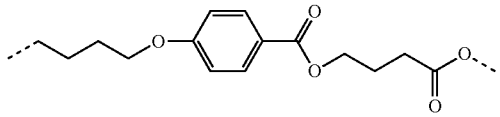 (Sp-t-8)
[Chem. 30]
(Sp-u-1) 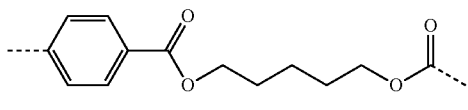 (Sp-u-2)
(Sp-u-3) 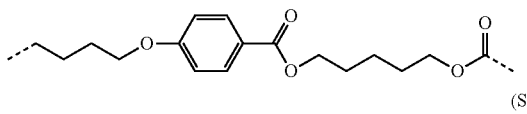 (Sp-u-4)
(Sp-u-5) 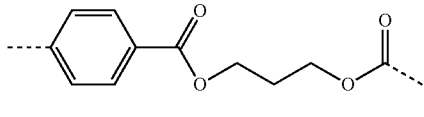 (Sp-u-6)
(Sp-u-7) 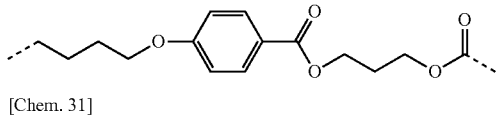 (Sp-u-8)
[Chem. 31]
(Sp-v-1) 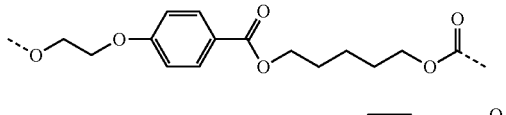 (Sp-v-2) 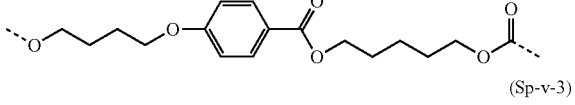
(Sp-v-3) 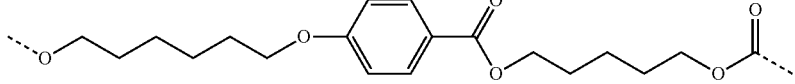

-continued
(Sp-v-4) 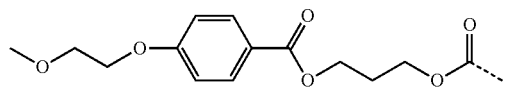
(Sp-v-5) 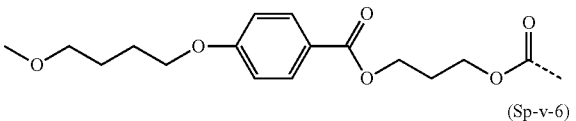
(Sp-v-6) 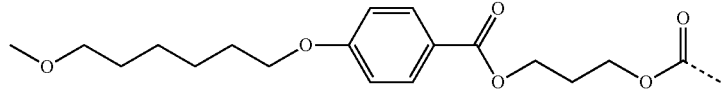
[Chem. 32]
(Sp-w-1) 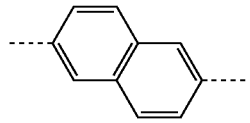
(Sp-w-2)
(Sp-w-3) 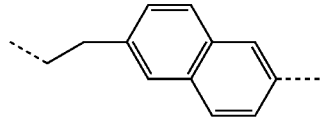
(Sp-w-4)
(Sp-w-5) 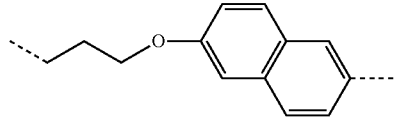
(Sp-w-6)
(Sp-w-7) 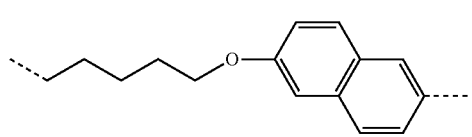
(Sp-w-8)
[Chem. 33]
(Sp-x-1) 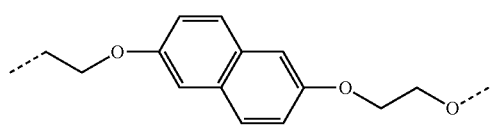
(Sp-x-2)
(Sp-x-3) 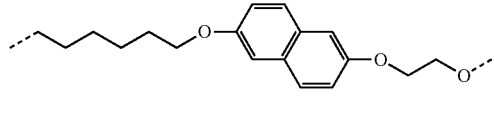
(Sp-x-4)
(Sp-x-5) 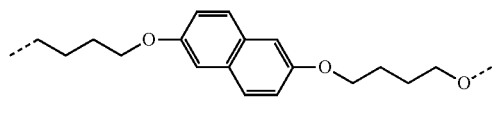
(Sp-x-6)
(Sp-x-7) 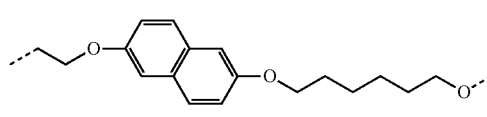
(Sp-x-8)
(Sp-x-9) 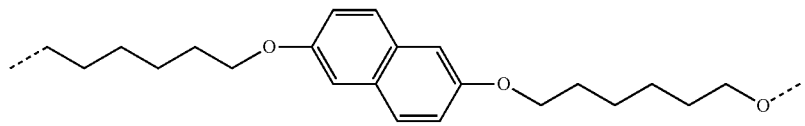

[Chem. 34]

-continued (Sp-y-1) (Sp-y-2) (Sp-y-3) (Sp-y-4) (Sp-y-5) (Sp-y-6) (Sp-y-7) (Sp-y-8) (Sp-y-9)

[Chem. 35]

(Sp-z-1) (Sp-z-2) (Sp-z-3) (Sp-z-4) (Sp-z-5) (Sp-z-6) (Sp-z-7) (Sp-z-8) (Sp-z-9)

-continued
[Chem. 36]
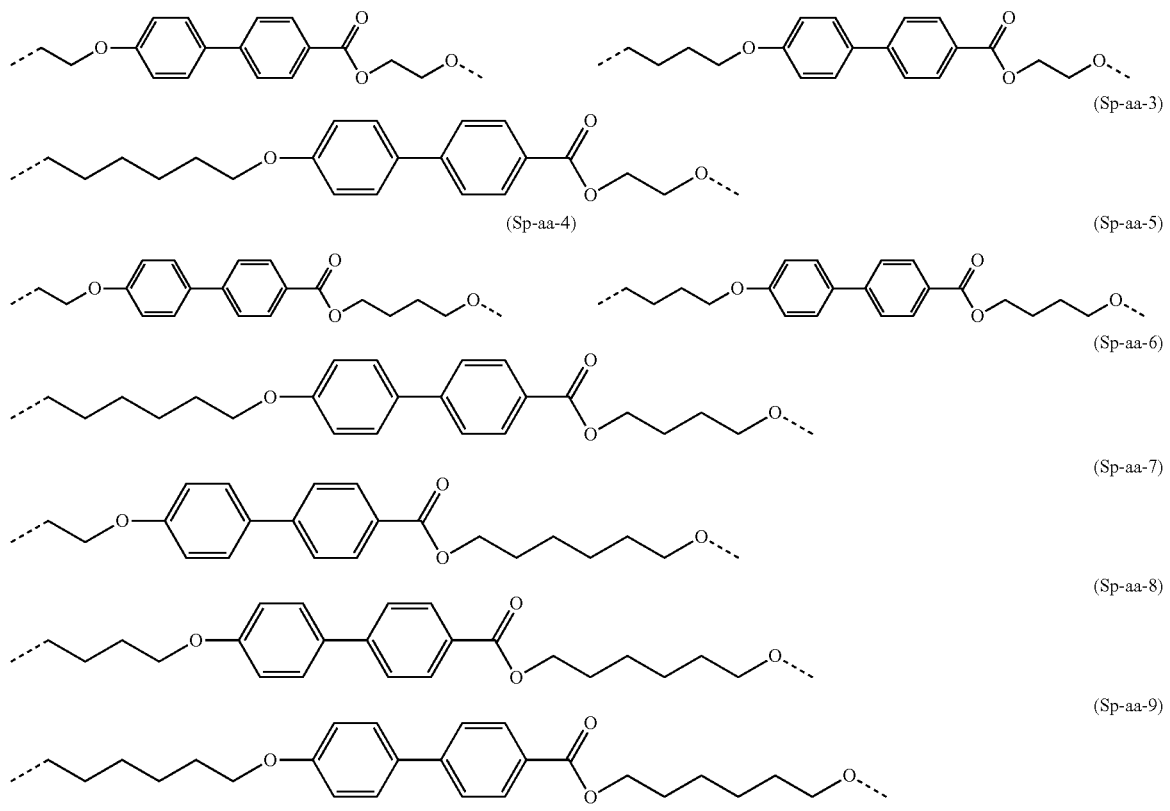
[Chem. 37]
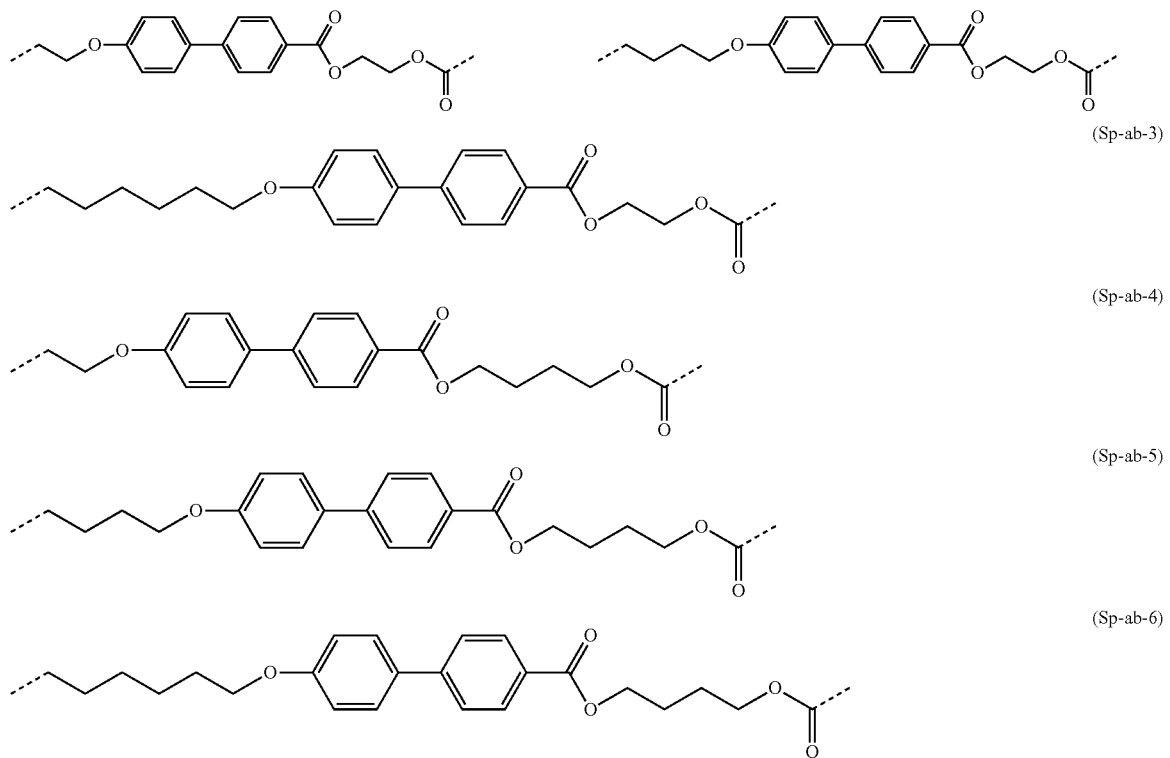

-continued
(Sp-ab-7)
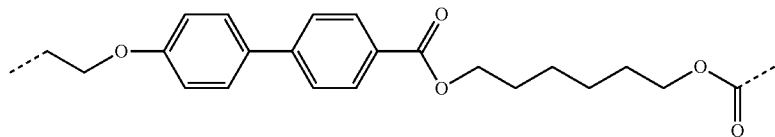
(Sp-ab-8)
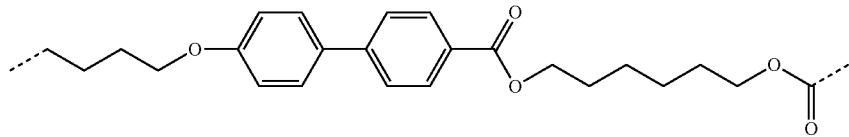
(Sp-ab-9)
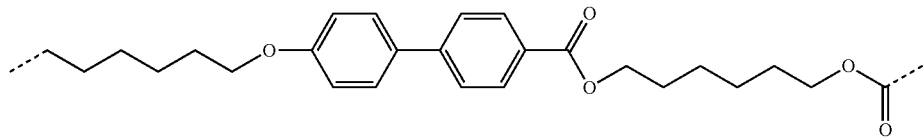
[Chem. 38]
(Sp-ac-1)
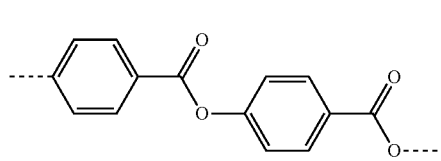
(Sp-ac-2)
(Sp-ac-3)
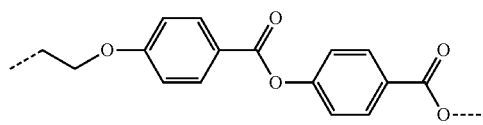
(Sp-ac-4)
(Sp-ac-5)
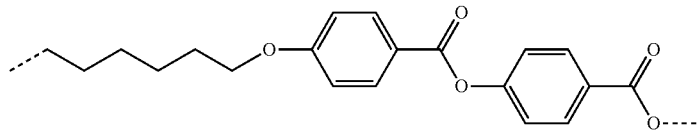
[Chem. 39]
(Sp-ad-1)
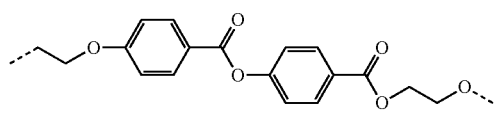
(Sp-ad-2)
(Sp-ad-3)
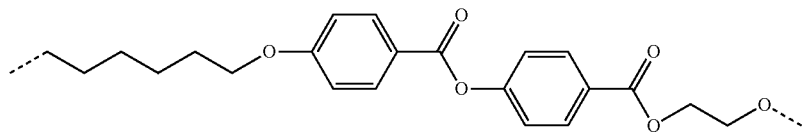
(Sp-ad-4)
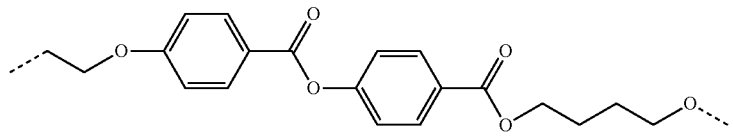
(Sp-ad-5)
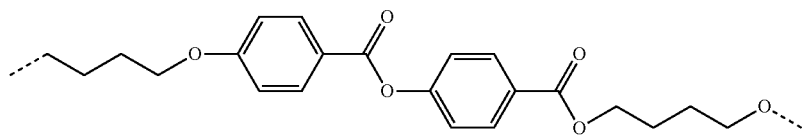

(Sp-ad-6)
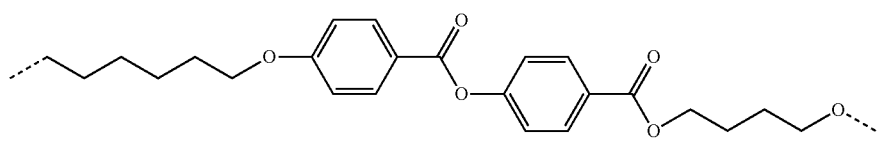
(Sp-ad-7)
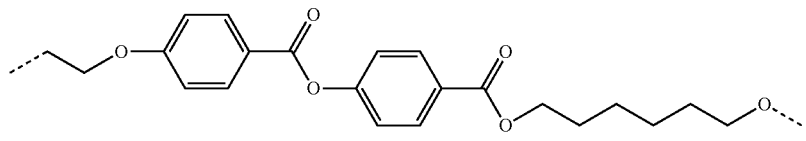
(Sp-ad-8)
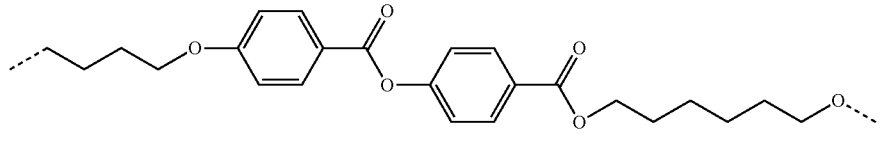
(Sp-ad-9)
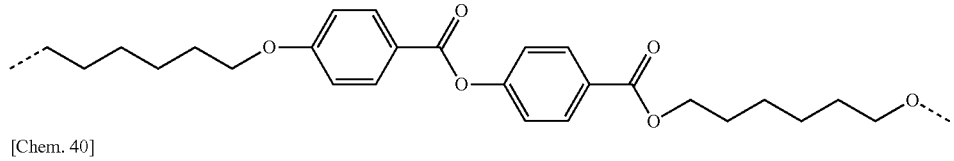
[Chem. 40]
(Sp-ae-1)
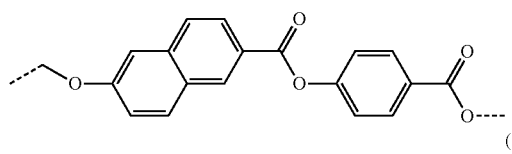
(Sp-ae-2)
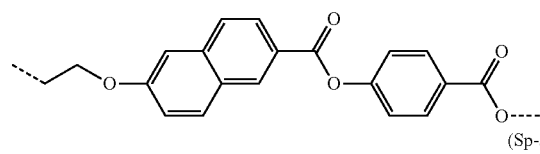
(Sp-ae-3)
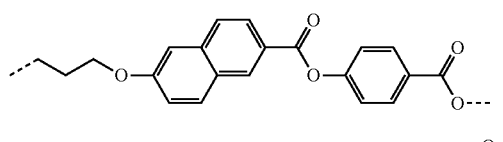
(Sp-ae-4)
(Sp-ae-5)
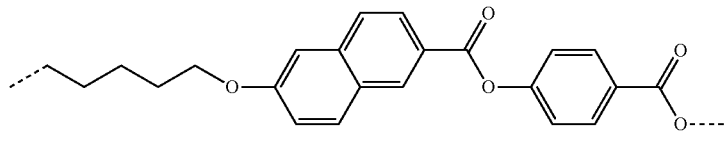
(Sp-ae-6)
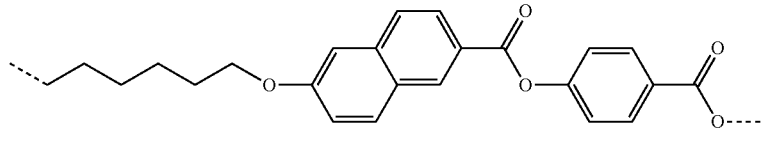
(Sp-ae-7)
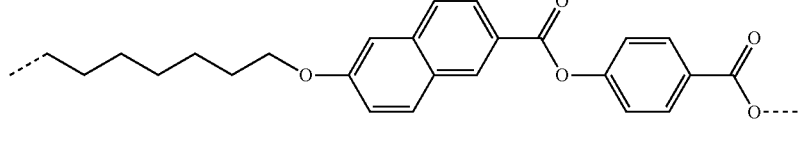
(Sp-ae-8)
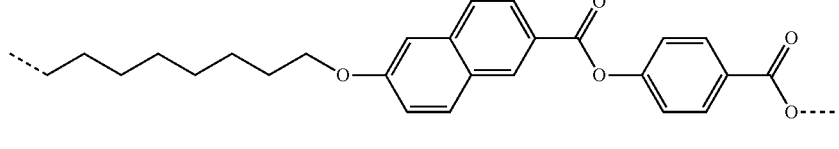
(Sp-ae-9)
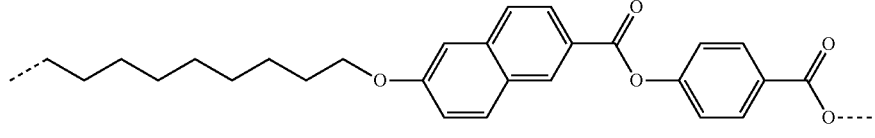

[Chem. 41]
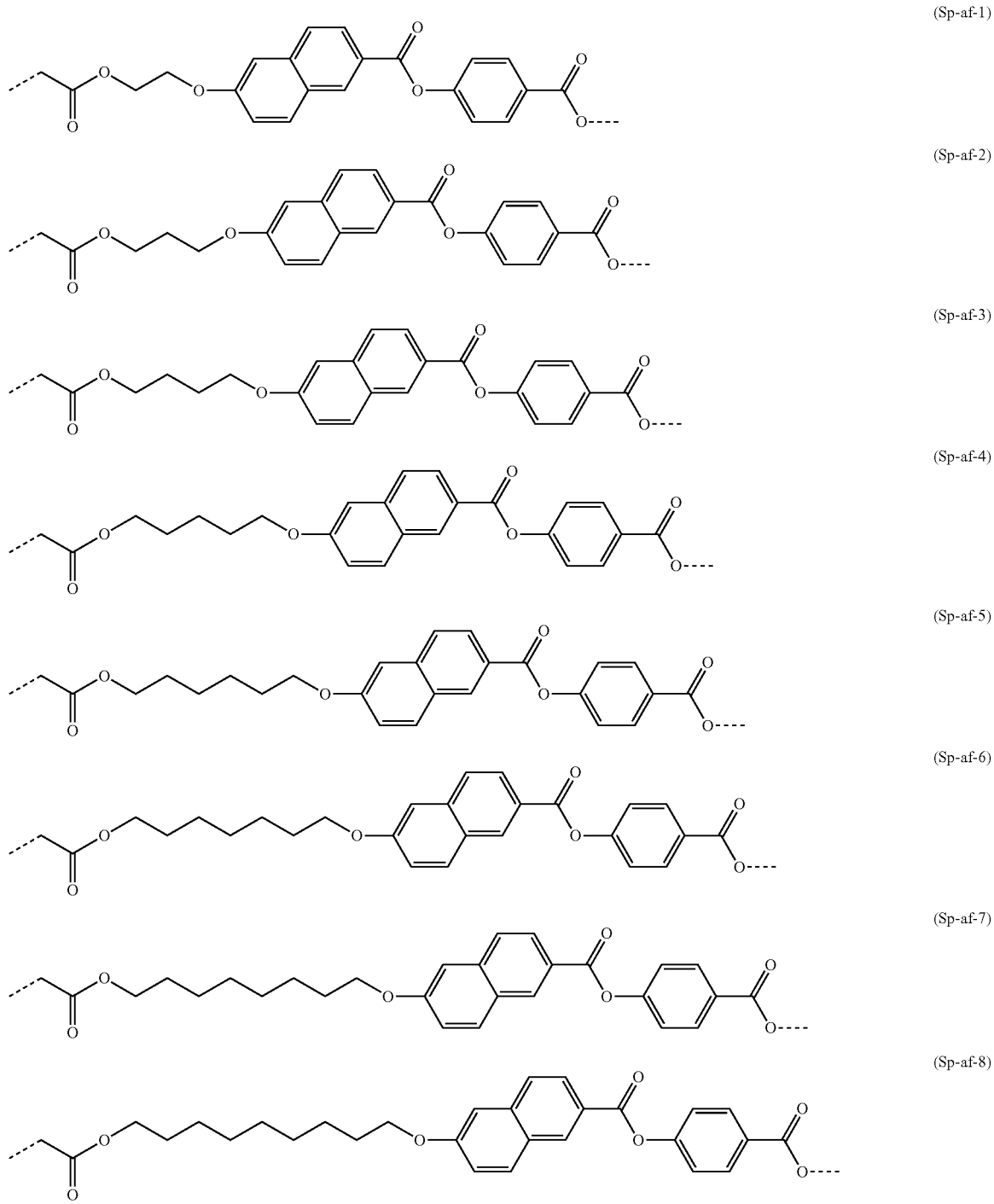
[Chem. 42]
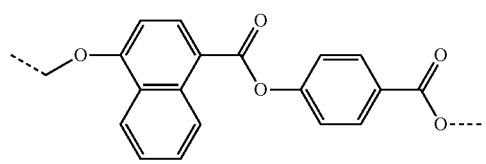
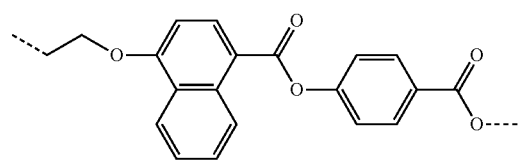

-continued
(Sp-ag-3)
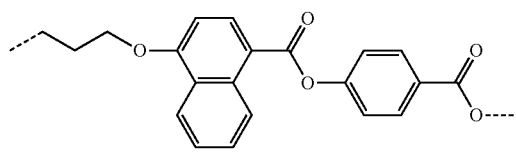
(Sp-ag-4)
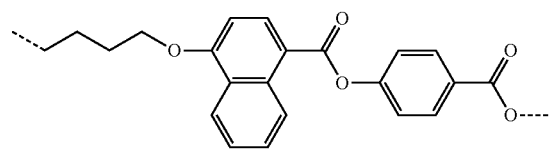
(Sp-ag-5)
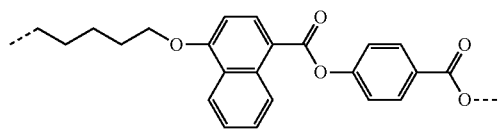
(Sp-ag-6)
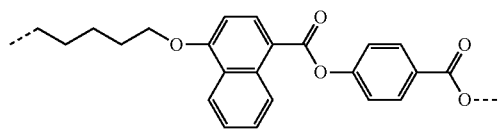
(Sp-ag-7)
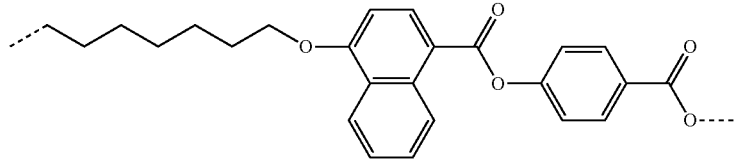
(Sp-ag-8)
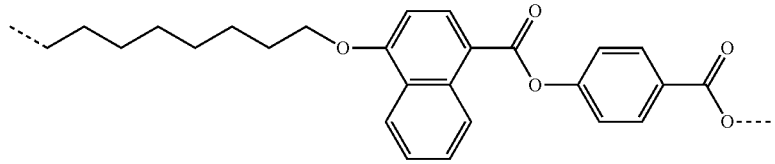
(Sp-ag-9)
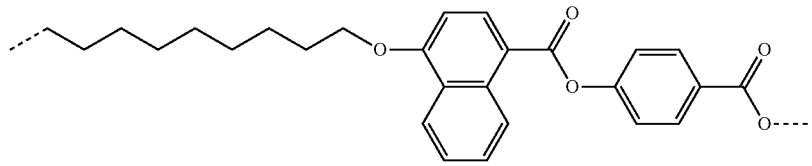
[Chem. 43]
(Sp-ah-1)
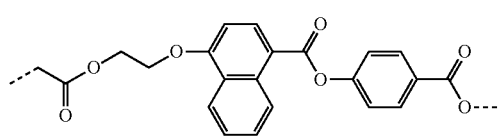
(Sp-ah-2)
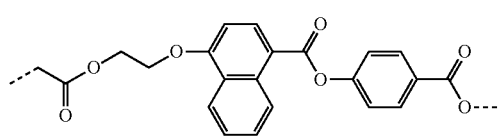
(Sp-ah-3)
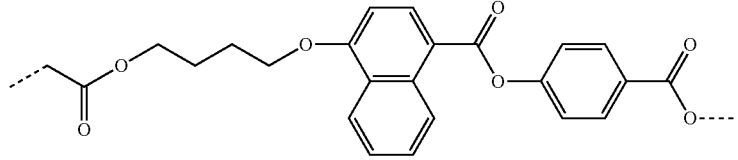
(Sp-ah-4)
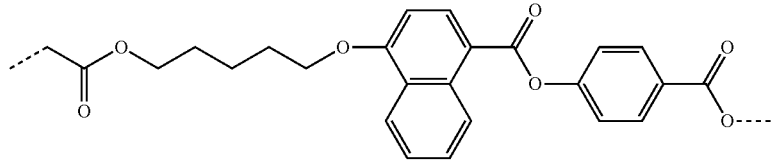
(Sp-ah-5)
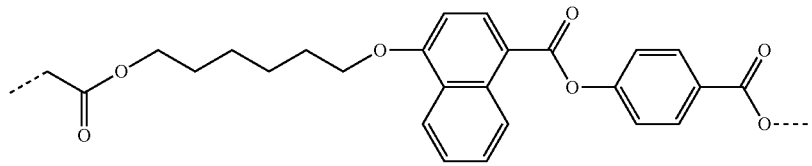

-continued

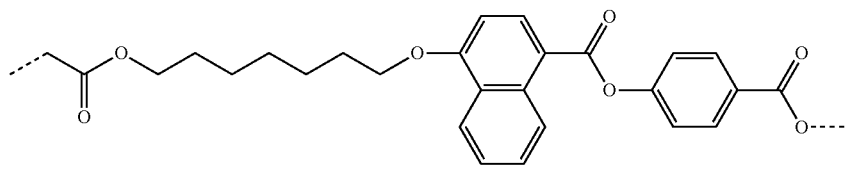
(Sp-ah-6)

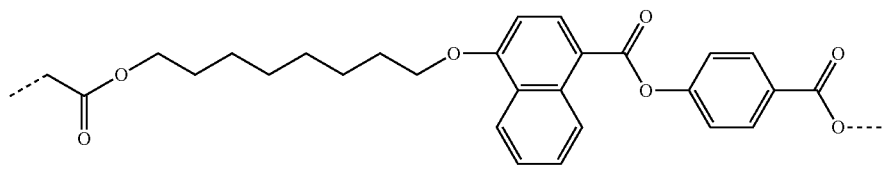
(Sp-ah-7)

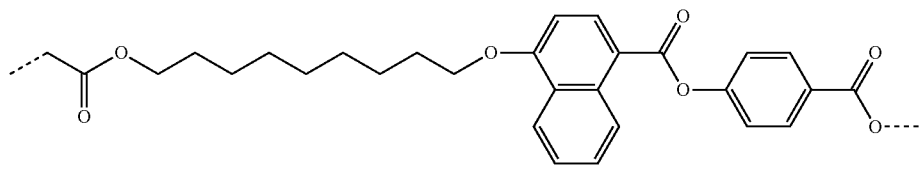
(Sp-ah-8)

A preferable polymer of the present invention is a polymer having Sp represented by the general formula (IVa), in which in the general formula (IVa), $A^2$ represents any group of a trans-1,4-cyclohexylene group, a 2,6-naphthylene group, a pyridine-2,5-diyl group, a pyrimidine-2,5-diyl group, or a 1,4-phenylene group, one or more hydrogen atoms in any group of these groups may be substituted with a fluorine atom, a chlorine atom, a methyl group, or a methoxy group, $Z^3$ represents a single bond or any group of —$(CH_2)_u$— (in which u represents 1 to 20), —$OCH_2$—, —$CH_2O$—, —COO—, —OCO—, —CH=CH—, or —C≡C—, one or more of the non-adjacent $CH_2$ groups in any group of these groups may be independently substituted with —O—, —CO—, —CO—O—, —O—CO—, —CH=CH—, or —C≡C—, and q represents 1.

By using the polymer, a liquid crystal alignment layer having a superior ability to control the alignment of the liquid crystals and the pretilt angles, and a high voltage holding ratio (VHR), and a liquid crystal display element using the liquid crystal alignment layer can be obtained.

<With respect to L>

In the general formula (I), L preferably represents any substituent selected from the group consisting of the general formulae (III-1) to (III-17):

[Chem. 44]

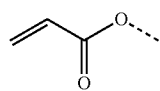
(III-1)

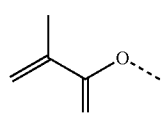
(III-2)

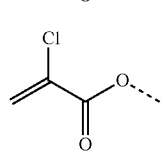
(III-3)

-continued

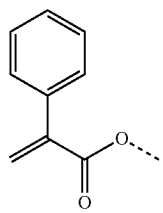
(III-4)

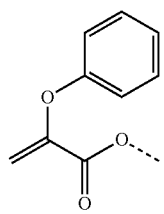
(III-5)

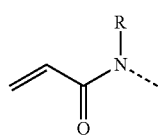
(III-6)

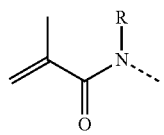
(III-7)

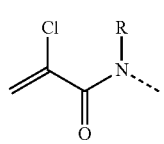
(III-8)

-continued

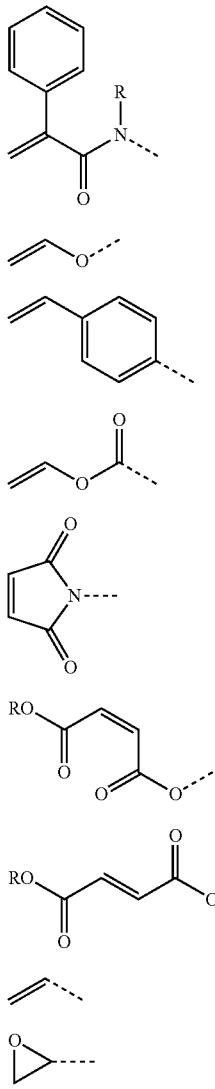

(III-9)
(III-10)
(III-11)
(III-12)
(III-13)
(III-14)
(III-15)
(III-16)
(III-17)

(in which the broken line represents a bond to Sp and R's independently represent hydrogen or an alkyl group having 1 to 5 carbon atoms).

L is preferably represented by the general formula (III-1), (III-2), (III-6), (III-7), or (III-13), and more preferably represented by the general formula (III-1) or (III-2).

<With Respect to a Photochemically Isomerizable and Photochemically Non-Crosslinkable Site, and a Polymer Having the Part>

In the polymer of the present invention, the photochemically isomerizable and photochemically non-crosslinkable site preferably includes a structure represented by the following general formula (Q).

[Chem. 45]

(Q)

(in which the broken line represents a bond to the main chain of the polymer, $S_a$ and $S_{aa}$ represent spacer units which may be different from each other, P represents a photochemically isomerizable and photochemically non-crosslinkable site, and $V_a$ represents a terminal in the side chain).

Furthermore, the polymer of the present invention preferably includes a structural unit represented by the following general formula (QP).

[Chem. 46]

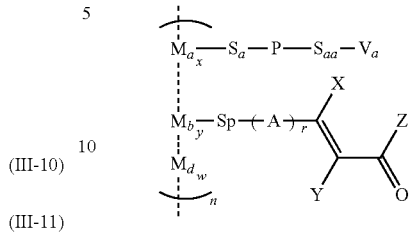

(QP)

(in which Sp, A, X, Y, Z, and r have the same definitions as in the general formula (I), $S_a$, P, $S_{aa}$ and $V_a$ have the same definitions as in the general formula (Q), Ma, Mb and Md each represent monomer units of the polymer, which may be different from each other, x, y and w each represent a molar fraction of the copolymer, each satisfying $0<X\leq 1$, $0<y\leq 1$, and $0\leq w<1$, n represents 4 to 1000000, the arrangement orders of Ma, Mb and Md may be the same as or different from that shown in the formula, and the monomer units of Ma, Mb and Md may be each independently constituted with one kind of units or two or more kinds of different units).

The polymer of the present invention can be preferably used to form a liquid crystal alignment layer for a horizontal alignment mode or vertical alignment mode liquid crystal display element, or to form a liquid crystal alignment layer for an optical anisotropic body. Further, the obtained liquid crystal alignment layer can be preferably used in the horizontal alignment mode or vertical alignment mode liquid crystal display element.

In the polymer included in the liquid crystal alignment layer capable of being photo-aligned, the photochemically isomerizable and photochemically non-crosslinkable site preferably has an azo group.

In the general formula (QP), Ma and Mb are each independently preferably compounds having any group selected from the group consisting of the formulae (QIII-A-1) to (QIII-A-17).

[Chem. 47]

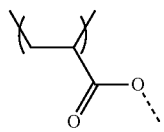

(QIII-A-1)

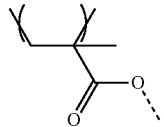

(QIII-A-2)

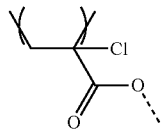

(QIII-A-3)

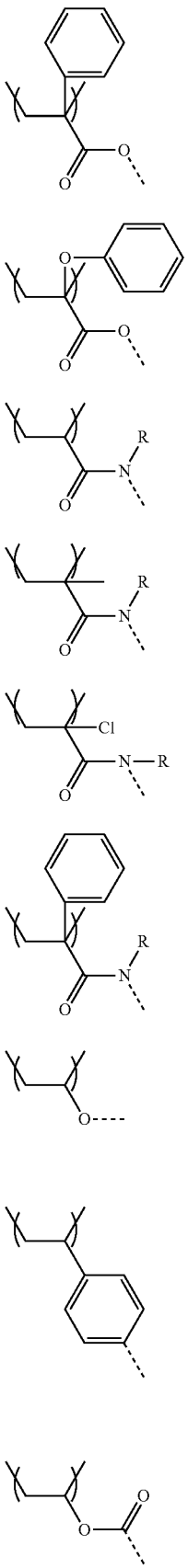

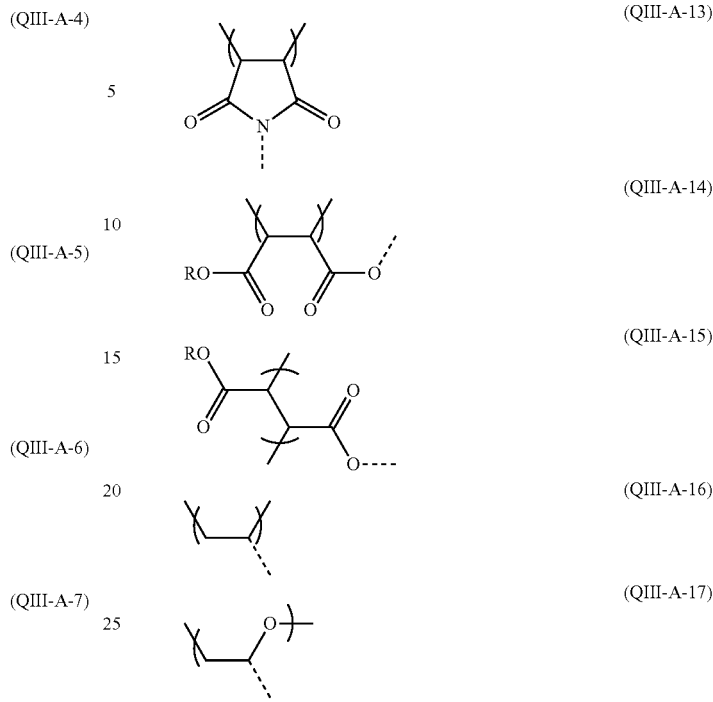

(in which the broken line represents a bond to $S_a$ or Sp, R's independently represent a hydrogen atom or an alkyl group having 1 to 5 carbon atoms, and any hydrogen atom in each of the structures may be substituted with a fluorine atom, a chlorine atom, a methyl group, or a methoxy group).

The formula (QIII-A-1), (QIII-A-2), (QIII-A-3), (QIII-A-4), (QIII-A-6), (QIII-A-7), (QIII-A-8), (QIII-A-9), (QIII-A-10), (QIII-A-11), (QIII-A-13), (QIII-A-16), or (QIII-A-17) is preferable, the formula (QIII-A-1), (QIII-A-2), (QIII-A-3), (QIII-A-6), (QIII-A-7), (QIII-A-8), (QIII-A-13), (QIII-A-16), or (QIII-A-17) is more preferable, and the formula (QIII-A-1), (QIII-A-2), (QIII-A-3), (QIII-A-6), (QIII-A-7), or (QIII-A-13) is particularly preferable.

In order to improve the solubility of the polymer, the formula (QIII-A-1), (QIII-A-2), (QIII-A-3), (QIII-A-6), (QIII-A-7), (QIII-A-8), (QIII-A-10), (QIII-A-12), (QIII-A-14), (QIII-A-16), or (QIII-A-17) is preferable, and among those, the formula (QIII-A-1), (QIII-A-2), (QIII-A-10), (QIII-A-12), or (QIII-A-17) is particularly preferable. Further, in order to improve the polymerization speed, the formula (QIII-A-3), (QIII-A-8), (QIII-A-10), (QIII-A-12), (QIII-A-13), (QIII-A-14), (QIII-A-15), (QIII-A-16), or (QIII-A-17) is preferable, and among those, the formula (QIII-A-3), (QIII-A-8), (QIII-A-10), (QIII-A-12), or (QIII-A-17) is more preferable. Further, in order to narrow the molecular weight distribution of the polymer, the formula (QIII-A-2), (QIII-A-10), (QIII-A-11), or (QIII-A-12) is preferable. Further, in order to improve the stability of alignment, the formula (QIII-A-2), (QIII-A-4), (QIII-A-5), (QIII-A-7), (QIII-A-9), (QIII-A-13), (QIII-A-14), or (QIII-A-15) is preferable. In addition, in order to improve the adhesion onto a substrate, the formula (QIII-A-1), (QIII-A-6), (QIII-A-7), (QIII-A-8), (QIII-A-9), (QIII-A-10), (QIII-A-12), (QIII-A-13), or (QIII-A-17) is preferable, and among those, the formula (QIII-A-6), (QIII-A-7), (QIII-A-8), or (QIII-A-13) is particularly preferable.

In the general formula (Q) or (QP), as Ma or Mb, for example, acrylate, methacrylate, acrylamide, methacrylamide, maleic acid derivatives, siloxanes, epoxides, an acryloyloxy group, a methacryloyloxy group, a 2-chloroacryloyloxy group, a 2-phenylacryloyloxy group, a 2-phenyloxyacryloyloxy group, an acrylamide group, a methacrylamide group, a 2-chloromethacrylamide group, a 2-phenylacrylamide group, a vinyloxy group, a styryl group, a vinyloxycarbonyl group, a maleimide group, maleic esters, fumaric esters, siloxanes, a vinyl group, or an epoxy group may be used.

In the general formula (QP), $M_d$'s each independently preferably represent the formulae (QIII-1) to (QIII-17).

[Chem. 48]

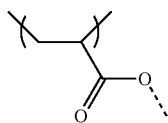
(QIII-1)

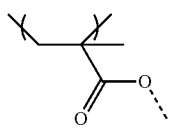
(QIII-2)

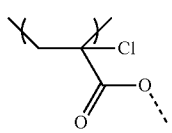
(QIII-3)

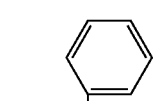
(QIII-4)

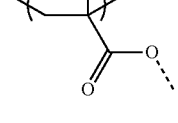
(QIII-5)

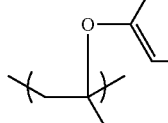
(QIII-6)

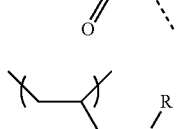
(QIII-7)

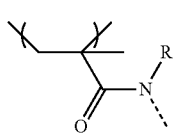
(QIII-8)

-continued

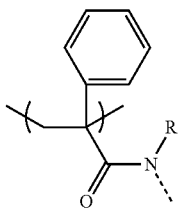
(QIII-9)

(QIII-10)

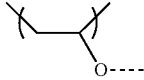

(QIII-11)

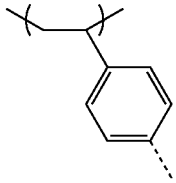

(QIII-12)

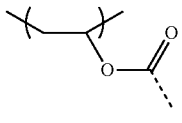

(QIII-13)

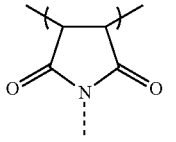

(QIII-14)

(QIII-15)

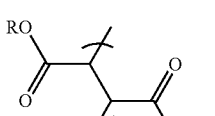

(QIII-16)

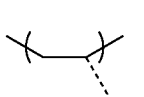

(QIII-17)

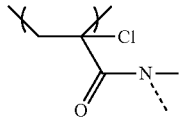

(in which the broken line represents a bond to a hydrogen atom or a monovalent organic group, and R's independently represent a hydrogen atom or an alkyl group having 1 to 5 carbon atoms, and any hydrogen atom in each of the structures may be substituted with a fluorine atom, a chlorine atom, a methyl group, or a methoxy group).

In the general formulae (QIII-1) to (QIII-17), the monovalent organic group is preferably represented by the general formula (QIV):

[Chem. 49]

$$-S_a-V_a \qquad (QIV)$$

(in which the broken line represents a bond to $M_d$, $S_a$ represents a structure represented by the general formula (VI), and $V_a$ represents a structure represented by the general formula (VII)).

In the general formula (Q) or (QP), $S_a$ and $S_{aa}$ are each preferably a structure represented by the following general formula (VI).

[Chem. 50]

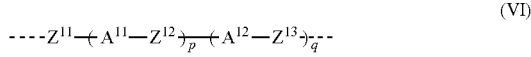
(VI)

(in which the broken line represents the main chain of the polymer, or a bond to Ma, P, or Va;

$Z^{11}$, $Z^{12}$ and $Z^{13}$ each independently represent a single bond, —$(CH_2)_u$— (in which u represents 1 to 20), —$OCH_2$—, —$CH_2O$—, —COO—, —OCO—, —CH=CH—, —CF=CF—, —$CF_2O$—, —$OCF_2$—, —$CF_2CF_2$—, or —C≡C—, in which one or more of the non-adjacent $CH_2$ groups in these substituents may be independently substituted with —O—, —CO—, —CO—O—, —O—CO—, —$Si(CH_3)_2$—O—$Si(CH_3)_2$—, —NR—, —NR—CO—, —CO—NR—, —NR—CO—O—, —O—CO—NR—, —NR—CO—NR—, —CH=CH—, —C≡C—, or —O—CO—O— (in which R's independently represent hydrogen or an alkyl group having 1 to 5 carbon atoms), $A^{11}$ and $A^{12}$ each independently represent a group selected from the group consisting of:

(a) a trans-1,4-cyclohexylene group (one methylene group or two or more non-adjacent methylene groups present in this group may be substituted with —O—, —NH—, or —S—), (b) a 1,4-phenylene group (one —CH= or two or more —CH='s present in this group may be substituted with —N=), and (c) a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, and p and q each independently represent 0 or 1).

In the general formula (VI), the broken line represents a bond to the main chain of the polymer, or Ma, P, or Va;

$Z^{11}$, $Z^{12}$ and $Z^{13}$ each independently represent a single bond, —$(CH_2)_u$—, —$OCH_2$—, —$CH_2O$—, —COO—, —OCO—, —CH=CH—, —CF=CF—, —$CF_2O$—, —$OCF_2$—, —$CF_2CF_2$—, or —C≡C—, u represents 1 to 20, in which one or more of the non-adjacent $CH_2$ groups in the alkyl group may be independently substituted with Q, in which Q represents —O—, —CO—, —CO—O—, —O—CO—, —$Si(CH_3)_2$—O—$Si(CH_3)_2$—, —NR—, —NR—CO—, —CO—NR—, —NR—CO—O—, —O—CO—NR—, —NR—CO—NR—, —CH=CH—, —C≡C—, or —O—CO—O—, and R's independently represent a hydrogen atom or an alkyl group having 1 to 5 carbon atoms;

$A^{11}$ and $A^{12}$ each independently represent a trans-1,4-cyclohexylene group, a trans-1,3-dioxan-2,5-yl group, a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group, and these may be unsubstituted or have one or more hydrogen atoms substituted with a fluorine atom, a chlorine atom, a methyl group, or a methoxy group; and p and q may represent 0 or 1.

$Z^{11}$, $Z^{12}$ and $Z^{13}$ are each independently preferably a single bond, —$(CH_2)_u$— (in which u represents 1 to 12, and one or more of the non-adjacent $CH_2$ groups may be independently substituted with —O—, —CO—, —CO—O—, —O—CO—, —NR—, —NR—CO—, —CO—NR—, —NR—CO—NR—, —CH=CH—, —C≡C—, or —O—CO—O—, and R's represent hydrogen, a methyl group, or an ethyl group), —$OCH_2$—, —$CH_2O$—, —COO—, —OCO—, —CH=CH—, —$CF_2O$—, —$OCF_2$—, or —C≡C—. $A^{11}$ and $A^{12}$ each independently represent a trans-1,4-cyclohexylene group, a trans-1,3-dioxane-2,5-diyl group, a 1,4-naphthylene group, a 2,6-naphthylene group, a pyridine-2,5-diyl group, a pyrimidine-2,5-diyl group, or a 1,4-phenylene group, and these are preferably unsubstituted or have one or more hydrogen atoms substituted with a fluorine atom, a chlorine atom, a methyl group, or a methoxy group. $Z^{11}$, $Z^{12}$ and $Z^{13}$ are each independently more preferably a single bond, —$(CH_2)_u$— (in which u represents 1 to 10, one or more of the non-adjacent $CH_2$ groups may be independently substituted with —O—, —CO—, —CO—O—, —O—CO—, —NR—, —NR—CO—, —CO—NR—, —CH=CH—, or —C≡C—, and R represents hydrogen, a methyl group, or an ethyl group), —$OCH_2$—, —$CH_2O$—, —COO—, —OCO—, —CH=CH—, or —C≡C—. $A^{11}$ and $A^{12}$ each independently represent a trans-1,4-cyclohexylene group, a 2,6-naphthylene group, or a 1,4-phenylene group and these are more preferably unsubstituted or have one or more hydrogen atoms substituted with a fluorine atom, a chlorine atom, a methyl group, or a methoxy group. $Z^{11}$, $Z^{12}$ and $Z^{13}$ are each independently particularly preferably a single bond, —$(CH_2)_u$— (in which u represents 1 to 6, and one or more of the non-adjacent $CH_2$ groups may be independently substituted with, —O—, —CO—O—, —O—CO—, —CH=CH—, or —C≡C—), —$OCH_2$—, —$CH_2O$—, —COO—, —OCO—, —CH=CH—, or —C≡C—. $A^{11}$ and $A^{12}$ each independently represent a trans-1,4-cyclohexylene group, a 2,6-naphthylene group, or a 1,4-phenylene group, and these are particularly preferably unsubstituted or have one or more hydrogen atoms substituted with a fluorine atom, a methyl group, or a methoxy group.

In the general formula (VI), in order to improve the liquid crystal alignment property, $Z^{11}$, $Z^{12}$ and $Z^{13}$ are each independently preferably a single bond, —$(CH_2)_u$— (in which u represents 1 to 6, one or more of the non-adjacent $CH_2$ groups independently represent —O— or —CO—O—, —O represents 1 to 8, and one or two of the non-adjacent $CH_2$ groups may be independently substituted with —O—, —CO—O—, —O—CO—, —$Si(CH_3)_2$—O—$Si(CH_3)_2$—, —CH=CH—, or —C≡C—), —COO—, —OCO—, —CH=CH—, —CF=CF—, or —C≡C—. $A^{11}$ and $A^{12}$ are each independently preferably a trans-1,4-cyclohexylene group, a trans-1,3-dioxane-2,5-diyl group, a pyridine-2,5-diyl group, a pyrimidine-2,5-diyl group, a 2,5-thiophenylene group, or a 1,4-phenylene group.

Further, in order to improve the thermal stability of alignment, $Z^{11}$, $Z^{12}$ and $Z^{13}$ are each independently preferably —NR—CO—, —CO—NR—, —NR—CO—O—, —O—CO—NR—, —NR—CO—NR—, or —O—CO—O—, and $A^{11}$ and $A^{12}$ are each independently preferably a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group.

In addition, in order to improve the solubility of the polymer, $Z^{11}$, $Z^{12}$ and $Z^{13}$ are each independently preferably —$OCH_2$—, —$CH_2O$—, —$CF_2O$—, —$OCF_2$—, —$CF_2CF_2$—, —NR—, or —CO—, and $A^{11}$ and $A^{12}$ are each independently preferably a trans-1,4-cyclohexylene group, a 1,4-naphthylene group, a 2,6-naphthylene group, or a 2,5-furanylene group.
Many compounds belong to the general formula (VI), but specifically, the compounds represented by the following general formulae (S-a-1) to (S-ad-9):
[Chem. 51]
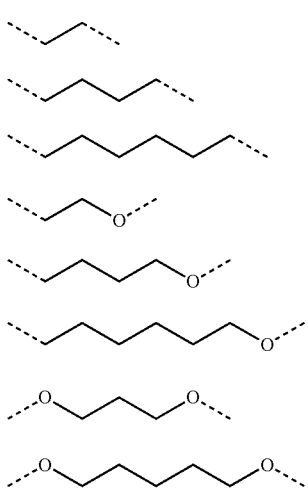
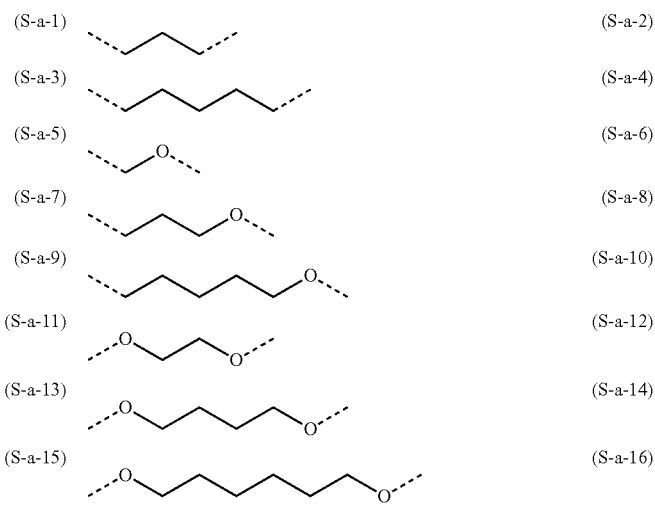
[Chem. 52]
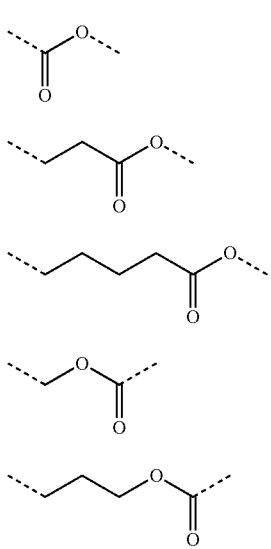
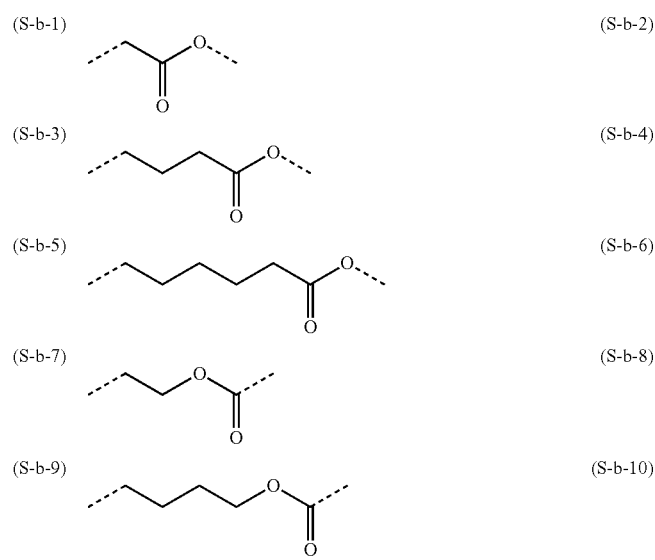
[Chem. 53]
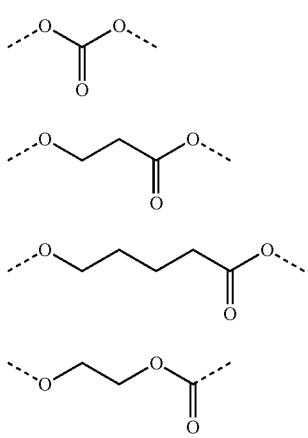
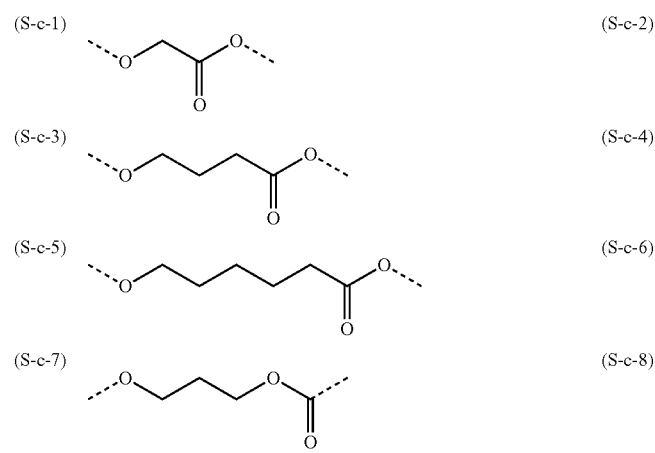

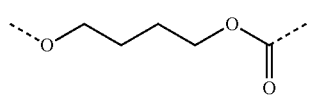 (S-c-9)
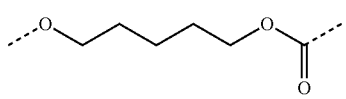 (S-c-10)
[Chem. 54]
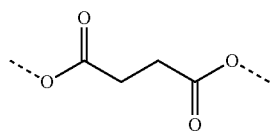 (S-d-1)
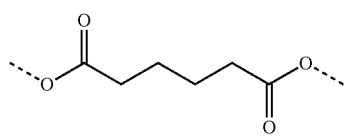 (S-d-2)
(S-d-3)
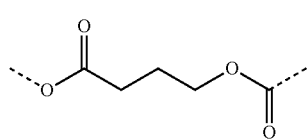 (S-d-4)
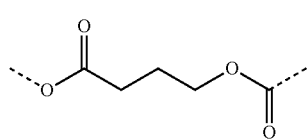
(S-d-5)
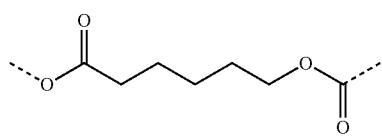 (S-d-6)
(S-d-7)
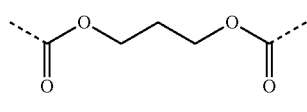 (S-d-8)
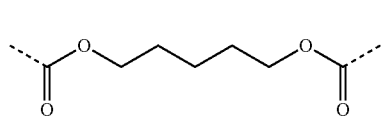 (S-d-9)
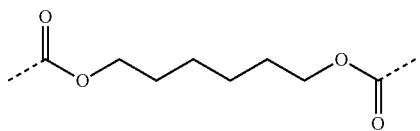 (S-d-10)
(S-d-11)
(S-d-12)
[Chem. 55]
 (S-e-1)
(S-e-2)
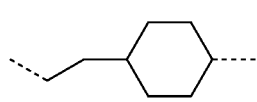 (S-e-3)
(S-e-4)
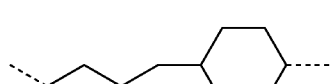 (S-e-5)
(S-e-6)
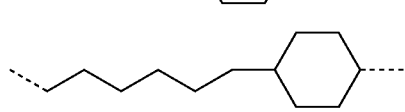 (S-e-7)
(S-e-8)
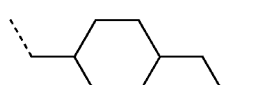 (S-e-9)
(S-e-10)
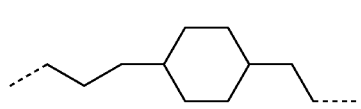 (S-e-11)
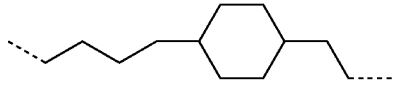 (S-e-12)

-continued
(S-e-13) 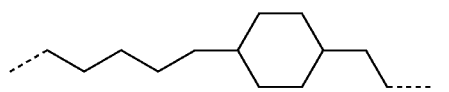 (S-e-14) 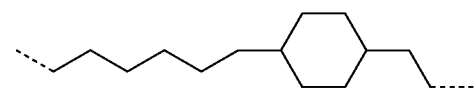
[Chem. 56]
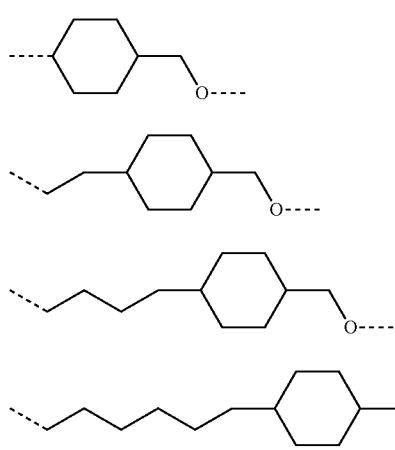
(S-f-1)
(S-f-3)
(S-f-5)
(S-f-7)
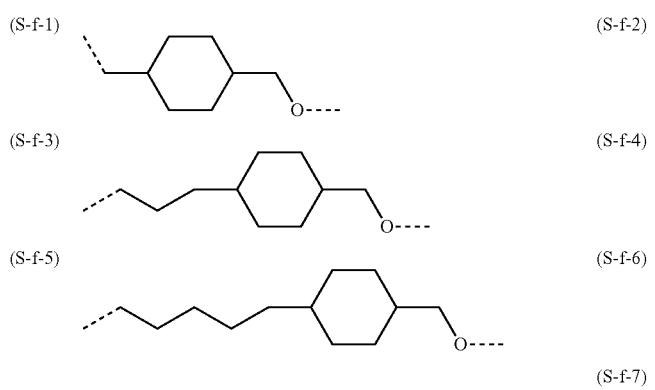
(S-f-2)
(S-f-4)
(S-f-6)
[Chem. 57]
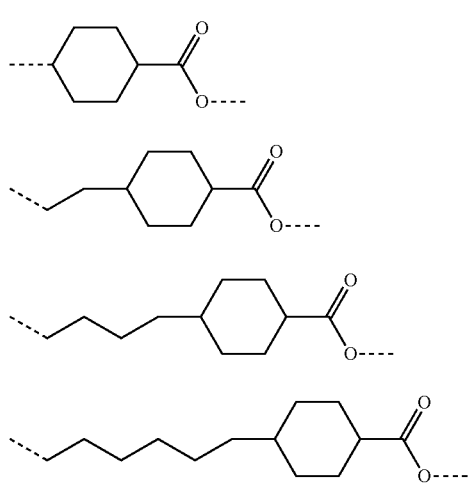
(S-g-1)
(S-g-3)
(S-g-5)
(S-g-7)
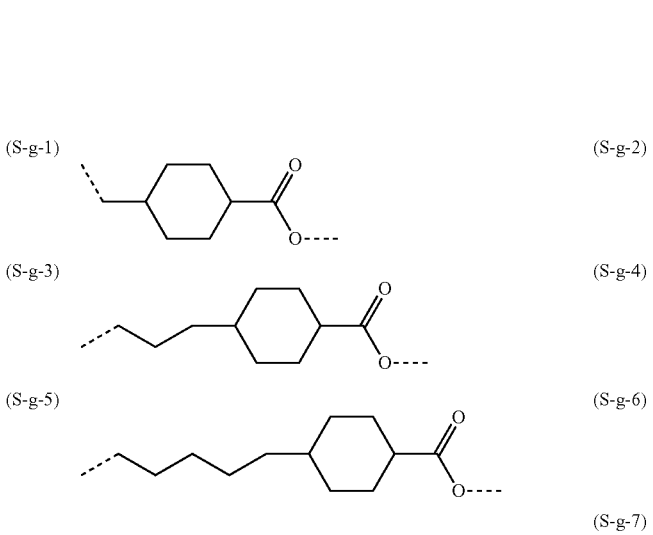
(S-g-2)
(S-g-4)
(S-g-6)
[Chem. 58]
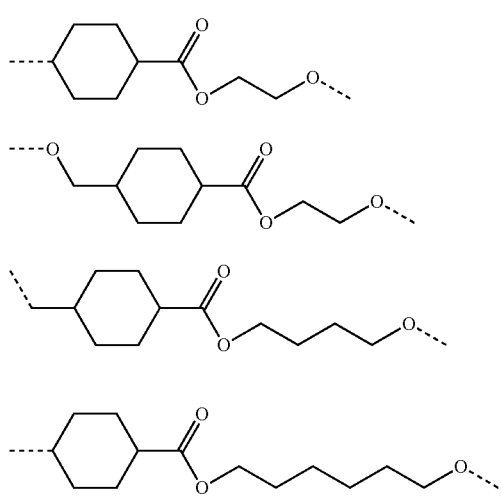
(S-h-1)
(S-h-3)
(S-h-5)
(S-h-7)
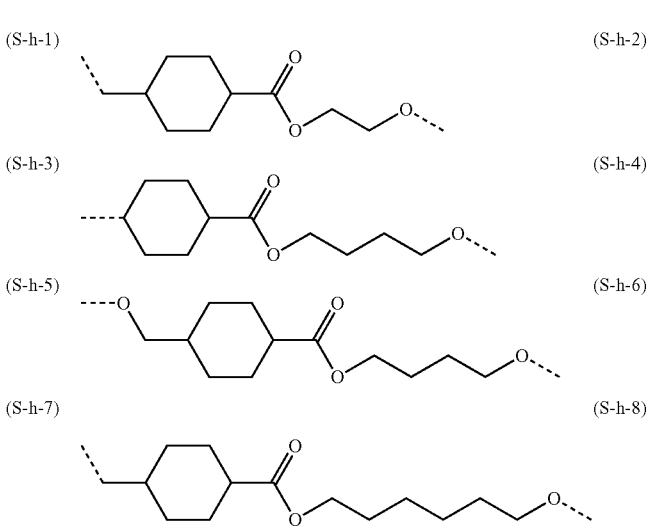
(S-h-2)
(S-h-4)
(S-h-6)
(S-h-8)

(S-h-9)
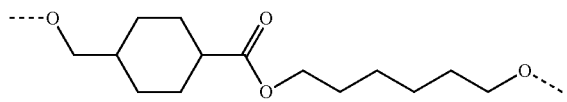
[Chem. 59]
(S-i-1)
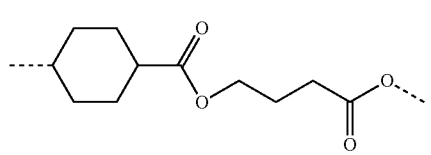
(S-i-2)
(S-i-3)
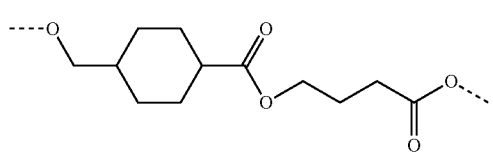
(S-i-4)
(S-i-5)
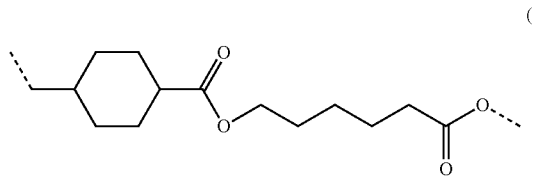
(S-i-6)
[Chem. 60]
(S-j-1)
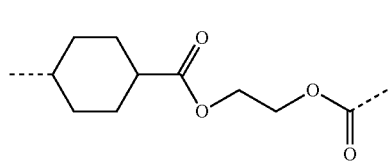
(S-j-2)
(S-j-3)
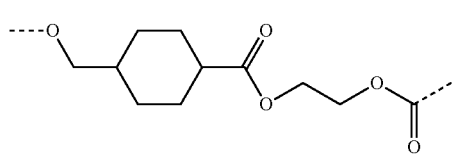
(S-j-4)
(S-j-5)
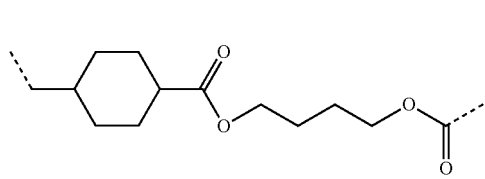
(S-j-6)
(S-j-7)
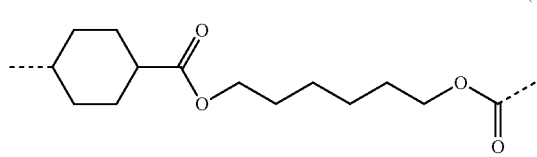
(S-j-8)
(S-j-9)
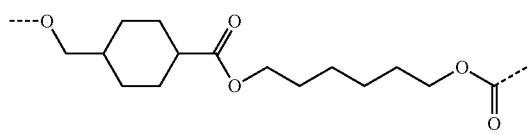
[Chem. 61]
(S-k-1)
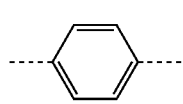
(S-k-2)
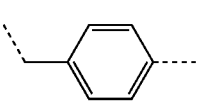

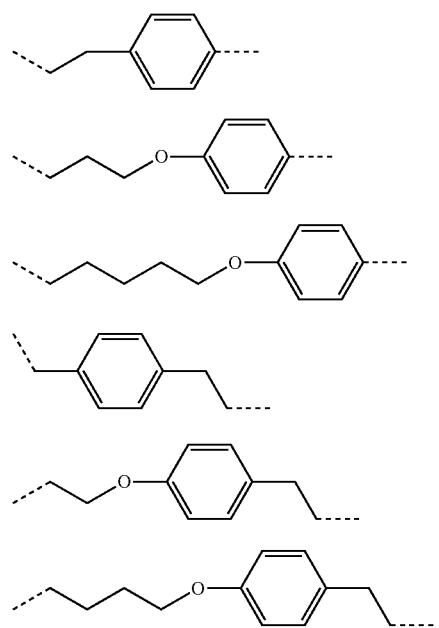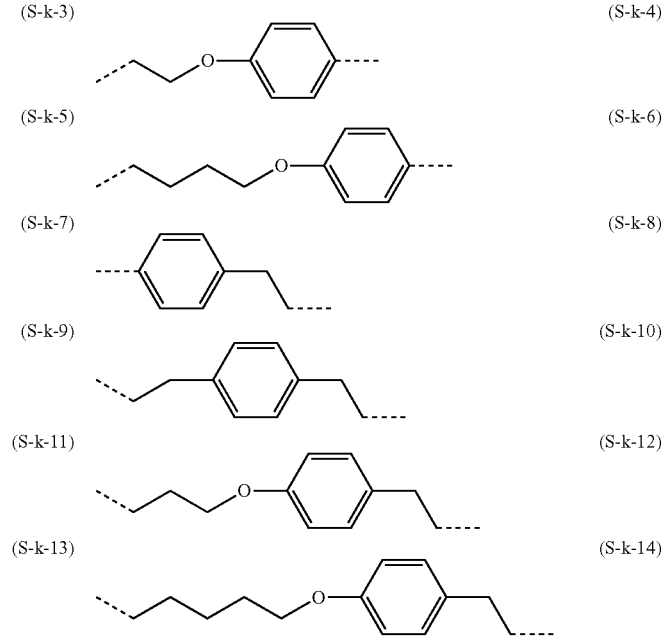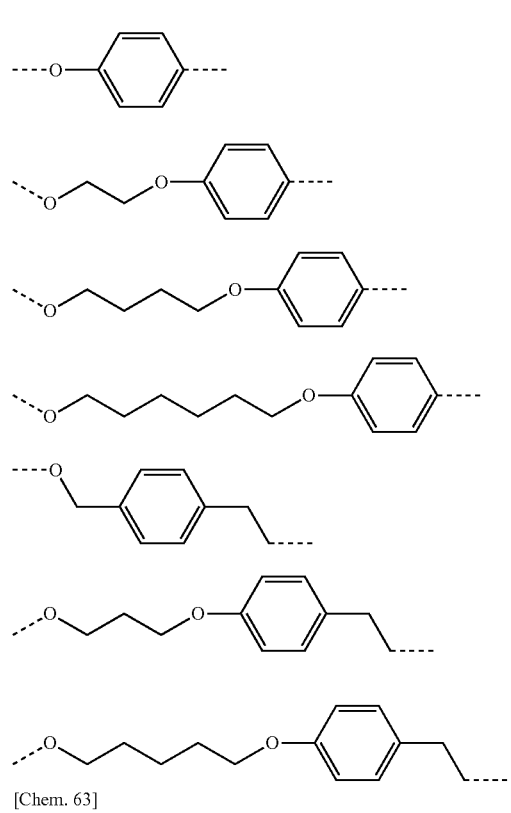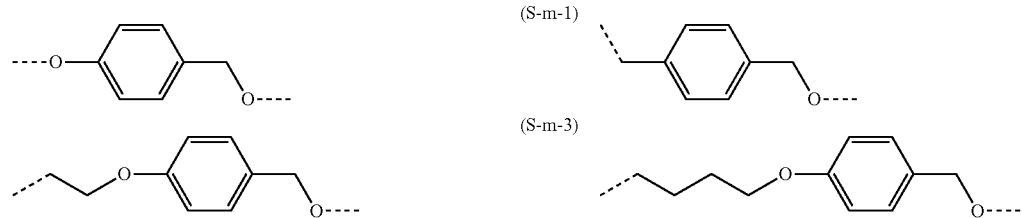

-continued
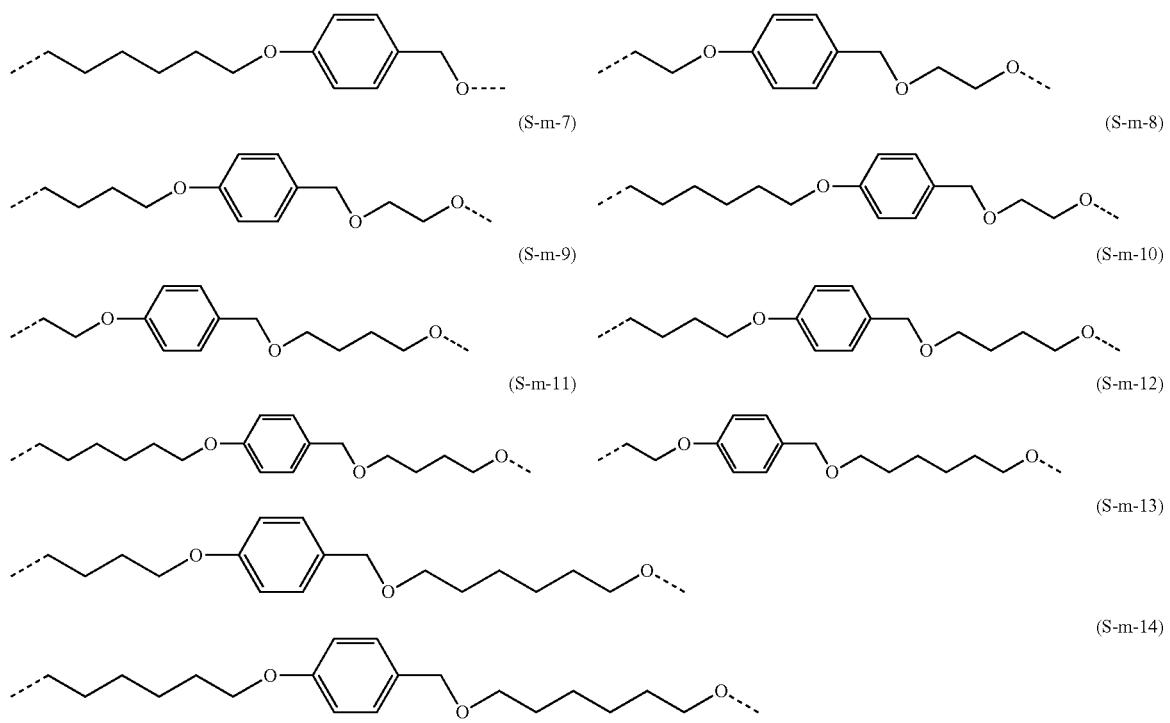
[Chem. 64]
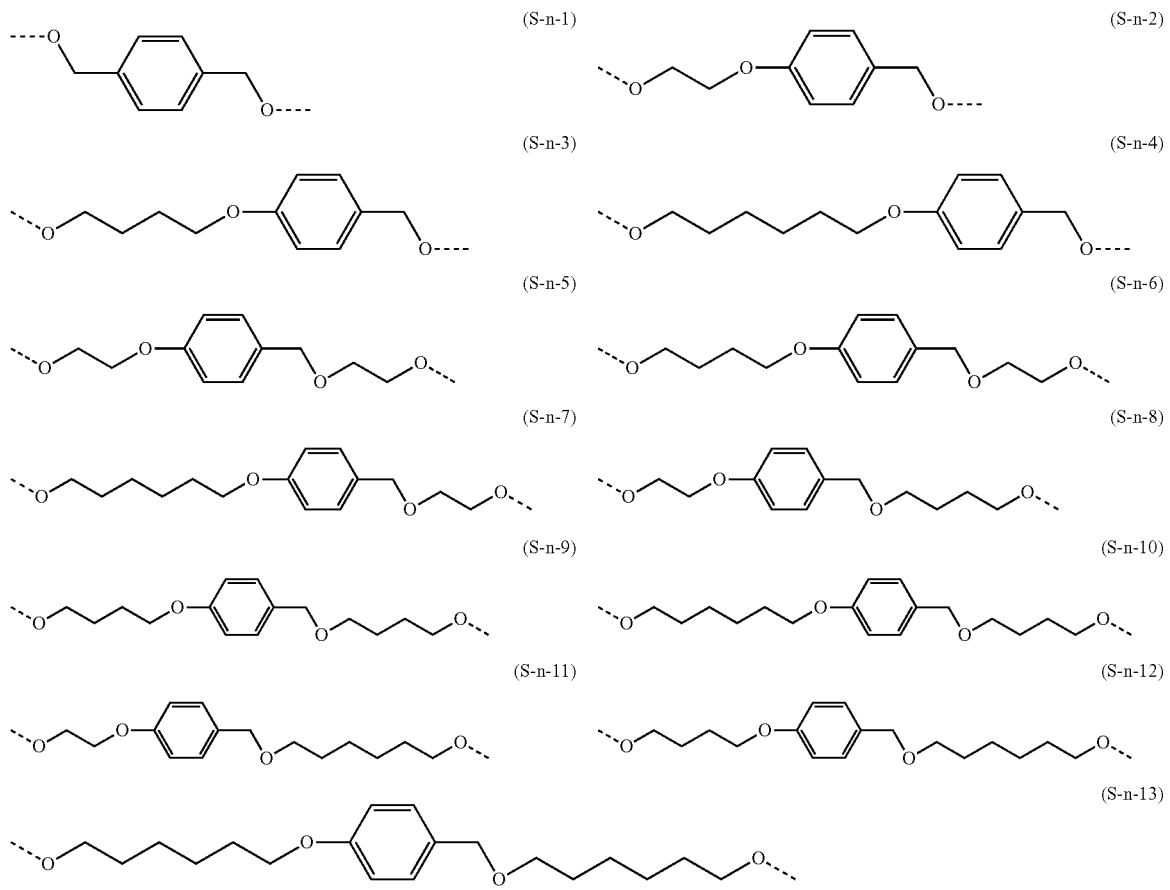

-continued
[Chem. 65]
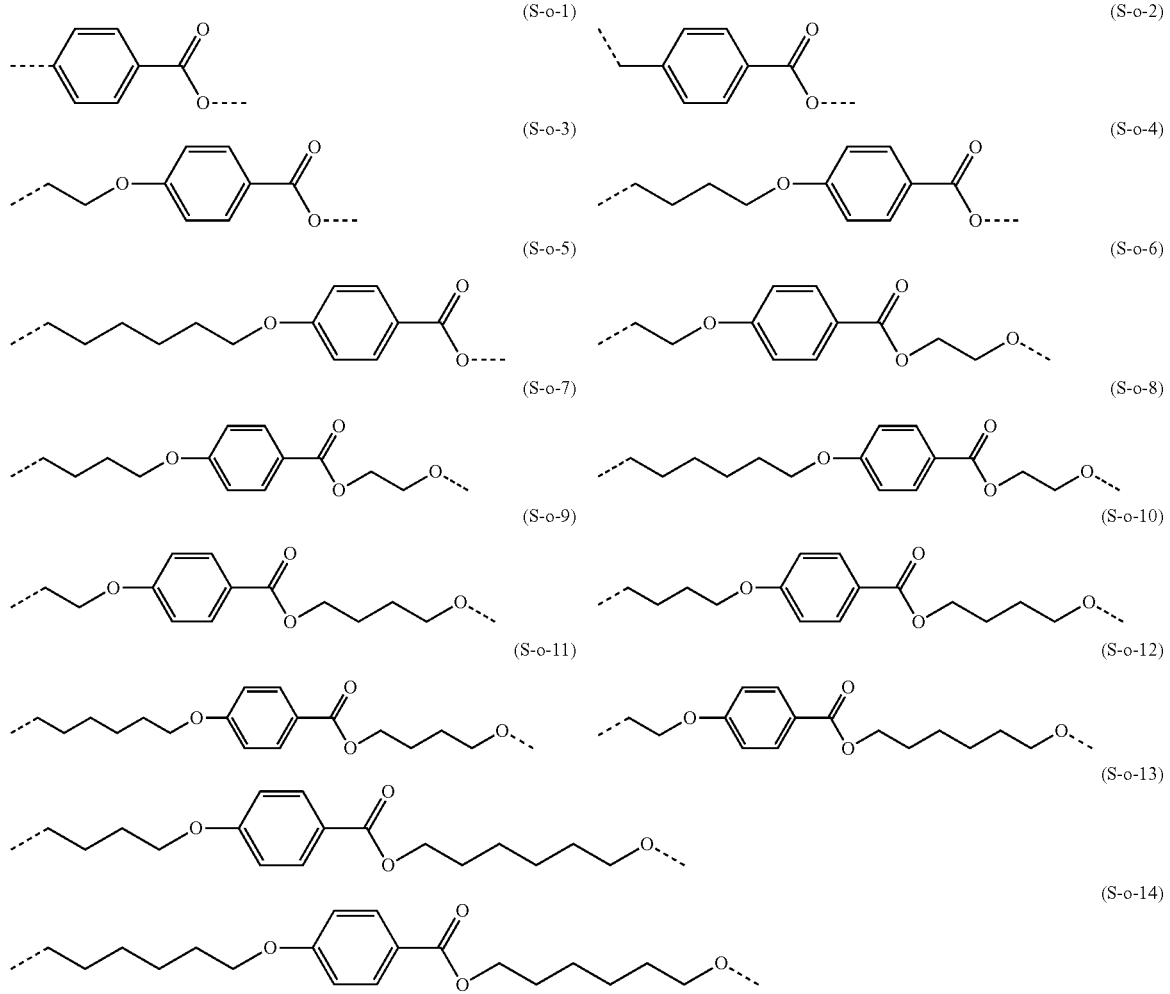
[Chem. 66]
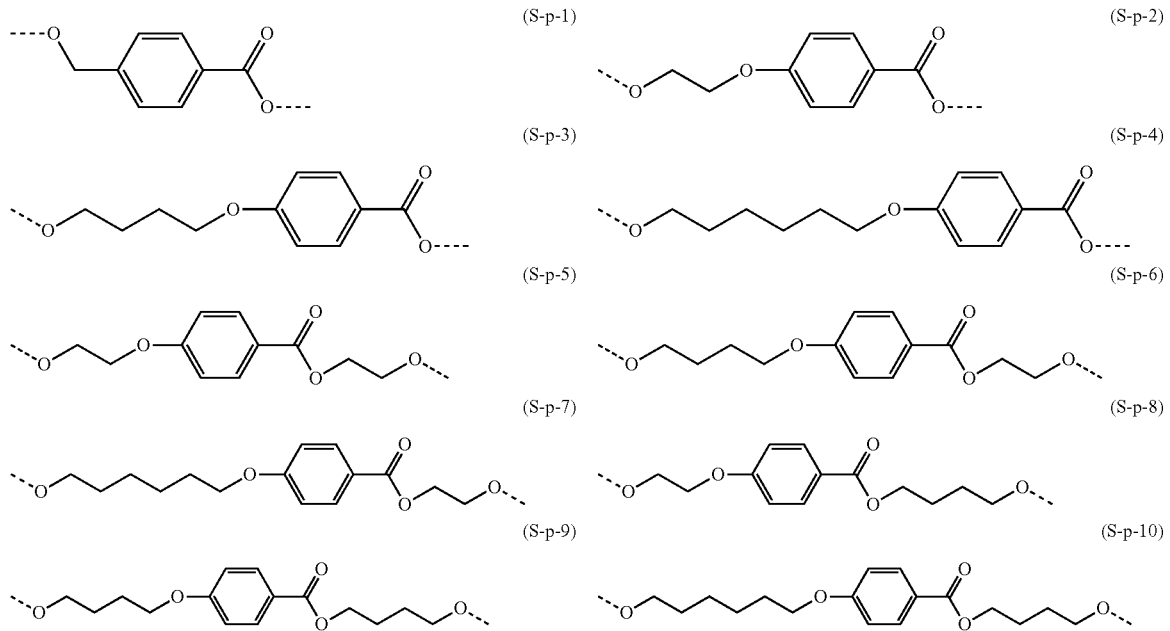

-continued
(S-p-11) 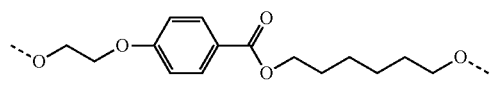 (S-p-12) 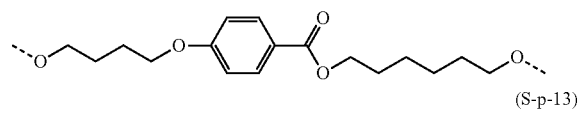
[Chem. 67]
(S-p-13)
(S-q-1) 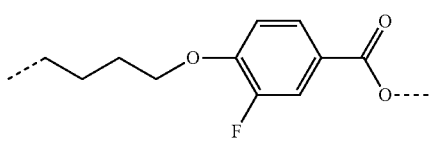 (S-q-2) 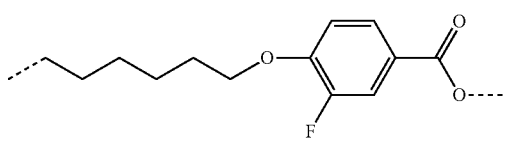
(S-q-3) 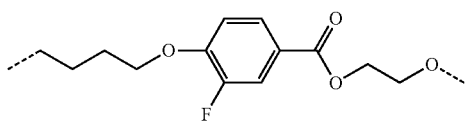 (S-q-4)
(S-q-5) 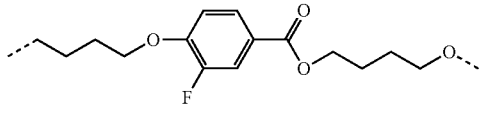 (S-q-6)
(S-q-7) 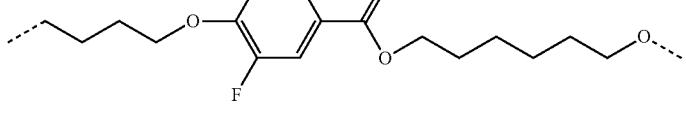
(S-q-8)
[Chem. 68]
(S-r-1) 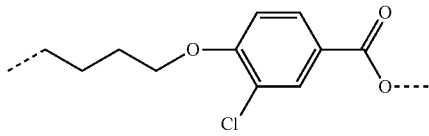 (S-r-2)
(S-r-3) 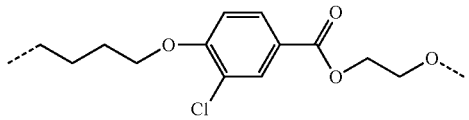 (S-r-4)
(S-r-5) 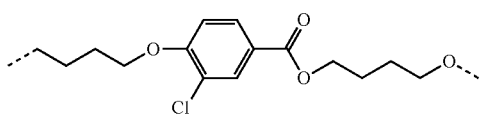 (S-r-6)
(S-r-7) 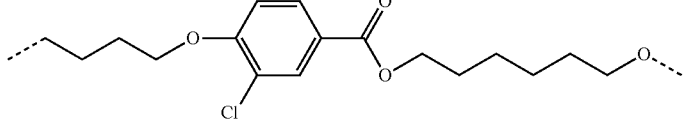

-continued
(S-r-8)
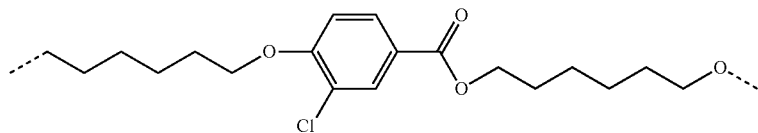
[Chem. 69]
(S-s-1) 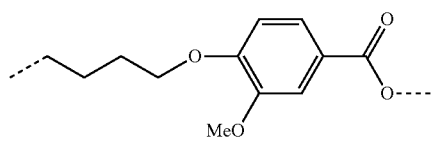 (S-s-2)
(S-s-3) 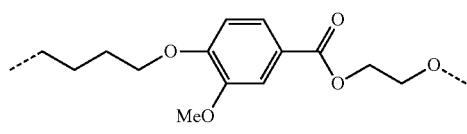 (S-s-4)
(S-s-5) 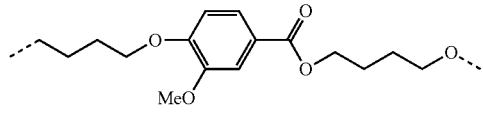 (S-s-6)
(S-s-7) 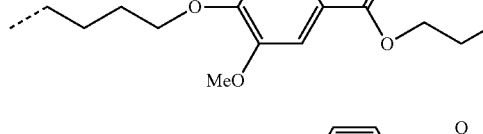
(S-s-8) 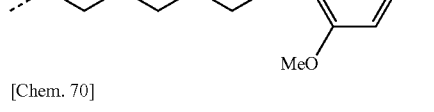
[Chem. 70]
(S-t-1) 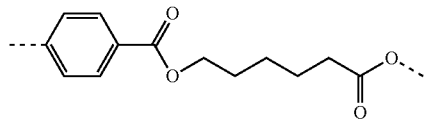 (S-t-2) 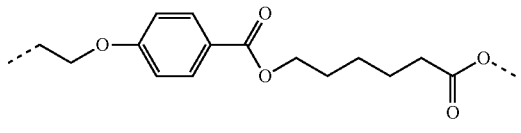
(S-t-3) 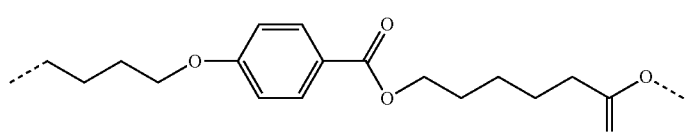
(S-t-4) 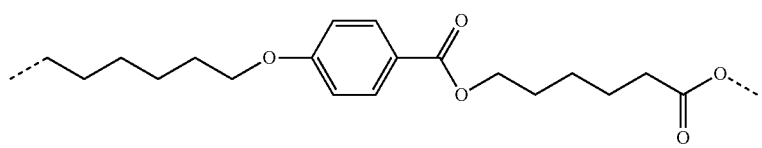
(S-t-5) 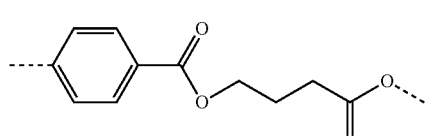 (S-t-6) 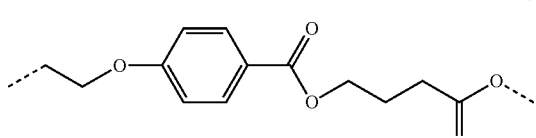

-continued
(S-t-7)
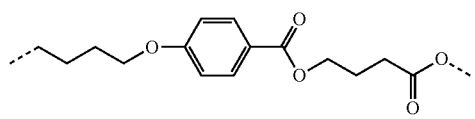
(S-t-8)
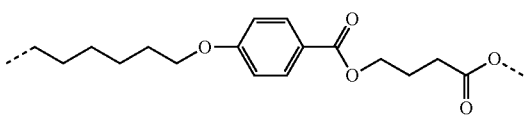
[Chem. 71]
(S-u-1)
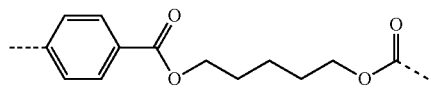
(S-u-2)
(S-u-3)
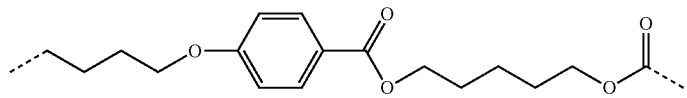
(S-u-4)
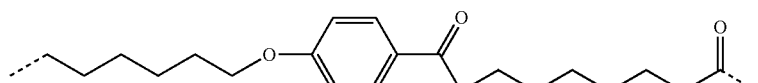
(S-u-5)
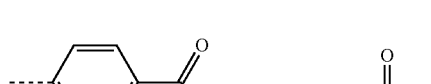
(S-u-6)
(S-u-7)
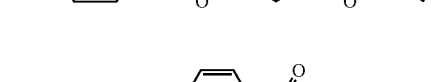
(S-u-8)
[Chem. 72]
(S-v-1)
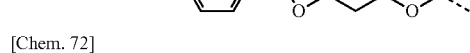
(S-v-2)
(S-v-3)
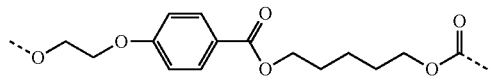
(S-v-4)
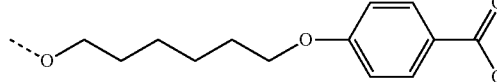
(S-v-5)
(S-v-6)
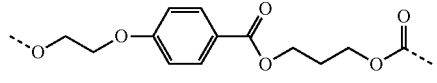
[Chem. 73]
(S-w-1)
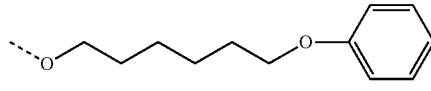
(S-w-2)
(S-w-3)
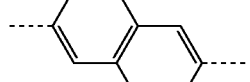
(S-w-4)
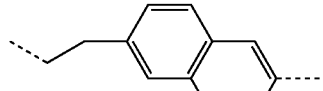
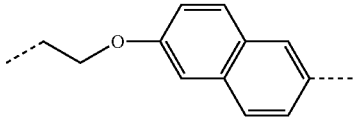

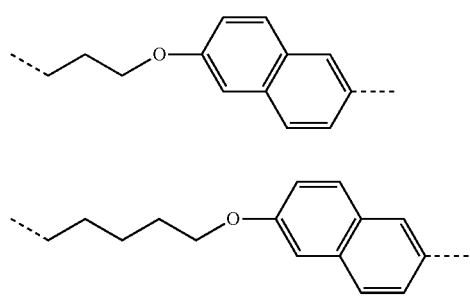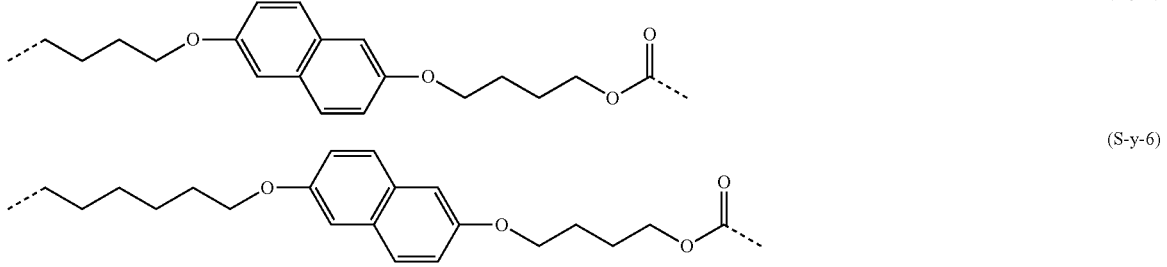

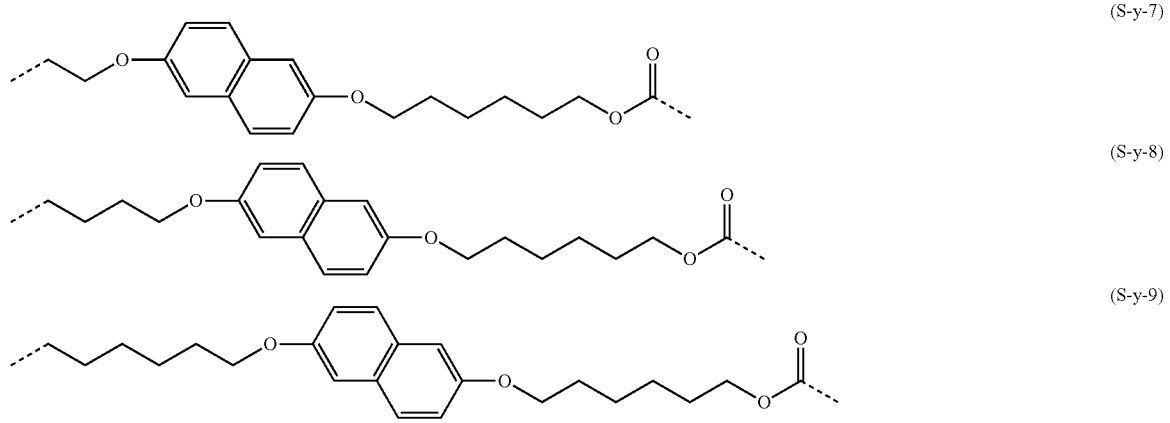
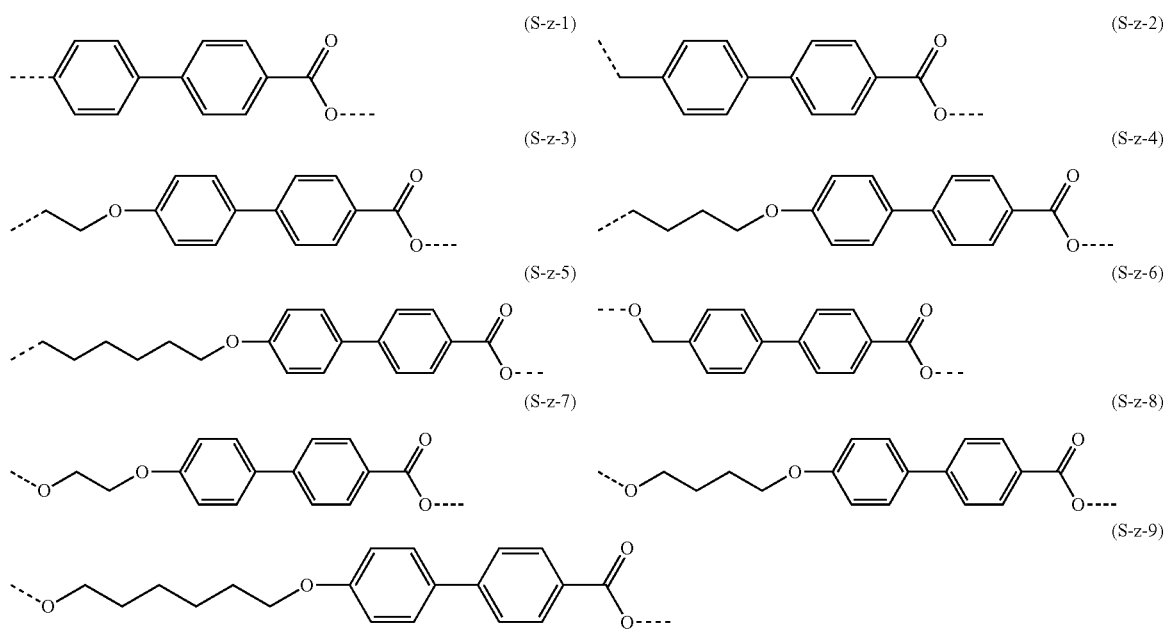
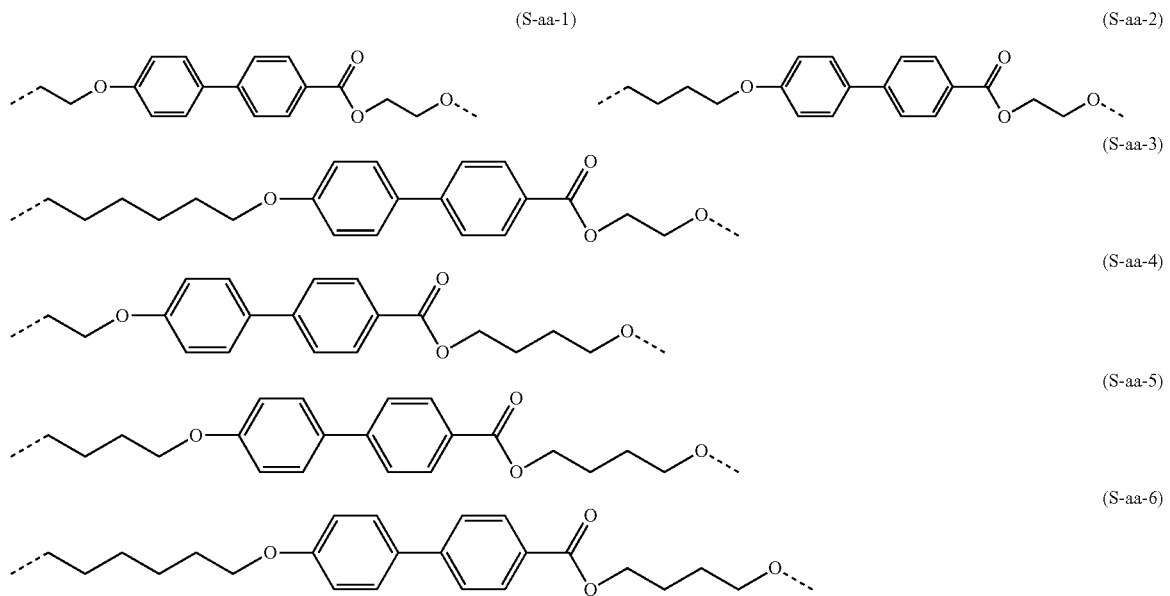

-continued
(S-aa-7)
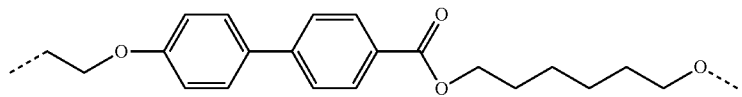
(S-aa-8)
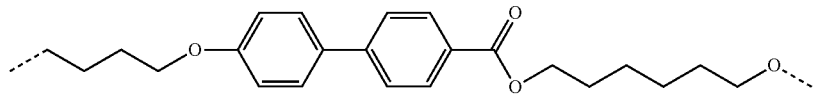
(S-aa-9)
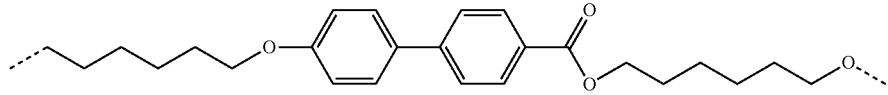
[Chem. 78]
(S-ab-1)
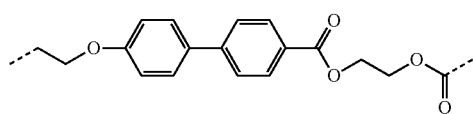
(S-ab-2)
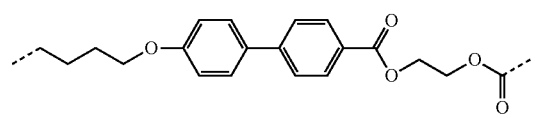
(S-ab-3)
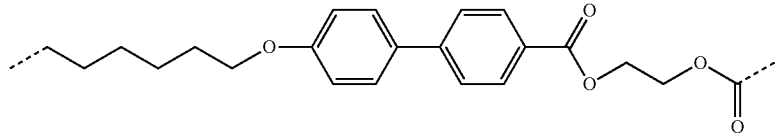
(S-ab-4)
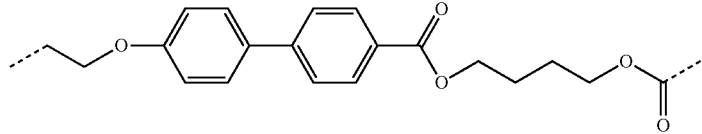
(S-ab-5)
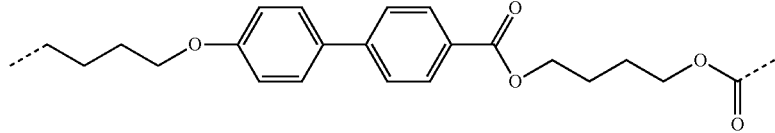
(S-ab-6)
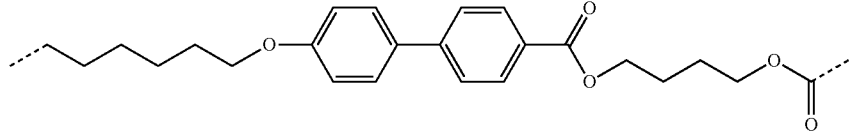
(S-ab-7)
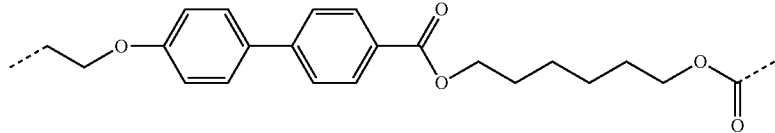
(S-ab-8)
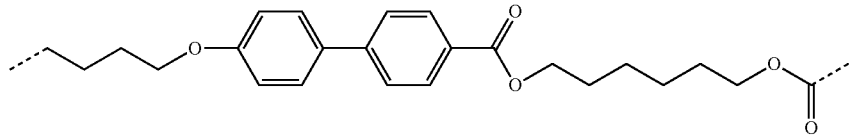
(S-ab-9)
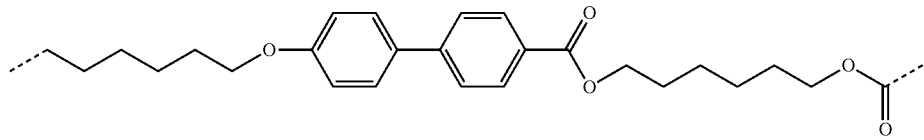

[Chem. 79]
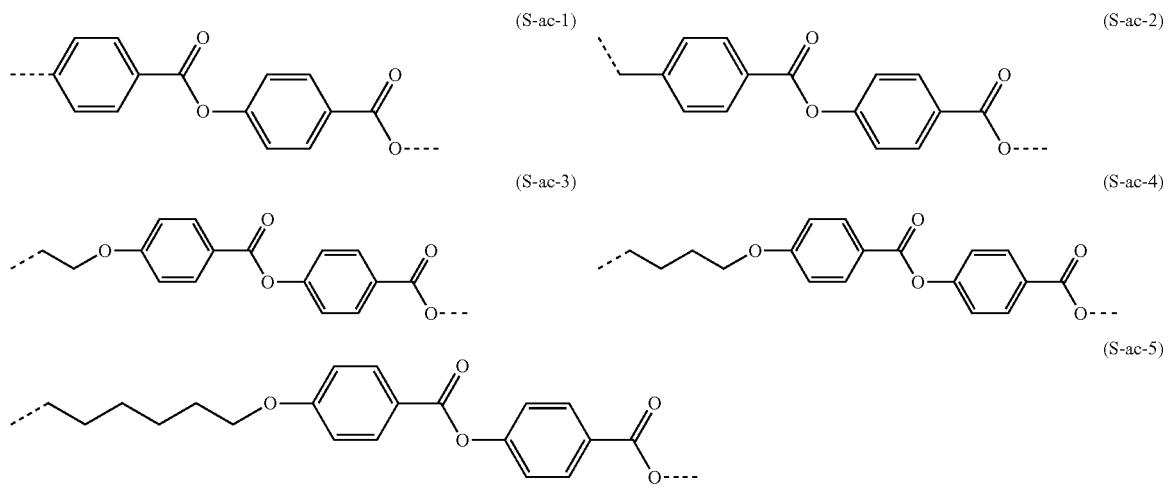
[Chem. 80]
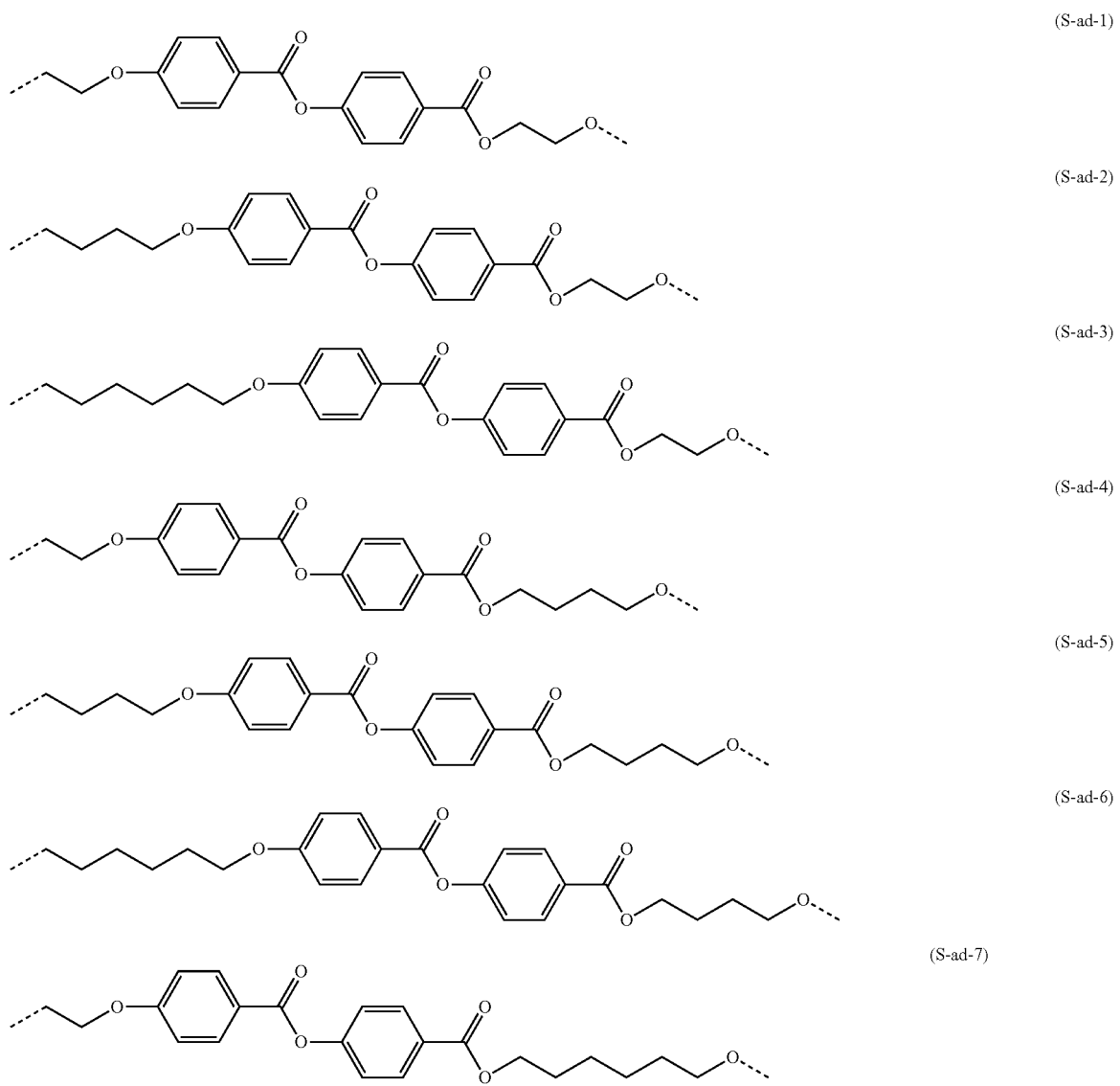

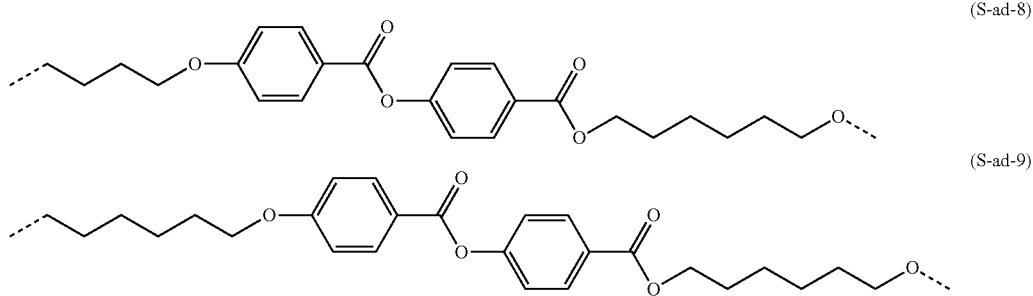

(S-ad-8)

(S-ad-9)

are particularly preferable.

Among these, the compounds represented by the formulae (S-a-6) to (S-a-16), the formulae (S-b-3) to (S-b-10), the formulae (S-c-3) to (S-c-10), the formulae (S-d-3) to (S-d-12), the formulae (S-k-4) to (S-k-7), the formulae (S-1-13) to (S-1-17), the formulae (S-o-3) to (S-o-14), the formulae (S-p-2) to (S-p-13), the formulae (S-s-1) to (S-s-8), the formulae (S-t-1) to (S-t-8), the formulae (S-y-1) to (S-y-9), and the formulae (S-aa-1) to (S-aa-9) are more preferable.

In the general formula (Q) or (QP), $V_a$ is preferably a structure represented by the following general formula (VII).

[Chem. 81]

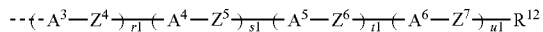

(VII)

(in which the broken line represents a bond to $S_{aa}$;

$Z^4$, $Z^5$, $Z^6$ and $Z^7$ each independently represent a single bond, —(CH$_2$)$_u$— (in which u represents 1 to 20), —OCH$_2$—, —CH$_2$O—, —COO—, —OCO—, —CH═CH—, —CF═CF—, —CF$_2$O—, —OCF$_2$—, —CF$_2$CF$_2$— or —C≡C—, in which one or more of the non-adjacent CH$_2$ groups in these substituents may be independently substituted with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C—, or —O—CO—O— (in which R's independently represent hydrogen or an alkyl group having 1 to 5 carbon atoms), $A^3$, $A^4$, $A^5$ and $A^6$ each independently represent a group selected from the group consisting of:

(a) a trans-1,4-cyclohexylene group (one methylene group or two or more non-adjacent methylene groups present in this group may be substituted with —O—, —NH—, or —S—), (b) a 1,4-phenylene group (one —CH═ or two or more —CH═'s present in this group may be substituted with —N═), and (c) a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, r1, s1, t1, and u1 each independently represent 0 or 1, and $R^{12}$ represents hydrogen, fluorine, chlorine, a cyano group, or an alkyl group having 1 to 20 carbon atoms, a hydrogen atom in the alkyl group may be substituted with a fluorine atom, and one CH$_2$ group or two or more non-adjacent CH$_2$ groups may be substituted with —O—, —CO—O—, —O—CO— and/or —CH═CH—)).

In the general formula (VII), preferably, the broken line represents a bond to $S_{aa}$;

$Z^4$, $Z^5$, $Z^6$ and $Z^7$ each independently represent a single bond, —(CH$_2$)$_u$—, —OCH$_2$—, —CH$_2$O—, —COO—, —OCO—, —CH═CH—, —CF═CF—, —CF$_2$O—, —OCF$_2$—, —CF$_2$CF$_2$— or —C≡C, u represents 1 to 20, in which one or more of the non-adjacent CH$_2$ groups in the alkyl group may be independently substituted with Q, in which Q represents —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH═CH—, —C≡C—, or —O—CO—O—, and R's independently represent a hydrogen atom or an alkyl group having 1 to 5 carbon atoms;

$A^3$, $A^4$, $A^5$ and $A^6$ each independently represent a trans-1,4-cyclohexylene group, a trans-1,3-dioxan-2,5-yl group, a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group, these may be unsubstituted or have one or more hydrogen atoms substituted with a fluorine atom, a chlorine atom, a methyl group, or a methoxy group;

r1, s1, t1 and u1 represent 0 or 1; and $R^{12}$ represents hydrogen, fluorine, chlorine, a cyano group, or an alkyl group having 1 to 20 carbon atoms (which may be appropriately substituted with fluorine, or appropriately one CH$_2$ group or two or more non-adjacent CH$_2$ groups may be substituted with —O—, —CO—O—, —O—CO— and/or —CH═CH—).

$Z^4$, $Z^5$, $Z^6$ and $Z^7$ are each independently preferably a single bond, —(CH$_2$)$_u$— (in which u represents 1 to 12, one or more of the non-adjacent CH$_2$ groups may be independently substituted with —O—, —CO—, —CO—O—, —O—CO—, —NR—CO—, —CO—NR—, —NR—CO—NR—, —CH═CH—, —C≡C—, or —O—CO—O—, and R's independently represent hydrogen, a methyl group, or an ethyl group), —OCH$_2$—, —CH$_2$O—, —COO—, —OCO—, —CH═CH—, —CF$_2$O—, —OCF$_2$— or —C≡C—. $A^3$, $A^4$, $A^5$ and $A^6$ each independently represent a trans-1,4-cyclohexylene group, a 2,6-naphthylene group, a pyridine-2,5-diyl group, a pyrimidine-2,5-diyl group, or a 1,4-phenylene group and these are preferably unsubstituted or have one or more hydrogen atoms substituted with a fluorine atom, a chlorine atom, a methyl group, or a methoxy group.

r1, s1, t1 and u1 preferably satisfy r1+s1+t+u of 0 or more and 3 or less, and $R^2$ is preferably a structure represented by hydrogen, fluorine, chlorine, a cyano group, or an alkyl group having 1 to 18 carbon atoms (one $CH_2$ group, or two or more non-adjacent $CH_2$ groups in the alkyl group may be substituted with —O—, —CO—O—, —O—CO— and/or —CH=CH—).

In order to improve the liquid crystal alignment property, $Z^4$, $Z^5$, $Z^6$ and $Z^7$ are each independently preferably a single bond, —(CH$_2$)$_u$— (in which u represents 1 to 8, one or two of the non-adjacent $CH_2$ groups may be independently substituted with —O—, —CO—O—, —O—CO—, —Si(CH$_3$)$_2$—O—Si(CH$_3$)$_2$—, —CH=CH—, or —C≡C—), —COO—, —OCO—, —CH=CH—, —CF=CF—, or —C≡C—. $A^3$, $A^4$, $A^5$ and $A^6$ are each independently preferably a trans-1,4-cyclohexylene group, a trans-1,3-dioxane-2,5-diyl group, a pyridine-2,5-diyl group, a pyrimidine-2,5-diyl group, a 2,5-thiophenylene group, or a 1,4-phenylene group.

Furthermore, in order to improve the thermal stability of the alignment, $Z^4$, $Z^5$, $Z^6$ and $Z^7$ are each independently preferably —NR—CO—, —CO—NR—, —NR—CO—O—, —O—CO—NR—, —NR—CO—NR—, or —O—CO—O—. $A^3$, $A^4$, $A^5$ and $A^6$ are each independently preferably a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group. Further, in order to improve the solubility of the polymer, $Z^4$, $Z^5$, $Z^6$ and $Z^7$ are each independently preferably —OCH$_2$—, —CH$_2$O—, —CF$_2$O—, —OCF$_2$—, —CF$_2$CF$_2$—, —NR—, or —CO—. $A^3$, $A^4$, $A^5$ and $A^6$ are each independently preferably a trans-1,4-cyclohexylene group, a 1,4-naphthylene group, a 2,6-naphthylene group, or a 2,5-furanylene group.

Furthermore, in order to provide a pretilt angle of 80 degrees or more, $Z^4$, $Z^5$, $Z^6$ and $Z^7$ are each independently preferably a single bond, —OCH$_2$—, —CH$_2$O—, —COO—, —OCO—, and —C≡C—. $A^3$, $A^4$, $A^5$ and $A^6$ are each independently preferably a trans-1,4-cyclohexylene group, a trans-1,3-dioxane-2,5-diyl group, and a 1,4-phenylene group, and $R^{12}$ is preferably an alkyl group having 1 to 10 carbon atoms, an alkoxy group, fluorine, a trifluoromethyl group, or a trifluoromethoxy group.

Many compounds belong to the general formula (VII), but specifically, the compounds represented by the following general formulae (VII-a-1) to (VII-q-10):

[Chem. 82]

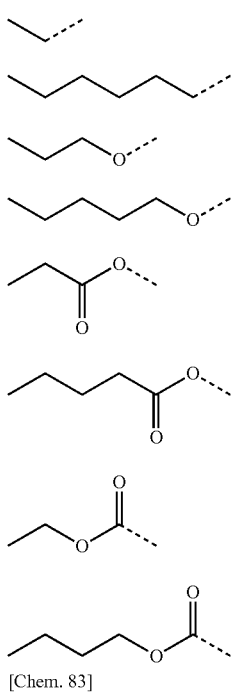
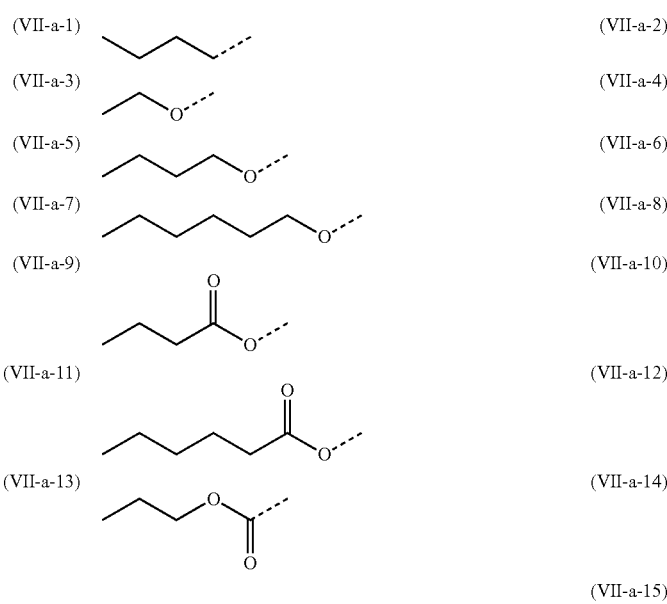

(VII-a-1) (VII-a-2) (VII-a-3) (VII-a-4) (VII-a-5) (VII-a-6) (VII-a-7) (VII-a-8) (VII-a-9) (VII-a-10) (VII-a-11) (VII-a-12) (VII-a-13) (VII-a-14) (VII-a-15)

[Chem. 83]

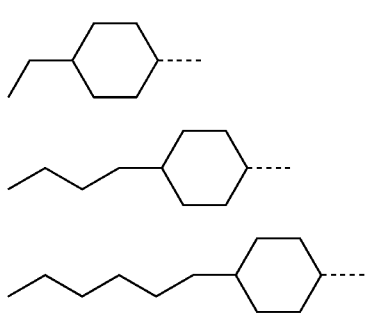
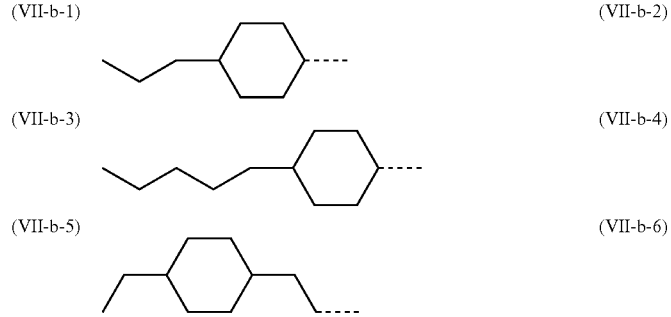

(VII-b-1) (VII-b-2) (VII-b-3) (VII-b-4) (VII-b-5) (VII-b-6)

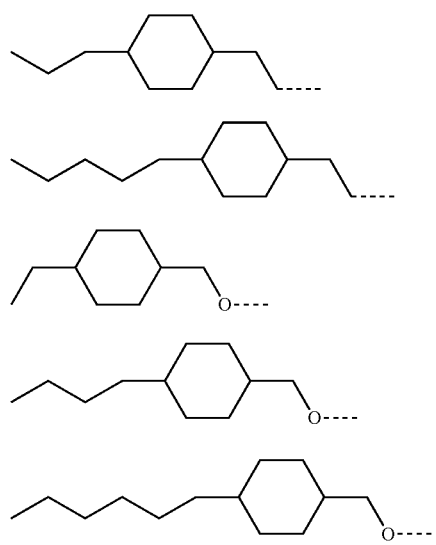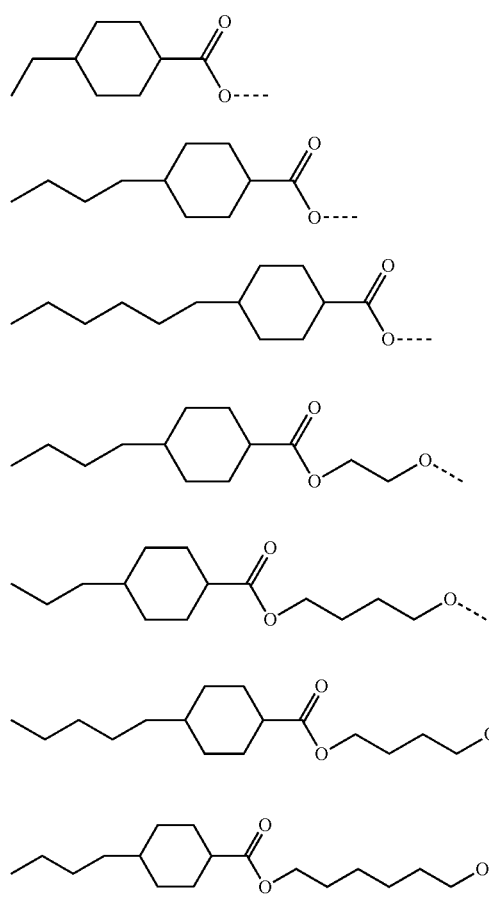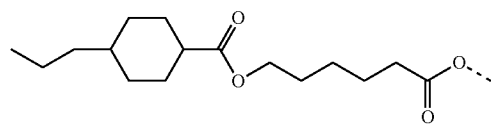

-continued
(VII-d-3)
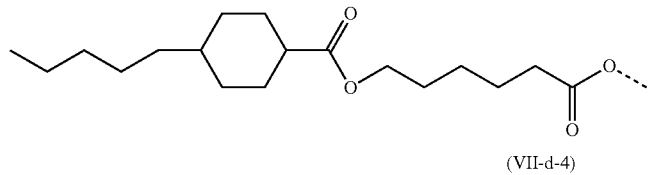
(VII-d-4)
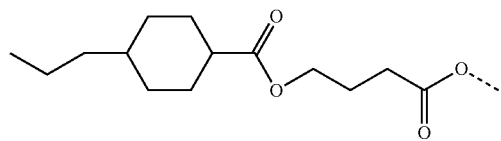
(VII-d-5)
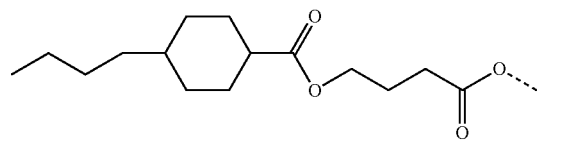
(VII-d-6)
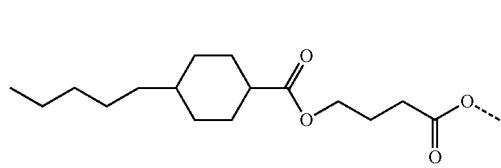
(VII-d-7)
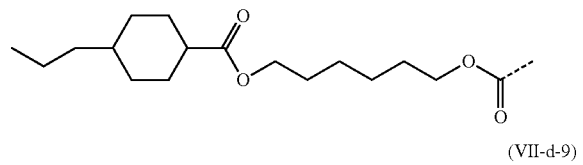
(VII-d-8)
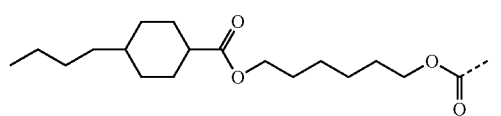
(VII-d-9)
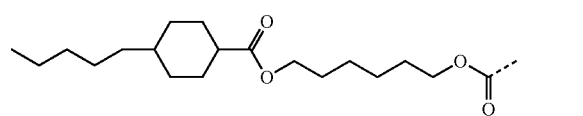
(VII-d-10)
(VII-d-11)
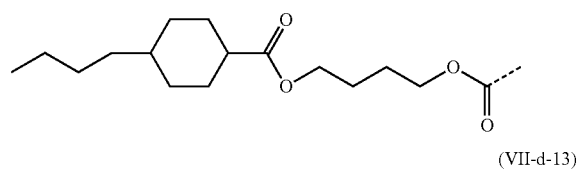
(VII-d-12)
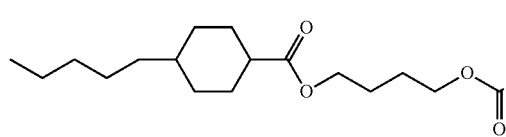
(VII-d-13)
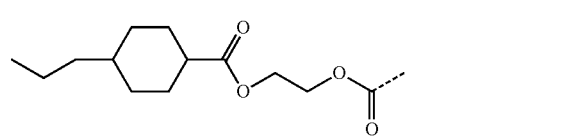
(VII-d-14)
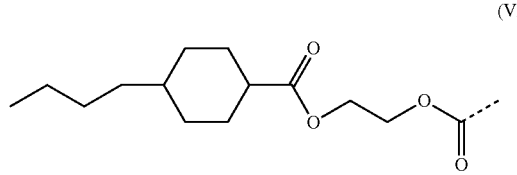
(VII-d-15)
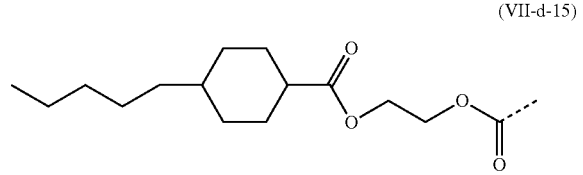
[Chem. 86]
(VII-e-1)
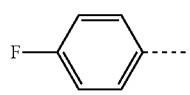
(VII-e-2)
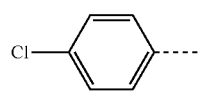
(VII-e-3)
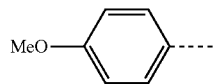
(VII-e-4)
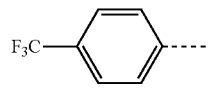
(VII-e-5)
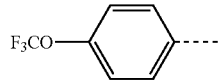
(VII-e-6)
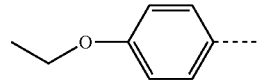
(VII-e-7)
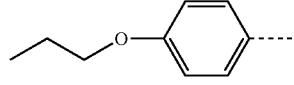
(VII-e-8)
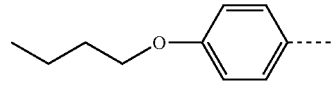

-continued
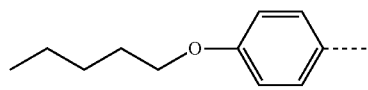
[Chem. 87]
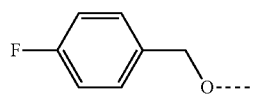 (VII-f-1)  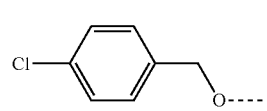 (VII-f-2)
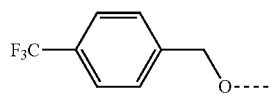 (VII-f-3)  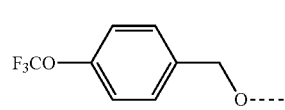 (VII-f-4)
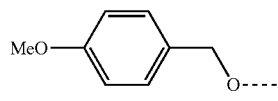 (VII-f-5)  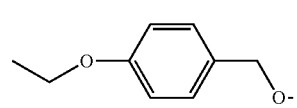 (VII-f-6)
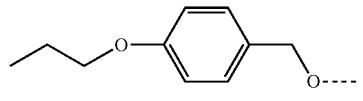 (VII-f-7)  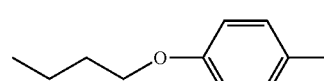 (VII-f-8)
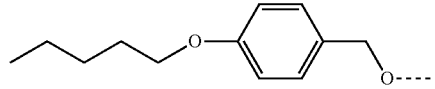 (VII-f-9)  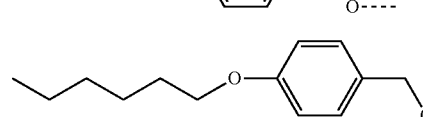 (VII-f-10)
[Chem. 88]
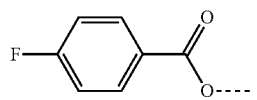 (VII-g-1)  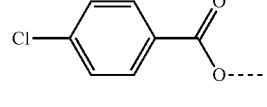 (VII-g-2)
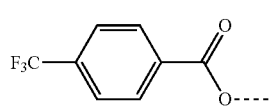 (VII-g-3)  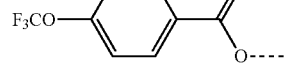 (VII-g-4)
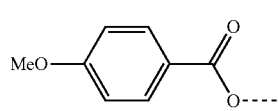 (VII-g-5)  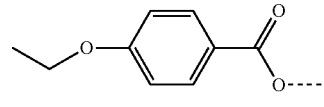 (VII-g-6)
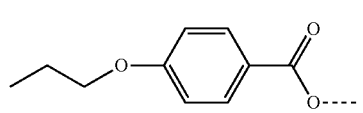 (VII-g-7)  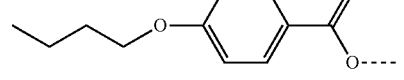 (VII-g-8)
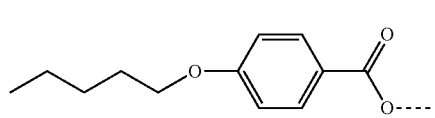 (VII-g-9)  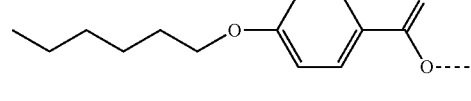 (VII-g-10)
[Chem. 89]
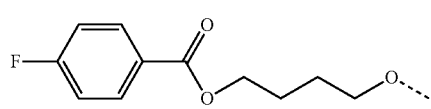 (VII-h-1)  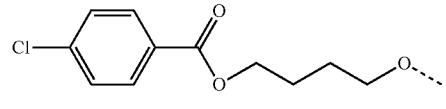 (VII-h-2)
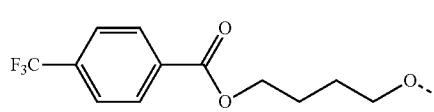 (VII-h-3)  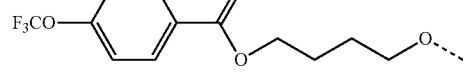 (VII-h-4)
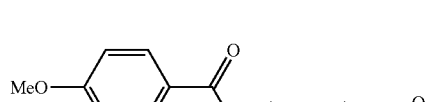 (VII-h-5)  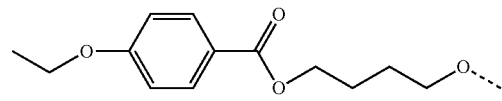 (VII-h-6)

-continued
(VII-h-7) 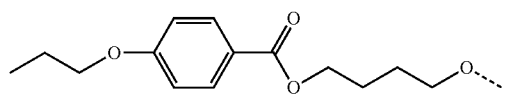
(VII-h-8) 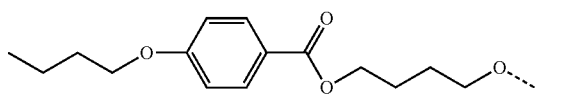
(VII-h-9) 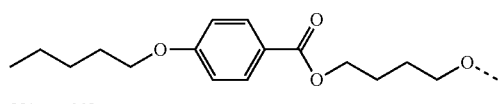
(VII-h-10) 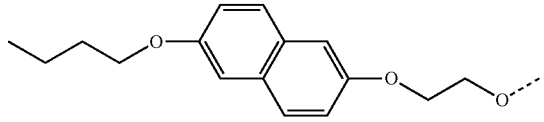
[Chem. 90]
(VII-i-1) 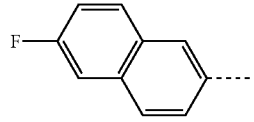
(VII-i-2) 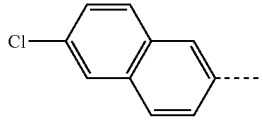
(VII-i-3) 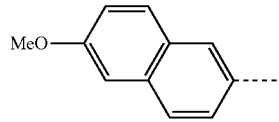
(VII-i-4) 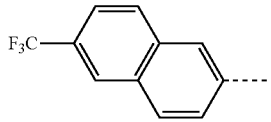
(VII-i-5) 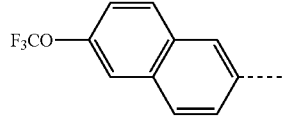
(VII-i-6) 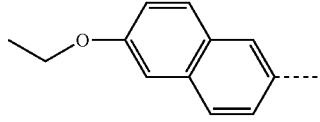
(VII-i-7) 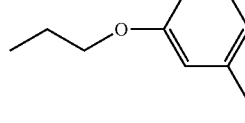
(VII-i-8) 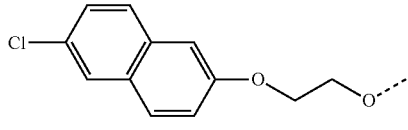
(VII-i-9) 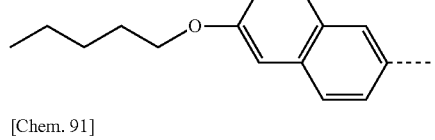
[Chem. 91]
(VII-j-1) 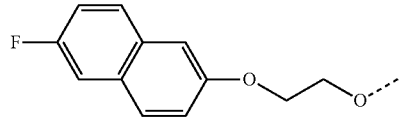
(VII-j-2) 
(VII-j-3) 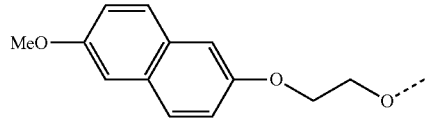
(VII-j-4) 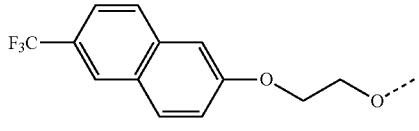
(VII-j-5) 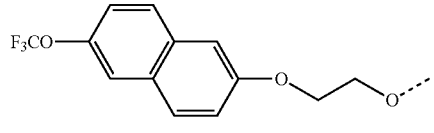
(VII-j-6) 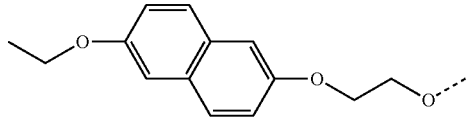
(VII-j-7) 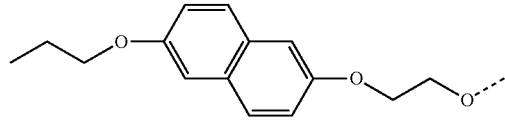
(VII-j-8)

[Chem. 92]
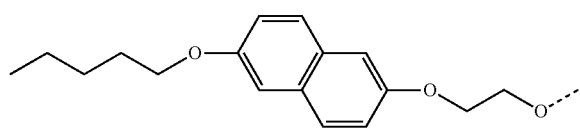
(VII-j-9)
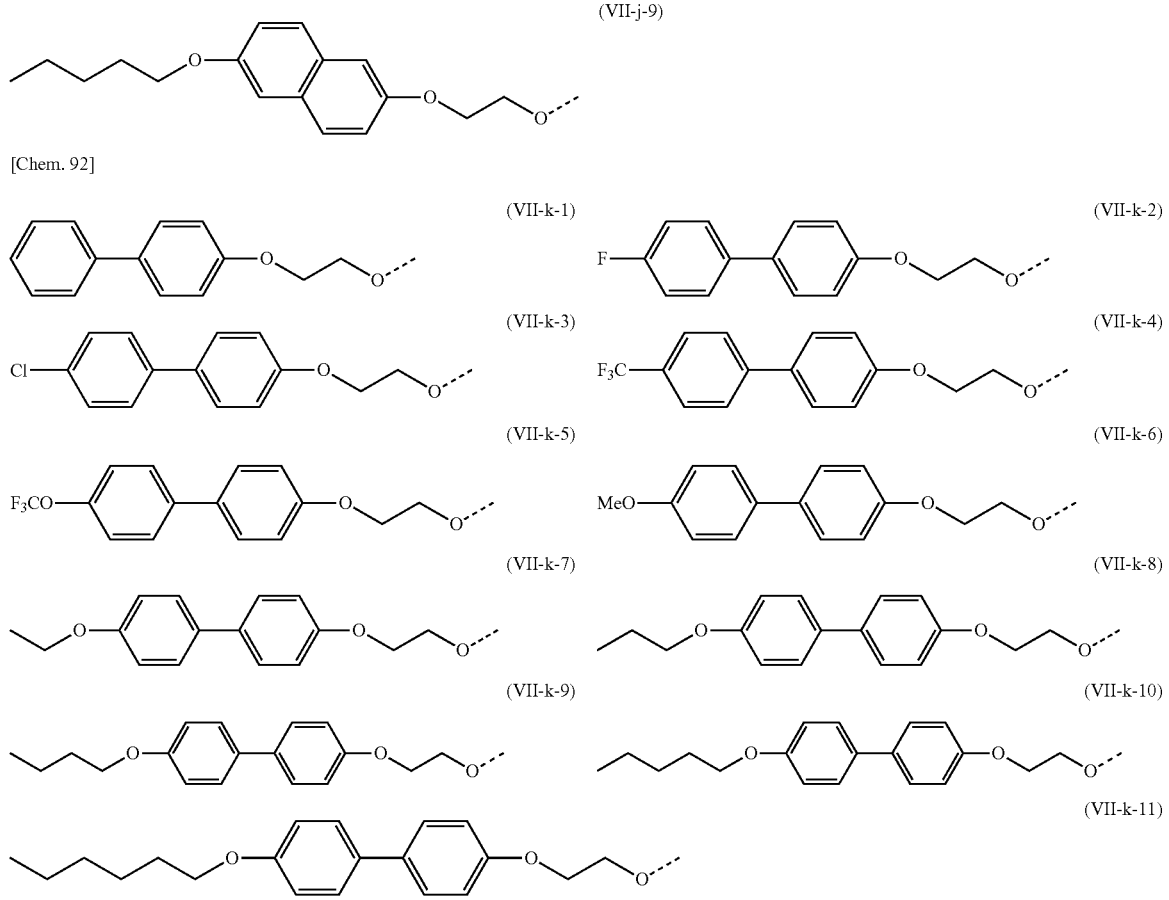
[Chem. 93]
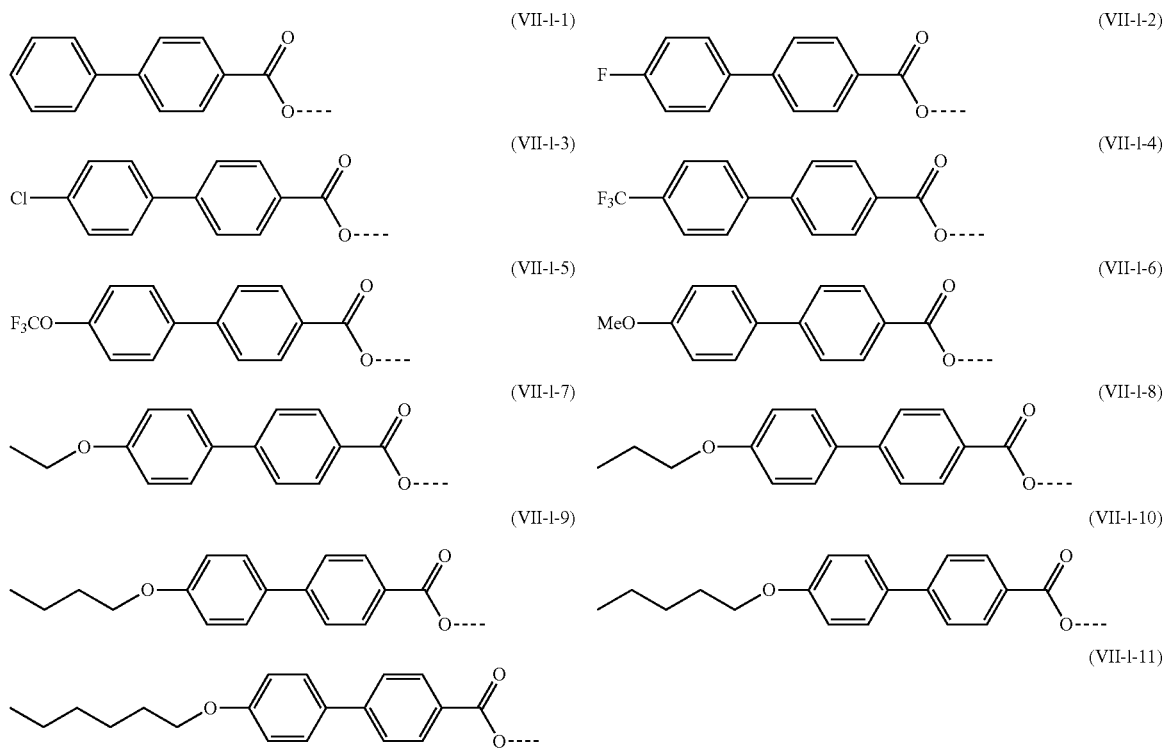

-continued
[Chem. 94]
(VII-m-1) 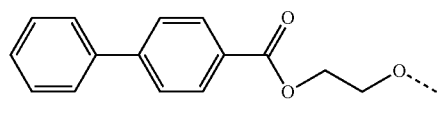
(VII-m-2) 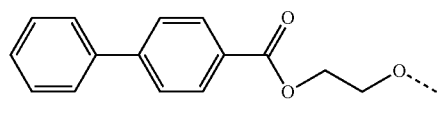
(VII-m-3) 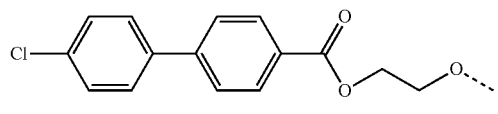
(VII-m-4) 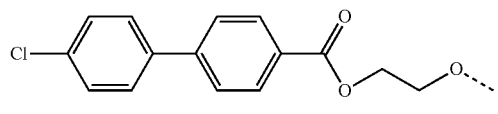
(VII-m-5) 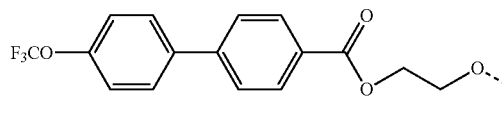
(VII-m-6) 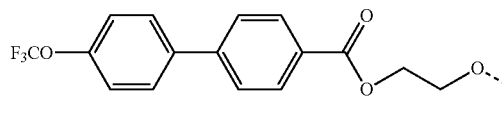
(VII-m-7) 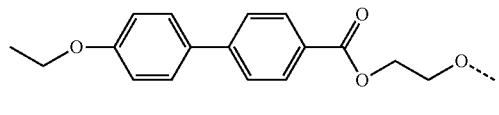
(VII-m-8) 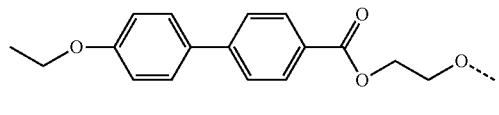
(VII-m-9) 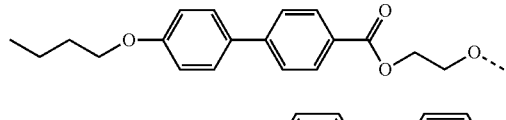
(VII-m-10) 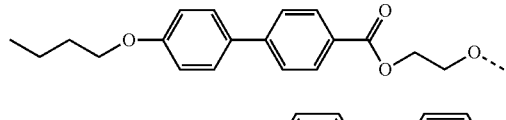
(VII-m-11) 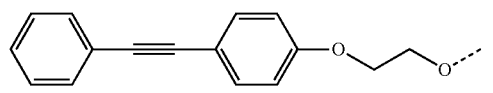
[Chem. 95]
(VII-n-1) 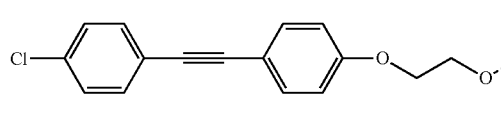
(VII-n-2) 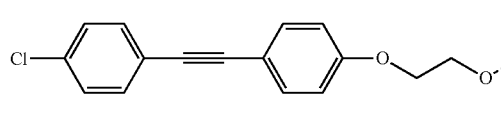
(VII-n-3) 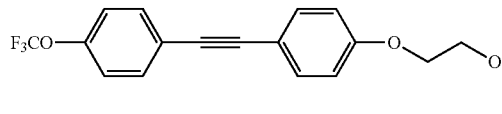
(VII-n-4) 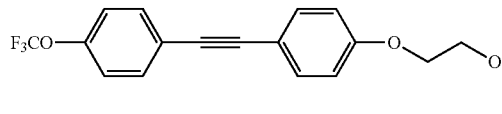
(VII-n-5) 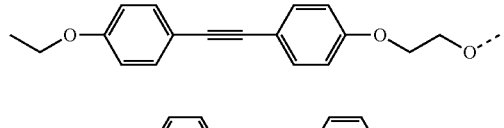
(VII-n-6) 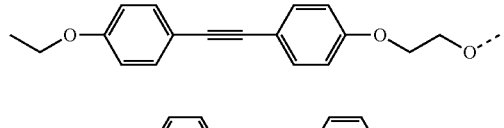
(VII-n-7) 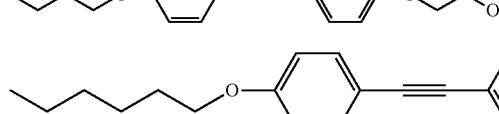
(VII-n-8) 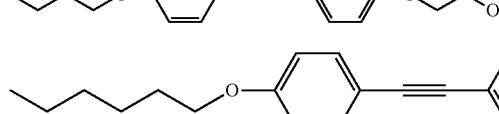
(VII-n-9) 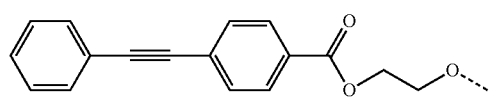
(VII-n-10) 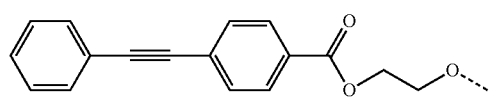
(VII-n-11)
[Chem. 96]
(VII-o-1)
(VII-o-2)

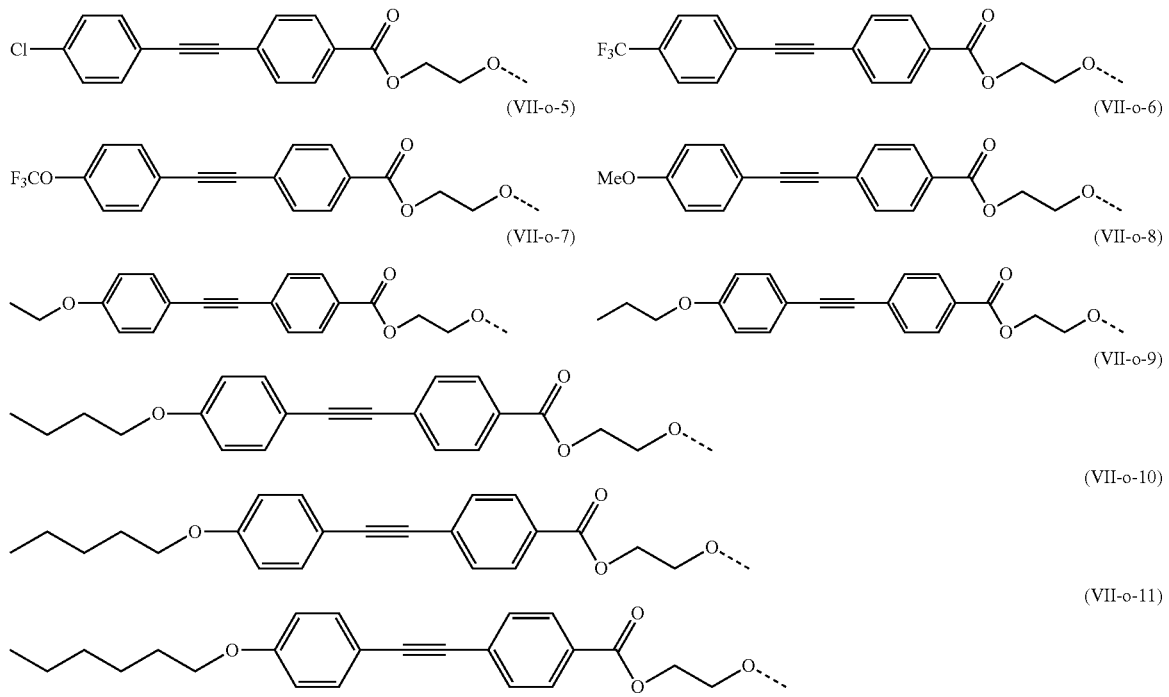
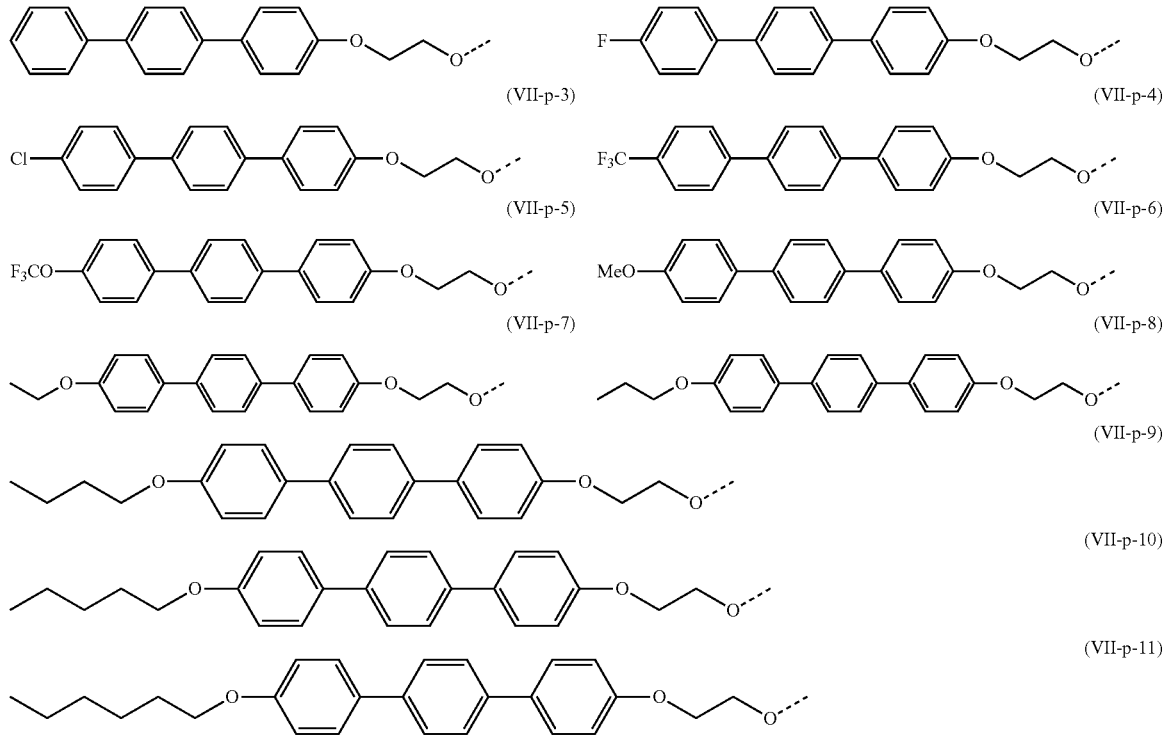

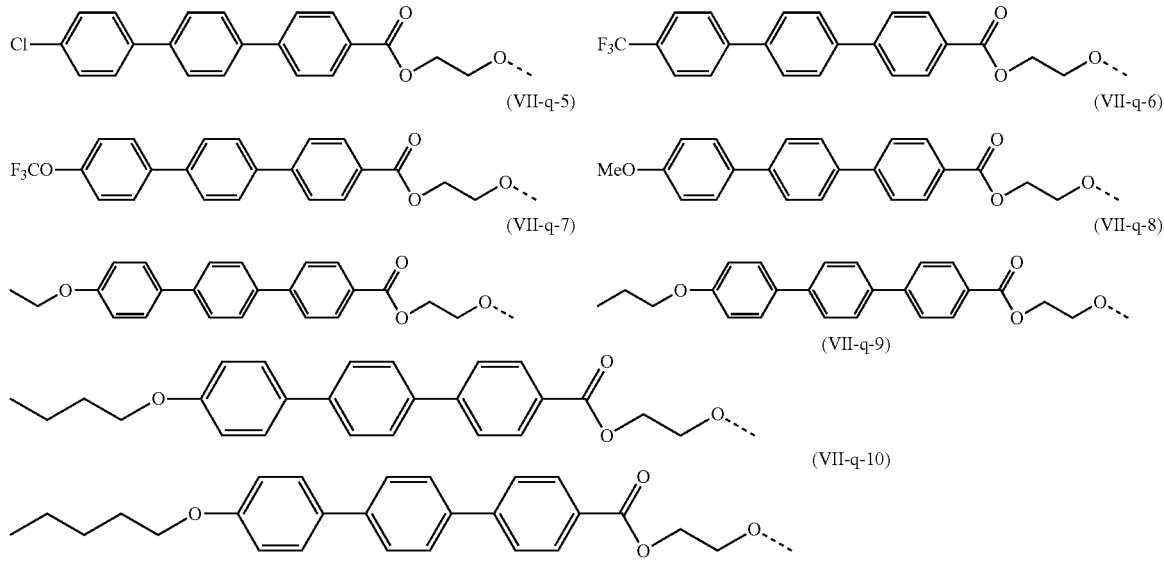

are particularly preferable.

Among these, the formulae (VII-a-1) to (VII-a-15), (VII-b-11) to (VII-b-15), (VII-c-1) to (VII-c-11), (VII-d-10) to (VII-d-15), (VII-f-1) to (VII-f-10), (VII-g-1) to (VII-g-10), (VII-h-1) to (VII-h-10), (VII-j-1) to (VII-j-9), (VII-l-1) to (VII-l-11) or (VII-m-1) to (VII-m-11) are more preferable.

In the general formula (Q) or (QP), P is represented by the following general formula (VIII):

[Chem. 99]

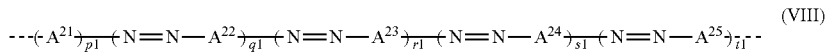
(VIII)

(in which broken line represents a bond to $S_a$ and $S_{aa}$; $A^{21}$, $A^{22}$, $A^{23}$, $A^{24}$ and $A^{25}$ each independently represent a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group, these are unsubstituted, or mono-substituted or poly-substituted with a fluorine atom, a chlorine atom, a bromine atom, a methyl group, a methoxy group, a nitro group, —$NR^{21}R^{22}$, or a linear or branched alkyl residue having 1 to 10 carbon atoms, and the alkyl residue is unsubstituted or mono-substituted or poly-substituted with fluorine, in which one or more of the non-adjacent CH$_2$ groups may be independently substituted with Q, and Q represents —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, or —O—CO—O—, R, $R^{21}$ and $R^{22}$ independently represent a hydrogen atom or an alkyl group having 1 to 5 carbon atoms; and p1, q1, r1, s1 and t1 each independently represent 0 or 1, provided that these satisfy 0<1 q1+r1+s1+t1).

Preferably, $A^{21}$, $A^{22}$, $A^{23}$, $A^{24}$ and $A^{25}$ each independently represent a 1,4-naphthylene group, a 2,6-naphthylene group, a pyridine-2,5-diyl group, pyrimidine-2,5-diyl group, or a 1,4-phenylene group, and these are unsubstituted or have one or more hydrogen atoms substituted with a fluorine atom, a chlorine atom, a methyl group, or a methoxy group. More preferably, $A^{21}$, $A^{22}$, $A^{23}$, $A^{24}$ and $A^{25}$ each independently represent a 2,6-naphthylene group, a pyridine-2,5-diyl group, a pyrimidine-2,5-diyl group, or a 1,4-phenylene group, and these are unsubstituted or have one or more hydrogen atoms substituted with a fluorine atom, a chlorine atom, a methyl group, or a methoxy group. q1+r1+s1+t1 is more preferably from 1 to 2. Particularly preferably, $A^{21}$, $A^{22}$, $A^{23}$, $A^{24}$ and $A^{25}$ each independently represent a 2,6-naphthylene group or a 1,4-phenylene group, and these are unsubstituted or have one or more hydrogen atoms substituted with a fluorine atom, a chlorine atom, a methyl group, or a methoxy group. p1 and q1+r1+s1+t1 are particularly preferably 1.

In order to improve the liquid crystal alignment property, $A^{21}$, $A^{22}$, $A^{23}$, $A^{24}$ and $A^{25}$ are each independently preferably a pyridine-2,5-diyl group, a pyrimidine-2,5-diyl group, or a 1,4-phenylene group. Further, in order to improve the solubility of the polymer, $A^{21}$, $A^{22}$, $A^{23}$, $A^{24}$ and $A^{25}$ are each independently preferably a 1,4-naphthylene group, a 2,6-naphthylene group, a 2,5-thiophenylene group, or a 2,5-furanylene group. Further, in order to reduce the light irradiation dose required for aligning the liquid crystals, $A^{21}$, $A^{22}$, $A^{23}$, $A^{24}$ and $A^{25}$ are preferably a pyridine-2,5-diyl group, a pyrimidine-2,5-diyl group, a 2,5-thiophenylene group, or a 1,4-phenylene group, and q1+r1+s1+t1 is preferably from 1 to 2. Further, in order to realize photo-alignment at a longer wavelength, $A^{21}$, $A^{22}$, $A^{23}$, $A^{24}$ and $A^{25}$ are preferably a pyrimidine-2,5-diyl group, a 2,5-thiophenylene group, a 2,6-naphthylene group, or a 2,5-furanylene group, and q1+r1+s1+t1 is preferably from 1 to 3.

Many compounds belong to the general formula (VIII), but specifically, the structures represented by the following formulae (P-a-1) to (P-e-7) are preferable.
[Chem. 100]
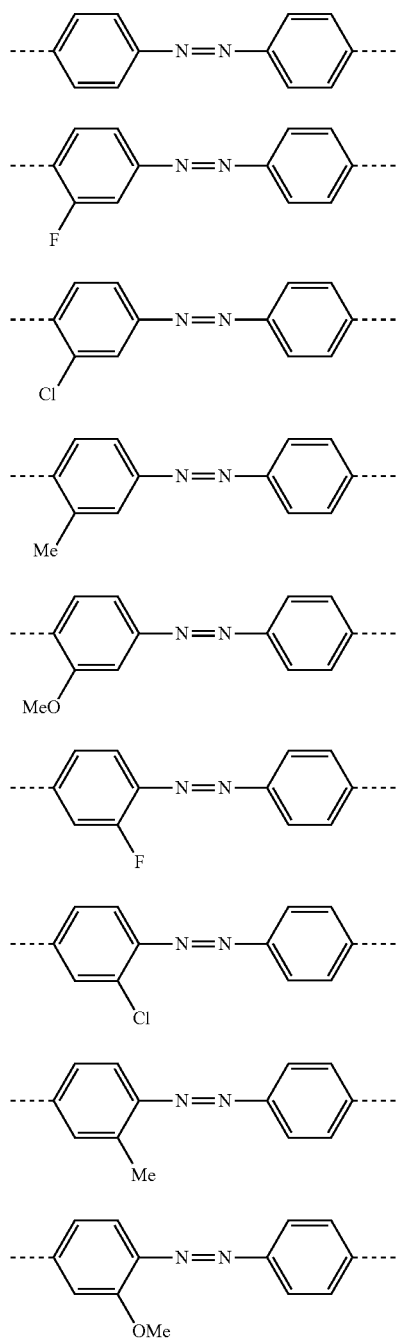
[Chem. 101]
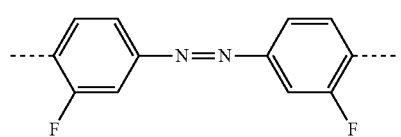
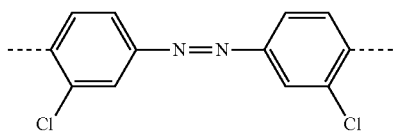
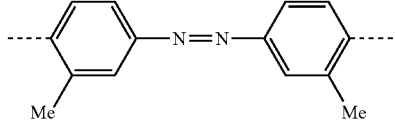
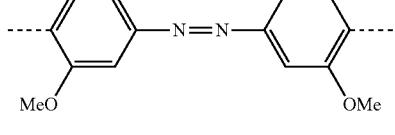
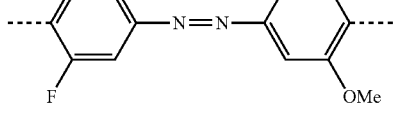
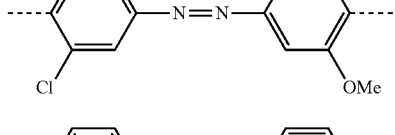
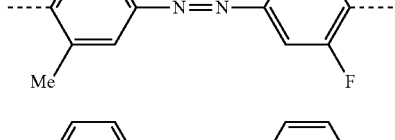
[Chem. 102]
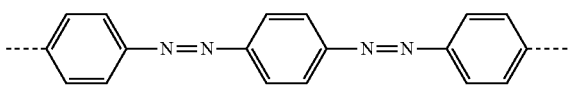
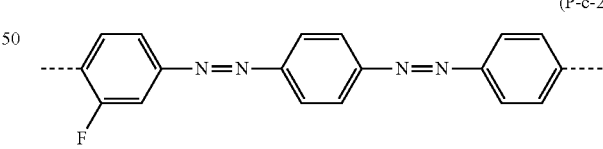
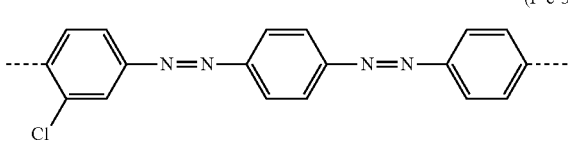
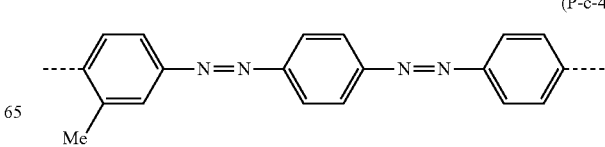

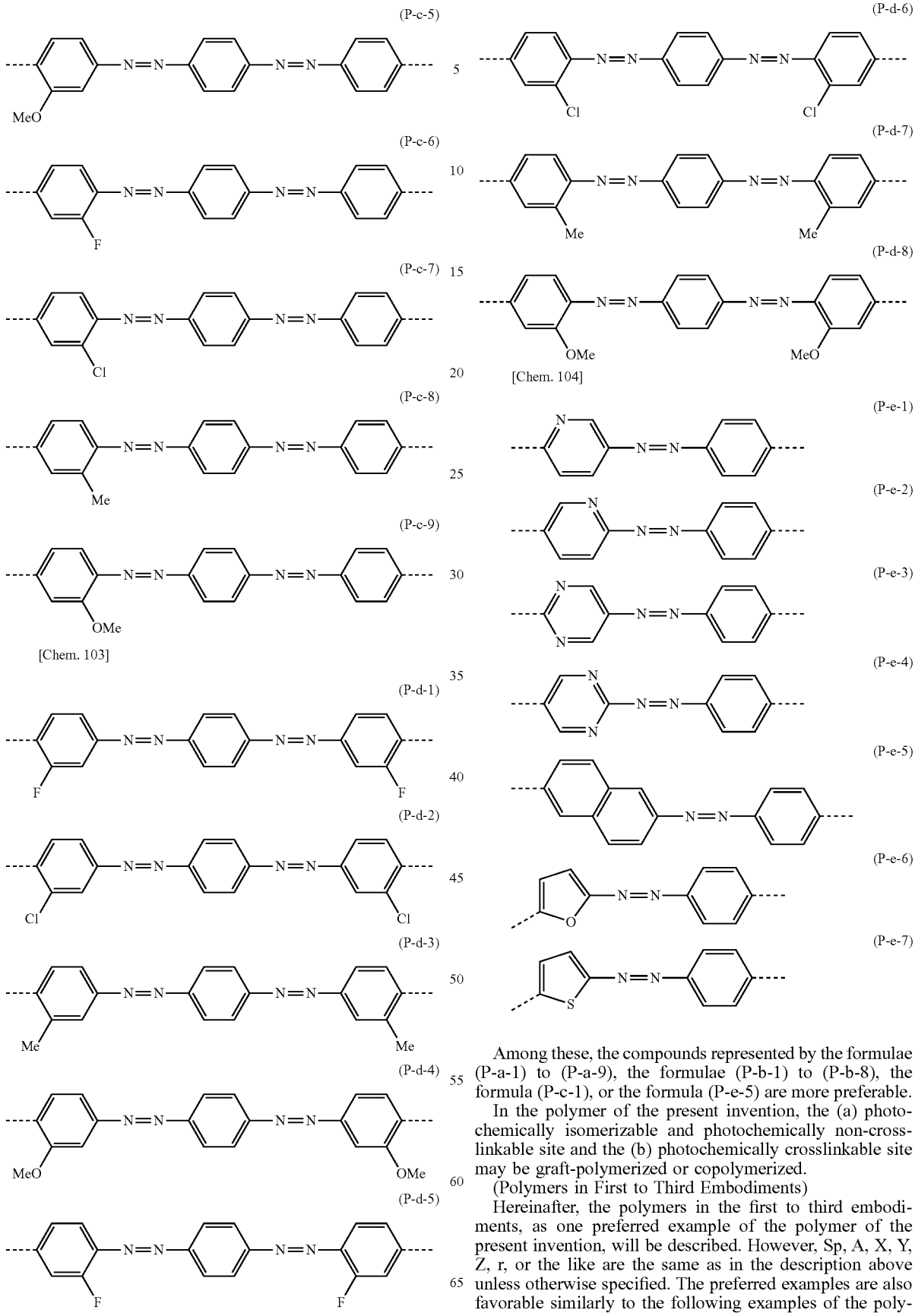

Among these, the compounds represented by the formulae (P-a-1) to (P-a-9), the formulae (P-b-1) to (P-b-8), the formula (P-c-1), or the formula (P-e-5) are more preferable.

In the polymer of the present invention, the (a) photochemically isomerizable and photochemically non-crosslinkable site and the (b) photochemically crosslinkable site may be graft-polymerized or copolymerized.

(Polymers in First to Third Embodiments)

Hereinafter, the polymers in the first to third embodiments, as one preferred example of the polymer of the present invention, will be described. However, Sp, A, X, Y, Z, r, or the like are the same as in the description above unless otherwise specified. The preferred examples are also favorable similarly to the following examples of the polymer.

(Polymer in First Embodiment)

The polymer in the first embodiment of the present invention is a polymer having (a) a photochemically isomerizable and photochemically non-crosslinkable site, and (b) a photochemically crosslinkable site, in which the polymer includes a structure represented by the general formula (I).

[Chem. 105]

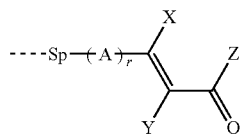

(I)

In the general formula (I), the broken line represents a bond to the main chain of the polymer, Sp represents a spacer unit, A's each independently represent a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group. These may be unsubstituted or have one or more hydrogen atoms substituted with a fluorine atom, a chlorine atom, a methyl group, or a methoxy group. r represents 0, 1, or 2. X and Y each independently represent a hydrogen atom, a fluorine atom, a chlorine atom, a cyano group, or an alkyl group having 1 to 20 carbon atoms, but a hydrogen atom in the alkyl group may be substituted with a fluorine atom, and one $CH_2$ group, or two or more non-adjacent $CH_2$ groups may be substituted with —O—, —CO—O—, —O—CO— and/or —CH=CH—. Z is represented by the general formula (IIa) or (IIb).

[Chem. 106]

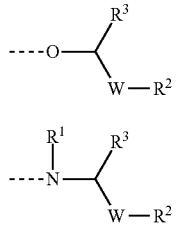

(IIa)

(IIb)

In the general formula (IIa) or (IIb), the broken line represents a bond to a carbon atom, to which Z is bonded. $R^1$ represents a hydrogen atom, a linear or branched alkyl group having 1 to 20 carbon atoms, or a cycloalkyl group of from 3- to 8-membered ring, but a hydrogen atom in the alkyl group may be unsubstituted or may be substituted with a fluorine atom or a chlorine atom, and a hydrogen atom in the cycloalkyl group may be unsubstituted or may be substituted with an alkyl group having 1 to 10 carbon atoms, an alkoxy group having 1 to 10 carbon atoms, a fluorine atom, or a chlorine atom. W represents a single bond, —$CH_2$—, =CH—, —CO—O— or —CO—NH—. $R^2$ represents an alkyl group having 1 to 20 carbon atoms, but one $CH_2$ group, or two or more non-adjacent $CH_2$ groups in the alkyl group are substituted with —CH=CH—, —CF=CF— and/or —C≡C—, and a hydrogen atom in the alkyl group may be substituted with a fluorine atom. $R^3$ represents a hydrogen atom or an alkyl group having 1 to 5 carbon atoms.

The alkyl group having 1 to 20 carbon atoms, represented by $R^2$, is preferably a linear or branched alkyl group or a cycloalkyl group of from 3- to 8-membered ring.

In the present specification and claims, "two or more non-adjacent $CH_2$ groups" mean "two or more $CH_2$ groups that are not adjacent to each other".

In the general formula (I), (IIa), or (IIb), in order to improve the liquid crystal alignment property of the liquid crystal alignment layer of the present invention, A is preferably a pyridine-2,5-diyl group, a pyrimidine-2,5-diyl group, or a 1,4-phenylene group.

Furthermore, in order to improve the solubility of the polymer in the first embodiment of the present invention, A is preferably a 1,4-naphthylene group, a 2,6-naphthylene group, a 2,5-thiophenylene group, or a 2,5-furanylene group.

Furthermore, in order to reduce the light irradiation dose required for aligning the liquid crystals in the liquid crystal alignment layer of the present invention, A is preferably a pyridine-2,5-diyl group, a pyrimidine-2,5-diyl group, a 2,5-thiophenylene group, or a 1,4-phenylene group.

Furthermore, in order to realize photo-alignment at a longer wavelength in the liquid crystal alignment layer of the present invention, A is preferably a pyrimidine-2,5-diyl group, a 2,5-thiophenylene group, a 2,6-naphthylene group, or a 2,5-furanylene group, and, X and Y are each preferably a fluorine atom, a chlorine atom, or a cyano group.

Incidentally, in order to improve the voltage holding ratio in the liquid crystal alignment layer of the present invention, X and Y are each preferably a hydrogen atom, W is preferably a single bond or —$CH_2$—, and $R^2$ is preferably an alkyl group having 1 to 12 carbon atoms, in which one $CH_2$ group is substituted with —CH=CH— or —C≡C—.

In addition, in order to reduce the residual charges in the liquid crystal alignment layer of the present invention, W is preferably —CO—O— or —CO—NH—, and $R^2$ is preferably an alkyl group having 1 to 6 carbon atoms, in which one $CH_2$ group is substituted with —CH=CH— or —C≡C—.

In the polymer represented by the general formula (I) in the first embodiment of the present invention, X and Y are each preferably a hydrogen atom. Thus, the voltage holding ratio in the liquid crystal alignment layer of the present invention using the polymer can be improved.

In the polymer represented by the general formula (I) in the first embodiment of the present invention, A is preferably a 1,4-phenylene group which may have one or more hydrogen atoms substituted with a fluorine atom, a chlorine atom, a methyl group, or a methoxy group.

By using the compound, a liquid crystal alignment layer which has good coatability, a superior ability to control the alignment of the liquid crystals and the pretilt angles, and a high voltage holding ratio (VHR), and a display element using the composition can be obtained.

A preferable polymer in the first embodiment of the present invention is a polymer having Sp represented by the general formula (IVa), in which in the general formula (IVa), $A^2$ represents any group of a trans-1,4-cyclohexylene group, a 2,6-naphthylene group, a pyridine-2,5-diyl group, a pyrimidine-2,5-diyl group, or a 1,4-phenylene group, one or more hydrogen atoms in any group of these groups may be substituted with a fluorine atom, a chlorine atom, a methyl group, or a methoxy group, $Z^3$ represents a single bond or any group of —$(CH_2)_u$— (in which u represents 1 to 20), —$OCH_2$—, —$CH_2O$—, —COO—, —OCO—, —CH=CH—, or —C≡C—, one or more of the non-adjacent $CH_2$ groups in any one of these groups may be independently substituted with —O—, —CO—, —CO—O—, —O—CO—, —CH═CH—, or —C≡C—, and q represents 1.

By using the polymer, a liquid crystal alignment layer having a superior ability to control the alignment of the liquid crystals and the pretilt angles, and a high voltage holding ratio (VHR), and a liquid crystal display element using the liquid crystal alignment layer can be obtained.

A preferable polymer in the first embodiment of the present invention is a polymer having Sp represented by the general formula (IVa), in which in the general formula (IVa), $A^2$ represents a 1,4-phenylene group having one or more hydrogen atoms which may be substituted with a fluorine atom, a chlorine atom, a methyl group, or a methoxy group.

By using the polymer, a liquid crystal alignment layer having the effects of exhibiting a superior ability to control the alignment of the liquid crystals and the pretilt angles, and a high voltage holding ratio (VHR), and a liquid crystal display element using the liquid crystal alignment layer can be obtained.

(Polymer in Second Embodiment)

The polymer in the second embodiment of the present invention is a polymer having (a) a photochemically isomerizable and photochemically non-crosslinkable site, and (b) a photochemically crosslinkable site, in which the polymer includes a structure represented by the general formula (I).

[Chem. 107]

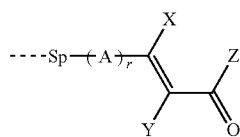

(I)

In the general formula (I), the broken line represents a bond to the main chain of the polymer, Sp represents a spacer unit, and A's each independently represent a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group, and these may be unsubstituted or may have one or more hydrogen atoms substituted with a fluorine atom, a chlorine atom, a methyl group, or a methoxy group. X and Y each independently represent a hydrogen atom, a fluorine atom, a chlorine atom, a cyano group, or an alkyl group having 1 to 20 carbon atoms, in which a hydrogen atom in the alkyl group may be substituted with a fluorine atom, and one $CH_2$ group or two or more non-adjacent $CH_2$ groups in the alkyl group may be substituted with —O—, —CO—O—, —O—CO— and/or —CH═CH—, Z is represented by the general formula (IIa) or (IIb), and r represents 1 or 2.

[Chem. 108]

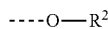
(IIa)

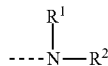
(IIb)

In the general formulae (IIa) and (IIb), the broken line represents a bond to a carbon atom, to which Z is bonded.

$R^1$ represents a hydrogen atom, a linear or branched alkyl group having 1 to 20 carbon atoms, or a cycloalkyl group of from 3- to 8-membered ring, which may have the alkyl group interposed therein as a linking group, in which a hydrogen atom in the alkyl group may be unsubstituted or may be substituted with a fluorine atom, or a chlorine atom, and a hydrogen atom in the cycloalkyl group may be unsubstituted or may be substituted with an alkyl group having 1 to 10 carbon atoms, an alkoxy group having 1 to 10 carbon atoms, a fluorine atom, or a chlorine atom.

$R^2$ represents a linear or branched alkyl group having 1 to 20 carbon atoms, or a cycloalkyl group of from 3- to 8-membered ring, which may have the alkyl group interposed therein as a linking group, in which a hydrogen atom in the alkyl group may be unsubstituted or may be substituted with a fluorine atom or a chlorine atom, in which a hydrogen atom in the cycloalkyl group may be unsubstituted or may be substituted with an alkyl group having 1 to 10 carbon atoms, an alkoxy group having 1 to 10 carbon atoms, a fluorine atom, or a chlorine atom.

The alkyl group having 1 to 20 carbon atoms, represented by $R^1$, is preferably a linear or branched alkyl group or a cycloalkyl group of from 3- to 8-membered ring, which may have the alkyl group interposed therein as a linking group.

The alkyl group having 1 to 20 carbon atoms, represented by $R^2$, is preferably a linear or branched alkyl group or a cycloalkyl group of from 3- to 8-membered ring, which may have the alkyl group interposed therein as a linking group.

In the present specification and claims, "two or more non-adjacent $CH_2$ groups" mean "two or more $CH_2$ groups that are not adjacent to each other".

In the general formula (I), (IIa), or (IIb), in order to improve the liquid crystal alignment properties of the liquid crystal alignment layer of the present invention, A is preferably a pyridine-2,5-diyl group, a pyrimidine-2,5-diyl group, or a 1,4-phenylene group.

Further, in order to improve the solubility of the polymer in the second embodiment of the present invention, A is preferably a 1,4-naphthylene group, a 2,6-naphthylene group, a 2,5-thiophenylene group, or a 2,5-furanylene group.

Further, in order to reduce the light irradiation dose required for aligning the liquid crystals in the liquid crystal alignment layer of the present invention, A is preferably a pyridine-2,5-diyl group, a pyrimidine-2,5-diyl group, a 2,5-thiophenylene group, or a 1,4-phenylene group.

Further, in order to realize photo-alignment at a longer wavelength in the liquid crystal alignment layer of the present invention, A is preferably a pyrimidine-2,5-diyl group, a 2,5-thiophenylene group, a 2,6-naphthylene group, or a 2,5-furanylene group, and X and Y are each preferably a fluorine atom, a chlorine atom, or a cyano group.

Further, in order to improve the voltage holding ratio in the liquid crystal alignment layer of the present invention, X and Y are each preferably a hydrogen atom, and $R^2$ is preferably a linear or cyclic alkyl group having 1 to 12 carbon atoms.

In addition, in order to reduce the residual charges in the liquid crystal alignment layer of the present invention, $R^2$ is preferably a linear or cyclic alkyl group having 1 to 6 carbon atoms.

In the polymer represented by the general formula (I) in the second embodiment of the present invention, X and Y are each preferably a hydrogen atom. The voltage holding ratio in the liquid crystal alignment layer of the present invention using the polymer can be improved.

In the polymer represented by the general formula (I) in the second embodiment of the present invention, A is preferably a 1,4-phenylene group having one or more hydrogen atoms which may be substituted with a fluorine atom, a chlorine atom, a methyl group, or a methoxy group.

By using the compound, a liquid crystal alignment layer which has good coatability, a superior ability to control the alignment of the liquid crystals and the pretilt angles, and a high voltage holding ratio (VHR), and a display element using the composition can be obtained.

In the general formula (I), Sp is preferably a structure represented by the general formula (IVa).

In the general formula (IVa), $A^1$ is preferably any group of a 1,4-naphthylene group, a 2,6-naphthylene group, or a 2,5-thiophenylene group. $A^2$ is preferably any group of a trans-1,4-cyclohexylene group, a trans-1,3-dioxane-2,5-diyl group, a 1,4-naphthylene group, a 2,6-naphthylene group, a pyridine-2,5-diyl group, a pyrimidine-2,5-diyl group, or a 1,4-phenylene group. A hydrogen atom of these groups may be unsubstituted or one or more hydrogen atoms of these groups may be substituted with a fluorine atom, a chlorine atom, a methyl group, or a methoxy group.

In the general formula (IVa), $A^1$ is more preferably any group of a 1,4-naphthylene group or a 2,6-naphthylene group, and $A^2$ is more preferably any group of a trans-1,4-cyclohexylene group, a 2,6-naphthylene group, a pyridine-2,5-diyl group, a pyrimidine-2,5-diyl group, or a 1,4-phenylene group. A hydrogen atom of these groups may be unsubstituted or one or more hydrogen atoms of these groups may be substituted with a fluorine atom, a chlorine atom, a methyl group, or a methoxy group.

In the general formula (IVa), $A^1$ is particularly preferably a 2,6-naphthylene group, and $A^2$ is particularly preferably any group of a trans-1,4-cyclohexylene group, a 2,6-naphthylene group, or a 1,4-phenylene group. A hydrogen atom of these groups may be unsubstituted or one or more hydrogen atoms of these groups may be substituted with a fluorine atom, a methyl group, or a methoxy group.

As it is possible to provide an alignment property efficiently at a low dose of irradiation of polarized light during the production of the liquid crystal alignment layer of the present invention, in the general formula (IVa), $A^1$ is preferably a 1,4-naphthylene group or a 2,6-naphthylene group, more preferably a 1,4-naphthylene group or 2,6-naphthylene group, and still more preferably a 2,6-naphthylene group.

As it is possible to provide an alignment property efficiently at a low dose of irradiation of polarized light during the production of the liquid crystal alignment layer of the present invention, in the general formula (IVa), $A^2$ is preferably a 1,4-naphthylene group, a 2,6-naphthylene group, or a 1,4-phenylene group, more preferably a 2,6-naphthylene group or a 1,4-phenylene group, and still more preferably a 1,4-phenylene group. If a hydrogen atom in the 1,4-phenylene group is unsubstituted or one or more hydrogen atoms in the 1,4-phenylene group are substituted with a fluorine atom, a methyl group, or a methoxy group, an alignment property can be provided efficiently at a low dose of irradiation of polarized light in some cases, which is thus preferred.

In order to improve the liquid crystal alignment property in the liquid crystal alignment layer of the present invention, in the general formula (IVa), $Z^1$, $Z^2$ and $Z^3$ are each independently preferably a single bond, —(CH$_2$)$_u$— (in which u represents 1 to 8, and one or two of the non-adjacent CH$_2$ groups may be independently substituted with —O—, —CO—O—, —O—CO—, —Si(CH$_3$)$_2$—O—Si(CH$_3$)$_2$—, —CH=CH—, or —C≡C—), —COO—, —OCO—, —CH=CH—, —CF=CF—, or —C≡C—. $A^1$ is preferably any group of a 1,4-naphthylene group or a 2,6-naphthylene group, and $A^2$ is preferably a trans-1,4-cyclohexylene group, a trans-1,3-dioxane-2,5-diyl group, a pyridine-2,5-diyl group, a pyrimidine-2,5-diyl group, a 2,5-thiophenylene group, or a 1,4-phenylene group.

Moreover, in order to improve the thermal stability of the alignment in the liquid crystal alignment layer of the present invention, in the general formula (IVa), $Z^1$, $Z^2$ and $Z^3$ are each independently preferably —NR—CO—, —CO—NR—, —NR—CO—O—, —O—CO—NR—, —NR—CO—NR—, or —O—CO—O—, $A^1$ is preferably a 2,6-naphthylene group, and $A^2$ is preferably a 1,4-naphthylene group, a 2,6-naphthylene group, a pyridine-2,5-diyl group, a pyrimidine-2,5-diyl group, a 2,5-thiophenylene group, a 2,5-furanylene group, or a 1,4-phenylene group.

Furthermore, in order to improve the solubility of the polymer in the second embodiment of the present invention, $Z^1$, $Z^2$ and $Z^3$ are each independently preferably —OCH$_2$—, —CH$_2$O—, —CF$_2$O—, —OCF$_2$—, —CF$_2$CF$_2$—, —NR—, or —CO—. $A^1$ is preferably a 2,6-naphthylene group, and $A^2$ is preferably a trans-1,4-cyclohexylene group, a 1,4-naphthylene group, a 2,6-naphthylene group, or a 2,5-furanylene group.

As Sp represented by the general formula (IVa), for example, one represented by the chemical formulae (Sp-a-1) to (Sp-ah-8) in the first embodiment is also preferable in the second embodiment. In addition, those represented by the chemical formulae (Sp-ae-1) to (Sp-ah-8) shown below are also preferable.

Among these, those represented by the chemical formulae (Sp-a-6) to (Sp-a-16), the chemical formulae (Sp-b-3) to (Sp-b-10), the chemical formulae (Sp-c-3) to (Sp-c-10), the chemical formulae (Sp-d-3) to (Sp-d-12), the chemical formulae (Sp-k-4) to (Sp-k-7), the chemical formulae (Sp-1-13) to (Sp-1-17), the chemical formulae (Sp-o-3) to (Sp-o-14), the chemical formulae (Sp-p-2) to (Sp-p-13), the chemical formulae (Sp-s-1) to (Sp-s-8), the chemical formulae (Sp-t-1) to (Sp-t-8), the chemical formulae (Sp-y-1) to (Sp-y-9), the chemical formulae (Sp-aa-1) to (Sp-aa-9), the chemical formulae (Sp-ae-1) to (Sp-ae-9), the chemical formulae (Sp-af-1) to (Sp-af-8), the chemical formulae (Sp-ag-1) to (Sp-ag-9), and the chemical formulae (Sp-ah-1) to (Sp-ah-8) are more preferable.

A preferable compound of the present invention is a compound having Sp represented by the general formula (IVa), in which in the general formula (IVa), $A^1$ represents any group of a 1,4-naphthylene group, a 2,6-naphthylene group, a pyridine-2,5-diyl group, a pyrimidine-2,5-diyl group, or a 1,4-phenylene group, one or more hydrogen atoms in any group of these groups may be substituted with a fluorine atom, a chlorine atom, a methyl group, or a methoxy group, $Z^2$ represents a single bond or any group of —(CH$_2$)$_u$— (in which u represents 1 to 20), —OCH$_2$—, —CH$_2$O—, —COO—, —OCO—, —CH=CH—, or —C≡C—, one or more of the non-adjacent CH$_2$ groups in any group of these groups may be independently substituted with —O—, —CO—, —CO—O—, —O—CO—, —CH=CH—, or —C≡C—, and p represents 1.

By using the compound, a liquid crystal alignment layer which is efficiently provided with an alignment property at a low dose of irradiation of polarized light during the production of the liquid crystal alignment layer, a superior ability to control the alignment of the liquid crystals and the pretilt angles, and a high voltage holding ratio (VHR), and a display element using the composition can be obtained.

A more preferable compound of the present invention is a compound having Sp represented by the general formula (IVa), in which in the general formula (IVa), $A^1$ represents a 1,4-naphthylene group or a 2,6-naphthylene group, having one or more hydrogen atoms which may be substituted with a fluorine atom, a chlorine atom, a methyl group, or a methoxy group.

By using the compound, an alignment property can be efficiently provided at a low dose of irradiation of polarized light during the production of the liquid crystal alignment layer, and thus, a liquid crystal alignment layer which has a superior ability to control the alignment of the liquid crystals and the pretilt angles, and a high voltage holding ratio (VHR), and a display element using the composition can be obtained.

A preferable polymer in the second embodiment of the present invention is a polymer having Sp represented by the general formula (IVa), in which in the general formula (IVa), $A^2$ represents any group of a trans-1,4-cyclohexylene group, a 2,6-naphthylene group, a pyridine-2,5-diyl group, a pyrimidine-2,5-diyl group, or a 1,4-phenylene group, one or more hydrogen atoms in any group of these groups may be substituted with a fluorine atom, a chlorine atom, a methyl group, or a methoxy group, $Z^3$ represents a single bond or any group of —$(CH_2)_u$— (in which u represents 1 to 20), —$OCH_2$—, —$CH_2O$—, —COO—, —OCO—, —CH=CH—, or —C≡C—, one or more of the non-adjacent $CH_2$ groups in any group of these groups may be independently substituted with —O—, —CO—, —CO—O—, —O—CO—, —CH=CH—, or —C≡C—, and q represents 1.

By using the polymer, a liquid crystal alignment layer which has a superior ability to control the alignment of the liquid crystals and the pretilt angles, and a high voltage holding ratio (VHR), and a liquid crystal display element using the liquid crystal alignment layer can be obtained.

A more preferable polymer in the second embodiment of the present invention is a polymer having Sp represented by the general formula (IVa), in which in the general formula (IVa), $A^2$ represents a 1,4-phenylene group having one or more hydrogen atoms which may be substituted with a fluorine atom, a chlorine atom, a methyl group, or a methoxy group.

By using the polymer, a liquid crystal alignment layer having the effects of exhibiting a superior ability to control the alignment of the liquid crystals and the pretilt angles, and a high voltage holding ratio (VHR), and a liquid crystal display element using the liquid crystal alignment layer can be obtained.

(Polymer in Third Embodiment)

The polymer in the third embodiment of the present invention is a polymer having (a) a photochemically isomerizable and photochemically non-crosslinkable site, and (b) a photochemically crosslinkable site, in which the polymer includes a structure represented by the general formula (I).

[Chem. 109]

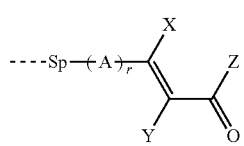

(I)

In the general formula (I), the broken line represents a bond to the main chain of the polymer, Sp represents a spacer unit, and A's each independently represent a 1,4-naphthylene group, a 2,6-naphthylene group, a pyridine-2, 5-diyl group, a pyrimidine-2,5-diyl group, a 2,5-thiophenylene group, a 2,5-furanylene group, or a 1,4-phenylene group. These may be unsubstituted or have one or more hydrogen atoms substituted with a fluorine atom, a chlorine atom, a methyl group, or a methoxy group. X and Y each independently represent a hydrogen atom, a fluorine atom, a chlorine atom, a cyano group, or an alkyl group having 1 to 20 carbon atoms, but a hydrogen atom in the alkyl group may be substituted with a fluorine atom, and one $CH_2$ group or two or more non-adjacent $CH_2$ groups may be substituted with —O—, —CO—O—, —O—CO— and/or —CH=CH—, and Z is represented by the general formula (IIa) or (IIb).

[Chem. 110]

(IIa)

(IIb)

In the general formula (IIa) or (IIb), the broken line represents a bond to a carbon atom, to which Z is bonded, and $R^1$ represents a hydrogen atom, a linear or branched alkyl group having 1 to 20 carbon atoms, or a cycloalkyl group of from 3- to 8-membered ring, but a hydrogen atom in the alkyl group may be unsubstituted or may be substituted with a fluorine atom or a chlorine atom, and a hydrogen atom in the cycloalkyl group may be unsubstituted or may be substituted with an alkyl group having 1 to 10 carbon atoms, an alkoxy group having 1 to 10 carbon atoms, a fluorine atom, or a chlorine atom. W represents $CH_2$—, —CO—O—, or —CO—NH. $R^2$ represents an alkyl group having 1 to 20 carbon atoms, but a hydrogen atom in the alkyl group may be substituted with a fluorine atom, and one $CH_2$ group or two or more non-adjacent $CH_2$ groups in the alkyl group are substituted with —O—, —CO—O—, —O—CO—, —CO—NH—, —NH—CO— and/or —$NCH_3$—.

The alkyl group having 1 to 20 carbon atoms, represented by $R^2$, is preferably a linear or branched alkyl group or a cycloalkyl group of from 3- to 8-membered ring.

A preferable polymer in the third embodiment of the present invention is a polymer having Sp represented by the general formula (IVa), in which in the general formula (IVa), $A^2$ represents any group of a trans-1,4-cyclohexylene group, a 2,6-naphthylene group, a pyridine-2,5-diyl group, a pyrimidine-2,5-diyl group, or a 1,4-phenylene group, and one or more hydrogen atoms in any group of these groups may be substituted with a fluorine atom, a chlorine atom, a methyl group, or a methoxy group, $Z^3$ represents a single bond or any group of —$(CH_2)_u$— (in which u represents 1 to 20), —$OCH_2$—, —$CH_2O$—, —COO—, —OCO—, —CH=CH—, or —C≡C—, one or more of the non-adjacent $CH_2$ groups in any group of these groups may be independently substituted with —O—, —CO—, —CO—O—, —O—CO—, —CH=CH—, or —C≡C—, and q represents 1.

By using the polymer, a liquid crystal alignment layer having a superior ability to control the alignment of the liquid crystals and the pretilt angles, and a high voltage holding ratio (VHR), and a liquid crystal display element using the liquid crystal alignment layer can be obtained.

A preferable polymer in the third embodiment of the present invention is a polymer having Sp represented by the general formula (IVa), in which in the general formula (IVa), $A^2$ represents a 1,4-phenylene group having one or more hydrogen atoms which may be substituted with a fluorine atom, a chlorine atom, a methyl group, or a methoxy group.

By using the polymer, a liquid crystal alignment layer having the effects of exhibiting a superior ability to control the alignment of the liquid crystals and the pretilt angles, and a high voltage holding ratio (VHR), and a liquid crystal display element using the liquid crystal alignment layer can be obtained.

[Preparation of Polymer of the Present Invention]

The preparation of the polymer of the present invention will be described below.

The mixing ratio of (a) a composition including a compound constituting the photochemically isomerizable and photochemically non-crosslinkable site (hereinafter referred to as a "monomer composition (a)") to (b) a composition including a compound constituting the photochemically crosslinkable site (hereinafter referred to as a "monomer composition (b)") in the polymer of the present invention is preferably 0.1 to 30-fold moles of the photochemically isomerizable sites in the polymer, with respect to 100-fold moles of the photochemically crosslinkable sites in the polymer, and more preferably 2 to 10-fold moles of the photochemically isomerizable sites in the polymer, with respect to 100-fold moles of the photochemically crosslinkable sites in the polymer.

Furthermore, these compounds are preferably compounds having liquid crystal properties.

When the polymer of the present invention is prepared, a polymerization initiator may be optionally used, corresponding to the polymerization modes of a polymerization functional group, and examples of the polymerization initiator are known from Synthesis and Reaction of Polymers (edited by The Society of Polymer Science, Japan, Kyoritsu Shuppan, Co., Ltd.) and the like.

Examples of the thermopolymerization initiator in the radical polymerization include azo compounds such as azobisisobutyronitrile and peroxides such as benzoyl peroxide.

Examples of a photopolymerization initiator include aromatic ketone compounds such as benzophenone, Michler's ketone, xanthone, and thioxanthone, quinones such as 2-ethylanthraquinone, acetophenone compounds such as acetophenone, trichloroacetophenone, 2-hydroxy-2-methylpropiophenone, 1-hydroxycyclohexyl phenyl ketone, benzoin ether, 2,2-diethoxyacetophenone, and 2,2-dimethoxy-2-phenylacetophenone, diketone compounds such as benzyl and methylbenzoyl formate, acyloxime ester compounds such as 1-phenyl-1,2-propanedione-2-(o-benzoyl)oxime, acylphosphine oxide compounds such as 2,4,6-trimethylbenzoyldiphenylphosphine oxide, sulfur compounds such as tetramethylthiuram and dithiocarbamate, organic peroxides such as benzoyl peroxide, and azo compounds such as azobisisobutyronitrile. Further, examples of the thermopolymerization initiator used in cationic polymerization include aromatic sulfonium salt compounds. In addition, examples of the photopolymerization initiator include organic sulfonium salt compounds, iodonium salt compounds, and phosphonium compounds.

The amount of the polymerization initiator added is preferably from 0.1 to 10% by mass, more preferably from 0.1 to 6% by mass, and still more preferably from 0.1 to 3% by mass in the mixture of the monomer composition (a) and the monomer composition (b). Further, a desired polymer can be synthesized by an addition reaction to a main chain of the polymer, such as with a polysiloxane compound.

The polymer of the present invention is obtained by first subjecting the materials or the composition to a polymerization reaction in a reactor made of glass, stainless steel, or the like, and then purifying the resulting polymer. The polymerization reaction may be carried out by dissolving the monomers to be raw materials in a solvent, and preferable examples of the solvent include benzene, toluene, xylene, ethylbenzene, pentane, hexane, heptane, octane, cyclohexane, cycloheptane, methanol, ethanol, 1-propanol, 2-propanol, ethylene glycol, ethylene glycol monomethyl ether, ethylene glycol dimethyl ether, 2-butanone, acetone, tetrahydrofuran, γ-butyrolactone, N-methyl-pyrrolidone, dimethyl sulfoxide, and dimethylformamide. Two or more kinds of organic solvents may be used in combination.

In addition, the polymer of the present invention can also be obtained by dissolving the monomer composition (a) and the monomer composition (b) in a solvent, applying the solution onto a substrate to remove the solvent by drying, and conducting a polymerization reaction by heating or light irradiation.

[Method for Forming Liquid Crystal Alignment Layer]

The ability to control the alignment of liquid crystal molecules and the stability of the alignment of the liquid crystal molecules against heat and light can be developed by irradiating the polymer of the present invention with light. In the present invention, a liquid crystal alignment layer for a horizontal alignment or vertical alignment mode liquid crystal display element using the polymer of the present invention, and a horizontal alignment or vertical alignment mode liquid crystal display element including the layer can be provided. An example of a method for forming the liquid crystal alignment layer obtained from the polymer of the present invention is a method of dissolving the polymer in a solvent, applying the solution onto a substrate, and then irradiating the coating film with light to exhibit the ability to control the alignment to give a liquid crystal alignment layer. The solvent used for dissolving the polymer is preferably a solvent which dissolves but does not react with the polymer of the present invention and other components optionally used. Examples of the solvent include 1,1,2-trichloroethane, N-methylpyrrolidone, butoxyethanol, γ-butyrolactone, ethylene glycol, polyethylene glycol monomethyl ether, propylene glycol, 2-pyrrolidone, N,N-dimethylformamide, phenoxyethanol, tetrahydrofuran, dimethylsulfoxide, methyl isobutyl ketone, and cyclohexanone. Two or more kinds of organic solvents may be used in combination.

Furthermore, examples of the method for forming the liquid crystal alignment layer of the present invention include a method including applying a solution obtained by dissolving the monomer composition (a) and the monomer composition (b) in a solvent onto a substrate, heating the coating film or irradiating the coating film with light to prepare a polymer, and further irradiating the polymer with light to exhibit the ability to control the alignment, thereby giving a liquid crystal alignment layer.

As the solvent used for dissolving the monomer composition, the same solvents as those used for dissolving the polymer can be used. Further, by light irradiation, preparation of the polymer and exhibition of an ability of controlling the alignment may be carried out simultaneously, or preparation of the polymer and exhibition of an ability of controlling the alignment may be carried out separately by a method such as a combination of heating and light irradiation and a combination of two or more types of light having different wavelengths. In addition, in any case of the methods for forming the liquid crystal alignment layer, the substrate can be provided with an ability to control the alignment direction and the alignment angle with the polymer of the present invention, by preparing a photo-alignment layer on a substrate on which an alignment layer has been formed.

Examples of the material for the substrate include glass, silicon, polyethylene terephthalate, polybutylene terephthalate, polyether sulfone, polycarbonate, and triacetyl cellulose.

In the case of being used for a liquid crystal display element, an electrode layer such Cr, Al, an ITO film composed of $In_2O_3$—$SnO_2$, or a NESA film composed of $SnO_2$ may be provided to this substrate. For the patterning of these electrode layers, a photoetching method, a method using a mask in forming the electrode layers, or the like is used.

In addition, a color filter layer or the like may also be formed on the substrate.

Examples of the method of applying a solution including the polymer of the present invention onto a substrate include spin coating, die coating, gravure coating, flexographic printing, and ink jet printing.

The concentration of the solid content in the solution used in the application is preferably 0.5 to 10% by weight, and is more preferably selected from this range by considering a method of applying the solution on the substrate, viscosity, volatility, or the like.

Further, the applied surface is preferably heated after applying the solution onto the substrate so as to remove the solvent. The drying conditions are preferably 50 to 300° C., and more preferably 80 to 200° C. for preferably 2 to 200 minutes, and more preferably 2 to 100 minutes.

Moreover, in the case where the monomer composition (a) and the monomer composition (b) in the present invention are used, a polymer may be prepared on the substrate by conducting thermopolymerization by the heating process. In this case, a polymerization initiator is preferably incorporated into the monomer composition (a) or the monomer composition (b). Alternatively, a polymer may be prepared by photopolymerization through irradiating the compositions with unpolarized light after removal of the solvent in the heating process, or a combination of thermopolymerization and photopolymerization may be used.

In the case of preparing the polymer of the present invention by thermopolymerization on the substrate, the heating temperature is not particularly limited as long as it is sufficient for allowing the polymerization to proceed. Typically, the heating temperature is approximately 50 to 250° C., and more preferably approximately 70 to 200° C.

Further, the polymerization initiator may or may not be added to the compositions.

In preparing the polymer of the present invention by photopolymerization on the substrate, unpolarized ultraviolet light is preferably used for light irradiation.

Moreover, a polymerization initiator is preferably incorporated into the compositions.

The irradiation energy of unpolarized ultraviolet light is preferably 20 $mJ/cm^2$ to 8 $J/cm^2$, and more preferably 40 $mJ/cm^2$ to 5 $J/cm^2$.

The luminous intensity of unpolarized ultraviolet light is preferably 10 to 1000 $mW/cm^2$, and more preferably 20 to 500 $mW/cm^2$.

The irradiation wavelength of unpolarized ultraviolet light preferably has a peak in a range of 250 to 450 nm.

Next, a photoisomerization reaction or a photocrosslinking reaction is carried out on the coating film formed by the method, by applying linear polarized light in the coated surface normal direction and applying unpolarized or linear polarized light in an oblique direction, thereby an ability to control the alignment can be exhibited. Alternatively, these irradiation methods may be combined. In order to form a desired pretilt angle, irradiation with linear polarized light in a tilt direction is preferable. Further, in the present invention, the irradiation in the oblique direction refers to a case where the angle between the irradiation direction of light and the substrate surface is from 1 degree to 89 degrees. In the case where the film is used as the liquid crystal alignment film for vertical alignment, the pretilt angle is generally preferably 70 to 89.8°. Further, in the case where the film is used as a liquid crystal alignment film for horizontal alignment, typically, the pretilt angle is preferably 0 to 20°.

As the light for irradiation onto the coating film, for example, ultraviolet rays or visible rays containing light having a wavelength of 150 nm to 800 nm may be used, and among these, ultraviolet rays having a wavelength of 270 nm to 450 nm are particularly preferable.

Examples of the light source include a xenon lamp, a high-pressure mercury lamp, an ultrahigh-pressure mercury lamp, and a metal halide lamp. Linear polarized light is obtained by using a polarizing filter and a polarizing prism for light from these light sources. Further, regarding the ultraviolet light and visible light obtained from such light sources a wavelength range for irradiation may be restricted by using an interference filter or a color filter.

In addition, the irradiation energy of light is preferably 15 $mJ/cm^2$ to 500 $mJ/cm^2$, and more preferably 20 $mJ/cm^2$ to 300 $mJ/cm^2$.

The luminous intensity of light is more preferably 2 to 500 $mW/cm^2$, and still more preferably 5 to 300 $mW/cm^2$.

The thickness of the liquid crystal alignment layer to be formed is preferably approximately 10 to 250 nm, and more preferably approximately 10 to 100 nm.

In the present invention, the optical axis is referred to as a direction, in which in the liquid crystal display element or the optical anisotropic body, the refractive index becomes constant, and therefore, even when unpolarized light is incident, birefringence does not occur, and thus, ordinary rays and extraordinary rays match or the deviation is minimized.

In the present invention, the alignment is a direction in which the liquid crystal molecules in the liquid crystal cell of the liquid crystal display element or the polymerizable liquid crystal molecules forming the optical anisotropic body faces a certain direction. In the case of rod-shaped liquid crystal molecules, the molecules face the direction taken by the molecular long axis, and in the case of disk-shaped liquid crystal molecules, the molecules face a normal direction with respect to the disk surface.

In the present invention, the pretilt angle is an angle formed between the alignment direction of the liquid crystal molecules or the polymerizable liquid crystal molecules and the substrate surface.

In the present invention, the polymerizable liquid crystal is assumed to be a compound showing a liquid crystal phase and containing a polymerizable chemical structure.

In the present invention, the homogeneous alignment is assumed to be an alignment in which the pretilt angle is from 0 degree to 20 degrees.

In the present invention, the homeotropic alignment is assumed to be an alignment in which the pretilt angle is from 70 degrees to 90 degrees. The angle between the optical axis and the substrate surface may or may not match the pretilt angle.

[Method for Producing Liquid Crystal Display Element]

A liquid crystal cell having a liquid crystal composition sandwiched between a pair of substrates, and a liquid crystal display element using the same can be produced by using the liquid crystal alignment layer formed by the method as described above, for example, by the following manner.

By preparing two substrates on which the liquid crystal alignment layer in the present invention is formed and arranging liquid crystal between the two substrates, a liquid crystal cell can be produced. Further, the liquid crystal alignment layer may be formed on only one of the two substrates.

Examples of a method for producing the liquid crystal cell include the following methods. First, two substrates are arranged so that the respective liquid crystal alignment layers face each other, and the peripheral portions of the two substrates are bonded with a sealing agent while maintaining a particular space (cell gap) between the two substrates. Liquid crystal is poured into a cell gap defined by the substrate surfaces and the sealing agent to fill the cell gap, and the inlet hole is sealed to produce a liquid crystal cell.

Furthermore, the liquid crystal cell may also be produced by a technique called a One Drop Fill (ODF) process. The process can be conducted, for example, by the following procedure. For example, an ultraviolet light-curable sealing agent is applied to a predetermined position on one substrate on which the liquid crystal alignment layer is formed, a liquid crystal is dropped onto the liquid crystal alignment layer, and another substrate is then bonded so that the liquid crystal alignment layers face each other. Then, the entire surfaces of the substrates are irradiated with UV light to cure the sealing agent, thereby producing a liquid crystal cell.

In any case where the liquid crystal cell is produced, regardless of the method used therefor, the liquid crystal used is preferably heated to a temperature at which the liquid crystal transitions to an isotropic phase and slowly cooled to room temperature so as to eliminate the alignment induced by the flow during pouring.

For example, an epoxy resin may be used as the sealing agent.

Furthermore, in order to keep the cell gap constant, beads of silica gel, alumina, an acrylic resin, or the like may be used as a spacer prior to bonding the two substrates. These spacers may be spread over the coating film of the alignment layer, or mixed with a sealing agent and then two substrates may be bonded.

As the liquid crystal, for example, a nematic type liquid crystal can be used. In the case of a vertical alignment-type liquid crystal cell, a liquid crystal cell having negative dielectric anisotropy is preferable. In the case of a horizontal alignment-type liquid crystal cell, a liquid crystal cell having positive dielectric anisotropy is preferable. Examples of the liquid crystal used include dicyanobenzene-based liquid crystals, pyridazine-based liquid crystals, Schiff-base-based liquid crystals, azoxy-based liquid crystals, naphthalene-based liquid crystals, biphenyl-based liquid crystals, and phenylcyclohexane-based liquid crystals.

A liquid crystal display element can be obtained by bonding a polarizing plate to an outer surface of the liquid crystal cell thus produced.

Examples of the polarizing plate include a polarizing plate formed of an "H film" in which iodine has been absorbed while stretching and aligning a polyvinyl alcohol, and a polarizing plate having an H film sandwiched between cellulose acetate protective films.

[Method for Producing Optical Anisotropic Body]

An optical anisotropic body useful for an optical anisotropic film used for optical compensation or the like of the liquid crystal display element can be produced by using the liquid crystal alignment layer formed by the method above, for example, as follows. That is, in the present invention, an optical anisotropic body constituted with the polymer of the polymerizable liquid crystal composition, which is an optical anisotropic body formed by aligning the polymerizable liquid crystal molecules in the polymerizable liquid crystal composition using the polymer of the present invention can be provided.

In the case of applying the polymerizable liquid crystal composition onto the liquid crystal alignment layer to produce an optical anisotropic body, a well-known coating method that is ordinarily used, such as bar coating, spin coating, roll coating, gravure coating, spray coating, die coating, cap coating, and a dipping method may be used. In doing so, in order to enhance the coatability, a well-known organic solvent that is ordinarily used may be added to the polymerizable liquid crystal composition. In this case, the polymerizable liquid crystal composition is applied onto the liquid crystal alignment layer, and then subjected to natural drying, drying by heating, drying under reduced pressure, drying by heating under reduced pressure, or the like, whereby the organic solvent is removed.

In order to obtain an optical anisotropic body using the liquid crystal alignment layer of the present invention, the polymerizable liquid crystal composition is applied onto the liquid crystal alignment layer as described above, and polymerized in the aligned state.

In the present invention, examples of the method for polymerizing the polymerizable liquid crystal composition include a method in which irradiation of actinic energy rays is performed onto a polymerizable liquid crystal composition and a thermopolymerization method.

In the case where the polymerization procedure of the polymerizable liquid crystal composition includes irradiation of actinic energy rays, a method for photopolymerization by irradiation with light such as ultraviolet rays is preferable since its procedure is simple.

If the polymerization procedure for the polymerizable liquid crystal composition is photopolymerization, the procedure may be carried out in the same manner as in the case of forming the liquid crystal alignment layer.

The irradiation intensity of ultraviolet rays for the polymerizable liquid crystal composition is preferably in the range of 1 W/m$^2$ to 10 kW/m$^2$, and particularly preferably in the range of 5 W/m$^2$ to 2 kW/m$^2$.

Polymerization of the polymerizable liquid crystal composition by heating is preferably carried out at a temperature equal to or lower than the temperature at which the polymerizable liquid crystal composition exhibits a liquid crystal phase, and particularly in case of using a thermopolymerization initiator that releases a radical as a result of heating, it is preferable to use a thermopolymerization initiator of which the cleavage temperature is within the aforementioned temperature range.

In addition, the thermopolymerization initiator may be used in combination with a photopolymerization initiator.

Although the heating temperature varies depending on the transition temperature of the polymerizable liquid crystal composition from the liquid crystal phase to the isotropic phase, it is preferably equal to or lower than the temperature at which non-uniform polymerization is induced by heating, and is preferably 20° C. to 300° C., more preferably 30° C. to 200° C., and particularly preferably 30° C. to 120° C. In addition, for example, in the case where the polymerizable group is a (meth)acryloyloxy group, polymerization is preferably carried out at a temperature below 90° C.

In the present invention, the optical axis of the optical anisotropic body can be regulated by controlling the pretilt angle by the photo-alignment layer, but in order to form an angle formed by the optical axis with respect to the substrate surface of 0 degree to 45 degrees, the pretilt angle is preferably 0 degree to 45 degrees, and in order to form an angle formed by the optical axis with respect to the substrate surface of 45 degrees to 90 degrees, the pretilt angle is preferably 45 degrees to 90 degrees.

Examples of the step for producing a liquid crystal alignment layer and an optical anisotropic body include the following methods.

In the first step, a film including the polymer is formed on a substrate. In the second step, irradiation of light having anisotropy is performed to provide an alignment regulating ability to the film including the polymer, and form a liquid crystal alignment layer. In the third step, a polymerizable liquid crystal composition film is formed on the liquid crystal alignment layer. In the fourth step, the polymerizable liquid crystal composition film is polymerized to form an optical anisotropic body. Here, in the fourth step, a polymerization reaction and a crosslinking reaction may proceed simultaneously in the liquid crystal alignment layer. In the production step, the film including the polymer is directly irradiated with light, and thus, a liquid crystal alignment layer having a higher liquid crystal alignment capability can be obtained.

Furthermore, examples of other production method include the following methods.

In the first step, a film including the polymer is formed on a substrate. In the second step, a polymerizable liquid crystal composition film is formed on the film including the polymer. In the third step, irradiation of light having anisotropy is performed to provide an alignment regulating ability to the film including the polymer, and form a liquid crystal alignment layer. In the fourth step, the polymerizable liquid crystal composition film is polymerized to form an optical anisotropic body. Here, the third step and the fourth step may proceed simultaneously by light irradiation. In the production step, the number of the steps may be reduced.

In some cases, the optical anisotropic bodies may be laminated on several layers. In this case, the steps may be repeated plural times, and a laminate of the optical anisotropic bodies may be formed. After optical anisotropic body is formed on the liquid crystal alignment, the liquid crystal alignment and the optical anisotropic body may be further laminated on the optical anisotropic body, and after the optical anisotropic body is formed on the liquid crystal alignment, the optical anisotropic body may be further laminated. The optical anisotropic body thus obtained, having a plurality of optical isomer layers, may be used in the applications, for example, in which optical compensation is carried out simultaneously on the liquid crystal layer of the liquid crystal display element and the polarizing plate; optical compensation and brightness enhancement of the liquid crystal layer of the liquid crystal display element are carried out simultaneously; or optical compensation and brightness enhancement of the polarizing plate of the liquid crystal display element are carried out simultaneously.

If only certain parts are polymerized using a mask by irradiation with ultraviolet rays, the alignment state of unpolymerized parts is then changed by an electric field, a magnetic field, a temperature, or the like, and then the unpolymerized parts are polymerized, an optical anisotropic body having a plurality of regions having different alignment directions can be obtained.

In addition, when only certain parts are polymerized using a mask by irradiation with ultraviolet rays, the alignment of the monomer composition (a) and the monomer composition (b) in the unpolymerized state is regulated in advance by an electric field, a magnetic field, a temperature, or the like, and polymerized by irradiation with light onto the mask while maintaining the state, an optical anisotropic body having a plurality of regions having different alignment directions can be obtained.

In order to stabilize the solvent resistance and the heat resistance of the obtained optical anisotropic body, the optical anisotropic body can be subjected to heating and aging treatments. In this case, it is preferable to heat the optical anisotropic body to a temperature equal to or higher than the glass transition temperature of the polymerizable liquid crystal composition film. The temperature is typically preferably 50 to 300° C., more preferably 80 to 240° C., and particularly preferably 100 to 220° C.

The optical anisotropic body obtained by the steps above can be used as an optical anisotropic body alone by peeling the optical anisotropic body layer from the substrate, or as the optical anisotropic body as it is without peeling the optical anisotropic body layer from the substrate. In particular, it is hard to contaminate the other members, and thus, the optical anisotropic body is useful in the cases of being used as a layered substrate or being bonded onto another substrate.

[Preparation of Polymerizable Liquid Crystal Composition]

The polymerizable liquid crystal composition used in the case of producing the optical anisotropic body in the present invention is a liquid crystal composition containing a polymerizable liquid crystal which exhibits liquid crystal properties either alone or in a composition with another liquid crystal compound. Examples of such compounds include rod-shaped polymerizable liquid crystal compounds having a rigid site, referred to as a mesogen in which a plurality of structures such as a 1,4-phenylene group and a 1,4-cyclohexylene group are connected, and a polymerizable functional group such as a (meth)acryloyloxy group, a vinyloxy group, and an epoxy group, as described in the Handbook of Liquid Crystals (edited by D. Demus, J. W. Goodby, G. W. Gray, H. W. Spiess, V. Vill, published by Wiley-VCH publishers, 1998), Kikan Kagaku Sosetsu No. 22, Liquid Crystal Chemistry (edited by Chemical Society of Japan, 1994), or Japanese Unexamined Patent Application, First Publication Nos. H07-294735, H08-3111, H08-29618, H11-80090, H11-148079, 2000-178233, 2002-308831, and 2002-145830; rod-shaped polymerizable liquid crystal compounds having a maleimide group as described in Japanese Unexamined Patent Application, First Publication Nos. 2004-2373 and 2004-99446; rod-shaped polymerizable liquid crystal compounds having an allyl ether group as described in Japanese Unexamined Patent Application, First Publication No. 2004-149522; and for example, discotic polymerizable compounds as described in the Handbook of Liquid Crystals, (edited by D. Demus, J. W. Goodby, G. W. Gray, H. W. Spiess, V. Vill, published by Wiley-VCH, 1998), Kikan Kagaku Sosetsu No. 22, Liquid Crystal Chemistry (edited by Chemical Society of Japan, 1994) or Japanese Unexamined Patent Application, First Publication No. H07-146409. Among these, the rod-shaped liquid crystal compounds having a polymerizable group are preferable since the polymerizable liquid crystal composition having a low liquid crystal temperature range which is in the vicinity of room temperature is easily fabricated.

There are no particular limitations on the solvent used in the polymerizable liquid crystal composition, and solvents for which the compound exhibits satisfactory solubility can be used. Examples of the solvent include aromatic hydrocarbon-based solvents such as toluene, xylene, and mesitylene, ester-based solvents such as methyl acetate, ethyl acetate, and propyl acetate, ketone-based solvents such as methyl ethyl ketone, methyl isobutyl ketone, and cyclohexanone, ether-based solvents such as tetrahydrofuran, 1,2-dimethoxyethane, and anisole, amide-based solvents such as N,N-dimethylformamide and N-methyl-2-pyrrolidone, γ-butyrolactone, and chlorobenzene. These can be used alone or as a mixture of two or more kinds thereof. In addition, an additive can also be added.

A liquid crystal compound that does not have a polymerizable group may also be added as necessary to the polymerizable liquid crystal composition. However, since excessive addition thereof has the risk of contamination of laminated members due to elution of liquid crystal compound from the resulting optical anisotropic body while also having the risk of lowering the heat resistance of the optical anisotropic body, in the case of adding such a compound, the added amount is preferably 30% by mass or less, more preferably 15% by mass or less, and particularly preferably 5% by mass or less based on the total amount of the polymerizable liquid crystal compound.

A compound that has a polymerizable group but is not a polymerizable liquid crystal compound can also be added to the polymerizable liquid crystal composition. Such compounds can be used without any particular limitations provided that they are recognized to be polymerizable monomers or polymerizable oligomers ordinarily in this technical field. In the case of adding such a compound, the amount added is preferably 5% by mass or less, and more preferably 3% by mass or less based on the polymerizable liquid crystal composition of the present invention.

A compound having optical activity, namely a chiral compound, may also be added to the polymerizable liquid crystal composition. The chiral compound itself is not required to exhibit a liquid crystal phase, and may or may not have a polymerizable group. In addition, the direction of the helical structure of the chiral compound can be suitably selected according to the application of the polymer used.

Specific examples of such a compound include cholesterol pelargonate or cholesterol stearate having a cholesteryl group as the chiral group, "CB-15" and "C-15" manufactured by BDH Chemicals Pty. Ltd., "S-1082" manufactured by Merck & Co., Ltd., and "CM-19", "CM-20", and "CM" manufactured by Chisso Corp. having a 2-methylbutyl group as the chiral group, and "S-811" manufactured by Merck & Co., Ltd., and "CM-21" and "CM-22" manufactured by Chisso Corp. having a 1-methylheptyl group as the chiral group.

In the case of adding the chiral compound, although varying depending on the application of the polymer of the polymerizable liquid crystal composition, the amount of the chiral compound added is preferably such that the value (d/P) resulting from dividing the thickness (d) of the resulting polymer by the helical pitch (P) within the polymer is in the range of 0.1 to 100, and more preferably in the range of 0.1 to 20.

A stabilizer for improving storage stability can also be added to the polymerizable liquid crystal composition. Examples of the stabilizer include hydroquinone, hydroquinone monoalkyl ethers, tertiary butyl catechols, pyrogallols, thiophenols, nitro compounds, β-naphthylamines, and β-naphthols. In the case of adding such a stabilizer, the amount thereof added is preferably 1% by mass or less, and particularly preferably 0.5% by mass or less based on the polymerizable liquid crystal composition of the present invention.

In the case of using an optical anisotropic body obtained from the polymer and the polymerizable liquid crystal composition of the present invention in an application such as a raw material of a polarizing film or alignment film, a printing ink or paint, and a protective film, a metal, a metal complex, a dye, a pigment, a fluorescent material, a phosphorescent material, a surfactant, a leveling agent, a thixo agent, a gelling agent, a polysaccharide, an ultraviolet absorber, an infrared ray absorber, an antioxidant, an ion exchange resin, a metal oxide such as titanium dioxide, or the like may also be added to the polymerizable liquid crystal composition used in the present invention according to the purpose of use.

EXAMPLES

The present invention will be described in more detail with reference to, for example, Examples below. However, the present invention is not limited to the Examples. The structure of a compound was identified with nuclear magnetic resonance (NMR) spectra, mass spectra (MS), or the like. Unless otherwise noted, "parts" and "%" are on a mass basis.

(Examples of Forming and Evaluating Polymer in First Embodiment)

(Synthesis of Azobenzene Derivative (P-1))

[Chem. 111]

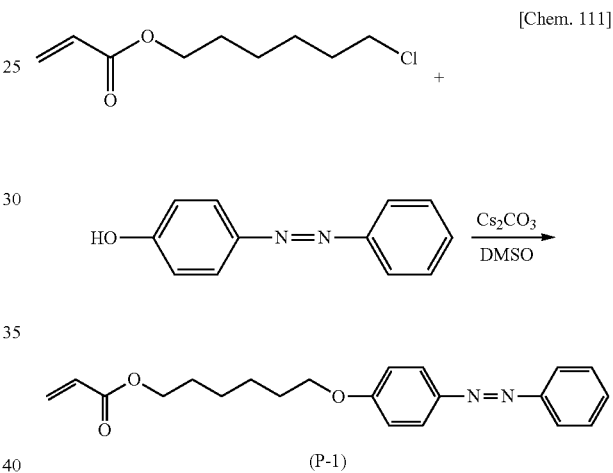

8.44 g of 4-hydroxyazobenzene and 27.9 g of cesium carbonate were dissolved in 110 mL of dimethyl sulfoxide and the mixture was stirred at room temperature for 1 hour. To the reaction solution, 9.94 g of 6-chlorohexyl acrylate was added dropwise, and the mixture was stirred at 85° C. for 4 hours. The reaction solution was cooled to room temperature, 150 mL of water was added thereto, and the mixture was stirred at 5° C. for 30 minutes. Solid precipitates were filtered and washed with methanol. The collected solid was dissolved in 150 ml of dichloromethane and dried by adding sodium sulfate. Sodium sulfate was removed and the solvent was evaporated under reduced pressure to reduce the volume to about 40 ml, and 80 ml of hexane was added. The resulting mixture was purified by column chromatography (alumina/silica gel, hexane/dichloromethane=2:1), the solvent was evaporated under reduced pressure, and recrystallization was conducted to obtain (P-1) as a white crystal (9.67 g).

$^1$H-NMR (400 MHz, CDCl$_3$) δ: 1.47-1.54 (m, 4H), 1.71-1.74 (m, 2H), 1.82-1.86 (m, 2H), 4.04 (t, J=6.4 Hz, 2H), 4.18 (t, J=6.6 Hz, 2H), 5.82 (dd, J=1.6 Hz, 10.4 Hz, 1H), 6.13 (dd, J=10.4 Hz, 17.4 Hz, 1H), 6.41 (dd, J=1.2 Hz, 17.2 Hz, 1H), 7.00 (d, J=9.2 Hz, 2H), 7.43-7.52 (m, 3H), 7.87-7.93 (d+d, J=7.2 Hz, 9.2 Hz, 2H),

EI-MS: 352[M$^+$]

[Chem. 112]
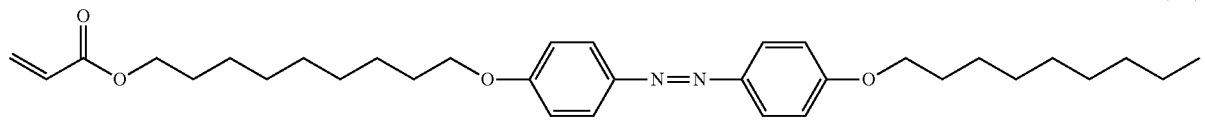
(P-2)
A compound (P-2) was synthesized according to the procedure described in a known document (Journal of Materials Chemistry, Vol. 19 (2009), 60-62).
[Chem. 113]
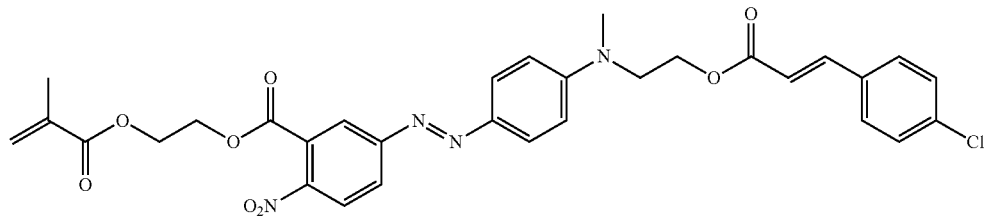
(P-3)
[Chem. 114]
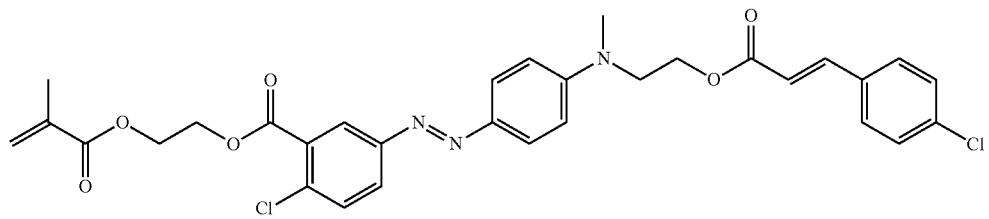
(P-4)
[Chem. 115]
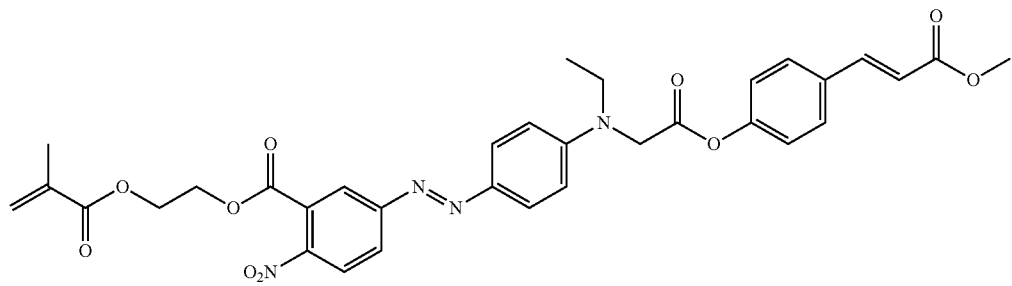
(P-5)
[Chem. 116]
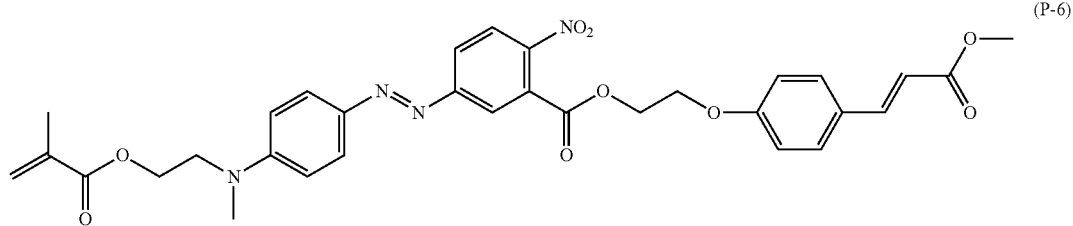
(P-6)

Compounds (P-3) to (P-6) were synthesized by the same method as the procedure described in Examples of Japanese Unexamined Patent Application Publication (Translation of PCT Application) No. H06-509889.

(Synthesis of Cinnamic Acid Derivative Cinv-1)

[Chem. 117]

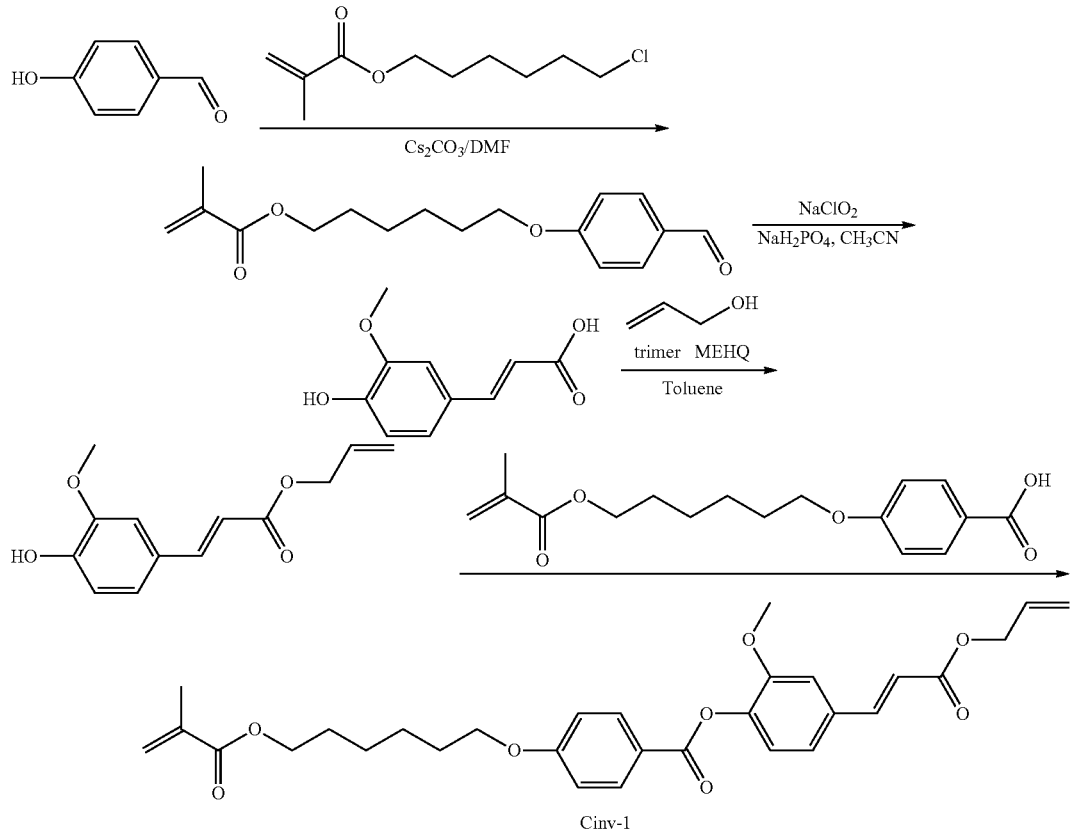

Cinv-1

11.5 g of 4-hydroxybenzaldehyde, 20.0 g of 6-chlorohexyl methacrylate, and 62 g of cesium carbonate were dissolved in 150 ml of dimethyl sulfoxide and the mixture was stirred at 60° C. for 3 hours. The reaction solution was cooled to room temperature, and 600 ml of water and 300 ml of dichloromethane were added thereto. The organic phase was separated and the aqueous phase was extracted twice with 150 ml of dichloromethane. The organic phase was combined, washed with 10% hydrochloric acid, saturated sodium bicarbonate, and saturated saline, and then dried by the addition of sodium sulfate. Sodium sulfate was removed and the mixture was purified by column chromatography (alumina/silica gel, dichloromethane), and the solvent was evaporated under reduced pressure to obtain 4-(6-methacryloyloxy)benzaldehyde (23 g) as a white solid.

Next, 20.0 g of the obtained 4-(6-methacryloyloxy)benzaldehyde was suspended in 300 ml of acetonitrile, and 10 g of sodium dihydrogen phosphate dihydrate dissolved in 120 ml of water was added dropwise thereto. To this suspension was added 15 ml of 30% hydrogen peroxide, and then 13 g of sodium chlorite dissolved in 100 ml of water was added dropwise thereto, and the mixture was stirred at 45° C. for 3 hours. To the reaction solution was added dropwise 350 ml of water, and the mixture was stirred at 10° C. for 1 hour. The solid was separated by filtration, dissolved in 120 ml of THF, washed with saturated saline, and then dried by the addition of sodium sulfate. Sodium sulfate was removed and the solvent was evaporated under reduced pressure. Then, 340 ml of ice-cooled hexane was added dropwise and the solid was separated by filtration to obtain 4-(6-methacryloyloxy)benzoic acid (22 g) as a white solid.

21.5 g of 4-hydroxy-3-methoxycinnamic acid, 80 g of 2-propen-1-ol, 0.5 g of propylphosphonic acid anhydride (trimer), and 0.03 g of p-methoxyphenol (MEHQ) were dissolved in 200 ml of toluene, and the mixture was heated at 135° C. for 24 hours. This reaction solution was cooled to room temperature and the toluene was evaporated. Then, the residue was purified by column chromatography (alumina/silica gel, dichloromethane) and the solvent was evaporated under reduced pressure to obtain 2-propenyl 4-hydroxy-3-methoxycinnamate (20.3 g) as a yellow liquid.

Next, 17 g of the obtained 2-propenyl 4-hydroxy-3-methoxycinnamate, 24.5 g of 4-(6-methacryloyloxy)benzoic acid, and 0.9 g of 4,4-dimethylaminopyridine were dissolved in 350 ml of dichloromethane, and the solution was cooled to 3° C. under a nitrogen atmosphere. 11 g of diisopropylcarbodiimide diluted with 30 ml of dichloromethane was added dropwise thereto, and the mixture was stirred at room temperature for 8 hours. The reaction solution was filtered and the solid was removed. Then, the residue was washed with 10% hydrochloric acid and saturated saline, and dried by the addition of sodium sulfate. Sodium sulfate was removed and the residue was purified by column chromatography (alumina/silica gel, hexane/dichloromethane). The solvent was evaporated under reduced pressure to obtain Cinv-1 (22 g) as a white solid.

$^1$H-NMR (400 MHz, CDCl$_3$) δ: 1.41-1.59 (m, 4H), 1.72 (tt, 2H), 1.84 (tt, 2H), 1.95 (s, 3H), 3.85 (s, 3H), 4.05 (t, J=6.4 Hz, 2H), 4.17 (t, J=6.4 Hz, 2H), 4.73 (d, J=5.6 Hz, 2H), 5.29 (d, J=10.4 Hz, 1H), 5.39 (d, J1=8.4 Hz, J2=1.0 Hz, 1H), 5.55 (s, 1H), 5.96-6.05 (m, 1H), 6.10 (s, 1H), 6.44 (d, J=16 Hz, 1H), 6.97 (d, J=8.8 Hz, 2H), 7.16 (s+d+d, 3H), 7.70 (d, J=16 Hz, 1H), 8.14 (d, J=8.8 Hz, 2H),

EI-MS: 522[M$^+$]

(Synthesis of Cinnamic Acid Derivative Cinv-2)

cooled to 3° C. under a nitrogen atmosphere. 11 g of diisopropylcarbodiimide diluted with 30 ml of dichloromethane was added dropwise thereto, and the mixture was stirred at room temperature for 8 hours. The reaction solution was filtered and the solid was removed. Then, the residue was washed with 10% hydrochloric acid and saturated saline, and dried by the addition of sodium sulfate. Sodium sulfate was removed and the residue was purified by column chromatography (alumina/silica gel, hexane/dichloromethane). The solvent was evaporated under reduced pressure to obtain Cinv-2 (26 g) as a white solid.

[Chem. 118]

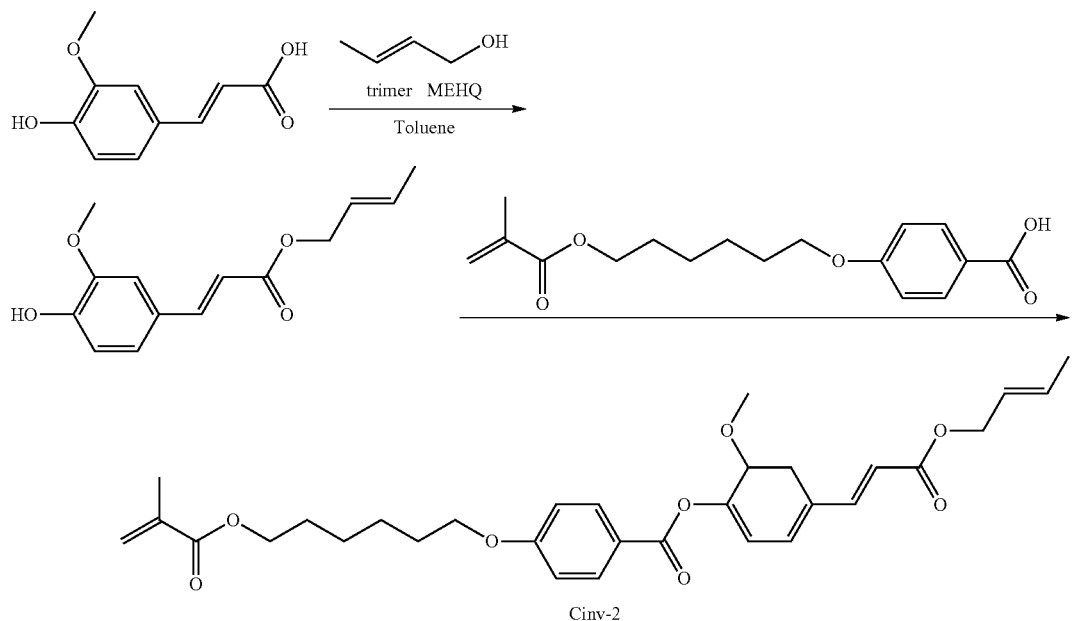

Cinv-2

21.5 g of 4-hydroxy-3-methoxycinnamic acid, 88 g of 2-buten-1-ol, 0.5 g of propylphosphonic acid anhydride (trimer), and 0.03 g of p-methoxyphenol (MEHQ) were dissolved in 200 ml of toluene, and the solution was heated to 135° C. for 24 hours. This reaction solution was cooled to room temperature and the toluene was evaporated. Then, the residue was purified by column chromatography (alumina/silica gel, dichloromethane), and the solvent was evaporated under reduced pressure to obtain 2-butenyl 4-hydroxy-3-methoxycinnamate (21.6 g) as a yellow liquid.

Next, 17.8 g of the obtained 2-butenyl 4-hydroxy-3-methoxycinnamate, 24.5 g of 4-(6-methacryloyloxy)benzoic acid, and 1.1 g of 4,4-dimethylaminopyridine were dissolved in 350 ml of dichloromethane, and the solution was $^1$H-NMR (400 MHz, CDCl$_3$) δ: 1.41-1.59 (m, 4H), 1.67-1.79 (d+tt, 5H), 1.84 (tt, 2H), 1.95 (s, 3H), 3.84 (s, 3H), 4.05 (t, J=6.4 Hz, 2H), 4.17 (t, J=6.4 Hz, 2H), 4.65 (d, J=6.8 Hz, 2H), 5.56 (s, 1H), 5.62-5.71 (m, 1H), 5.79-5.88 (m, 1H), 6.10 (s, 1H), 6.42 (d, J=16 Hz, 1H), 6.97 (d, J=8.8 Hz, 2H), 7.16 (s+d+d, 3H), 7.70 (d, J=16 Hz, 1H), 8.15 (d, J=8.8 Hz, 2H),

EI-MS: 536[M$^+$]

(Synthesis of Compounds Cinv-3 to Cinv-12)

In the same manner as above except for changing the materials, the following compounds Cinv-3 to Cinv-12 were synthesized.

[Chem. 119]

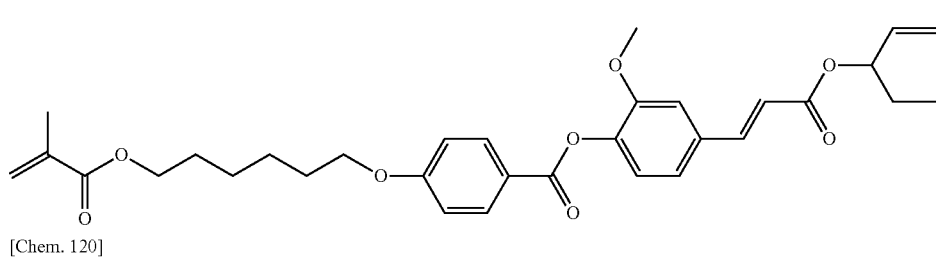

Cinv-3

[Chem. 120]

-continued

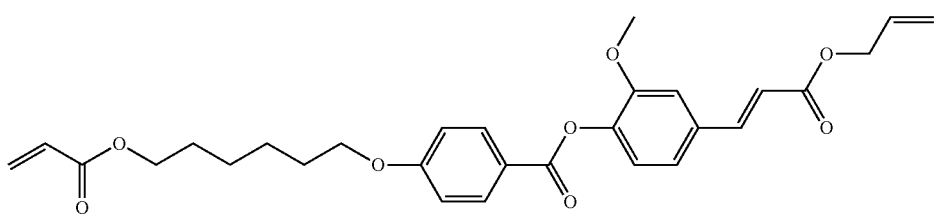
Cinv-4

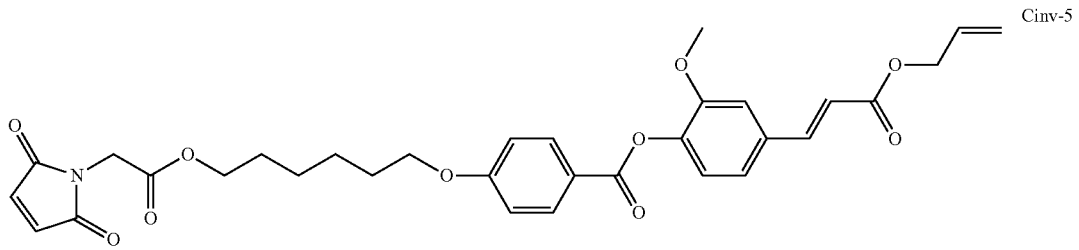
Cinv-5

[Chem. 121]

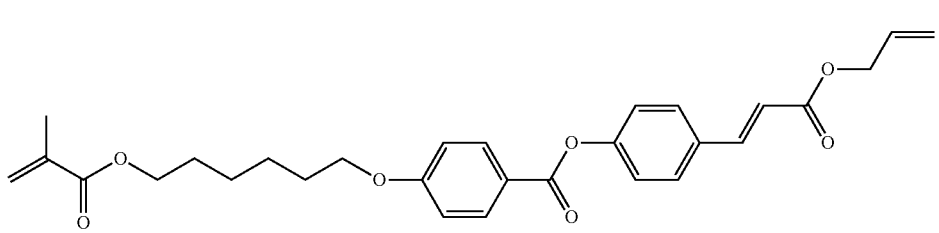
Cinv-6

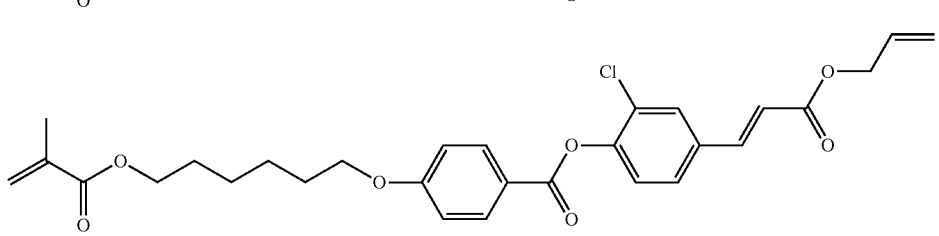
Cinv-7

(Synthesis of Monomer for Copolymerization)

[Chem. 122]

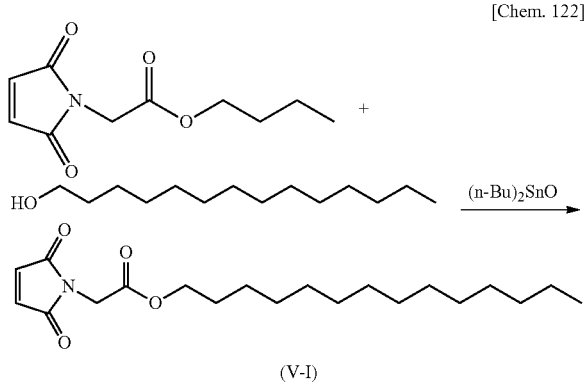

9.01 g of butyl maleimidoacetate, 0.33 g of dibutyltin (IV) oxide, and 9.14 g of tetradecanol were dissolved in 40 ml of toluene, and the mixture was stirred for 15 hours while heating to reflux.

The reaction solution was cooled to room temperature and 100 ml of toluene was added thereto. The mixture was subjected to liquid separation and washed with saturated sodium bicarbonate water and then with saturated saline. To this solution was added sodium sulfate, and the mixture was dried. Sodium sulfate was removed and the solvent was evaporated under reduced pressure to reduce the volume to about 50 ml, and 40 ml of hexane and 20 ml of dichloromethane were added thereto. The mixture was purified by column chromatography (alumina/silica gel, hexane/dichloromethane=2:1), the solvent was evaporated under reduced pressure, and the residue was reprecipitated with methanol to obtain (V-1) (7.95 g) as a white crystal.

$^1$H-NMR (400 MHz, CDCl$_3$) δ: 0.88 (t, J=6.8 Hz, 3H), 1.15-1.40 (m, 22H), 1.61-1.66 (tt, 2H), 4.14 (t, J=6.6 Hz, 2H), 4.15 (s, 2H), 6.79 (s, 2H),

EI-MS: 351[M$^+$]

[Chem. 123]

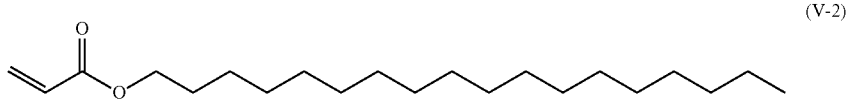

(V-2)

Stearyl acrylate (V-2) (manufactured by Tokyo Chemical Industry Co., Ltd.) was purchased and used.

[Chem. 124]

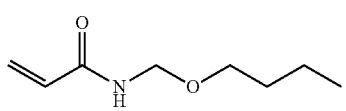

(V-3)

N-(Butoxymethyl)acrylamide (V-3) (manufactured by Tokyo Chemical Industry Co., Ltd.) was purchased and used.

[Chem. 125]

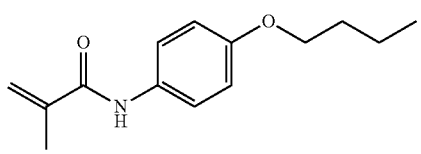

(V-4)

A compound (V-4) was synthesized according to the procedure described in a known document (Farmaco. Edizione Scientifica Vol. 22 (1967) 190, 590-598).

(Preparation of Copolymer (ACv-1))

Example 1

0.34 parts (0.5 mmol) of a compound represented by the formula (P-1), and 9.66 (9.5 mmol) of a compound represented by the formula (Cinv-1) were dissolved in 10 parts of ethyl methyl ketone to give a solution 1, and 0.01 parts of azobisisobutyronitrile (AIBN) was added to the solution 1. The mixture was heated and refluxed for 2 days under a nitrogen atmosphere to give a solution 2. Next, the solution 2 was added dropwise to 60 parts of methanol under stirring, and the precipitated solid was filtered. The obtained solid was dissolved in 5 parts of tetrahydrofuran (THF), 120 parts of ice-cooled hexane was added dropwise thereto under stirring, and the precipitated solid was filtered. The obtained solid was dissolved in 5 parts of THF, added dropwise to 120 parts of ice-cooled methanol under stirring, and the precipitated solid was filtered. The obtained solid was dissolved in THF and dried under vacuum to obtain a copolymer (ACv-1).

(Preparation of Copolymers (ACv-2) to (ACv-7))

In the same manner as for the copolymer (ACv-1), copolymers (ACv-2) to (ACv-7) were obtained. The composition of each of the copolymers is as shown in Tables 1 and 2.

Furthermore, (ACv-2) to (ACv-7) were assumed to be (Example 2) to (Example 7).

TABLE 1

| Sample name | Blending amount | | | | | |
|---|---|---|---|---|---|---|
| | P-1 | P-2 | P-3 | Cinv-1 | Cinv-2 | Cinv-3 |
| Example 1 ACv-1 | 5 | | | 95 | | |
| Example 2 ACv-2 | | 5 | | | 95 | |
| Example 3 ACv-3 | | | 5 | | | 95 |

TABLE 2

| Sample name | Blending amount | | | | | |
|---|---|---|---|---|---|---|
| | P-4 | P-5 | P-6 | Cinv-4 | Cinv-5 | Cinv-6 | Cinv-7 |
| Example 4 ACv-4 | 5 | | | 95 | | | |
| Example 5 ACv-5 | | 5 | | | 95 | | |
| Example 6 ACv-6 | | | 5 | | | 95 | |
| Example 7 ACv-7 | 5 | | | | | | 95 |

(Preparation of Copolymers (ACvV-1) to (ACvV-7))

In the same manner as for the copolymer (ACv-1), polymers (ACvV-1) to (ACvV-7) were obtained. The composition of each of the copolymers is as shown in Tables 3 and 4.

Furthermore, (ACvV-1) to (ACvV-7) were assumed to be (Example 8) to (Example 14).

TABLE 3

| Sample name | Blending amount | | | | | | | |
|---|---|---|---|---|---|---|---|---|
| | P-1 | P-2 | P-3 | Cinv-1 | Cinv-2 | Cinv-3 | V-1 | V-2 |
| Example 8 ACvV-1 | 5 | | | 65 | | | 30 | |
| Example 9 ACvV-2 | | 5 | | | 65 | | | 30 |
| Example 10 ACvV-3 | | | 5 | | | 65 | 30 | |

TABLE 4

| Sample name | Blending amount | | | | | | | |
|---|---|---|---|---|---|---|---|---|
| | P-4 | P-5 | P-6 | Cinv-4 | Cinv-5 | Cinv-6 | Cinv-7 | V-3 | V-4 |
| Example 11 ACvV-4 | 5 | | | 65 | | | | 30 | |
| Example 12 ACvV-5 | | 5 | | | 65 | | | | 30 |
| Example 13 ACvV-6 | | | 5 | | | 65 | | 30 | |
| Example 14 ACvV-7 | 5 | | | | | | 65 | | 30 |

(Fabrication of Alignment Layer and Liquid Crystal Display Element)

Example 15

The copolymer (ACv-1) was dissolved in cyclopentanone to be 0.8% and the solution was stirred at room temperature for 10 minutes. Then, the solution was applied onto a glass plate as a substrate at 2000 rpm for 30 seconds, using a spin coater, and dried at 100° C. for 3 minutes. Then, the surface was visually observed and as a result, it was found that a polymer was uniformly applied on the glass plate to form a smooth film.

Next, irradiation of linear polarized and parallel light of visible ultraviolet light (wavelength: 365 nm, irradiation intensity: 10 mW/cm$^2$) was performed onto the coated glass plate as a substrate using an ultrahigh-pressure mercury lamp via a wavelength cut filter, a band-pass filter, and a polarizing filter in a direction of 45 degrees with respect to the substrate. The irradiation dose was 100 mJ/cm$^2$.

A liquid crystal cell was fabricated by using the coated glass plate prepared by the method above. The gap between the plates was set to 10 μm and the two glass plates were bonded in the anti-parallel direction. Next, a nematic liquid crystal mixture having a negative dielectric anisotropy with a composition described below was charged into the cell at a temperature just exceeding a transparent point (Tc=84.4° C.), and then cooled to room temperature. A polarizing plate was placed on the top and the bottom of the liquid crystal cell, and a back light was placed therebelow. The light transmittance was changed by rotating the liquid crystal cell by 90 degrees and dark-light contrast was clearly observed and there was no abnormal domain and alignment non-uniformity, from which it was confirmed that the liquid crystals were normally aligned. The tilt angle of the liquid crystal in the cell was optically measured by a crystal rotation method, and the pretilt angle was found to be 1 degree. A voltage of 5 V was applied to this liquid crystal cell for an application time of 60 microseconds at a span of 167 milliseconds, and then the voltage holding ratio after 167 milliseconds from the release of the voltage was measured by means of "VHR-AMP01" manufactured by TOYO Corporation at 23° C., and as a result, the voltage holding ratio (VHR) was found to be 99.2%.

[Chem. 126]

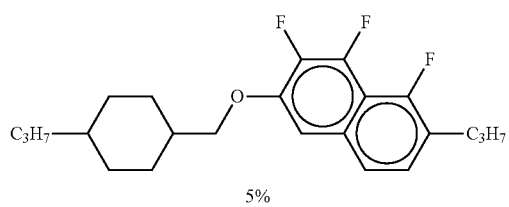

5%

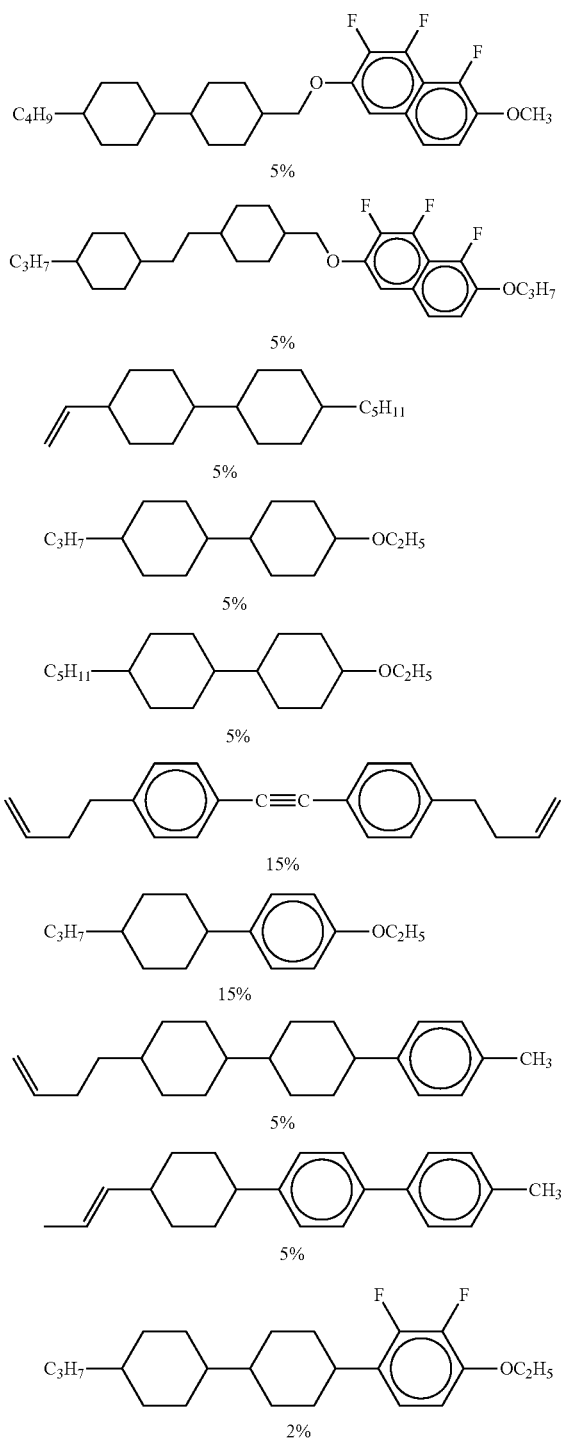

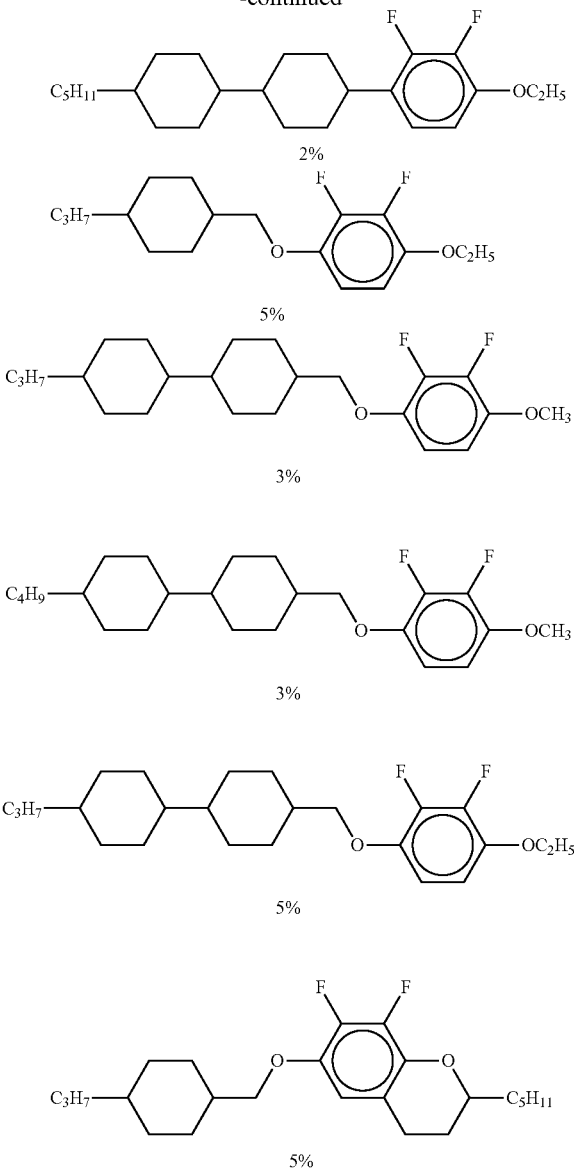

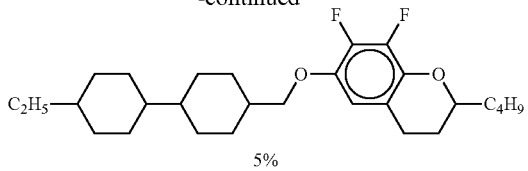

Hereinafter, in the same manner as the cinnamic acid polymer (ACv-1), with respect to (ACv-2) to (ACv-7), and (ACvV-1) to (ACvV-7), alignment layers were fabricated and liquid crystal cells were fabricated. The measurement results of the coatability, irradiation dose of linear polarized light, liquid crystal alignment property, pretilt angle, and VHR are shown in conjunction in Tables 5 and 6.

Further, Examples with respect to (ACv-1) to (ACv-7) were assumed to be (Example 15) to (Example 21), and Examples with respect to (ACvV-1) to (ACvV-7) were assumed to be (Example 22) to (Example 28).

For the coatability, a film formed by applying the polymer onto a glass plate was observed, and thus, a case where the polymer was uniformly applied to obtain a smooth film was denoted as O (good), a case where there was damage•non-uniformity on the coated surface at one place was denoted as Δ (acceptable), and a case where there was damage•non-uniformity on the coated surface in two or more places was denoted as X (poor).

For the liquid crystal alignment property, when the presence or absence of the abnormal domain and alignment non-uniformity of the liquid crystal cell was observed, and thus, a case where there was the abnormal domain and alignment non-uniformity at zero place was denoted as O (good), a case where there was the abnormal domain and alignment non-uniformity in two or less places was denoted as Δ (acceptable), and a case where there was the abnormal domain and alignment non-uniformity in three or more places was denoted as X (poor).

For the pretilt angles, the pretilt angles were optically measured by a crystal rotation method, and thus, a case where the pretilt angle was 80 degrees or more and less than 90 degrees was denoted as V, and a case where the pretilt angle was 0 degree or more and less than 15 degrees was denoted as P.

For VHR, a case where the VHR was 98% or more was denoted as O (good), a case where the VHR was 95% or more and less than 98% was denoted as Δ (acceptable), and a case where the VHR was 95% or less was denoted as X (poor).

TABLE 5

| | Sample name | Coatability | Irradiation dose of linear polarized light (mJ/cm$^2$) | Liquid crystal alignment property | Pretilt angle | VHR |
| --- | --- | --- | --- | --- | --- | --- |
| Example 15 | ACv-1 | O | 100 | O | P | O |
| Example 16 | ACv-2 | O | 100 | O | P | O |
| Example 17 | ACv-3 | O | 100 | O | P | O |
| Example 18 | ACv-4 | O | 100 | O | P | O |
| Example 19 | ACv-5 | O | 100 | O | P | O |
| Example 20 | ACv-6 | O | 100 | O | P | O |
| Example 21 | ACv-7 | O | 100 | O | P | O |

TABLE 6

| | Sample name | Coatability | Irradiation dose of linear polarized light (mJ/cm²) | Liquid crystal alignment property | Pretilt angle | VHR |
|---|---|---|---|---|---|---|
| Example 22 | ACvV-1 | ○ | 100 | ○ | V | ○ |
| Example 23 | ACvV-2 | ○ | 100 | ○ | V | ○ |
| Example 24 | ACvV-3 | ○ | 100 | ○ | V | ○ |
| Example 25 | ACvV-4 | ○ | 100 | ○ | P | ○ |
| Example 26 | ACvV-5 | ○ | 100 | ○ | P | ○ |
| Example 27 | ACvV-6 | ○ | 100 | ○ | P | ○ |
| Example 28 | ACvV-7 | ○ | 100 | ○ | P | ○ |

From the above results, it was found that an alignment layer, which has good coatability, allows a low irradiation dose of linear polarized light, has a superior liquid crystal alignment property, and a superior ability to control the pretilt, and exhibits a high voltage holding ratio, can be obtained, by the cinnamic acid polymerized product obtained by polymerizing the cinnamic acid derivatives of the present invention.

Comparative Example 1

For comparison, a cinnamic acid derivative (D-2) was synthesized.

By the same method as in Example 1, copolymers (AC-1), (ACV-1), (ACV-2) and (Cv-1) were prepared. The composition of each of the copolymers is as shown in Table 7.

Further, (AC-1) was assumed to be (Comparative Example 1), (ACV-1) was assumed to be (Comparative Example 2), (ACV-2) was assumed to be (Comparative Example 3), and (Cv-1) was assumed to be (Comparative Example 4).

[Chem. 127]

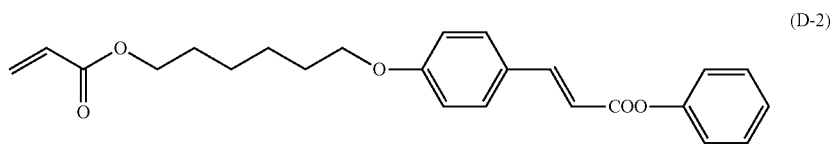

(D-2)

TABLE 7

| Sample name | Blending amount | | | | |
|---|---|---|---|---|---|
| | | P-3 | D-2 | Cinv-4 | V-1 | V-3 |
| Comparative Example 1 | AC-1 | 5 | 95 | | | |
| Comparative Example 2 | ACV-1 | 5 | 65 | | 30 | |
| Comparative Example 3 | ACV-2 | 5 | 65 | | | 30 |
| Comparative Example 4 | Cv-1 | | | 100 | | |

Furthermore, by the same method as in Example 15, an alignment layer was fabricated, and thus, various measurements were conducted and the results therefrom are shown in Table 8.

Further, Comparative Example with respect to (AC-1) was assumed to be (Comparative Example 5), Comparative Example with respect to (ACV-1) was assumed to be (Comparative Example 6), Comparative Example with respect to (ACV-2) was assumed to be (Comparative Example 7), and Comparative Example with respect to (Cv-1) was assumed to be (Comparative Example 8).

TABLE 8

| | Sample name | Coatability | Irradiation dose of linear polarized light (mJ/cm²) | Liquid crystal alignment property | Pretilt angle | VHR |
|---|---|---|---|---|---|---|
| Comparative Example 5 | AC-1 | Δ | 100 | ○ | P | ○ |
| Comparative Example 6 | ACV-1 | Δ | 100 | ○ | V | ○ |
| Comparative Example 7 | ACV-2 | Δ | 100 | ○ | P | ○ |
| Comparative Example 8 | Cv-1 | ○ | 300 | ○ | P | ○ |

Therefore, it was found that a liquid crystal alignment layer which has the effects of allowing a low irradiation dose of linear polarized light, having a superior ability to control the alignment of the liquid crystals and the pretilt angles, and exhibiting a high voltage holding ratio (VHR) and a display element using the composition can be obtained by the present invention.

(Preparation of Polymerizable Liquid Crystal Composition (LC-1))

[Chem. 128]

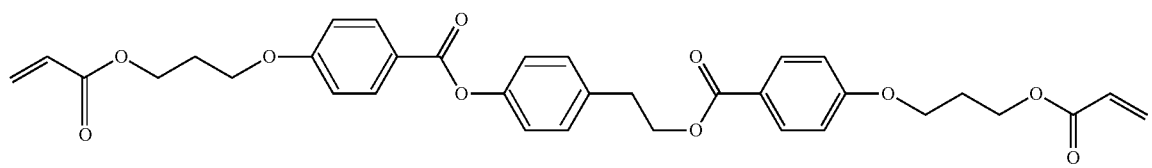

(m)

[Chem. 129]

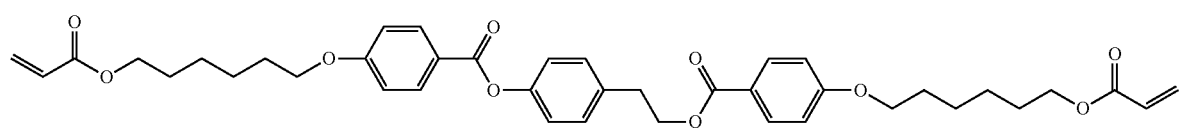

(n)

[Chem. 30]

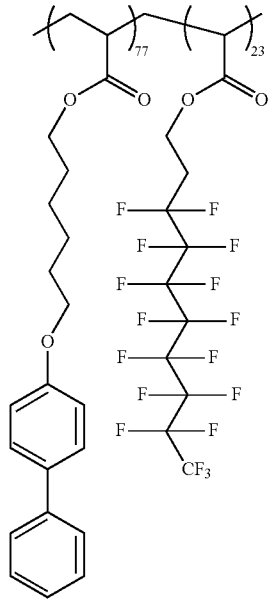

(p)

After dissolving 15 parts of the compound represented by formula (m) and 15 parts of the compound represented by formula (n) in 70 parts of xylene, 1.2 parts of Irgacure 907 (Chiba Specialty Chemicals Corp.) and 0.3 parts of the acrylic copolymer represented by formula (p) were added thereto to obtain a solution. The resulting solution was filtered with a 0.45 μm membrane filter to obtain a polymerizable liquid crystal composition (LC-1).

(Preparation of Polymerizable Liquid Crystal Composition (LC-2))

[Chem. 131]

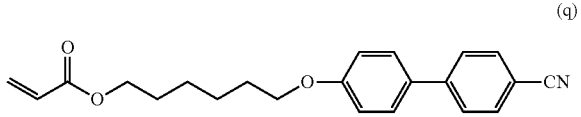
(q)

After dissolving 43 parts of the compound represented by formula (m), 43 parts of the compound represented by formula (n), and 14 parts of the compound represented by formula (q) in 70 parts of propylene glycol monomethyl ether acetate, 2 parts of Irgacure 651 (manufactured by Ciba Specialty Chemicals Corp.) was added thereto to obtain a solution. The resulting solution was filtered with a 0.45 μm membrane filter to obtain a polymerizable liquid crystal composition (LC-2).

(Evaluation Method for Alignment Property)

The alignment property of the optical anisotropic body was evaluated on a scale of one to five by visual observation and observation with a polarizing microscope.

A: Visually uniform alignment and no defects when observed with polarizing microscope B: Visually uniform alignment and alignment area of 90 to 100% when observed with polarizing microscope C: Visual alignment inferior to A and B and alignment area of 60 to 90% observed with polarizing microscope D: Visually nearly unaligned and alignment area of 40 to 60% when observed with polarizing microscope E: No visual alignment and alignment area of 40% or less when observed with polarizing microscope (Evaluation of Coatability)

For the coatability, the film formed by coating the polymer onto a glass plate was observed, and thus, a case where the polymer was uniformly applied to obtain a smooth film was denoted as O (good), a case where there was damage•non-uniformity on the coated surface at one place was denoted as Δ (acceptable), and a case where there was damage•non-uniformity on the coated surface in two or more places was denoted as X (poor).

(Preparation of Alignment Layer and Preparation of Optical Anisotropic Body)

Example 29

The copolymer (ACv-1) was dissolved in N-methylpyrrolidone (NMP) to be 0.5%, and the solution was stirred at room temperature for 10 minutes. The solution was then applied to a glass plate serving as a substrate by using a spin coater and dried at 100° C. for 30 minutes.

Next, irradiation of linear polarized and parallel light of visible ultraviolet light (wavelength: 365 nm, irradiation intensity: 20 mW/cm$^2$) was performed onto the coated glass plate as a substrate using an ultrahigh-pressure mercury lamp via a wavelength cut filter, a band-pass filter, and a polarizing filter in a direction of 45 degrees with respect to the substrate. The irradiation dose was 90 mJ/cm$^2$.

The polymerizable liquid crystal composition (LC-1) was applied onto the obtained alignment layer, using a spin coater, and dried at 80° C. for 1 minute. Then, (LC-1) was polymerized by irradiation of ultraviolet rays at 1 J/cm$^2$ under a nitrogen atmosphere to obtain an optical anisotropic body.

As a result, the alignment property was A, and good alignment could be obtained at a low irradiation dose of 90 mJ/cm$^2$. The evaluation results of the optical anisotropic body for solvent resistance•chemical resistance were B. When the alignment direction was observed, homogeneous alignment was formed.

In addition, it was found that the optical anisotropic body of the present invention had high solvent resistance•chemical resistance, and further, the optical anisotropic body of the present invention was provided with an alignment property at a significantly low irradiation dose of ultraviolet rays, and the alignment direction thereof can be controlled.

Examples 30 to 43

In the same manner as in Example 29 except that the copolymers (ACv-2) to (ACv-7), (ACvV-1) to (ACvV-7) were used instead of the copolymer (ACv-1), the optical anisotropic bodies in Examples 30 to 43 were fabricated. The coatability, the alignment direction, and the liquid crystal alignment property were investigated and the results are shown in conjunction in Table 9.

TABLE 9

| | Copolymer for photo-alignment film | Coatability | Irradiation dose of linear polarized light (mJ/cm$^2$) | Polymerizable liquid crystal composition | Alignment direction | Liquid crystal alignment property |
|---|---|---|---|---|---|---|
| Example 29 | ACv-1 | O | 90 | LC-1 | Homogeneous | A |
| Example 30 | ACv-2 | O | 90 | LC-1 | Homogeneous | A |
| Example 31 | ACv-3 | O | 90 | LC-1 | Homogeneous | A |
| Example 32 | ACv-4 | O | 90 | LC-1 | Homogeneous | A |
| Example 33 | ACv-5 | O | 90 | LC-1 | Homogeneous | A |

TABLE 9-continued

| | Copolymer for photo-alignment film | Coatability | Irradiation dose of linear polarized light (mJ/cm$^2$) | Polymerizable liquid crystal composition | Alignment direction | Liquid crystal alignment property |
|---|---|---|---|---|---|---|
| Example 34 | ACv-6 | ○ | 90 | LC-1 | Homogeneous | A |
| Example 35 | ACv-7 | ○ | 90 | LC-1 | Homogeneous | A |
| Example 36 | ACvV-1 | ○ | 90 | LC-1 | Homeotropic | A |
| Example 37 | ACvV-2 | ○ | 90 | LC-1 | Homeotropic | A |
| Example 38 | ACvV-3 | ○ | 90 | LC-1 | Homeotropic | A |
| Example 39 | ACvV-4 | ○ | 90 | LC-1 | Homogeneous | A |
| Example 40 | ACvV-5 | ○ | 90 | LC-1 | Homogeneous | A |
| Example 41 | ACvV-6 | ○ | 90 | LC-1 | Homogeneous | A |
| Example 42 | ACvV-7 | ○ | 90 | LC-1 | Homogeneous | A |
| Example 43 | ACvV-7 | ○ | 90 | LC-2 | Homeotropic | A |

Comparative Examples 9 to 12

For comparison, compositions for a liquid crystal alignment layer capable of photo-alignment (AC-1), (ACV-1), (ACV-2), and (Cv-1) were prepared at the ratios shown in Table 7. Using such the compositions for a liquid crystal alignment layer capable of photo-alignment, in the same manner as in Example 29, the optical anisotropic bodies in Comparative Examples 9 to 12 were fabricated. The coatability, the alignment direction, and the liquid crystal alignment property were investigated and the results are shown in conjunction in Table 10.

TABLE 10

| | Copolymer for photo-alignment film | Coatability | Irradiation dose of linear polarized light (mJ/cm$^2$) | Polymerizable liquid crystal composition | Alignment direction | Liquid crystal alignment property |
|---|---|---|---|---|---|---|
| Comparative Example 9 | AC-1 | Δ | 90 | LC-1 | Homogeneous | A |
| Comparative Example 10 | ACV-1 | Δ | 90 | LC-1 | Homeotropic | A |
| Comparative Example 11 | ACV-2 | Δ | 90 | LC-1 | Homogeneous | A |
| Comparative Example 12 | Cv-1 | ○ | 120 | LC-1 | Homogeneous | A |

From the above results, it was found that the optical anisotropic bodies in Examples 29 to 43 also had high solvent resistance•chemical resistance, and were provided with an alignment property at a significantly low irradiation dose of ultraviolet rays during the production of the optical anisotropic bodies, and the alignment direction thereof can be controlled.

(Examples of Forming Polymer in Second Embodiment)

By the same method as in Example above in which the polymer in the first embodiment was formed and evaluated, azobenzene derivatives (P-1), and compounds (P-3) to (P-7) were obtained.

(Synthesis of Cinnamic Acid Derivative CinNp-1)

Synthesis of Methyl=3-(4-(6-(6-(2-methylacryloy-loxy)hexyloxy)naphthalene-2-carbonyloxy)phenyl-car bonyloxy-3-methoxyphenyl)acrylate
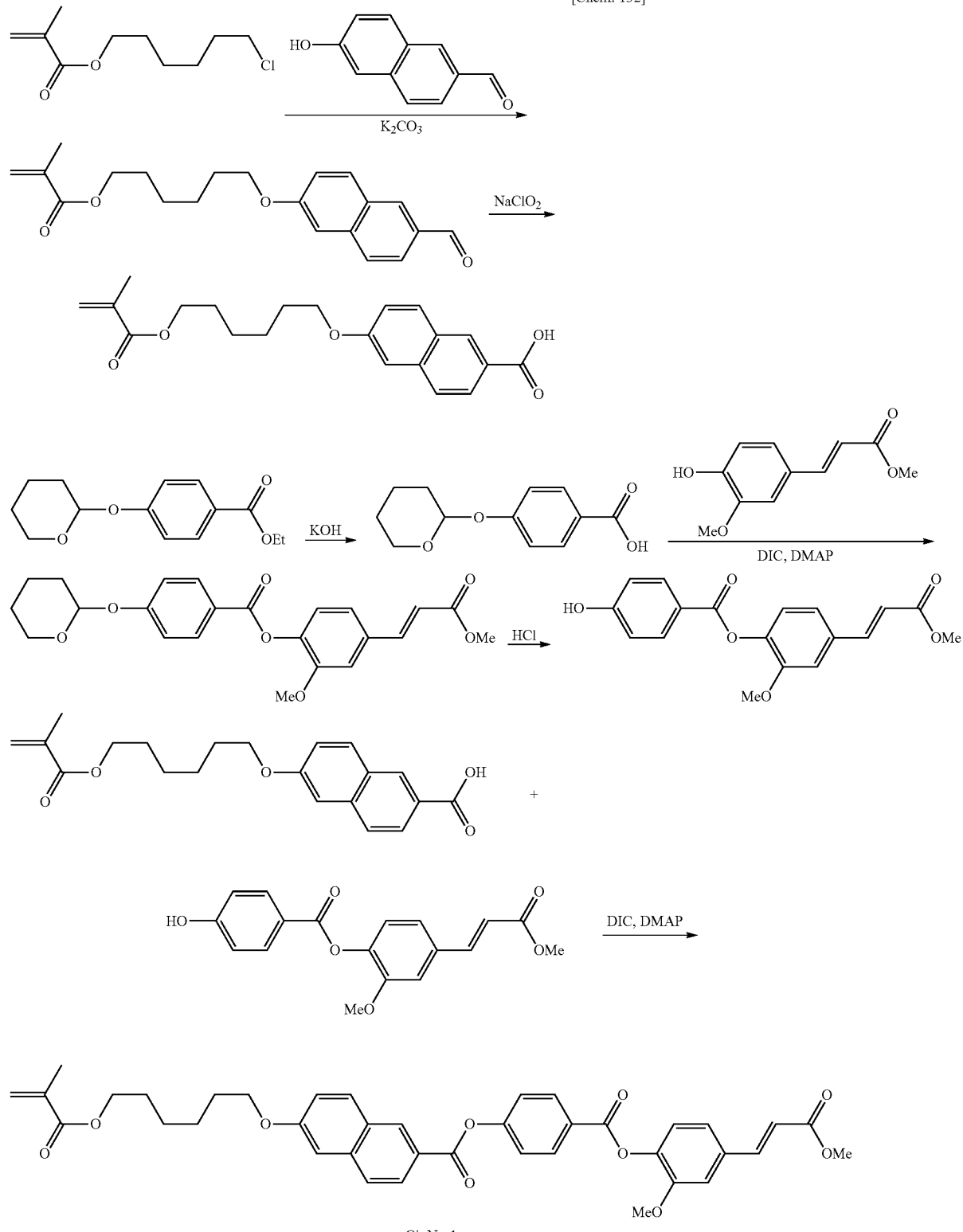
CinNp-1

Synthesis of 6-(6-(2-Methylacryloxy)hexyloxy)-2-naphthoic acid

6-Chlorohexyl-2-methylacrylate (77.2 g), 6-hydroxy-2-naphthaldehyde (50.0 g), and potassium carbonate (60.0 g) were suspended in dimethyl formamide (150 mL), and the suspension was stirred at 95° C. for 8 hours. The suspension was cooled to 25° C. and 10% hydrochloric acid was added thereto. The mixture was extracted twice with toluene. The organic phase was combined, washed with saturated saline, and dried over anhydrous sodium sulfate. The solvent was evaporated under reduced pressure to obtain a brown liquid. The mixture was purified by column chromatography to obtain 6-(6-(2-methylacryloxy)hexyloxy)-2-naphthaldehyde (118.7 g) as a yellow liquid.

6-(6-(2-Methylacryloxy)hexyloxy)-2-naphthaldehyde (118.7 g), 2-methyl-2-butene (91.5 g), and sodium dihydrogen phosphate (67.9 g) were suspended in tert-butyl alcohol (750 ml) and water (204 ml), and a solution prepared by dissolving sodium chlorite (49.2 g) in water (172 ml) was added dropwise thereto at 25° C. The mixture was stirred at 25° C. for 8 hours. Thereafter, the mixture was stirred at 5° C. for 1 hour and the precipitated solid was collected by filtration. The solid was purified by reprecipitation to obtain 6-(6-(2-methylacryloxy)hexyloxy)-2-naphthoic acid (83.8 g) as a yellow powder.

$^1$H-NMR (400 MHz, CDCl$_3$) δ: 1.46-1.62 (m, 4H), 1.75 (dt, J=7.0 Hz, J=14.6 Hz, 2H), 1.89 (dt, J=6.9 Hz, J=14.6 Hz, 2H), 1.94 (s, 3H), 4.11 (t, J=6.5 Hz, 2H), 4.18 (t, J=6.6 Hz, 2H), 5.55 (s, 1H), 6.10 (s, 1H), 7.16 (bs, 1H), 7.22 (dd, J=2.4 Hz, J=8.8 Hz, 1H), 7.77 (d, J=8.8 Hz, 1H), 7.87 (d, J=9.0 Hz, 1H), 8.08 (dd, J=1.7 Hz, J=8.5 Hz, 1H), 8.63 (s, 1H)

Synthesis of Methyl-3-(4-(4-hydroxybenzoyloxy)-3-methoxyphenyl)acrylate

Ethyl-4-(3,4,5,6-tetrahydropyran-2-yloxy)benzoic acid (10.0 g) was dissolved in dimethoxyethane (60 mL), and a 5% aqueous potassium hydroxide solution (65.0 g) was added thereto at 25° C. The mixture was stirred at 60° C. for 2 hours, toluene was then added thereto to separate the organic phase and the aqueous phase. The aqueous phase was neutralized with a 1 M aqueous sodium hydrogen sulfate solution, and the precipitated solid was collected by filtration. The solid was dried under reduced pressure to obtain 4-(3,4,5,6-tetrahydropyran-2-yloxy)benzoic acid (8.88 g) as a colorless powder.

4-(3,4,5,6-Tetrahydropyran-2-yloxy)benzoic acid (7.33 g), methyl-4-hydroxy-3-methoxycinnamate (6.87 g), and 4-dimethylaminopyridine (DMAP, 0.20 g) were suspended in dichloromethane (48 ml), and diisopropylcarbodiimide (DIC, 5.41 g) was added dropwise thereto at 25° C. After stirring at 25° C. for 2 hours, the solvent was evaporated under reduced pressure. Methanol (50 ml) was added thereto and the precipitated solid was collected by filtration. The residue was purified by column chromatography and reprecipitation to obtain methyl-3-(4-(4-(3,4,5,6-tetrahydropyran-2-yloxy)benzoyloxy)-3-methoxyphenyl)acrylate (13.8 g) as a colorless powder.

Methyl-3-(4-(4-(3,4,5,6-tetrahydropyran-2-yloxy)benzoyloxy)-3-methoxyphenyl)acrylate (6.9 g) was dissolved in dichloromethane (35 ml) and methanol (35 ml), and 30% hydrochloric acid (0.35 ml) was added thereto at 25° C. The mixture was stirred at 25° C. for 8 hours and neutralized by the addition of a 5% aqueous sodium hydrogen carbonate solution. The organic phase was collected by separation and the aqueous phase was extracted with dichloromethane. The organic phase was combined, washed with saturated saline, and dried over anhydrous sodium sulfate. The solvent was evaporated under reduced pressure to obtain a pale brown solid. The solid was washed with hexane to obtain methyl-3-(4-(4-hydroxybenzoyloxy)-3-methoxyphenyl)acrylate (5.24 g) as a pale brown powder.

$^1$H-NMR (400 MHz, CDCl$_3$) δ: 3.82 (s, 3H), 3.84 (s, 3H), 5.60 (bs, 1H), 6.42 (d, J=16.1 Hz, 1H), 6.92 (d, J=8.5 Hz, 2H), 7.15 (d, J=12.0 Hz, 1H), 7.17 (s, 2H), 7.68 (d, J=15.9 Hz, 1H), 8.13 (d, J=8.5 Hz, 2H)

Synthesis of Methyl=3-(4-(6-(6-(2-methylacryloyloxy)hexyloxy)naphthalene-2-carbonyloxy)phenylcarbonyloxy-3-methoxyphenyl)acrylate Methyl=3-(4-(4-hydroxybenzoyloxy)-3-methoxyphenyl)acrylate (5.0 g), 6-(6-(2-methylacryloyloxy)hexyloxy)-2-naphthoic acid (5.43 g), and DMAP (0.092 g) were suspended in dichloromethane (50 ml), and DIC (2.49 g) was added dropwise thereto at 25° C. After stirring at 25° C. for 2 hours, the solvent was evaporated under reduced pressure. Methanol (50 ml) was added thereto and the precipitated solid was collected by filtration. The residue was purified by column chromatography and recrystallization to obtain methyl=3-(4-(6-(6-(2-methylacryloyloxy)hexyloxy)naphthalene-2-carbonyloxy)phenylcarbonyloxy-3-methoxyphenyl)acrylate as colorless powder (9.26 g). Transition temperature Cr 141 Iso.

$^1$H-NMR (400 MHz, CDCl$_3$) δ: 1.46-1.64 (m, 4H), 1.75 (dt, J=7.0 Hz, J=14.4 Hz, 2H), 1.86-2.00 (m, 2H), 1.95 (s, 3H), 3.84 (s, 3H), 3.86 (s, 3H), 4.12 (t, J=6.4 Hz, 2H), 4.18 (t, J=6.5 Hz, 2H), 5.55 (t, J=1.5 Hz, 1H), 6.10 (s, 1H), 6.42 (d, J=16.1 Hz, 1H), 7.05-7.28 (m, 5H), 7.42 (d, J=8.3 Hz, 2H), 7.68 (d, J=16.1 Hz, 1H), 7.82 (d, J=8.8 Hz, 1H), 7.90 (d, J=9.0 Hz, 1H), 8.15 (dd, J=1.7 Hz, J=8.5 Hz, 1H), 8.32 (d, J=6.8 Hz, 2H), 8.72 (s, 1H)

(Synthesis of Compounds CinNp-2 to CinNp-7)

By the same method as above except for changing the materials, the following compounds CinNp-2 to CinNp-7 were synthesized.

[Chem. 133]

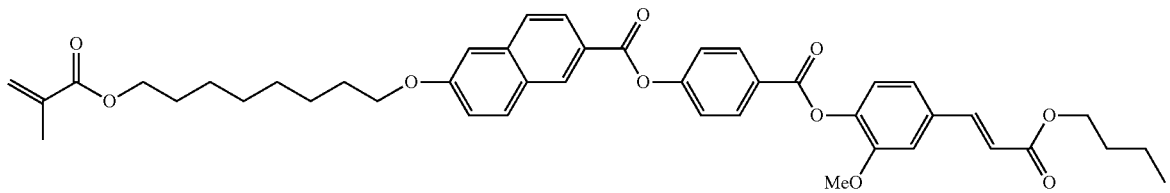

CinNp-2

-continued

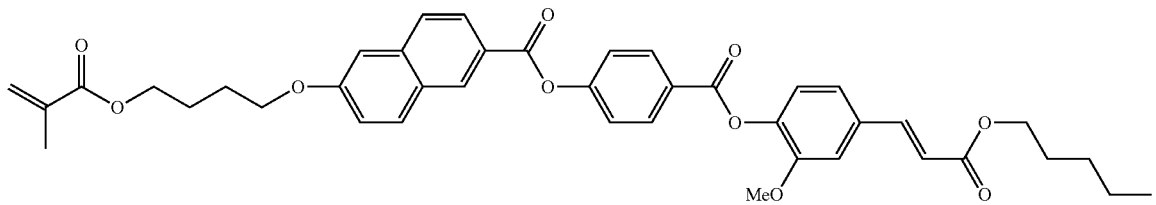
CinNp-3

[Chem. 134]

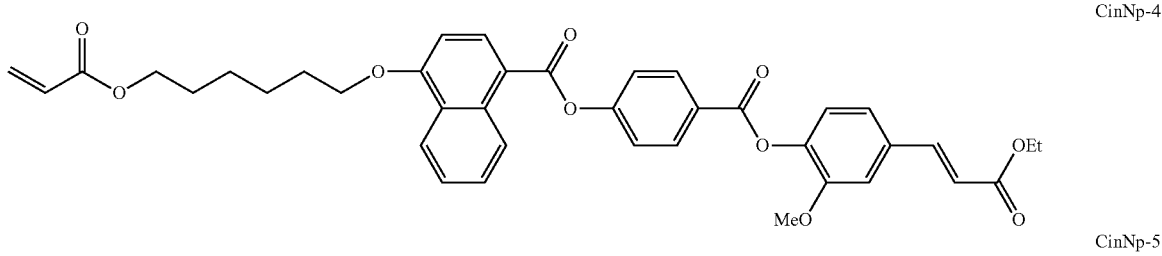
CinNp-4

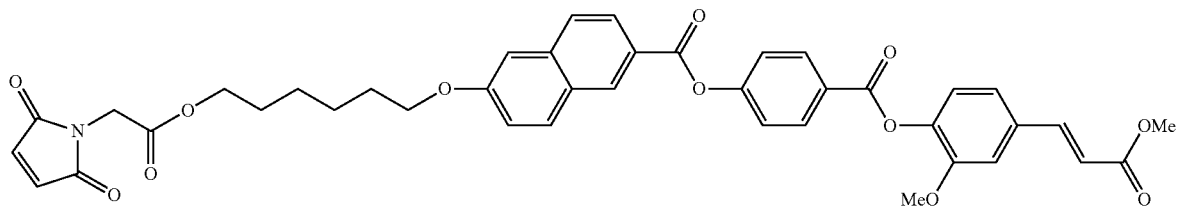
CinNp-5

[Chem. 135]

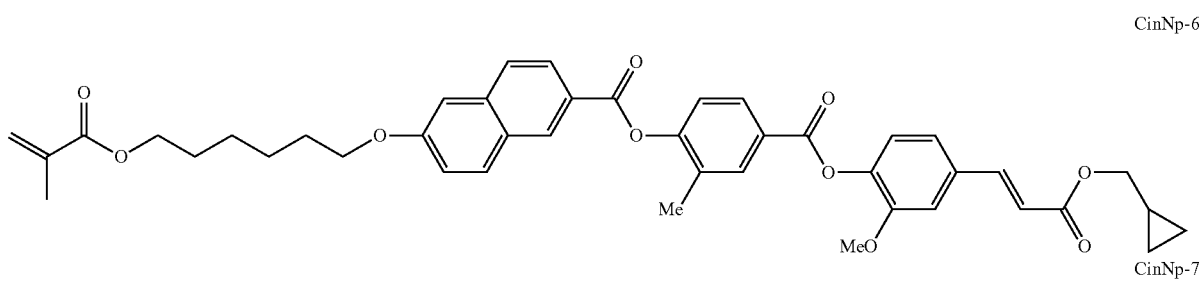
CinNp-6

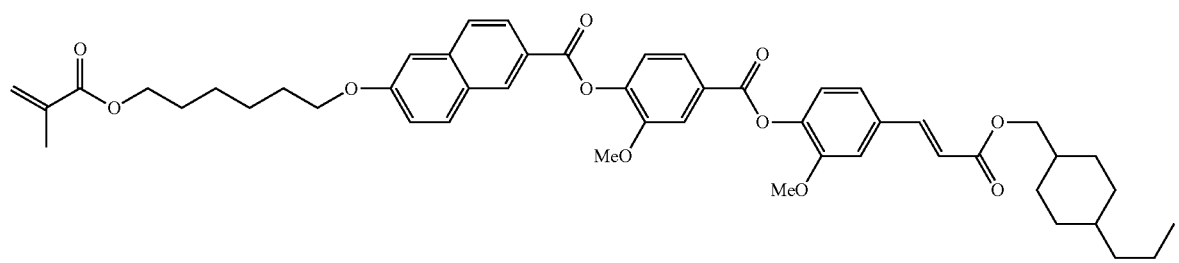
CinNp-7

(Synthesis of Monomer for Copolymerization)

By the same method as shown in Example of the first embodiment, monomers for copolymerization (V-1) to (V-4) were prepared.

(Preparation of Copolymer (ACnp-1))

Example 44

Using the same method as that described in "Preparation of Copolymer (ACv-1)" in Example of the first embodiment except that 9.66 parts (9.5 mmol) of a compound represented by the formula (CinNp-1) was used instead of 9.66 parts of the compound represented by the formula (Cinv-1), a copolymer (ACnp-1) was obtained.

(Preparation of Copolymers (ACnp-2) to (ACnp-7))

In the same manner as the copolymer (ACnp-1), copolymers (ACnp-2) to (ACnp-7) were obtained. The composition of each of the copolymers is as shown in Tables 1 and 2.

Further, (ACnp-2) to (ACnp-7) were assumed to be (Example 45) to (Example 50).

TABLE 11

| Sample name | | | | Blending amount | | |
|---|---|---|---|---|---|---|
| | P-1 | P-2 | P-3 | CinNp-1 | CinNp-2 | CinNp-3 |
| Example 44 ACnp-1 | 5 | | | 95 | | |
| Example 45 ACnp-2 | | 5 | | | 95 | |
| Example 46 ACnp-3 | | | 5 | | | 95 |

TABLE 12

| Sample name | P-4 | P-5 | P-6 | CinNp-4 | CinNp-5 | CinNp-6 | CinNp-7 |
|---|---|---|---|---|---|---|---|
| Example 47 ACnp-4 | 5 | | | 95 | | | |
| Example 48 ACnp-5 | | 5 | | | 95 | | |
| Example 49 ACnp-6 | | | 5 | | | 95 | |
| Example 50 ACnp-7 | 5 | | | | | | 95 |

(Preparation of Copolymers (ACnpV-1) to (ACnpV-7))

In the same manner as the copolymer (ACnp-1), polymers (ACnpV-1) to (ACnpV-7) were obtained. The composition of each of the copolymers is as shown in Tables 13 and 14.

Further, (ACnpV-1) to (ACnpV-7) were assumed to be (Example 51) to (Example 57).

TABLE 13

| Sample name | | | | Blending amount | | | | |
|---|---|---|---|---|---|---|---|---|
| | P-1 | P-2 | P-3 | CinNp-1 | CinNp-2 | CinNp-3 | V-1 | V-2 |
| Example 51 ACnpV-1 | 5 | | | 65 | | | 30 | |
| Example 52 ACnpV-2 | | 5 | | | 65 | | | 30 |
| Example 53 ACnpV-3 | | | 5 | | | 65 | 30 | |

TABLE 14

| Sample name | | | | Blending amount | | | | | |
|---|---|---|---|---|---|---|---|---|---|
| | P-4 | P-5 | P-6 | CinNp-4 | CinNp-5 | CinNp-6 | CinNp-7 | V-3 | V-4 |
| Example 54 ACnpV-4 | 5 | | | 65 | | | | 30 | |
| Example 55 ACnpV-5 | | 5 | | | 65 | | | | 30 |
| Example 56 ACnpV-6 | | | 5 | | | 65 | | 30 | |
| Example 57 ACnpV-7 | 5 | | | | | | 65 | | 30 |

(Fabrication of Alignment Layer and Liquid Crystal Display Element)

Example 58

The copolymer (ACnp-1) was dissolved in cyclopentanone to be 0.8% and the solution was stirred at room temperature for 10 minutes. Then, the solution was applied onto a glass plate as a substrate, using a spin coater, and dried at 100° C. for 3 minutes. Then, the surface was visually observed and as a result, it was found that a polymer was uniformly applied on the glass plate to form a smooth film.

Next, irradiation of linear polarized and parallel light of visible ultraviolet light (wavelength: 365 nm, irradiation intensity: 10 mW/cm$^2$) was performed onto the coated glass plate as a substrate using an ultrahigh-pressure mercury lamp via a wavelength cut filter, a band-pass filter, and a polarizing filter in a direction of 45 degrees with respect to the substrate. The irradiation dose was 90 mJ/cm$^2$.

A liquid crystal cell was fabricated by using the coated glass plate prepared by the method above. The gap between the plates was set to 10 μm and the two glass plates were bonded in the anti-parallel direction. Next, the evaluation was conducted by the same method as denoted in the first embodiment. That is, a nematic liquid crystal mixture having a negative dielectric anisotropy with a composition described below was charged into the cell at a temperature just exceeding a transparent point (Tc=84.4° C.), and then cooled to room temperature. A polarizing plate was placed on the top and the bottom of the liquid crystal cell, and a back light was placed therebelow. The light transmittance was changed by rotating the liquid crystal cell by 90 degrees and dark-light contrast was clearly observed and there was no abnormal domain and alignment non-uniformity, from which it was confirmed that the liquid crystals were normally aligned. The tilt angle of the liquid crystal in the cell was optically measured by a crystal rotation method, and the pretilt angle was found to be 0.8 degrees. A voltage of 5 V was applied to this liquid crystal cell for an application time of 60 microseconds at a span of 167 milliseconds, and then the voltage holding ratio after 167 milliseconds from the release of the voltage was measured by means of "VHR-AMP01" manufactured by TOYO Corporation at 23° C., and as a result, the voltage holding ratio (VHR) was found to be 99.3%.

[Chem. 136]

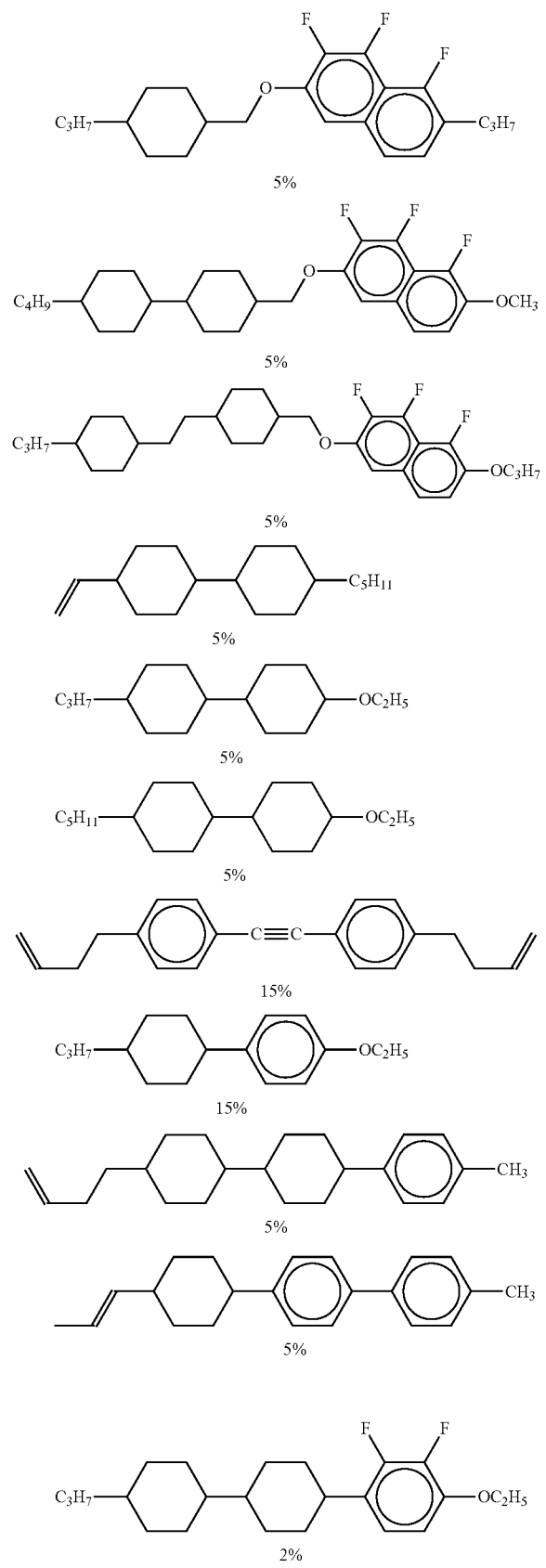

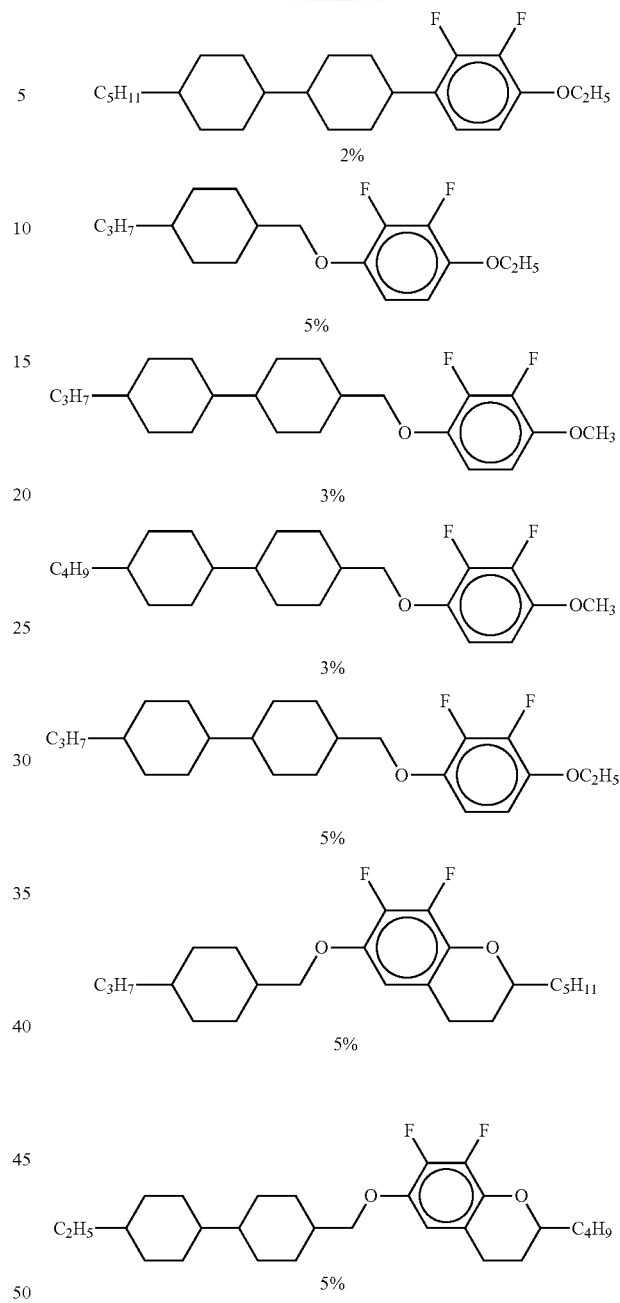

Hereinafter, in the same manner as the cinnamic acid polymer (ACnp-1), with respect to (ACnp-2) to (ACnp-7) and to (ACnpV-1) to (ACnpV-7), alignment layers were fabricated and liquid crystal cells were fabricated. The measurement results of the irradiation doses of linear polarized light, liquid crystal alignment property, pretilt angle, and VHR are shown in conjunction in Tables 15 and 16.

Further, Examples with respect to (ACnp-1) to (ACnp-7) were assumed to be (Example 48) to (Example 64), and Examples with respect to (ACnpV-1) to (ACnpV-7) were assumed to be (Example 65) to (Example 71).

For the evaluation of the liquid crystal alignment property, the pretilt angle, and the VHR, the same evaluation criteria as in Example of the first embodiment were used.

TABLE 15

| Sample name | Irradiation dose of linear polarized light (mJ/cm$^2$) | Liquid crystal alignment property | Pretilt angle | VHR |
|---|---|---|---|---|
| Example 58 | ACnp-1 | 90 | O | P | O |
| Example 59 | ACnp-2 | 90 | O | P | O |
| Example 60 | ACnp-3 | 90 | O | P | O |
| Example 61 | ACnp-4 | 90 | O | P | O |
| Example 62 | ACnp-5 | 90 | O | P | O |
| Example 63 | ACnp-6 | 90 | O | P | O |
| Example 64 | ACnp-7 | 90 | O | P | O |

TABLE 16

| Sample name | Irradiation dose of linear polarized light (mJ/cm$^2$) | Liquid crystal alignment property | Pretilt angle | VHR |
|---|---|---|---|---|
| Example 65 | ACnpV-1 | 90 | O | V | O |
| Example 66 | ACnpV-2 | 90 | O | V | O |
| Example 67 | ACnpV-3 | 90 | O | V | O |
| Example 68 | ACnpV-4 | 90 | O | P | O |
| Example 69 | ACnpV-5 | 90 | O | P | O |
| Example 70 | ACnpV-6 | 90 | O | P | O |
| Example 71 | ACnpV-7 | 90 | O | P | O |

From the above results, it was found that an alignment layer, which allows a low irradiation dose of linear polarized light, and has a superior liquid crystal alignment property and a superior ability to control the pretilt, and exhibits a high voltage holding ratio, can be obtained, by the polymer in the second embodiment of the present invention.

Comparative Examples 13 to 16

For comparison, the cinnamic acid derivative (D-2) was synthesized in the same manner as in Comparative Example shown in Example of the first embodiment.

Further, by the same method as in Example 44, copolymers (AC-1), (ACV-1), (ACV-2) and (Cv-1') were prepared at the ratios shown in Table 17. The composition of each of the copolymers is as shown in Table 17.

In addition, (AC-1) was assumed to be (Comparative Example 13), (ACV-1) was assumed to be (Comparative Example 14), (ACV-2) was assumed to be (Comparative Example 15), and (Cv-1') was assumed to be (Comparative Example 16).

Comparative Examples 13 to 16 in Table 17 are the same as Comparative Examples 1 to 3 shown in Example of the first embodiment.

TABLE 17

| | Sample name | Blending amount | | | | |
| | | P-3 | D-2 | CinNp-4 | V-1 | V-3 |
|---|---|---|---|---|---|---|
| Comparative Example 13 | AC-1 | 5 | 95 | | | |
| Comparative Example 14 | ACV-1 | 5 | 65 | | 30 | |
| Comparative Example 15 | ACV-2 | 5 | 65 | | | 30 |
| Comparative Example 16 | Cv-1' | | | 100 | | |

Furthermore, alignment layer were fabricated using the samples by the same method as in Example 58, and thus, various measurements were conducted and the results therefrom are shown in Table 18.

Further, Comparative Example with respect to (AC-1) was assumed to be (Comparative Example 17), Comparative Example with respect to (ACV-1) was assumed to be (Comparative Example 18), Comparative Example with respect to (ACV-2) was assumed to be (Comparative Example 19), and Comparative Example with respect to (Cv-1') was assumed to be (Comparative Example 20). However, Comparative Examples 17 to 19 in Table 18 are the same as Comparative Example 5 to 7 in Example of the first embodiment.

TABLE 18

| | Sample name | Irradiation dose of linear polarized light (mJ/cm$^2$) | Liquid crystal alignment property | Pretilt angle | VHR |
|---|---|---|---|---|---|
| Comparative Example 17 | AC-1 | 100 | O | P | O |
| Comparative Example 18 | ACV-1 | 100 | O | V | O |
| Comparative Example 19 | ACV-2 | 100 | O | P | O |
| Comparative Example 20 | Cv-1' | 300 | O | P | O |

Therefore, it was found that a liquid crystal alignment layer which has the effects of allowing a low irradiation dose of linear polarized light, having a superior ability to control the alignment of the liquid crystals and the pretilt angles, and exhibiting a high voltage holding ratio (VHR), and a display element using the composition can be obtained by the present invention.

(Preparation of Polymerizable Liquid Crystal Composition (LC-1))

Using the same method as that described in "Preparation of Polymerizable Liquid Crystal Composition (LC-1)" in Example of the first embodiment, a polymerizable liquid crystal composition (LC-1) was obtained.

(Preparation of Polymerizable Liquid Crystal Composition (LC-2)

Using the same method as that described in "Preparation of Polymerizable Liquid Crystal Composition (LC-2)" in Example of the first embodiment, a polymerizable liquid crystal composition (LC-2) was obtained.

(Method for Evaluating Alignment Property)

The alignment property of the optical anisotropic body was evaluated by the same method as "Method for Evaluating Alignment Property" used in Example of the first embodiment.

(Preparation of Alignment Layer and Preparation of Optical Anisotropic Body)

Example 72

In the same manner as in Example of the first embodiment except that the irradiation dose was set to 80 mJ/cm$^2$, and the copolymer (ACnp-1) was used, an optical anisotropic body was obtained.

As a result, the alignment property was A, and good alignment could be obtained with a low irradiation dose of 80 mJ/cm$^2$. Further, the alignment direction was observed, and as a result, a smooth film was obtained by uniform coating with homogeneous alignment.

It was found that with respect to the optical anisotropic body of the present invention, an alignment property can be provided at a significantly low irradiation dose of ultraviolet rays during the production, the alignment direction can be controlled, and a smooth film surface can be produced.

Examples 73 to 86

In the same manner as in Example 72 except that the copolymers (ACnp-2) to (ACnp-7), and (ACnpV-1) to (ACnpV-7) were used instead of the copolymer (ACnp-1), the optical anisotropic bodies in Examples 73 to 86 were fabricated. The alignment direction, the smoothness of the film surface, and the liquid crystal alignment property were investigated and the results are shown in conjunction in Table 19.

TABLE 19

| | Copolymer for photo-alignment film | Irradiation dose of linear polarized light (mJ/cm²) | Polymerizable liquid crystal composition | Alignment direction | Smoothness of film surface | Liquid crystal alignment property |
|---|---|---|---|---|---|---|
| Example 72 | ACnp-1 | 80 | LC-1 | Homogeneous | ○ | A |
| Example 73 | ACnp-2 | 80 | LC-1 | Homogeneous | ○ | A |
| Example 74 | ACnp-3 | 80 | LC-1 | Homogeneous | ○ | A |
| Example 75 | ACnp-4 | 80 | LC-1 | Homogeneous | ○ | A |
| Example 76 | ACnp-5 | 80 | LC-1 | Homogeneous | ○ | A |
| Example 77 | ACnp-6 | 80 | LC-1 | Homogeneous | ○ | A |
| Example 78 | ACnp-7 | 80 | LC-1 | Homogeneous | ○ | A |
| Example 79 | ACnpV-1 | 80 | LC-1 | Homeotropic | ○ | A |
| Example 80 | ACnpV-2 | 80 | LC-1 | Homeotropic | ○ | A |
| Example 81 | ACnpV-3 | 80 | LC-1 | Homeotropic | ○ | A |
| Example 82 | ACnpV-4 | 80 | LC-1 | Homogeneous | ○ | A |
| Example 83 | ACnpV-5 | 80 | LC-1 | Homogeneous | ○ | A |
| Example 84 | ACnpV-6 | 80 | LC-1 | Homogeneous | ○ | A |
| Example 85 | ACnpV-7 | 80 | LC-1 | Homogeneous | ○ | A |
| Example 86 | ACnpV-7 | 80 | LC-2 | Homeotropic | ○ | A |

Comparative Examples 21 to 24

For comparison, compositions for a liquid crystal alignment layer capable of photo-alignment (AC-1), (ACV-1), (ACV-2), and (Cv-1') were prepared at the ratios shown in Table 17. Using such the compositions for a liquid crystal alignment layer capable of photo-alignment, in the same manner as in Example 72, the optical anisotropic bodies in Comparative Examples 21 to 24 were prepared. The alignment direction, the smoothness of the film surface, and the liquid crystal alignment property were investigated and the results are shown in conjunction in Table 20. However, the optical anisotropic bodies in Comparative Examples 21 to 23 in Table below are the same as the optical anisotropic bodies in Comparative Examples 9 to 11 in Example of the first embodiment.

TABLE 20

| | Copolymer for photo-alignment film | Irradiation dose of linear polarized light | Polymerizable liquid crystal composition | Alignment direction | Smoothness of film surface | Liquid crystal alignment property |
|---|---|---|---|---|---|---|
| Comparative Example 21 | AC-1 | 90 | LC-1 | Homogeneous | Δ | A |
| Comparative Example 22 | ACV-1 | 90 | LC-1 | Homeotropic | Δ | A |

TABLE 20-continued

| | Copolymer for photo-alignment film | Irradiation dose of linear polarized light | Polymerizable liquid crystal composition | Alignment direction | Smoothness of film surface | Liquid crystal alignment property |
|---|---|---|---|---|---|---|
| Comparative Example 23 | ACV-2 | 90 | LC-1 | Homogeneous | Δ | A |
| Comparative Example 24 | Cv-1' | 120 | LC-1 | Homogeneous | ○ | A |

From the above results, it was found that with respect also to the optical anisotropic bodies in Examples 72 to 86, an alignment property can be provided at a significantly low irradiation dose of ultraviolet rays during the production, the alignment direction can be controlled, and a smooth film surface can be prepared.

(Examples of Forming Polymer in Third Embodiment)

By the same method as in Example in which the polymer in the first embodiment was formed and evaluated, azobenzene derivatives (P-1), and compounds (P-3) to (P-7) were obtained.

(Synthesis of Cinnamic Acid Derivative Cinn-1)

[Chem. 137]

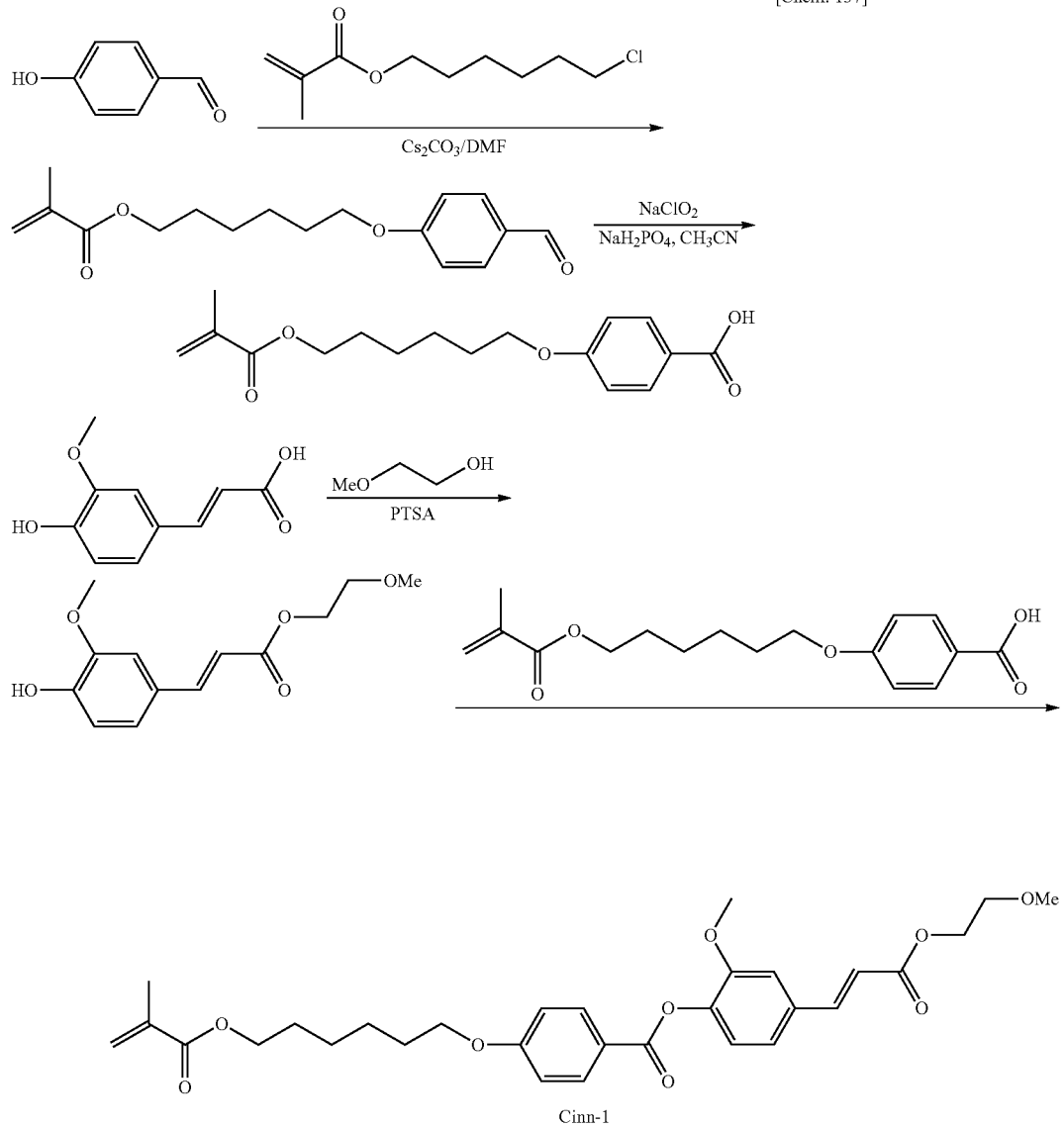

Cinn-1

By the same method as that described in "Synthesis of Cinnamic Acid Derivative Cinv-1" described in Example of the first embodiment, 4-(6-methacryloyloxy)benzoic acid (22 g) was obtained as a white solid.

30 g of 4-hydroxy-3-methoxycinnamic acid, 20 g of 2-methoxyethanol, and 3 g of p-toluenesulfonic acid were dissolved in 200 ml of cyclohexane and 20 ml of diisopropyl ether, and the mixture was heated to reflux for 6 hours while removing water produced. The reaction solution was cooled to room temperature, 100 ml of ethyl acetate was added thereto, and the mixture was washed with saturated sodium bicarbonate, water, and saturated saline, and then dried by the addition of sodium sulfate. Sodium sulfate was removed and the solvent was evaporated under reduced pressure to obtain 2-methoxyethyl 4-hydroxy-3-methoxycinnamate (30 g) as a white solid.

Next, 15.1 g of the obtained 2-methoxyethyl 4-hydroxy-3-methoxycinnamate, 20.2 g of 4-(6-methacryloyloxy)benzoic acid, and 0.9 g of 4,4-dimethylaminopyridine were dissolved in 300 ml of dichloromethane, and the solution was cooled to 3° C. under a nitrogen atmosphere. 9.1 g of diisopropylcarbodiimide diluted with 100 ml of dichloromethane was added dropwise thereto, and the mixture was stirred at room temperature for 8 hours. The reaction solution was filtered and the solid was removed. Then, the residue was washed with 10% hydrochloric acid and saturated saline, and dried by the addition of sodium sulfate. Sodium sulfate was removed and the residue was purified by column chromatography (alumina/silica gel, hexane/dichloromethane). The solvent was evaporated under reduced pressure and the residue was recrystallized with methanol to obtain Cinn-1 (21.7 g) as a white solid.

$^1$H-NMR (400 MHz, CDCl$_3$) δ: 1.41-1.59 (m, 4H), 1.73 (tt, 2H), 1.84 (tt, 2H), 1.94 (s, 3H), 3.43 (s, 3H), 3.68 (t, J=4.6 Hz, 2H), 3.84 (s, 3H), 4.05 (t, J=6.4 Hz, 2H), 4.17 (t, J=6.4 Hz, 2H), 4.38 (t, J=4.6 Hz, 2H), 5.55 (s, 1H), 6.10 (s, 1H), 6.47 (d, J=15.8 Hz, 1H), 6.96 (d, J=8.8 Hz, 2H), 7.16 (s+d+d, 3H), 7.70 (d, J=15.8 Hz, 1H), 8.14 (d, J=8.8 Hz, 2H),

EI-MS: 540[M$^+$]

(Synthesis of Compounds Cinn-3 to Cinn-7)

Similarly, the following compounds Cinn-3 to Cinn-7 were synthesized.

[Chem. 138]

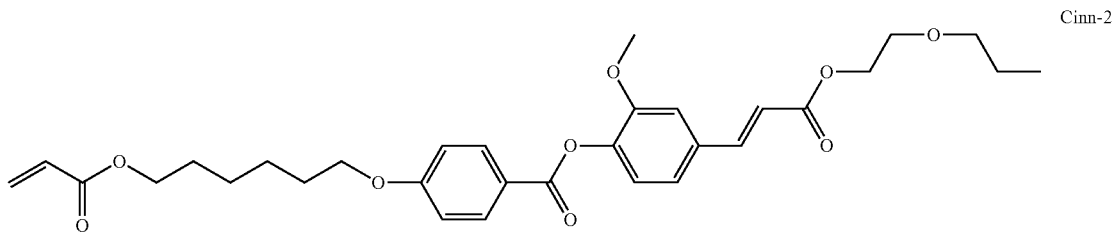

Cinn-2

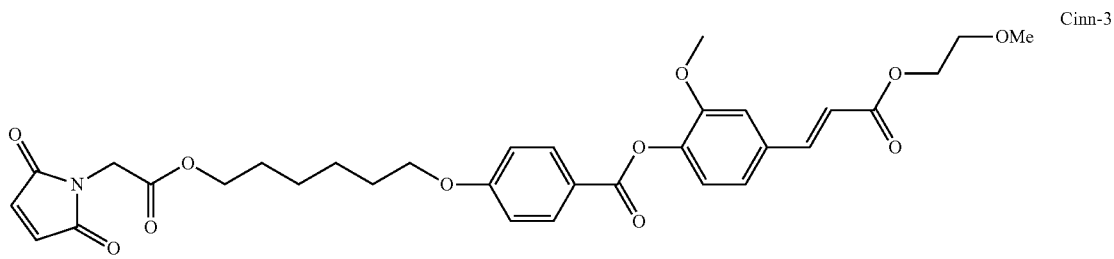

Cinn-3

[Chem. 139]

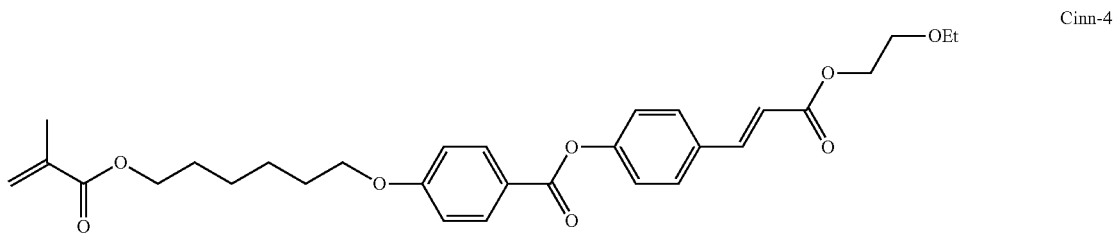

Cinn-4

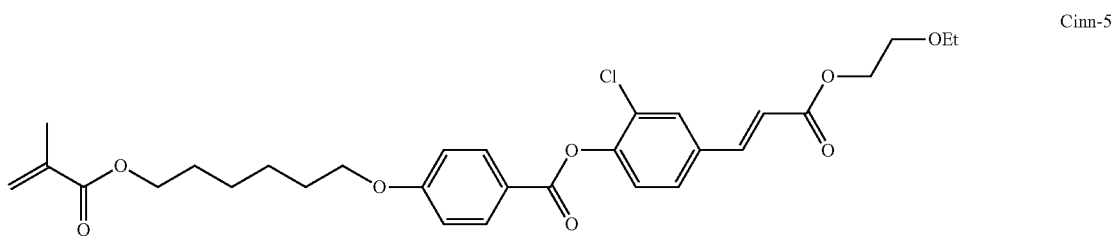

Cinn-5

[Chem. 140]

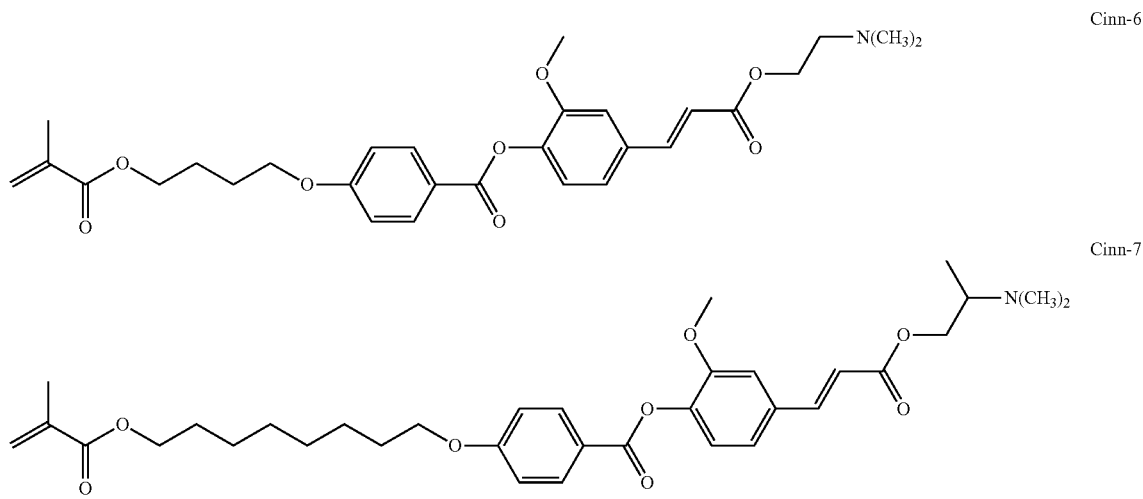

(Synthesis of Monomer for Copolymerization)

By the same method as in Example of the first embodiment, monomers for copolymerization (V-1) to (V-4) were prepared.

(Preparation of Copolymer (ACe-1))

Example 87

Using the same method as that described in "Preparation of Copolymer (ACv-1)" in Example of the first embodiment except that 9.66 parts (9.5 mmol) of a compound represented by the formula (Cinn-1) was used instead of 9.66 parts of the compound represented by the formula (Cinv-1), a copolymer (ACe-1) was obtained.

(Preparation of Copolymers (ACe-2) to (ACe-7))

In the same manner as the copolymer (ACe-1), copolymers (ACe-2) to (ACe-7) were obtained. The composition of each of the copolymers is as shown in Tables 21 and 22.

Further, (ACe-2) to (ACe-7) were assumed to be (Example 88) to (Example 93).

TABLE 21

| Sample name | Blending amount | | | | | |
|---|---|---|---|---|---|---|
| | P-1 | P-2 | P-3 | Cinn-1 | Cinn-2 | Cinn-3 |
| Example 87 ACe-1 | 5 | | | 95 | | |
| Example 88 ACe-2 | | 5 | | | 95 | |
| Example 89 ACe-3 | | | 5 | | | 95 |

TABLE 22

| Sample name | Blending amount | | | | | | |
|---|---|---|---|---|---|---|---|
| | P-4 | P-5 | P-6 | Cinn-4 | Cinn-5 | Cinn-6 | Cinn-7 |
| Example 90 ACe-4 | 5 | | | 95 | | | |
| Example 91 ACe-5 | | 5 | | | 95 | | |
| Example 92 ACe-6 | | | 5 | | | 95 | |
| Example 93 ACe-7 | 5 | | | | | | 95 |

(Preparation of Copolymers (ACeV-1) to (ACeV-7))

In the same manner as the copolymer (ACe-1), polymers (ACeV-1) to (ACeV-7) were obtained. The composition of each of the copolymers is as shown in Tables 3 and 4.

Further, (ACeV-1) to (ACeV-7) were assumed to be (Example 94) to (Example 100).

TABLE 23

| Sample name | Blending amount | | | | | | | |
|---|---|---|---|---|---|---|---|---|
| | P-1 | P-2 | P-3 | Cinn-1 | Cinn-2 | Cinn-3 | V-1 | V-2 |
| Example 94 ACeV-1 | 5 | | | 65 | | | 30 | |
| Example 95 ACeV-2 | | 5 | | | 65 | | | 30 |
| Example 96 ACeV-3 | | | 5 | | | 65 | 30 | |

TABLE 24

| Sample name | Blending amount | | | | | | | | |
|---|---|---|---|---|---|---|---|---|---|
| | P-4 | P-5 | P-6 | Cinn-4 | Cinn-5 | Cinn-6 | Cinn-7 | V-3 | N-4 |
| Example 97 ACeV-4 | 5 | | | 65 | | | | 30 | |
| Example 98 ACeV-5 | | 5 | | | 65 | | | | 30 |
| Example 99 ACeV-6 | | | 5 | | | 65 | | 30 | |
| Example 100 ACeV-7 | 5 | | | | | | 65 | | 30 |

(Fabrication of Alignment Layer and Liquid Crystal Display Element)

Example 101

The copolymer (ACe-1) was dissolved in cyclopentanone to be 0.8% and the solution was stirred at room temperature for 10 minutes. Then, the solution was applied onto a glass plate as a substrate, using a spin coater, and dried at 100° C. for 3 minutes. Then, the surface was visually observed and as a result, it was found that a polymer was uniformly applied on the glass plate to form a smooth film.

Next, irradiation of linear polarized and parallel light of visible ultraviolet light (wavelength: 365 nm, irradiation intensity: 10 mW/cm$^2$) was performed onto the coated glass plate as a substrate using an ultrahigh-pressure mercury lamp via a wavelength cut filter, a band-pass filter, and a polarizing filter in a direction of 45 degrees with respect to the substrate. The irradiation dose was 100 mJ/cm$^2$.

A liquid crystal cell was fabricated by using the coated glass plate prepared by the method above. The gap between the plates was set to 10 μm and the two glass plates were bonded in the anti-parallel direction. Next, the evaluation was conducted by the same method as described in the first embodiment. That is, a nematic liquid crystal mixture having a negative dielectric anisotropy with a composition described below was charged into the cell at a temperature just exceeding a transparent point (Tc=84.4° C.), and then cooled to room temperature. A polarizing plate was placed on the top and the bottom of the liquid crystal cell, and a back light was placed therebelow. The light transmittance was changed by rotating the liquid crystal cell by 90 degrees and dark-light contrast was clearly observed and there was no abnormal domain and alignment non-uniformity, from which it was confirmed that the liquid crystals were normally aligned. The tilt angle of the liquid crystal in the cell was optically measured by a crystal rotation method, and the pretilt angle was found to be 1 degree. A voltage of 5 V was applied to this liquid crystal cell for an application time of 60 microseconds at a span of 167 milliseconds, and then the voltage holding ratio after 167 milliseconds from the release of the voltage was measured by means of "VHR-AMP01" manufactured by TOYO Corporation at 23° C., and as a result, the voltage holding ratio (VHR) was found to be 99.1%.

Further, a square wave of 60 Hz/±10 V having a voltage of DC 10 V superimposed therewith was applied to this liquid crystal cell at 60° C. for 60 minutes, and short-circuited for 1 second, and 10 minutes later, the residual voltage (RDC) in the liquid crystal cell was measured, and as a result, it was found to be 48 mV.

[Chem. 141]

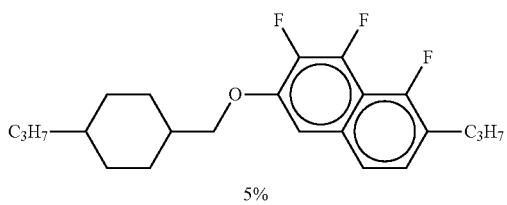

5%

-continued

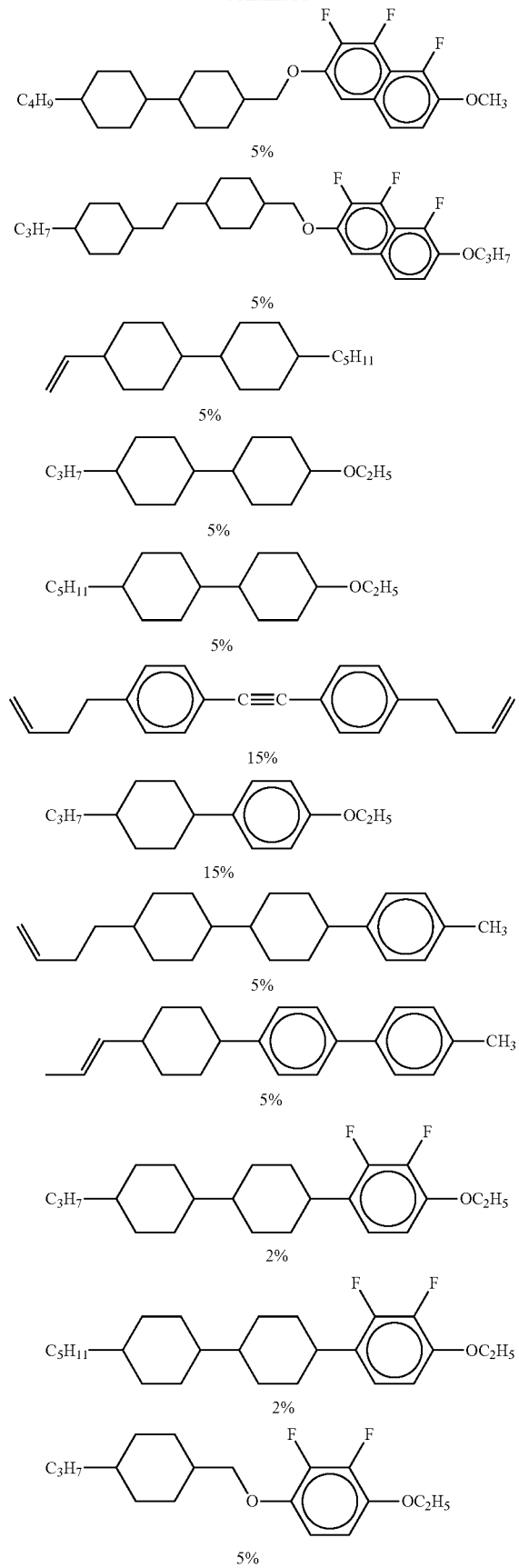

-continued

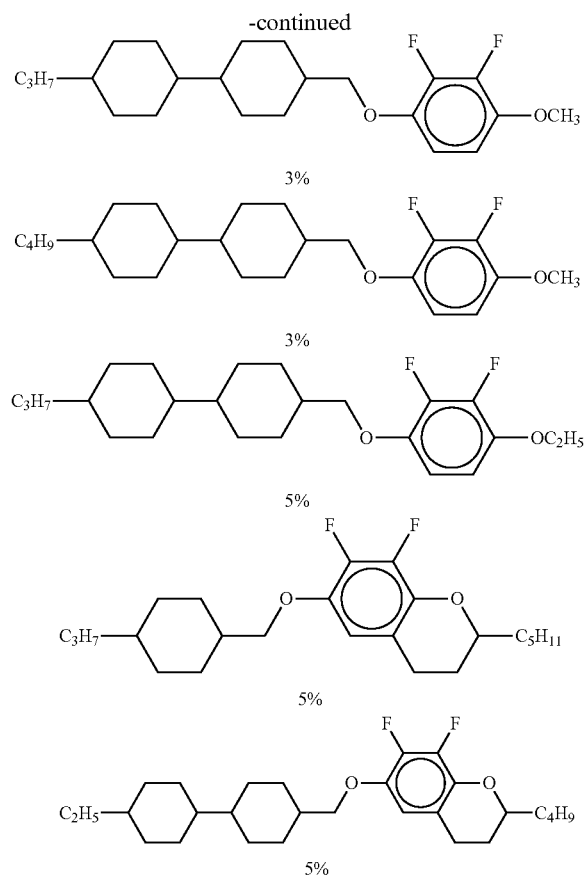

Hereinafter, in the same manner as the cinnamic acid polymer (ACe-1), with respect to (ACe-2) to (ACe-7), and (ACeV-1) to (ACeV-7), alignment layers were fabricated and liquid crystal cells were fabricated. The measurement results of the irradiation doses of linear polarized light, liquid crystal alignment property, pretilt angle, VHR, and RDC are shown in conjunction in Tables 25 and 26.

Further, Examples with respect to (ACe-1) to (ACe-7) were assumed to be (Example 101) to (Example 107), and Examples with respect to (ACeV-1) to (ACeV-7) were assumed to be (Example 108) to (Example 114).

For the liquid crystal alignment property, the pretilt angle, and the VHR, the same evaluation criteria as in Example of the first embodiment were used. For RDC, a value of less than 50 mV was denoted as O (good), a value from 50 mV to 150 mV was denoted as Δ (acceptable), and a value of 150 mV or more was denoted as X (poor). RDC is an index for residual image characteristics (seizure). When the value is usually 150 mV or less, the residual image characteristics can be said to be good, whereas when the value is 50 mV or less, the residual image characteristics can be said to be particularly good.

TABLE 25

| Sample name | Irradiation dose of linear polarized light (mJ/cm²) | Liquid crystal alignment property | Pretilt angle | VHR | RDC |
|---|---|---|---|---|---|
| Example 101 | ACe-1 | 100 | O | P | O | O |
| Example 102 | ACe-2 | 100 | O | P | O | O |

TABLE 25-continued

| Sample name | Irradiation dose of linear polarized light (mJ/cm²) | Liquid crystal alignment property | Pretilt angle | VHR | RDC |
|---|---|---|---|---|---|
| Example 103 | ACe-3 | 100 | O | P | O | O |
| Example 104 | ACe-4 | 100 | O | P | O | O |
| Example 105 | ACe-5 | 100 | O | P | O | O |
| Example 106 | ACe-6 | 100 | O | P | O | O |
| Example 107 | ACe-7 | 100 | O | P | O | O |

TABLE 26

| Sample name | Irradiation dose of linear polarized light (mJ/cm²) | Liquid crystal alignment property | Pretilt angle | VHR | RDC |
|---|---|---|---|---|---|
| Example 108 | ACeV-1 | 100 | O | V | O | O |
| Example 109 | ACeV-2 | 100 | O | V | O | O |
| Example 110 | ACeV-3 | 100 | O | V | O | O |
| Example 111 | ACeV-4 | 100 | O | P | O | O |
| Example 112 | ACeV-5 | 100 | O | P | O | O |
| Example 113 | ACeV-6 | 100 | O | P | O | O |
| Example 114 | ACeV-7 | 100 | O | P | O | O |

From the above results, it was found that an alignment layer, which allows a low irradiation dose of linear polarized light, has a superior liquid crystal alignment property and a superior ability to control the pretilt, and exhibits a high voltage holding ratio and low residual voltage, can be obtained, by the polymer in the third embodiment of the present invention.

Comparative Examples 25 to 28

For comparison, a cinnamic acid derivative (D-2) was synthesized in the same manner as in Comparative Example in Example of the first embodiment.

Further, by the same method as in Example 1, copolymers (AC-1), (ACV-1), (ACV-2) and (Cv-1″) were prepared at the ratios shown in Table 27. The composition of each of the copolymers is as shown in Table 27.

Further, (AC-1) was assumed to be (Comparative Example 25), (ACV-1) was assumed to be (Comparative Example 26), (ACV-2) was assumed to be (Comparative Example 27), and (Cv-1″) was assumed to be (Comparative Example 28).

However, Comparative Examples 25 to 27 in Table 27 are the same as Comparative Examples 1 to 3 shown in Example of the first embodiment.

TABLE 27

| | | Blending amount | | | |
|---|---|---|---|---|---|
| Sample name | | P-3 | D-2 | Cinn-4 | V-1 | V-3 |
| Comparative Example 25 | AC-1 | 5 | 95 | | | |
| Comparative Example 26 | ACV-1 | 5 | 65 | | 30 | |

TABLE 27-continued

| Sample name | Blending amount | | | | |
|---|---|---|---|---|---|
| | P-3 | D-2 | Cinn-4 | V-1 | V-3 |
| Comparative Example 27  ACV-2 | 5 | 65 | | | 30 |
| Comparative Example 28  Cv-1" | | | 100 | | |

Furthermore, by the same method as in Example 101, an alignment layer was fabricated using the samples, and thus, various measurements were conducted and the results therefrom are shown in Table 28.

Further, Comparative Example with respect to (AC-1) was assumed to be (Comparative Example 29), Comparative Example with respect to (ACV-1) was assumed to be (Comparative Example 30), Comparative Example with respect to (ACV-2) was assumed to be (Comparative Example 31), and Comparative Example with respect to (Cv-1") was assumed to be (Comparative Example 32). However, Comparative Examples 29 to 31 in Table 18 are the same as Comparative Examples 5 to 7 shown in Example of the first embodiment.

TABLE 28

| Sample name | Irradiation dose of linear polarized light (mJ/cm$^2$) | Liquid crystal alignment property | Pretilt angle | VHR | RDC |
|---|---|---|---|---|---|
| Comparative Example 29  AC-1 | 100 | ○ | P | ○ | Δ |
| Comparative Example 30  ACV-1 | 100 | ○ | V | ○ | Δ |
| Comparative Example 31  ACV-2 | 100 | ○ | P | ○ | Δ |
| Comparative Example 32  Cv-1" | 300 | ○ | P | ○ | ○ |

Therefore, it was found that a liquid crystal alignment layer which has the effects of allowing a low irradiation dose of linear polarized light, having a superior ability to control the alignment of the liquid crystals and the pretilt angles, and exhibiting a high voltage holding ratio (VHR) and low residual voltage, and a display element using the composition can be obtained by the present invention.

(Preparation of Polymerizable Liquid Crystal Composition (LC-1))

Using the same method as that described in "Preparation of Polymerizable Liquid Crystal Composition (LC-1)" in Example of the first embodiment, a polymerizable liquid crystal composition (LC-1) was obtained.

(Preparation of Polymerizable Liquid Crystal Composition (LC-2))

Using the same method as that described in "Preparation of Polymerizable Liquid Crystal Composition (LC-2)" in Example of the first embodiment, a polymerizable liquid crystal composition (LC-2) was obtained.

(Method for Evaluating Alignment Property)

The alignment property of the optical anisotropic body was evaluated by the same method as "Method for Evaluating Alignment Property" used in Example of the first embodiment.

(Evaluation of Coatability)

For the coatability, a film formed by applying the polymer onto a glass plate was observed, and thus, a case where the polymer was uniformly applied to obtain a smooth film was denoted as O (good), a case where there was damage•non-uniformity on the coated surface at one place was denoted as Δ (acceptable), and a case where there was damage•non-uniformity on the coated surface in two or more places was denoted as X (poor).

(Preparation of Alignment Layer and Preparation of Optical Anisotropic Body)

Example 115

By the same method as in "Preparation of Alignment Layer and Preparation of Optical Anisotropic Body" in Example of the first embodiment except for using the copolymer (ACe-1), an optical anisotropic body was obtained.

As a result, the alignment property was A, and good alignment could be obtained with a low irradiation dose of 90 mJ/cm$^2$. The evaluation result for the solvent resistance•chemical resistance of the optical anisotropic body was B. Further, the alignment direction was observed, and as a result, it was found to be homogeneous alignment, and a smooth film was obtained with uniform coating.

Furthermore, it was found that with respect to the optical anisotropic body of the present invention, an alignment property can be provided at an extremely low irradiation dose of ultraviolet rays during the production, and it is possible to control the alignment direction and produce a smooth film surface.

Examples 116 to 129

In the same manner as in Example 115 except that the copolymers (ACe-2) to (ACe-7), (ACeV-1) to (ACeV-7) were used instead of the copolymer (ACe-1), the optical anisotropic bodies in Examples 116 to 129 were fabricated. The coatability, the alignment direction, and the liquid crystal alignment property were investigated and the results are shown in conjunction in Table 29.

TABLE 29

| | Copolymer for photo-alignment film | Irradiation dose of linear polarized light (mJ/cm$^2$) | Polymerizable liquid crystal composition | Alignment direction | Smoothness of film surface | Liquid crystal alignment property |
|---|---|---|---|---|---|---|
| Example 115 | ACe-1 | 90 | LC-1 | Homogeneous | ○ | A |
| Example 116 | ACe-2 | 90 | LC-1 | Homogeneous | ○ | A |
| Example 117 | ACe-3 | 90 | LC-1 | Homogeneous | ○ | A |
| Example 118 | ACe-4 | 90 | LC-1 | Homogeneous | ○ | A |

TABLE 29-continued

| | Copolymer for photo-alignment film | Irradiation dose of linear polarized light (mJ/cm²) | Polymerizable liquid crystal composition | Alignment direction | Smoothness of film surface | Liquid crystal alignment property |
|---|---|---|---|---|---|---|
| Example 119 | ACe-5 | 90 | LC-1 | Homogeneous | ○ | A |
| Example 120 | ACe-6 | 90 | LC-1 | Homogeneous | ○ | A |
| Example 121 | ACe-7 | 90 | LC-1 | Homogeneous | ○ | A |
| Example 122 | ACeV-1 | 90 | LC-1 | Homeotropic | ○ | A |
| Example 123 | ACeV-2 | 90 | LC-1 | Homeotropic | ○ | A |
| Example 124 | ACeV-3 | 90 | LC-1 | Homeotropic | ○ | A |
| Example 125 | ACeV-4 | 90 | LC-1 | Homogeneous | ○ | A |
| Example 126 | ACeV-5 | 90 | LC-1 | Homogeneous | ○ | A |
| Example 127 | ACeV-6 | 90 | LC-1 | Homogeneous | ○ | A |
| Example 128 | ACeV-7 | 90 | LC-1 | Homogeneous | ○ | A |
| Example 129 | ACeV-7 | 90 | LC-2 | Homeotropic | ○ | A |

Comparative Examples 33 to 36

For comparison, the compositions for a liquid crystal alignment layer capable of photo-alignment (AC-1), (ACV-1), (ACV-2) and (Cv-1") were prepared, respectively, at the ratios shown in Table 27. Using the compositions for a liquid crystal alignment layer capable of photo-alignment, in the same manner as in Example 115, optical anisotropic bodies in Comparative Examples 33 to 36 were fabricated. The coatability, the alignment direction, and the liquid crystal alignment property were investigated, and the results thereof are shown in conjunction in Table 30. However, the optical anisotropic bodies in Comparative Examples 33 to 36 shown in Table below were the same as the optical anisotropic bodies in Comparative Examples 9 to 11 in Example of the first embodiment.

TABLE 30

| | Copolymer for photo-alignment film | Irradiation dose of linear polarized light | Polymerizable liquid crystal composition | Alignment direction | Smoothness of film surface | Liquid crystal alignment property |
|---|---|---|---|---|---|---|
| Comparative Example 33 | AC-1 | 90 | LC-1 | Homogeneous | Δ | A |
| Comparative Example 34 | ACV-1 | 90 | LC-1 | Homeotropic | Δ | A |
| Comparative Example 35 | ACV-2 | 90 | LC-1 | Homogeneous | Δ | A |
| Comparative Example 36 | Cv-1" | 120 | LC-1 | Homogeneous | ○ | A |

From the above results, it was found that with respect also to the optical anisotropic bodies in Examples 115 to 129, an alignment property can be provided at a significantly low irradiation dose of ultraviolet rays during the production, and the alignment direction can be controlled.

INDUSTRIAL APPLICABILITY

The polymer of the present invention can be used to prepare an alignment layer by light having optical anisotropy at a low irradiation dose, and can be suitably used to prepare an optical anisotropic body such as a liquid crystal display element and an optical compensation film. Further, the liquid crystal alignment layer and the optical anisotropic body of the present invention have a liquid crystal alignment property with which an ability to control the alignment can be provided at a low irradiation dose of ultraviolet rays, and have excellent characteristics to give any pretilt angle.

That is, according to the present invention, a liquid crystal alignment layer which has a superior ability to control the alignment of the liquid crystals and the pretilt angles, and a high voltage holding ratio (VHR), and a liquid crystal alignment property to provide an ability to control the alignment at a low irradiation dose of ultraviolet rays, and is not eroded by a solvent or the like; polymer used for the liquid crystal alignment layer; a liquid crystal display element using the liquid crystal alignment layer; and an optical anisotropic body using the polymer can be provided. Further, according to the present invention, in addition to the characteristics above, a polymer having characteristics of superior coatability and/or low residual voltage can also be formed.

The invention claimed is:

1. A polymer comprising (a) a photochemically isomerizable and photochemically non-crosslinkable site, and (b) a photochemically crosslinkable site, wherein the polymer contains a unit represented by the general formula (I):

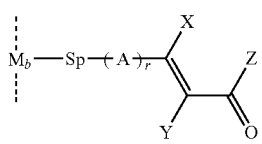

wherein $M_b$ represents a unit contained in a main chain of the polymer,

Sp represents a spacer unit,

A represents a group selected from the group consisting of:
(a) a trans-1,4-cyclohexylene group, wherein one methylene group or two or more non-adjacent methylene groups present in the trans-1,4-cyclohexylene group may be substituted with —O—, —NH—, or —S—,
(b) a 1,4-phenylene group, wherein one —CH= or two or more —CH='s present in the 1,4-phenylene group may be substituted with —N=, and
(c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, r represents 0, 1, or 2, but in the case where r represents 2, a plurality of A's, which is present, may be the same as or different from each other, X and Y each independently represents a hydrogen atom, a fluorine atom, a chlorine atom, a cyano group, or an alkyl group having 1 to 20 carbon atoms, but a hydrogen atom in the alkyl group may be substituted with a fluorine atom, and one $CH_2$ group or two or more non-adjacent $CH_2$ groups may be substituted with —O—, —CO—O—, —O—CO— and/or —CH=CH—, and Z is represented by the general formula (IIa) or (IIb):

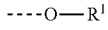

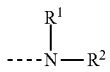

wherein the broken line represents a bond to a carbon atom, to which Z is bonded, and wherein in the general formula (IIa), $R^1$ represents a linear or branched alkyl group having 1 to 30 carbon atoms, and at least one of (i) one —$CH_2$— group or two or more non-adjacent —$CH_2$— groups in $R^1$ are substituted with —O—, —CO—, —CO—O—, —O—CO—, —CO—NH—, —NH—CO—, —$NCH_3$—, —CH=CH—, —CF=CF—, and/or —C≡C—, (ii) one —$CH_2$— group or two or more —$CH_2$— groups in $R^1$ are substituted with a cycloalkyl group of from 3- to 8-membered ring, and (iii) a hydrogen atom in $R^1$ is substituted with an alkyl group having 1 to 20 carbon atoms, a cyano group, or a halogen atom, wherein in the general formula (IIb), $R^1$ and $R^2$ each independently represents a hydrogen atom or a linear or branched alkyl group having 1 to 30 carbon atoms, and one —$CH_2$— group or two or more non-adjacent —$CH_2$— groups in $R^1$ and $R^2$ may be substituted with —O—, —CO—, —CO—O—, —O—CO—, —CO—NH—, —NH—CO—, —$NCH_3$—, —CH=CH—, —CF=CF—, and/or —C≡C—, one —$CH_2$— group or two or more —$CH_2$— groups in $R^1$ and $R^2$ may be each independently substituted with a cycloalkyl group of from 3- to 8-membered ring, and a hydrogen atom in $R^1$ and $R^2$ may be substituted with an alkyl group having 1 to 20 carbon atoms, a cyano group, or a halogen atom, wherein in the general formula (I), Sp is represented by the following general formula (IVa):

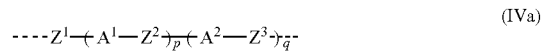

wherein the left broken line represents a bond to $M_b$, and the right broken line represents a bond to A or a bond to a carbon atom, to which X is bonded, $Z^1$, $Z^2$ and $Z^3$ each independently represents a single bond, —$(CH_2)_u$— in which u represents 1 to 20, —$OCH_2$—, —$CH_2O$—, —COO—, —OCO—, —CH=CH—, —CF=CF—, —$CF_2O$—, —$OCF_2$—, —$CF_2CF_2$—, or —C≡C, wherein one or more of the non-adjacent $CH_2$ groups in these substituents may be independently substituted with —O—, —CO—, —CO—O—, —O—CO—, —Si$(CH_3)_2$—O—Si $(CH_3)_2$—, —NR—, —NR—CO—, —CO—NR—, —NR—CO—O—, —O—CO—NR—, —NR—CO—NR—, —CH=CH—, —C≡C—, or —O—CO—O— in which R's independently represent hydrogen or an alkyl group having 1 to 5 carbon atoms, $A^1$ and $A^2$ each independently represents a group selected from the group consisting of:
(a) a trans-1,4-cyclohexylene group, wherein one methylene group or two or more non-adjacent methylene groups present in the trans-1,4-cyclohexylene group may be substituted with —O—, —NH—, or —S—,
(b) a 1,4-phenylene group, wherein one —CH= or two or more —CH='s present in the 1,4-phenylene group may be substituted with —N=, and
(c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, and
p and q each independently represents 0 or 1.

2. The polymer according to claim 1,
wherein in the general formula (IIa), $R^1$ represents a linear or branched alkyl group having 1 to 30 carbon atoms, and at least one of (i) one —$CH_2$— group or two or more non-adjacent —$CH_2$— groups in $R_1$ are substituted with —O—, —CO—, —CO—O, —O—CO—, —CO—NH—, —NH—CO—, or —$NCH_3$—, (ii) one —$CH_2$— group or two or more —$CH_2$— groups in $R^1$ are each independently substituted with a cycloalkyl group of from 3- to 8-membered ring, and (iii) a hydrogen atom in $R^1$ is substituted with an alkyl group having 1 to 20 carbon atoms, a cyano group, or a halogen atom, and
wherein in the general formula (IIb), $R^1$ represents a linear or branched alkyl group having 1 to 30 carbon atoms, and one —$CH_2$— group or two or more non-adjacent —$CH_2$— groups in the alkyl group are substituted with —O—, —CO—, —CO—O, —O—CO—, —CO—NH—, —NH—CO—, or —$NCH_3$—, one —$CH_2$— group or two or more —$CH_2$— groups in the alkyl group may be each independently substituted with a cycloalkyl group of from 3- to 8-membered ring, and a hydrogen atom in the alkyl group may be substituted with an alkyl group having 1 to 20 carbon atoms, a cyano group, or a halogen atom, and
$R^2$ represents a linear or branched alkyl group having 1 to 30 carbon atoms, and one —$CH_2$— group or two or more —$CH_2$— groups in the alkyl group may be each independently substituted with a cycloalkyl group of from 3- to 8-membered ring, and a hydrogen atom in the alkyl group may be unsubstituted or may be substituted with an alkyl group having 1 to 20 carbon atoms, a cyano group, or a halogen atom.

3. The polymer according to claim 1, wherein in the general formula (IIa) or (IIb), $R^1$ is represented by the general formula (IIc):

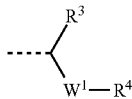

(IIc)

wherein the broken line represents a bond to an oxygen atom or a nitrogen atom,
$W^1$ represents a methylene group in which a hydrogen atom in the methylene group may be unsubstituted or substituted with an alkyl group having 1 to 5 carbon atoms, —CO—O—, or —CO—NH—,
$R^3$ represents a hydrogen atom or an alkyl group having 1 to 5 carbon atoms, and
$R^4$ represents a linear or branched alkyl group having 1 to 20 carbon atoms, wherein one —$CH_2$— group or two or more non-adjacent —$CH_2$— groups in the alkyl group are substituted with —O—, —CO—, —CO—O, —O—CO—, —CO—NH—, —NH—CO—, or —$NCH_3$—, one —$CH_2$— group or two or more —$CH_2$— groups in the alkyl group may be each independently substituted with a cycloalkyl group of from 3- to 8-membered ring, and a hydrogen atom in the alkyl group may be unsubstituted or substituted with a fluorine atom or a chlorine atom.

4. The polymer according to claim 1,
wherein in the general formula (IIa), $R^1$ represents a linear or branched alkyl group having 1 to 30 carbon atoms, and at least one of (i) one —$CH_2$— group or two or more non-adjacent —$CH_2$— groups in $R^1$ are substituted with —CH=CH—, —CF=CF—, and/or —C≡C—, (ii) one —$CH_2$— group or two or more —$CH_2$— groups in $R^1$ are each independently substituted with a cycloalkyl group of from 3- to 8-membered ring, and (iii) a hydrogen atom in $R^1$ is substituted with an alkyl group having 1 to 20 carbon atoms, a cyano group, or a halogen atom, and
wherein in the general formula (IIb), $R^1$ represents a linear or branched alkyl group having 1 to 30 carbon atoms, and one —$CH_2$— group or two or more non-adjacent —$CH_2$— groups in the alkyl group are substituted with —CH=CH—, —CF=CF—, and/or —C≡C—, and one —$CH_2$— group or two or more —$CH_2$— groups in the alkyl group may be each independently substituted with a cycloalkyl group of from 3- to 8-membered ring, and a hydrogen atom in the alkyl group may be substituted with an alkyl group having 1 to 20 carbon atoms, a cyano group, or a halogen atom, and
$R^2$ represents a linear or branched alkyl group having 1 to 30 carbon atoms, and one —$CH_2$— group or two or more —$CH_2$— groups in the alkyl group may be each independently substituted with a cycloalkyl group of from 3- to 8-membered ring, and a hydrogen atom in the alkyl group may be unsubstituted or may be substituted with an alkyl group having 1 to 20 carbon atoms, a cyano group, or a halogen atom.

5. The polymer according to claim 1, wherein in the general formula (IIa) or (IIb), $R^1$ is represented by the general formulae (IId) or (IIf):

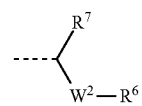

(IId)

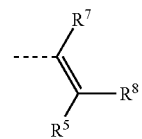

(IIf)

wherein the broken line represents a bond to an oxygen atom or a nitrogen atom,
$W^2$ represents a single bond, —$CH_2$—, —CO—O—, or —CO—NH—,
$R^7$ represents a hydrogen atom or an alkyl group having 1 to 5 carbon atoms,
$R^8$ represents a hydrogen atom, or a linear or branched alkyl group having 1 to 20 carbon atoms, wherein one —$CH_2$— group or two or more —$CH_2$— groups in the alkyl group may be each independently substituted with a cycloalkyl group of from 3- to 8-membered ring, and a hydrogen atom in the alkyl group may be unsubstituted or substituted with a fluorine atom or a chlorine atom,
$R^5$ represents an alkyl group having 1 to 20 carbon atoms, wherein a hydrogen atom in the alkyl group may be substituted with a fluorine atom, and
$R^6$ represents an alkyl group having 1 to 20 carbon atoms, wherein one —$CH_2$— group or two or more non-adjacent —CH₂— groups in the alkyl group are substituted with —CH=CH—, —CF=CF—, and/or —C≡C—, and one —CH₂— group or two or more —CH₂— groups in the alkyl group may be each independently substituted with a cycloalkyl group of from 3- to 8-membered ring, and a hydrogen atom in the alkyl group may be substituted with a fluorine atom or a chlorine atom.

6. The polymer according to claim 1, wherein in the general formula (I), $M_b$ is any one selected from the group consisting of the general formulae (QIII-A-1) to (QIII-A-17):

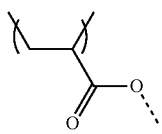
(QIII-A-1)

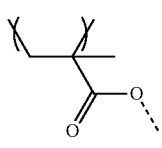
(QIII-A-2)

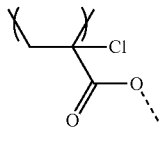
(QIII-A-3)

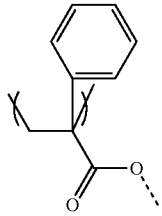
(QIII-A-4)

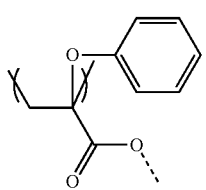
(QIII-A-5)

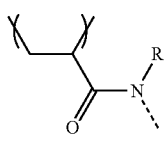
(QIII-A-6)

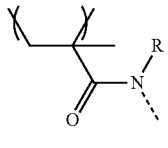
(QIII-A-7)

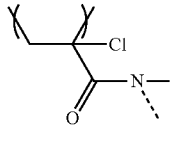
(QIII-A-8)

-continued

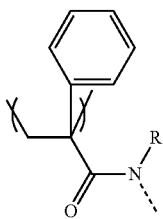
(QIII-A-9)

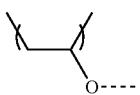
(QIII-A-10)

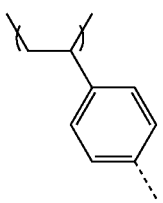
(QIII-A-11)

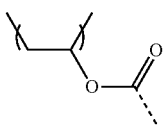
(QIII-A-12)

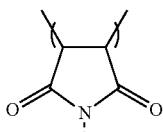
(QIII-A-13)

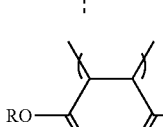
(QIII-A-14)

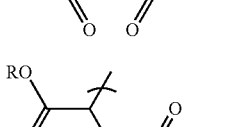
(QIII-A-15)

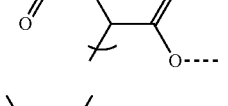
(QIII-A-16)

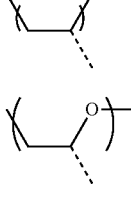
(QIII-A-17)

wherein the broken line represents a bond to Sp and R's independently represent hydrogen or an alkyl group having 1 to 5 carbon atoms.

7. The polymer according to claim 1, wherein in the general formula (I), X and Y each represents a hydrogen atom.

8. The polymer according to claim 1, wherein in the general formula (IVa), $A^2$ represents any group of a trans-1,4-cyclohexylene group, a 2,6-naphthylene group, a pyridine-2,5-diyl group, a pyrimidine-2,5-diyl group, or a 1,4-phenylene group, one or more hydrogen atoms in any group of these groups may be substituted with a fluorine atom, a chlorine atom, a methyl group, or a methoxy group, $Z^3$ represents a single bond or any group of $-(CH_2)_u-$ in which u represents 1 to 20, $-OCH_2-$, $-CH_2O-$, $-COO-$, $-OCO-$, $-CH=CH-$, or $-C\equiv C-$, one or more of the non-adjacent $CH_2$ groups in any group of these groups may be independently substituted with $-O-$, $-CO-$, $-CO-O-$, $-O-CO-$, $-CH=CH-$, or $-C\equiv C-$, and q represents 1.

9. The compound according to claim 1, wherein in the general formula (I), $M_b$ is represented by the general formula (QIII-A-1), (QIII-A-2), (QIII-A-6), (QIII-A-7), or (QIII-A-13):

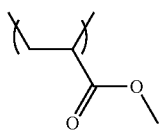

(QIII-A-1)

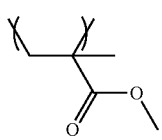

(QIII-A-2)

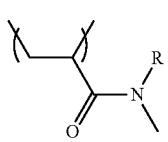

(QIII-A-6)

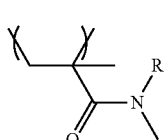

(QIII-A-7)

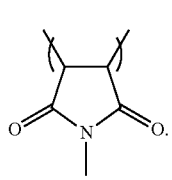

(QIII-A-13)

10. The polymer according to claim 1, wherein in the general formula (I), A represents a 1,4-phenylene group having one or more hydrogen atoms which may be substituted with a fluorine atom, a chlorine atom, a methyl group, or a methoxy group.

11. The polymer according to claim 1, wherein in the general formula (IVa), $A^2$ represents a 1,4-phenylene group having one or more hydrogen atoms which may be substituted with a fluorine atom, a chlorine atom, a methyl group, or a methoxy group.

12. The polymer according to claim 1, wherein in the general formula (I), $M_b$ is represented by the general formula (QIII-A-1) or (QIII-A-2):

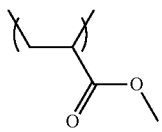

(QIII-A-1)

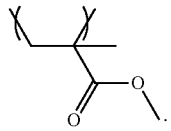

(QIII-A-2)

13. The polymer according to claim 1, wherein the photochemically isomerizable and photochemically non-crosslinkable site includes a structure represented by the following general formula (Q):

$$-S_a-P-S_{aa}-V_a \qquad (Q)$$

wherein the broken line represents a bond to a main chain of the polymer, $S_a$ and $S_{aa}$ represent spacer units which may be different from each other, P represents a photochemically isomerizable and photochemically non-crosslinkable site, and $V_a$ represents a terminal in a side chain of the polymer.

14. The polymer according to claim 13, wherein in the general formula (Q), $S_a$ and $S_{aa}$ are represented by the following general formula (VI):

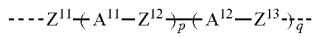

(VI)

wherein the broken line represents a bond to the main chain of the polymer, or $M_a$, P, or $V_a$;

$Z^{11}$, $Z^{12}$ and $Z^{13}$ each independently represents a single bond, $-(CH_2)_u-$ in which u represents 1 to 20, $-OCH_2-$, $-CH_2O-$, $-COO-$, $-OCO-$, $-CH=CH-$, $-CF=CF-$, $-CF_2O-$, $-OCF_2-$, $-CF_2CF_2-$, or $-C\equiv C-$, in which one or more of the non-adjacent $CH_2$ groups in these substituents may be independently substituted with $-O-$, $-CO-$, $-CO-O-$, $-O-CO-$, $-Si(CH_3)_2-O-Si(CH_3)_2-$, $-NR-$, $-NR-CO$, $-CO-NR-$, $-NR-CO-O-$, $-O-CO-NR-$, $-NR-CO-NR-$, $-CH=CH-$, $-C\equiv C-$, or $-O-CO-O-$ in which R's independently represent hydrogen or an alkyl group having 1 to 5 carbon atoms, $A^{11}$ and $A^{12}$ each independently represents a group selected from the group consisting of:
(a) a trans-1,4-cyclohexylene wherein one methylene group or two or more non-adjacent methylene groups present in the trans-1,4-cyclohexylene group may be substituted with $-O-$, $-NH-$, or $-S-$,
(b) a 1,4-phenylenegroup, wherein one $-CH=$ or two or more $-CH=$'s present in the 1,4-phenylene group may be substituted with $-N=$, and
(c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, and p and q each independently represents 0 or 1.

15. The polymer according to claim 13, wherein in the general formula (Q), $V_a$ is represented by the following general formula (VII):

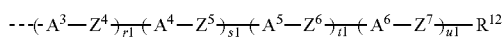
(VII)

wherein the broken line represents a bond to $S_{aa}$;
$Z^4$, $Z^5$, $Z^6$ and $Z^7$ each independently represents a single bond, —$(CH_2)_u$— in which u represents 1 to 20, —$OCH_2$—, —$CH_2O$—, —COO—, —OCO—, —CH=CH—, —CF=CF—, —$CF_2O$—, —$CF_2CF_2$— or —C≡C—, in which one or more of the non-adjacent $CH_2$ groups in these substituents may be independently substituted with —O—, —CO—, —CO—O—, —O—CO—, —$Si(CH_3)_2$—O—Si$(CH_3)_2$—, —NR—, —NR—CO, —CO—NR—, —NR—CO—O—, —O—CO—NR—, —NR—CO—NR—, —CH=CH—, —C≡C—, or —O—CO—O— in which R's independently represent hydrogen or an alkyl group having 1 to 5 carbon atoms,
$A^3$, $A^4$, $A^5$ and $A^6$ each independently represent a group selected from the group consisting of:
(a) a trans-1,4-cyclohexylene groups, wherein one methylene group or two or more non-adjacent methylene groups present in the trans-1,4-cyclohexylene group may be substituted with —O—, —NH—, or —S—,
(b) a 1,4-phenylenegroup, wherein one —CH= or two or more —CH='s present in the 1,4-phenylene group may be substituted with —N=, and
(c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group,
r1, s1, t1, and u1 each independently represents 0 or 1, and
$R^{12}$ represents hydrogen, fluorine, chlorine, a cyano group, or an alkyl group having 1 to 20 carbon atoms, a hydrogen atom in the alkyl group may be substituted with a fluorine atom, and one $CH_2$ group or two or more non-adjacent $CH_2$ groups may be substituted with —O—, —CO—O—, —O—CO— and/or —CH=CH—.

16. The polymer according to claim 13, wherein in the general formula (Q), P is represented by the following general formula (VIII):

--(-$A^{21}$-)$_{p1}$(-N=N-$A^{22}$-)$_{q1}$(-N=N-$A^{23}$-)$_{r1}$(-N=N-$A^{24}$-)$_{s1}$(-N=N-$A^{25}$-)$_{t1}$-- (VIII)

wherein the broken line represents a bond to $S_a$ and $S_{aa}$;
$A^{21}$, $A^{22}$, $A^{23}$, $A^{24}$ and $A^{25}$ each independently represent a 1,4-naphthylene group, a 2,6-naphthylene group, a 2,5-pyridyl group, a 2,5-pyrimidyl group, a 2,5-thiophenylene group, a 2,5-furanylene group, or a 1,4-phenylene group, these are unsubstituted, or mono-substituted or poly-substituted with a fluorine atom, a chlorine atom, a bromine atom, a methyl group, a methoxy group, a nitro group, —$NR^{21}R^{22}$, or a linear or branched alkyl residue having 1 to 10 carbon atoms, and the alkyl residue is unsubstituted or mono-substituted or poly-substituted with fluorine, in which one or more of the non-adjacent $CH_2$ groups may be independently substituted with Q, and Q represents —O—, —CO—, —CO—O—, —O—CO—, —$Si(CH_3)_2$—O—$Si(CH_3)_2$—, —NR—, —NR—CO—, —CO—NR—, —NR—CO—O—, —O—CO—NR—, —NR—CO—NR—, —CH=CH—, —C≡C—, or —O—CO—O—, R, $R^{21}$ and $R^{22}$ independently represent a hydrogen atom or an alkyl group having 1 to 5 carbon atoms; and
p1, q1, r1, s1 and t1 each independently represents 0 or 1, provided that these satisfy 0<q1+r1+s1+t1.

17. The polymer according to claim 1, which includes a structural unit represented by the following general formula (QP):

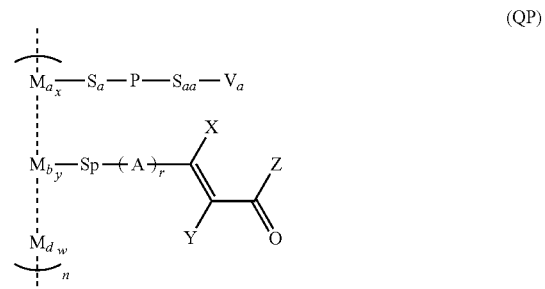
(QP)

wherein Sp, A, X, Y, Z, and r have the same definitions as in the general formula (I), $S_a$ and $S_{aa}$ represent spacer units which may be different from each other, P represents a photochemically isomerizable and photochemically non-crosslinkable site, and $V_a$ represents a terminal in the side chain, $M_a$, $M_b$ and $M_d$ each represents monomer units of the polymer, which may be different from each other, x, y and w each represents a molar fraction of the copolymer, each satisfying 0<x<1, 0<y<1, and 0≤w<1, n represents 4 to 1000000, an arrangement orders of $M_a$, $M_b$ and $M_d$ may be the same as or different from that shown in the general formula (QP), and the monomer units of $M_a$, $M_b$ and $M_d$ may be each independently constituted with one kind of units or two or more kinds of different units, and wherein $M_a$ and $M_b$ are any one or more kinds selected from the group consisting of the general formulae (QIII-A-1) to (QIII-A-17):

(QIII-A-1)

-continued (QIII-A-2) 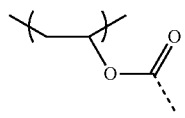

(QIII-A-3) 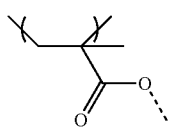

(QIII-A-4) 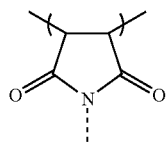

(QIII-A-5) 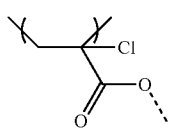

(QIII-A-6) 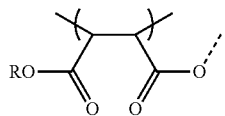

(QIII-A-7) 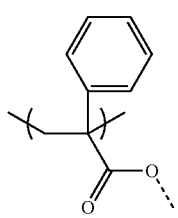

(QIII-A-8) 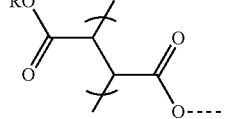

(QIII-A-9) 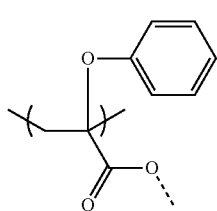

(QIII-A-10) 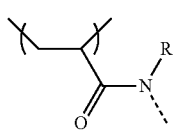

(QIII-A-11) 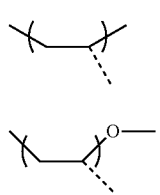

(QIII-A-12) 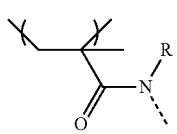

(QIII-A-13) 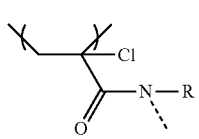

(QIII-A-14) 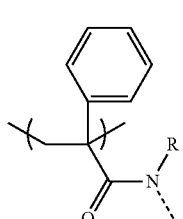

(QIII-A-15) 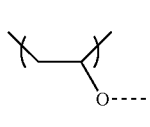

(QIII-A-16) 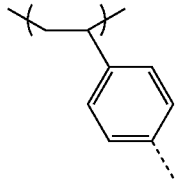

(QIII-A-17)

wherein the broken line represents a bond to $S_a$ or $S_p$, R's independently represent hydrogen or an alkyl group having 1 to 5 carbon atoms, and any hydrogen atom in each of the structures may be substituted with a fluorine atom, a chlorine atom, a methyl group, or a methoxy group.

18. The polymer according to claim 17, wherein in the general formula (QP), $M_d$ represents any one or more kinds selected from the group consisting of the general formulae (QIII-1) to (QIII-17):

(QIII-1) 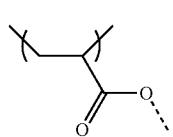

(QIII-2) 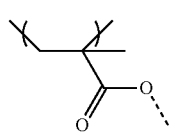

(QIII-3) 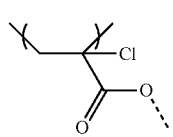

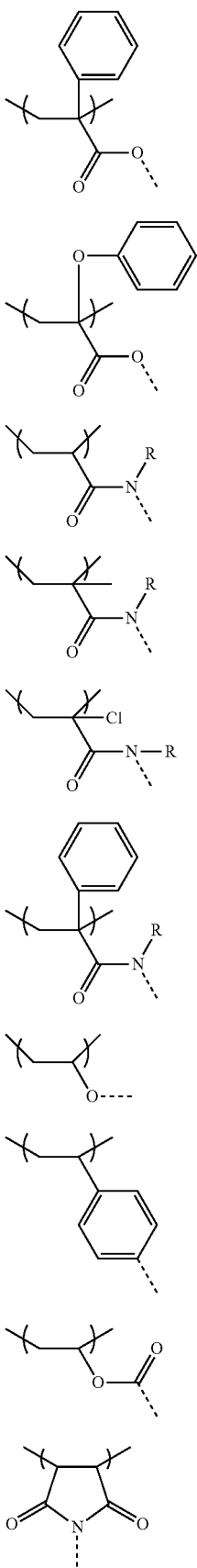

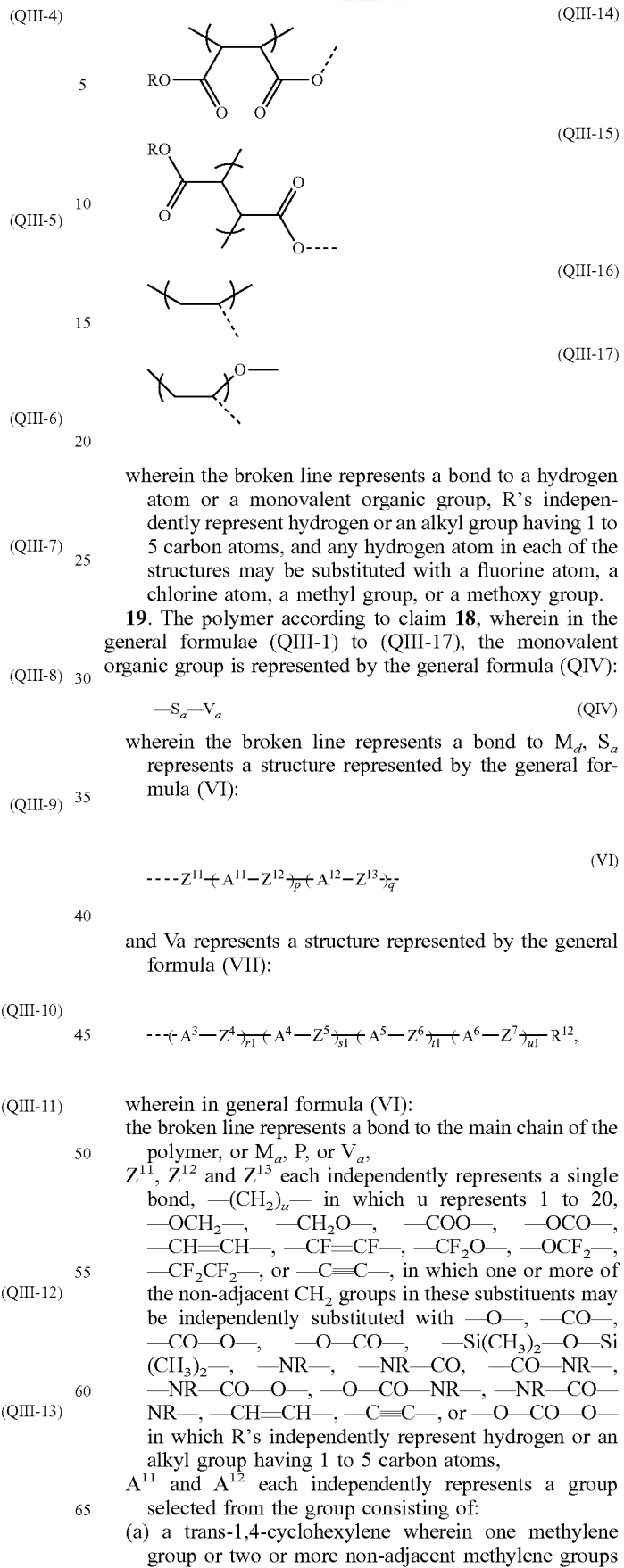

wherein the broken line represents a bond to a hydrogen atom or a monovalent organic group, R's independently represent hydrogen or an alkyl group having 1 to 5 carbon atoms, and any hydrogen atom in each of the structures may be substituted with a fluorine atom, a chlorine atom, a methyl group, or a methoxy group.

19. The polymer according to claim 18, wherein in the general formulae (QIII-1) to (QIII-17), the monovalent organic group is represented by the general formula (QIV):

$$—S_a—V_a \qquad (QIV)$$

wherein the broken line represents a bond to $M_d$, $S_a$ represents a structure represented by the general formula (VI):

$$----Z^{11}\!-\!\!(\!A^{11}\!-\!Z^{12}\!)_p\!-\!(\!A^{12}\!-\!Z^{13}\!)_q\!- \qquad (VI)$$

and Va represents a structure represented by the general formula (VII):

$$---(A^3—Z^4)_{r1}(A^4—Z^5)_{s1}(A^5—Z^6)_{t1}(A^6—Z^7)_{u1}R^{12},$$

wherein in general formula (VI):
the broken line represents a bond to the main chain of the polymer, or $M_a$, P, or $V_a$,
$Z^{11}$, $Z^{12}$ and $Z^{13}$ each independently represents a single bond, —(CH$_2$)$_u$— in which u represents 1 to 20, —OCH$_2$—, —CH$_2$O—, —COO—, —OCO—, —CH=CH—, —CF=CF—, —CF$_2$O—, —OCF$_2$—, —CF$_2$CF$_2$—, or —C≡C—, in which one or more of the non-adjacent CH$_2$ groups in these substituents may be independently substituted with —O—, —CO—, —CO—O—, —O—CO—, —Si(CH$_3$)$_2$—O—Si(CH$_3$)$_2$—, —NR—, —NR—CO—, —CO—NR—, —NR—CO—O—, —O—CO—NR—, —NR—CO—NR—, —CH=CH—, —C≡C—, or —O—CO—O— in which R's independently represent hydrogen or an alkyl group having 1 to 5 carbon atoms,
$A^{11}$ and $A^{12}$ each independently represents a group selected from the group consisting of:
(a) a trans-1,4-cyclohexylene wherein one methylene group or two or more non-adjacent methylene groups present in the trans-1,4-cyclohexylene group may be substituted with —O—, —NH—, or —S—, (b) a 1,4-phenylenegroup, wherein one —CH═or two or more —CH═'s present in the 1,4-phenylene group may be substituted with —N═, and (c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, p and q each independently represents 0 or 1, and wherein in the general formula (VII):

the broken line represents a bond to $S_{aa}$;

$Z^4$, $Z^5$, $Z^6$ and $Z^7$ each independently represents a single bond, —(CH$_2$)$_u$— in which u represents 1 to 20, —OCH$_2$—, —CH$_2$O—, —COO—, —OCO—, —CH═CH—, —CF═CF—, —CF$_2$O—, —CF$_2$CF$_2$— or —C≡C—, in which one or more of the non-adjacent CH$_2$ groups in these substituents may be independently substituted with —O—, —CO—, —CO—O—, —O—CO—, —Si(CH$_3$)$_2$—O—Si(CH$_3$)$_2$—, —NR—, —NR—CO, —CO—NR—, —NR—CO—O—, —O—CO—NR—, —NR—CO—NR—, —CH═CH—, —C≡C—, or —O—CO—O— in which R's independently represent hydrogen or an alkyl group having 1 to 5 carbon atoms, $A^3$, $A^4$, $A^5$ and $A^6$ each independently represent a group selected from the group consisting of:

(a) a trans-1,4-cyclohexylene groups, wherein one methylene group or two or more non-adjacent methylene groups present in the trans-1,4-cyclohexylene group may be substituted with —O—, —NH—, or —S—, (b) a 1,4-phenylenegroup, wherein one —CH═or two or more —CH═'s present in the 1,4-phenylene group may be substituted with —N═, and (c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, r1, s1, t1, and u1 each independently represents 0 or 1, and $R^{12}$ represents hydrogen, fluorine, chlorine, a cyano group, or an alkyl group having 1 to 20 carbon atoms, a hydrogen atom in the alkyl group may be substituted with a fluorine atom, and one CH$_2$ group or two or more non-adjacent CH$_2$ groups may be substituted with —O—, —CO—O—, —O—CO— and/or —CH═CH—.

20. A liquid crystal alignment layer for a vertical alignment mode liquid crystal display element, comprising the polymer according to claim 1.

21. A vertical alignment mode liquid crystal display element comprising the liquid crystal alignment layer according to claim 20.

22. A liquid crystal alignment layer for a horizontal alignment mode liquid crystal display element, comprising the polymer according to claim 1.

23. A horizontal alignment mode liquid crystal display element comprising the liquid crystal alignment layer according to claim 22.

24. An optical anisotropic body comprising:

a liquid crystal alignment layer comprising the polymer according to claim 1, and a layer obtained by polymerizing a polymerizable liquid crystal composition, wherein the layer is formed on the liquid crystal alignment layer, so that polymerizable liquid crystal molecules in the polymerizable liquid crystal composition are aligned by the polymer in the liquid crystal alignment layer.

25. A polymer comprising (a) a photochemically isomerizable and photochemically non-crosslinkable site, and (b) a photochemically crosslinkable site, wherein the polymer contains a unit represented by the general formula (I):

$$M_b\text{—}Sp\text{—}(A)_r\text{—}\underset{Y}{\overset{X}{\diagdown}}C=C\underset{O}{\overset{Z}{\diagup}} \quad (I)$$

wherein $M_b$ represents a unit contained in a main chain of the polymer,

Sp represents a spacer unit,

A represents a group selected from the group consisting of:

(a) a trans-1,4-cyclohexylene group, wherein one methylene group or two or more non-adjacent methylene groups present in the trans-1,4-cyclohexylene group may be substituted with —O—, —NH—, or —S—, (b) a 1,4-phenylene group, wherein one —CH═or two or more —CH═'s present in the 1,4-phenylene group may be substituted with —N═, and (c) a 1,4-cyclohexenylene group, a 2,5-thiophenylene group, a 2,5-furanylene group, a 1,4-bicyclo(2.2.2) octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, r represents 0, 1, or 2, but in the case where r represents 2, a plurality of A's, which is present, may be the same as or different from each other, X and Y each independently represents a hydrogen atom, a fluorine atom, a chlorine atom, a cyano group, or an alkyl group having 1 to 20 carbon atoms, but a hydrogen atom in the alkyl group may be substituted with a fluorine atom, and one CH$_2$ group or two or more non-adjacent CH$_2$ groups may be substituted with —O—, —CO—O—, —O—CO— and/or —CH═CH—, and Z is represented by the general formula (IIa) or (IIb):

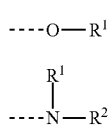

(IIa)

(IIb)

wherein the broken line represents a bond to a carbon atom, to which Z is bonded, and wherein in the general formula (IIa), $R^1$ represents a linear or branched alkyl group having 1 to 30 carbon atoms, and at least one of (i) one —$CH_2$— group or two or more —$CH_2$— groups in $R_1$ are each independently substituted with a cycloalkyl group of from 3- to 8-membered ring, and (ii) a hydrogen atom in $R^1$ is substituted with an alkyl group having 1 to 20 carbon atoms, a cyano group, or a halogen atom, wherein in the general formula (IIb), $R^1$ represents a hydrogen atom or a linear or branched alkyl group having 1 to 30 carbon atoms, and one —$CH_2$— group or two or more —$CH_2$— groups in the alkyl group may be each independently substituted with a cycloalkyl group of from 3- to 8-membered ring, and a hydrogen atom in the alkyl group may be substituted with an alkyl group having 1 to 20 carbon atoms, a cyano group, or a halogen atom, and $R^2$ represents a linear or branched alkyl group having 1 to 30 carbon atoms, and one —$CH_2$— group or two or more —$CH_2$— groups in the alkyl group may be each independently substituted with a cycloalkyl group of from 3- to 8-membered ring, and a hydrogen atom in the alkyl group may be unsubstituted or may be substituted with an alkyl group having 1 to 20 carbon atoms, a cyano group, or a halogen atom, and in the general formula (I), Sp is represented by the general formula (IVc):

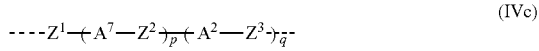

(IVc)

$Z^1$, $Z^2$ and $Z^3$ each independently represents a single bond, —$(CH_2)_u$— in which u represents 1 to 20, —$OCH_2$—, —$CH_2O$—, —COO—, —OCO—, —CH=CH—, —CF=CF—, —$CF_2O$—, —$OCF_2$—, —$CF_2CF_2$—, or —C≡C, wherein one or more of the non-adjacent $CH_2$ groups in these substituents may be independently substituted with —O—, —CO—, —CO—O—, —O—CO—, —Si$(CH_3)_2$—O—Si$(CH_3)_2$—, —NR—, —NR—CO—, —CO—NR—, —NR—CO—O—, —O—CO—NR—, —NR—CO—NR—, —CH=CH—, —C≡C—, or —O—CO—O— in which R's independently represent hydrogen or an alkyl group having 1 to 5 carbon atoms, $A^2$ represents a group selected from the group consisting of:

(a) a trans-1,4-cyclohexylene group, wherein one methylene group or two or more non-adjacent methylene groups present in the trans-1,4-cyclohexylene group may be substituted with —O—, —NH—, or —S—, (b) a 1,4-phenylene group, wherein one —CH= or two or more —CH='s present in the 1,4-phenylene group may be substituted with —N=, and (c) a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, and $A^7$ represents a group selected from the group consisting of:

a 1,4-phenylene group in which three or more —CH='s present in this group are substituted with —N=, a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, and these may be each unsubstituted or have one or more hydrogen atoms substituted with a fluorine atom, a chlorine atom, a cyano group, a methyl group, or a methoxy group, and p represents 1 and q represents 1 or 2, but, in the case where q represents 2, and a plurality of $A^2$ and $Z^3$, which are present, may be the same as or different from each other.

26. The polymer according to claim 25, wherein in the general formula (IVc), $A^7$ represents a 2,6-naphthylene group and one or more hydrogen atoms in the 2,6-naphthylene group may be substituted with a fluorine atom, a chlorine atom, a methyl group, or a methoxy group.

27. A polymer comprising (a) a photochemically isomerizable and photochemically non-crosslinkable site, and (b) a photochemically crosslinkable site, wherein the polymer contains a unit represented by the general formula (I):

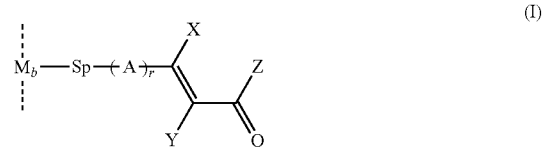

(I)

wherein $M_b$ represents a unit contained in a main chain of the polymer,

Sp represents a spacer unit,

A represents a group selected from the group consisting of:

(a) a trans-1,4-cyclohexylene group, wherein one methylene group or two or more non-adjacent methylene groups present in the trans-1,4-cyclohexylene group may be substituted with —O—, —NH—, or —S—, (b) a 1,4-phenylene group, wherein one —CH= or two or more —CH='s present in the 1,4-phenylene group may be substituted with —N=, and (c) a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, r represents 0, 1, or 2, but in the case where r represents 2, a plurality of A's, which is present, may be the same as or different from each other, X and Y each independently represents a hydrogen atom, a fluorine atom, a chlorine atom, a cyano group, or an alkyl group having 1 to 20 carbon atoms, but a hydrogen atom in the alkyl group may be substituted with a fluorine atom, and one $CH_2$ group or two or more non-adjacent $CH_2$ groups may be substituted with —O—, —CO—O—, —O—CO— and/or —CH=CH—, and Z is represented by the general formula (IIa) or (IIb):

wherein the broken line represents a bond to a carbon atom, to which Z is bonded, and wherein in the general formula (IIa), $R^1$ represents a linear or branched alkyl group having 1 to 30 carbon atoms, and at least one of (i) one —$CH_2$— group or two or more —$CH_2$— groups in $R^1$ are each independently substituted with a cycloalkyl group of from 3- to 8-membered ring, and (ii) a hydrogen atom in $R^1$ is substituted with an alkyl group having 1 to 20 carbon atoms, a cyano group, or a halogen atom, and wherein in the general formula (IIb), $R^1$ represents a linear or branched alkyl group having 1 to 30 carbon atoms, and one —$CH_2$— group or two or more —$CH_2$— groups in the alkyl group are each independently substituted with a cycloalkyl group of from 3- to 8-membered ring, and a hydrogen atom in the alkyl group may be substituted with an alkyl group having 1 to 20 carbon atoms, a cyano group, or a halogen atom, and $R^2$ represents a linear or branched alkyl group having 1 to 30 carbon atoms, and one —$CH_2$— group or two or more —$CH_2$— groups in the alkyl group may be each independently substituted with a cycloalkyl group of from 3- to 8-membered ring, and a hydrogen atom in the alkyl group may be unsubstituted or may be substituted with an alkyl group having 1 to 20 carbon atoms, a cyano group, or a halogen atom, and in the general formula (I), Sp is represented by the general formula (IVb):

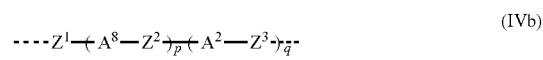

$Z^1$, $Z^2$ and $Z^3$ each independently represents a single bond, —$(CH_2)_u$— in which u represents 1 to 20, —$OCH_2$—, —$CH_2O$—, —COO—, —OCO—, —CH=CH—, —CF=CF—, —$CF_2O$—, —$OCF_2$—, —$CF_2CF_2$—, or —C≡C—, wherein one or more of the non-adjacent $CH_2$ groups in these substituents may be independently substituted with —O—, —CO—, —CO—O—, —O—CO—, —$Si(CH_3)_2$—O—$Si(CH_3)_2$—, —NR—, —NR—CO—, —CO—NR—, —NR—CO—O—, —O—CO—NR—, —NR—CO—NR—, —CH=CH—, —C≡C—, or —O—CO—O— in which R's independently represent hydrogen or an alkyl group having 1 to 5 carbon atoms, $A^2$ represents a group selected from the group consisting of:

(a) a trans-1,4-cyclohexylene group, wherein one methylene group or two or more non-adjacent methylene groups present in the trans-1,4-cyclohexylene group may be substituted with —O—, —NH—, or —S—, (b) a 1,4-phenylene group, wherein one —CH= or two or more —CH='s present in the 1,4-phenylene group may be substituted with —N=, and (c) a 1,4-cyclohexenylene group, a 2,5-thiophenylene group, a 2,5-furanylene group, a 1,4-bicyclo(2.2.2)octylene group, a naphthalene-1,4-diyl group, a naphthalene-2,6-diyl group, a decahydronaphthalene-2,6-diyl group, and a 1,2,3,4-tetrahydronaphthalene-2,6-diyl group, in which the group (a), (b), or (c) may be each unsubstituted or may have one or more hydrogen atoms substituted with a fluorine atom, a chlorine atom, a cyano group, a methyl group, or a methoxy group, and p and q each independently represents 0 or 1, and $A^8$ represents:

a trans-1,4-cyclohexylene group in which one methylene group or two or more non-adjacent methylene groups present in this group may be substituted with —O—, —NH—, or —S—, and a 1,4-phenylene group (one or two —CH='s present in this group may be substituted with —N=), and these may be each unsubstituted or one or more hydrogen atoms may be substituted with a fluorine atom, a chlorine atom, a cyano group, a methyl group, or a methoxy group.

* * * * *